US011954308B2

(12) United States Patent
Yu et al.

(10) Patent No.: US 11,954,308 B2
(45) Date of Patent: Apr. 9, 2024

(54) METHODS AND USER INTERFACES FOR ACCOUNT RECOVERY

(71) Applicant: Apple Inc., Cupertino, CA (US)

(72) Inventors: Carmen S. Yu, Fremont, CA (US); David G. Knipp, Monterey, CA (US); Munish K. Poonia, Cupertino, CA (US); Keetae Ryu, San Jose, CA (US); Hannah S. Story, San Mateo, CA (US); Gokul P. Thirumalai, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/687,429

(22) Filed: Mar. 4, 2022

(65) Prior Publication Data
US 2022/0391057 A1 Dec. 8, 2022

Related U.S. Application Data

(60) Provisional application No. 63/197,499, filed on Jun. 6, 2021, provisional application No. 63/302,848, filed on Jan. 25, 2022.

(51) Int. Cl.
*G06F 3/0484* (2022.01)
*G06F 21/31* (2013.01)
(Continued)

(52) U.S. Cl.
CPC ............ *G06F 3/0484* (2013.01); *G06F 21/31* (2013.01); *G06F 21/316* (2013.01); *G06F 21/32* (2013.01);
(Continued)

(58) Field of Classification Search
None
See application file for complete search history.

(56) References Cited

U.S. PATENT DOCUMENTS 9,203,826 B1 * 12/2015 Margolis ................. H04L 63/08
11,405,200 B1 * 8/2022 Hamel .................. H04L 9/0822
(Continued)

OTHER PUBLICATIONS

International Search Report and Written Opinion received for PCT Patent Application No. PCT/US2023/011386, dated Jul. 7, 2023, 15 pages.
(Continued)

*Primary Examiner* — Tuyetlien T Tran
(74) *Attorney, Agent, or Firm* — DLA Piper LLP (US)

(57) ABSTRACT

The present disclosure generally relates to account recovery. An example method includes, at a computer system in communication with a display generation component and one or more input devices: performing a recovery contact set up process including providing a notification to a contact; after performing the recovery contact set up process, receiving, via the one or more input devices, a request to initiate an account recovery process; in response to the request to initiate the account recovery process and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

42 Claims, 78 Drawing Sheets

(51) Int. Cl.
  *G06F 21/32* (2013.01)
  *G06F 21/34* (2013.01)
  *G06F 21/84* (2013.01)
(52) U.S. Cl.
  CPC .............. *G06F 21/34* (2013.01); *G06F 21/84* (2013.01); *G06F 2221/2131* (2013.01)

(56) References Cited

U.S. PATENT DOCUMENTS

| | | | | |
|---|---|---|---|---|
| 11,768,578 | B2* | 9/2023 | Behzadi | G06F 3/04815 |
| | | | | 715/848 |
| 2010/0293600 | A1* | 11/2010 | Schechter | H04L 63/083 |
| | | | | 726/4 |
| 2012/0166553 | A1* | 6/2012 | Rubinstein | G06Q 50/01 |
| | | | | 709/204 |
| 2016/0226881 | A1* | 8/2016 | Huang | G06Q 50/00 |
| 2017/0142082 | A1* | 5/2017 | Qian | G06F 21/62 |
| 2017/0163615 | A1* | 6/2017 | Ho | H04L 63/083 |
| 2018/0068334 | A1* | 3/2018 | Alomar | G06Q 30/0209 |
| 2019/0206230 | A1* | 7/2019 | Musumano | H04W 4/90 |
| 2019/0327245 | A1* | 10/2019 | Holton | H04L 63/0853 |
| 2020/0005282 | A1* | 1/2020 | Kim | G06Q 20/3672 |
| 2020/0106777 | A1* | 4/2020 | Hu | G06F 21/43 |
| 2020/0257419 | A1* | 8/2020 | Poteet | G06F 3/0484 |
| 2020/0380110 | A1* | 12/2020 | Ichihara | G06F 21/32 |
| 2021/0192039 | A1* | 6/2021 | Pihur | H04L 51/52 |
| 2021/0203661 | A1* | 7/2021 | Sankey | H04W 12/08 |
| 2022/0035510 | A1* | 2/2022 | Behzadi | G06F 3/0484 |

OTHER PUBLICATIONS

Invitation to Pay Additional Fees and Partial International Search Report received for PCT Patent Application No. PCT/US2023/011386, dated May 16, 2023, 9 pages.

* cited by examiner

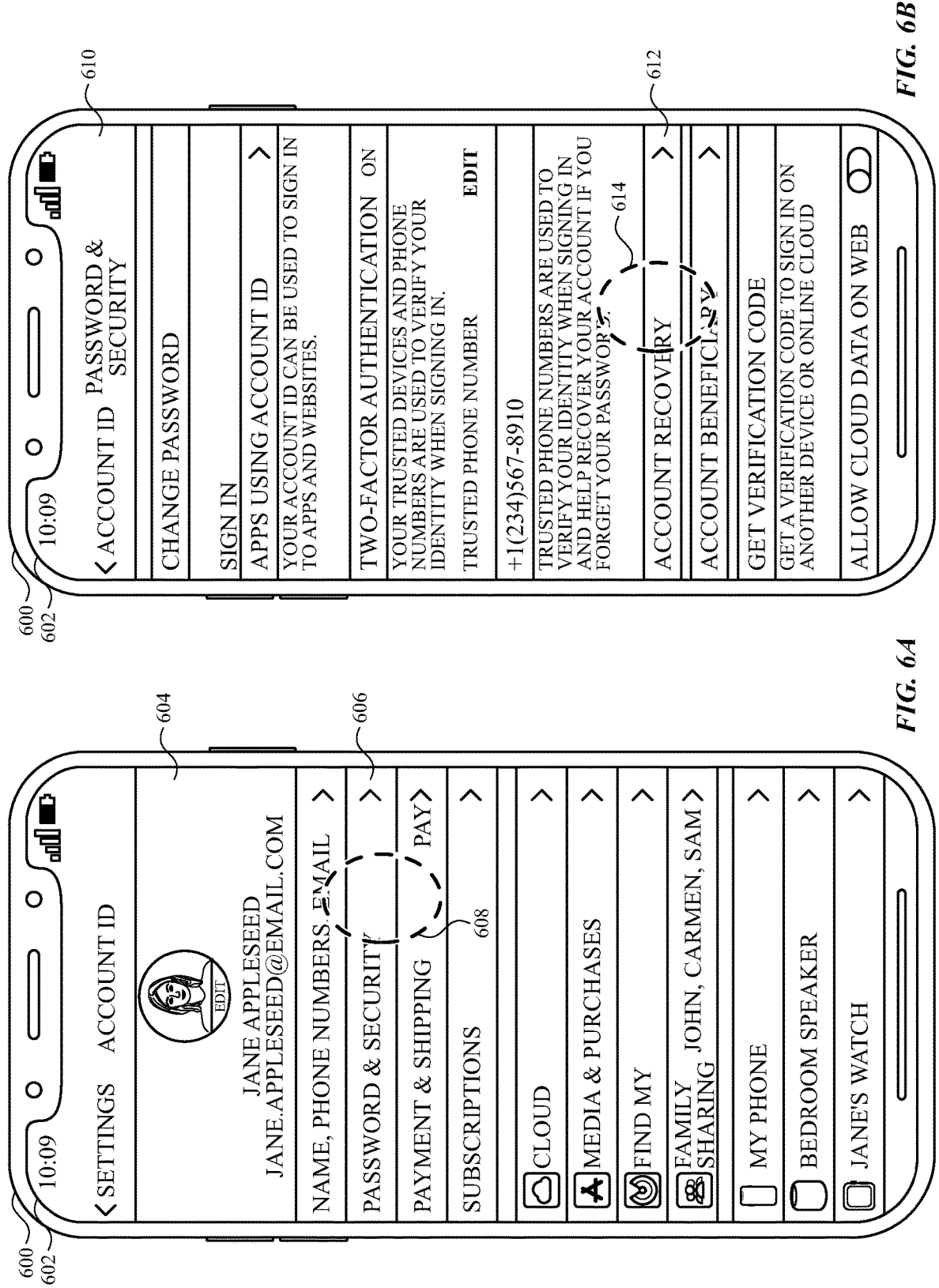

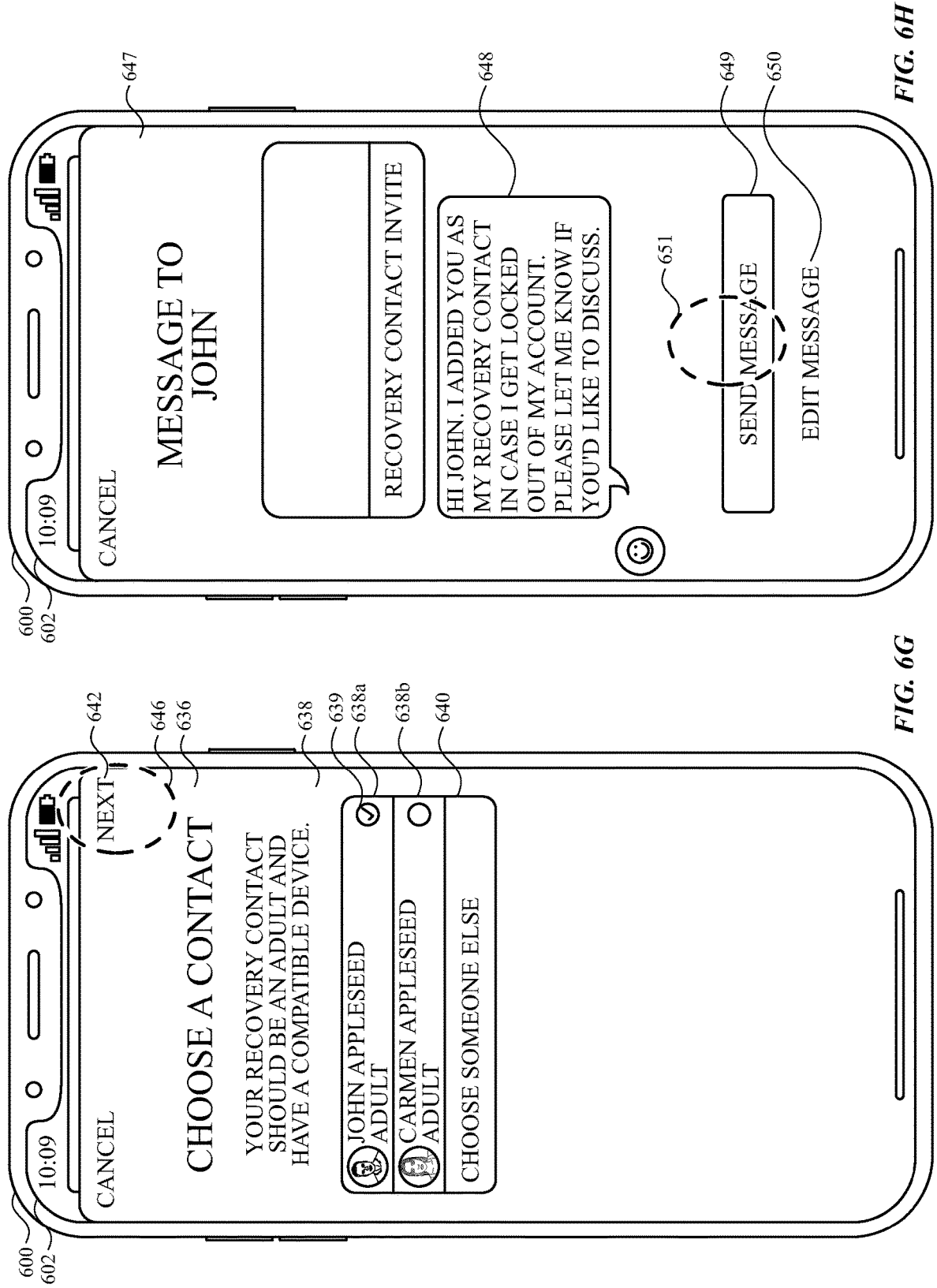

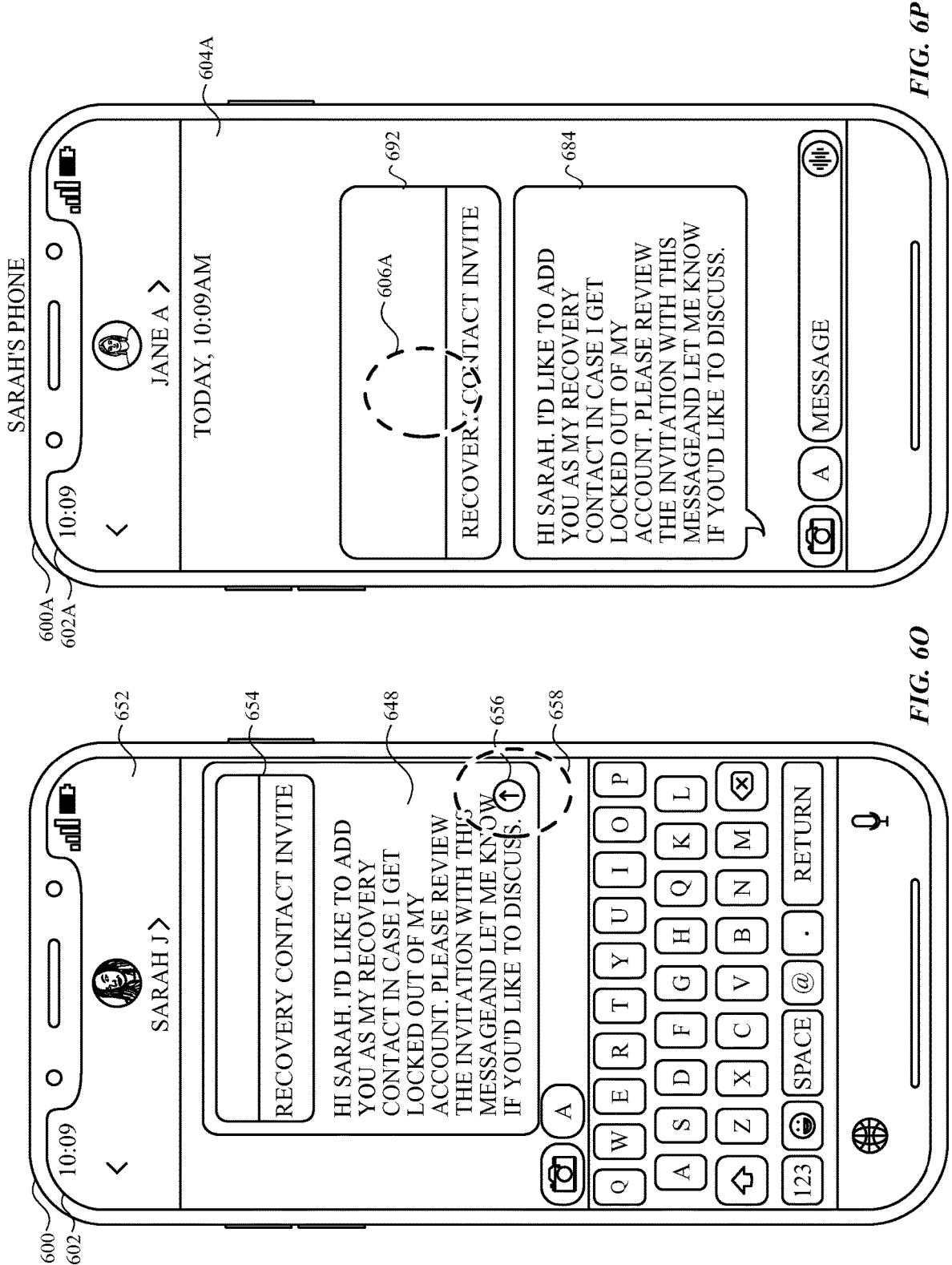

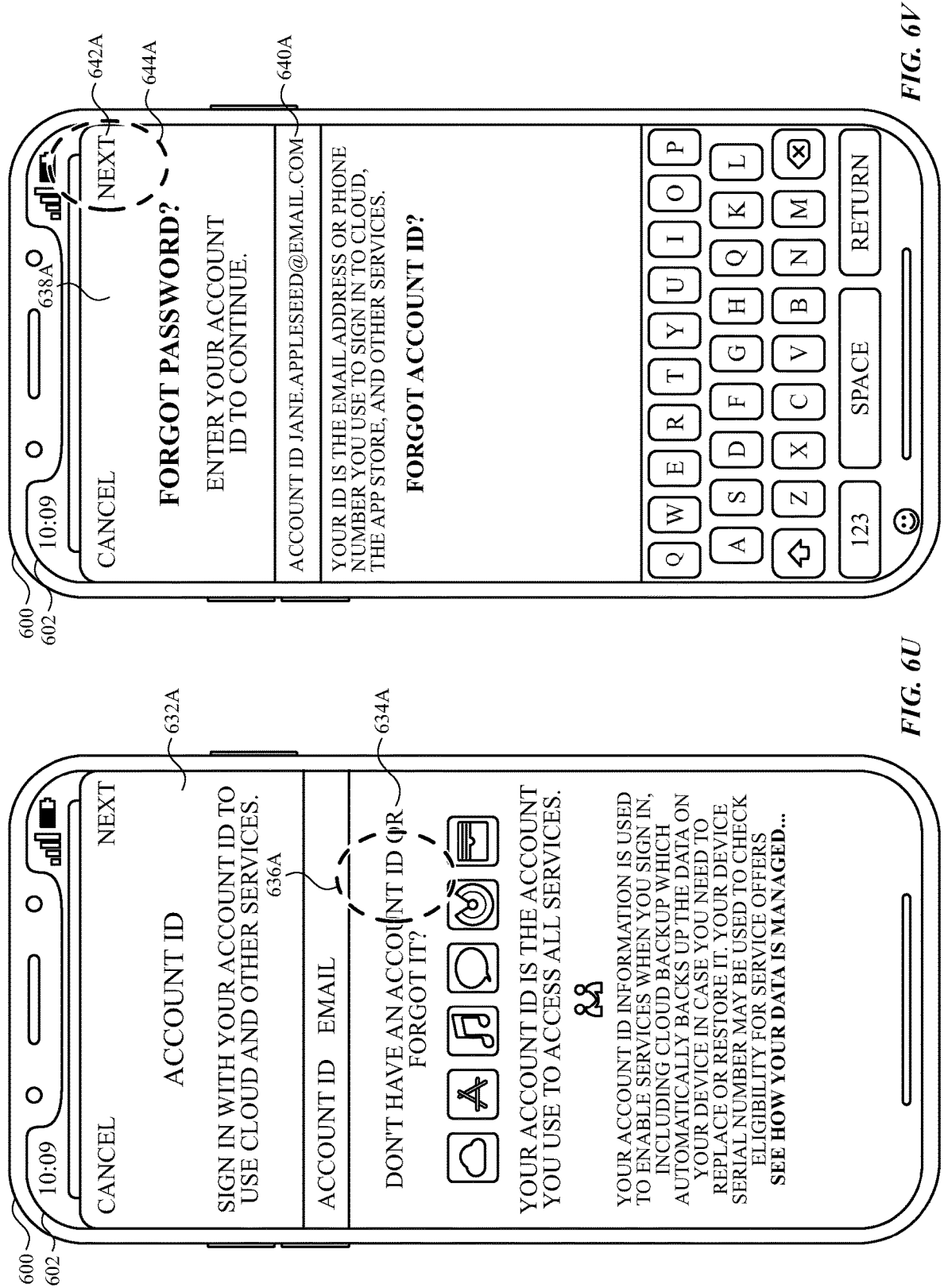

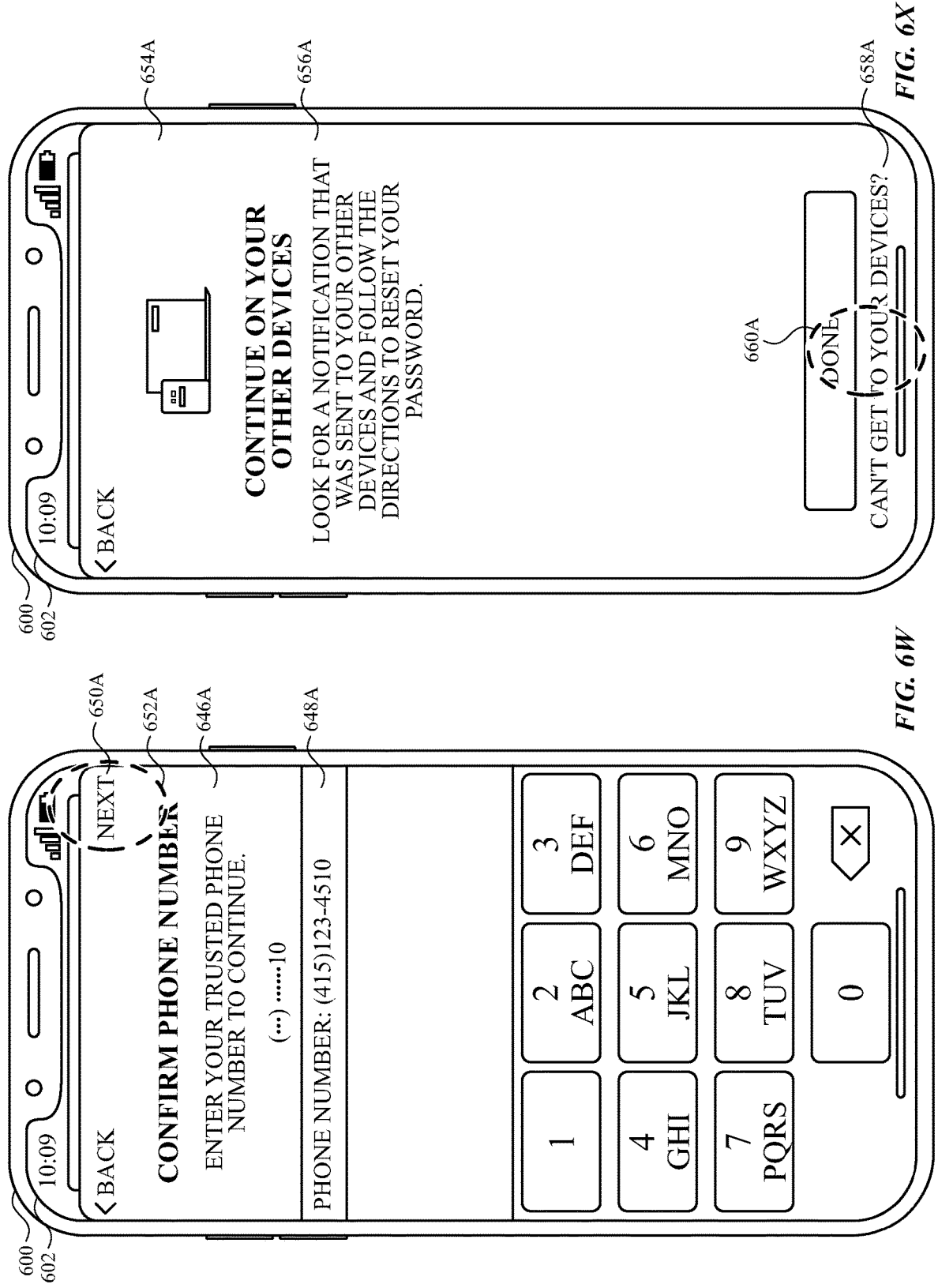

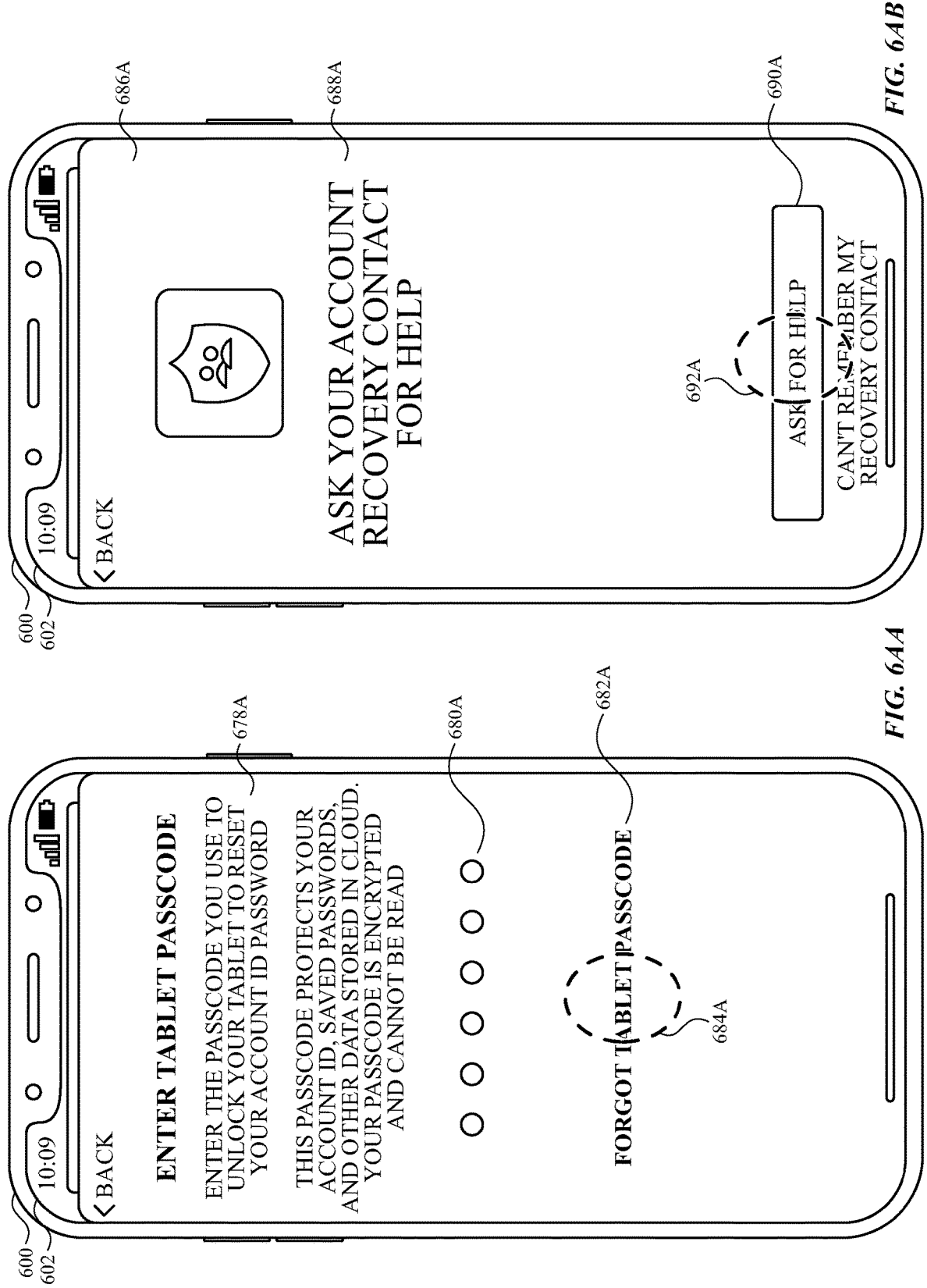

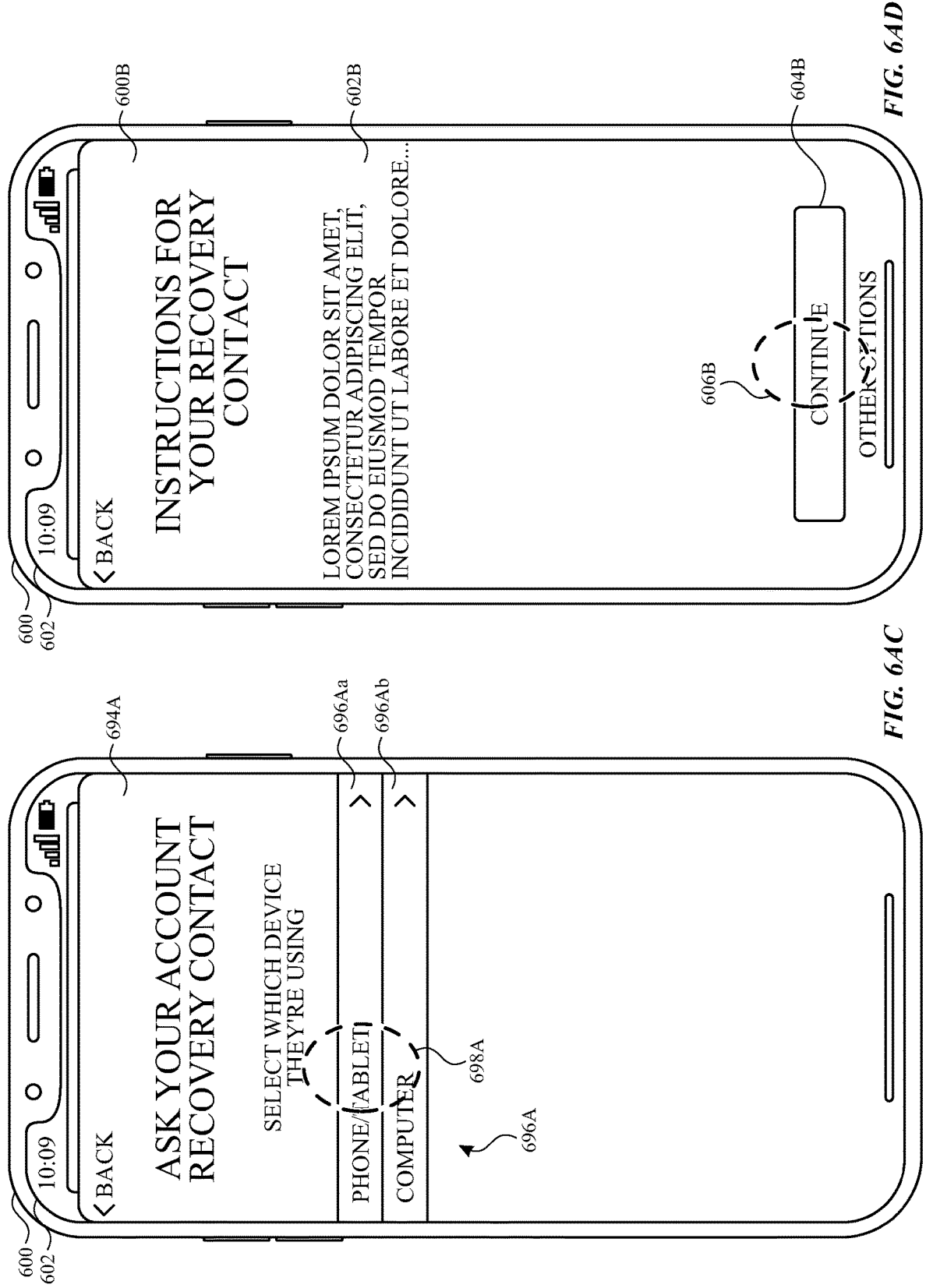

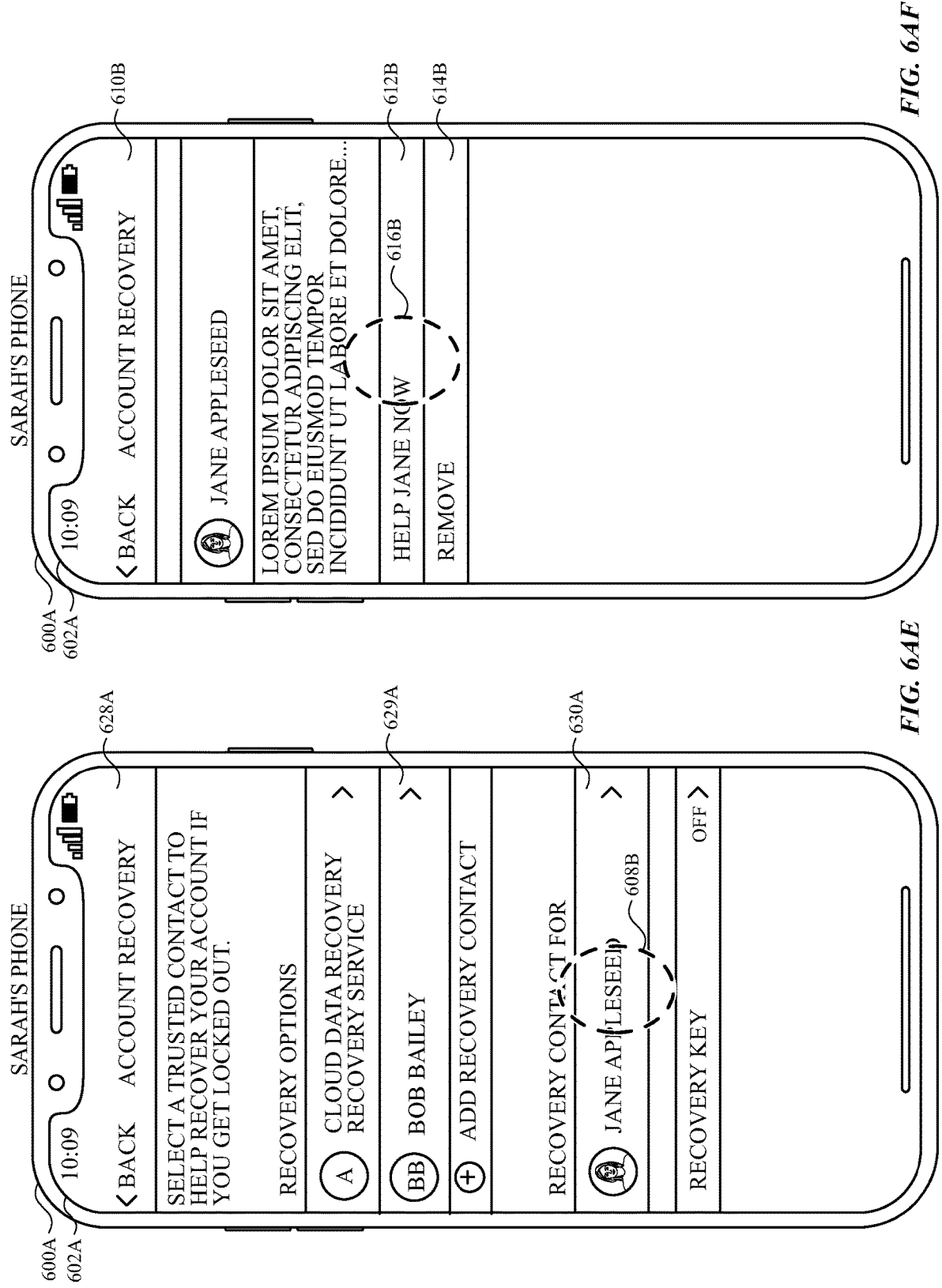

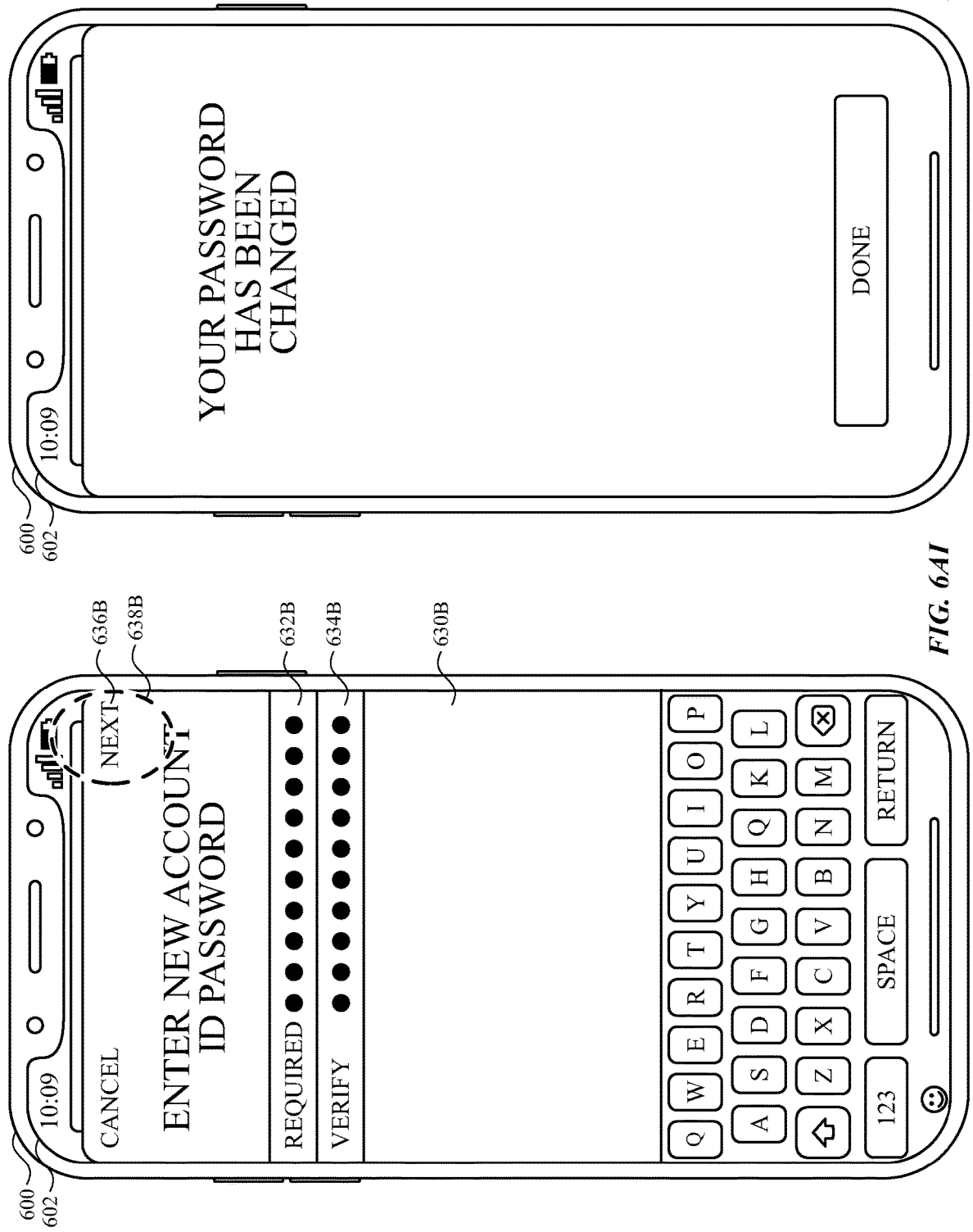

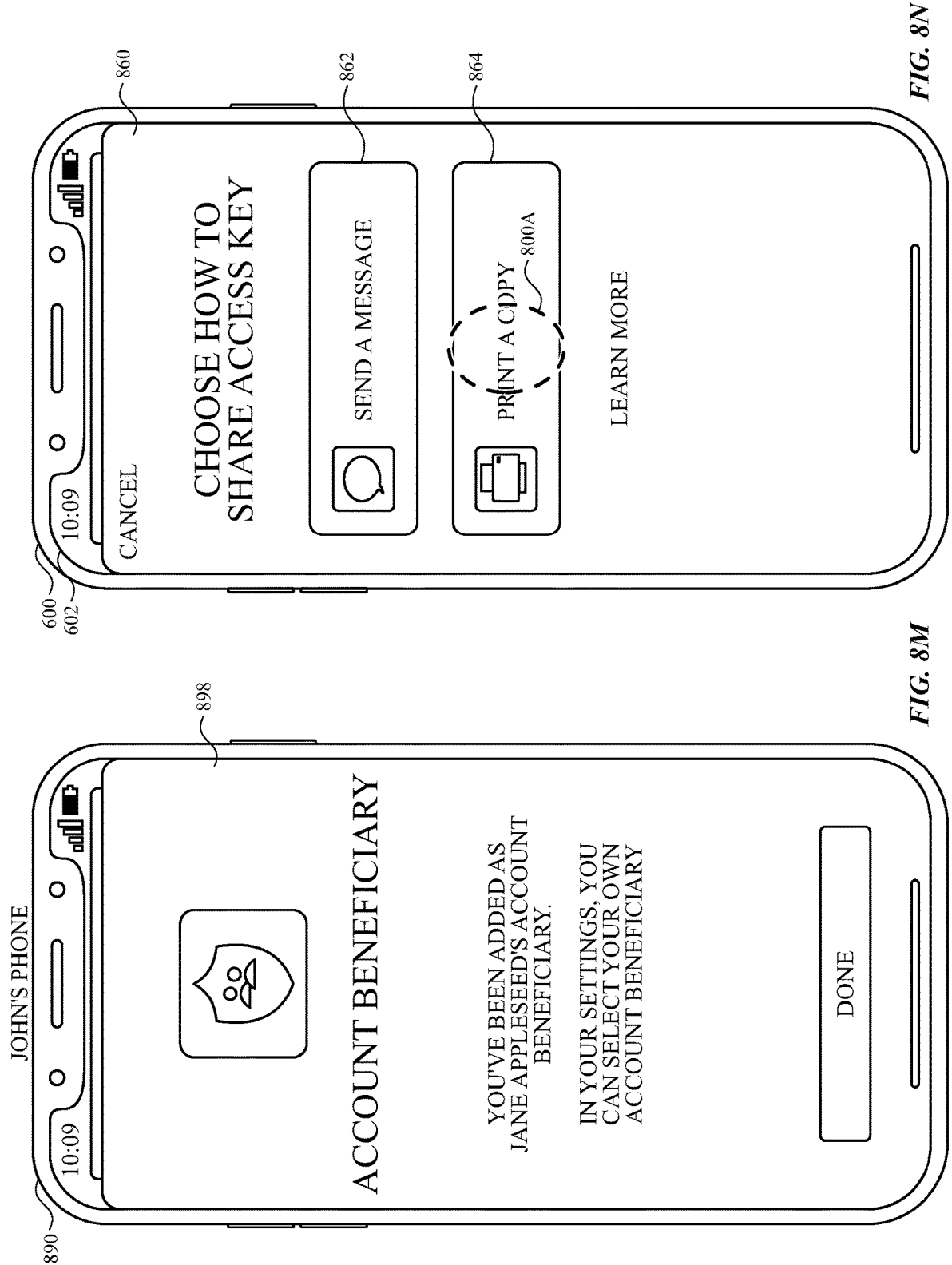

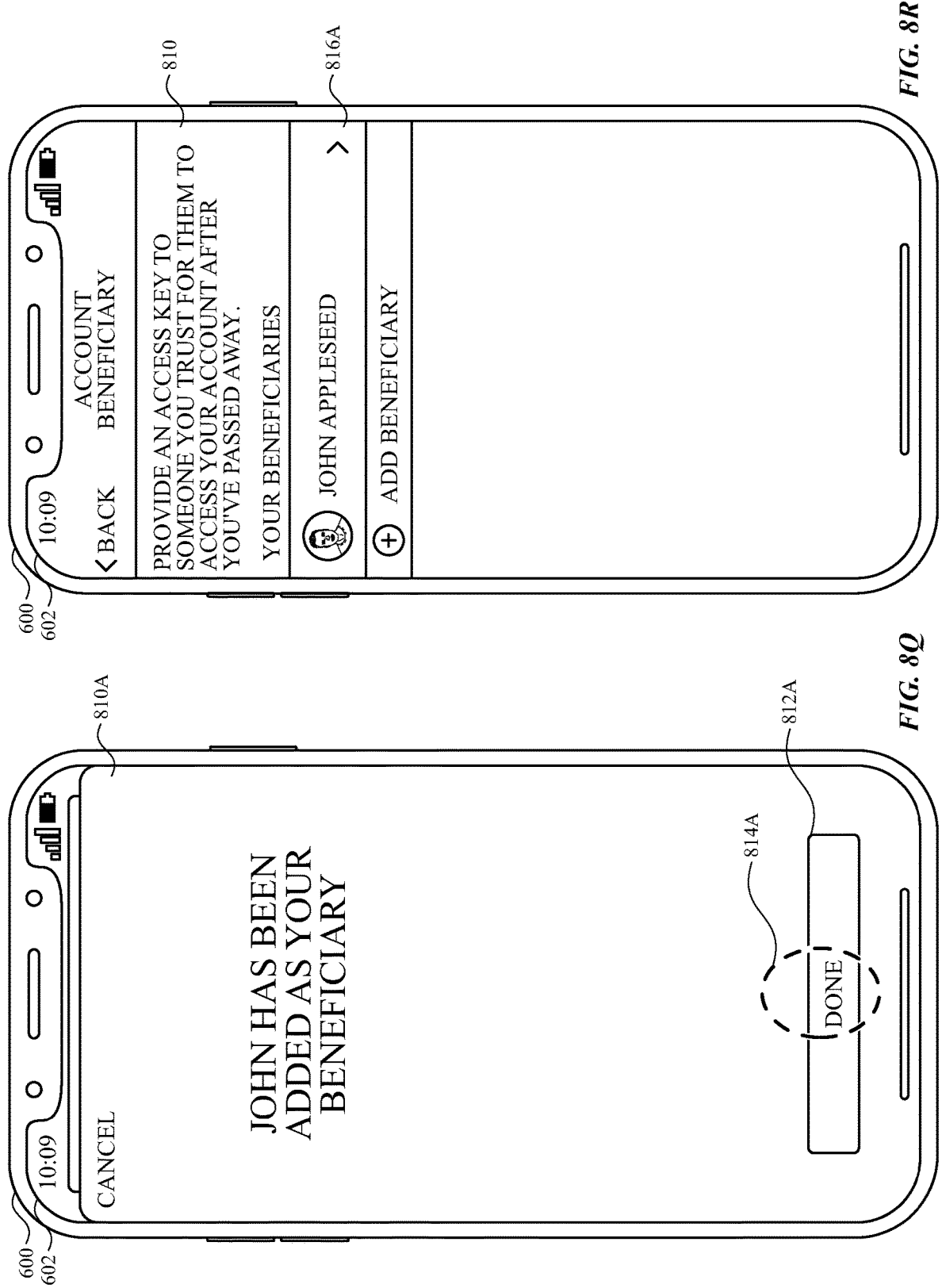

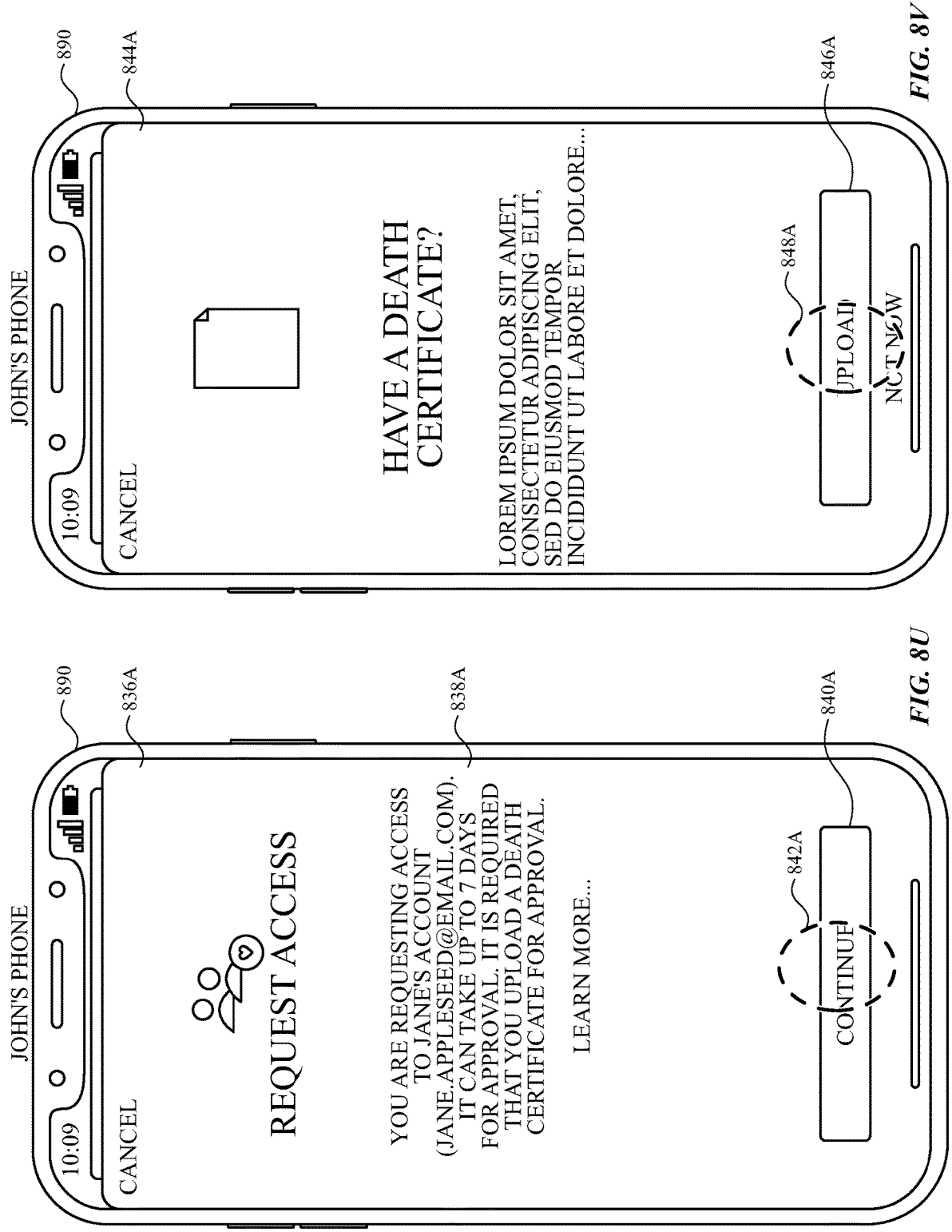

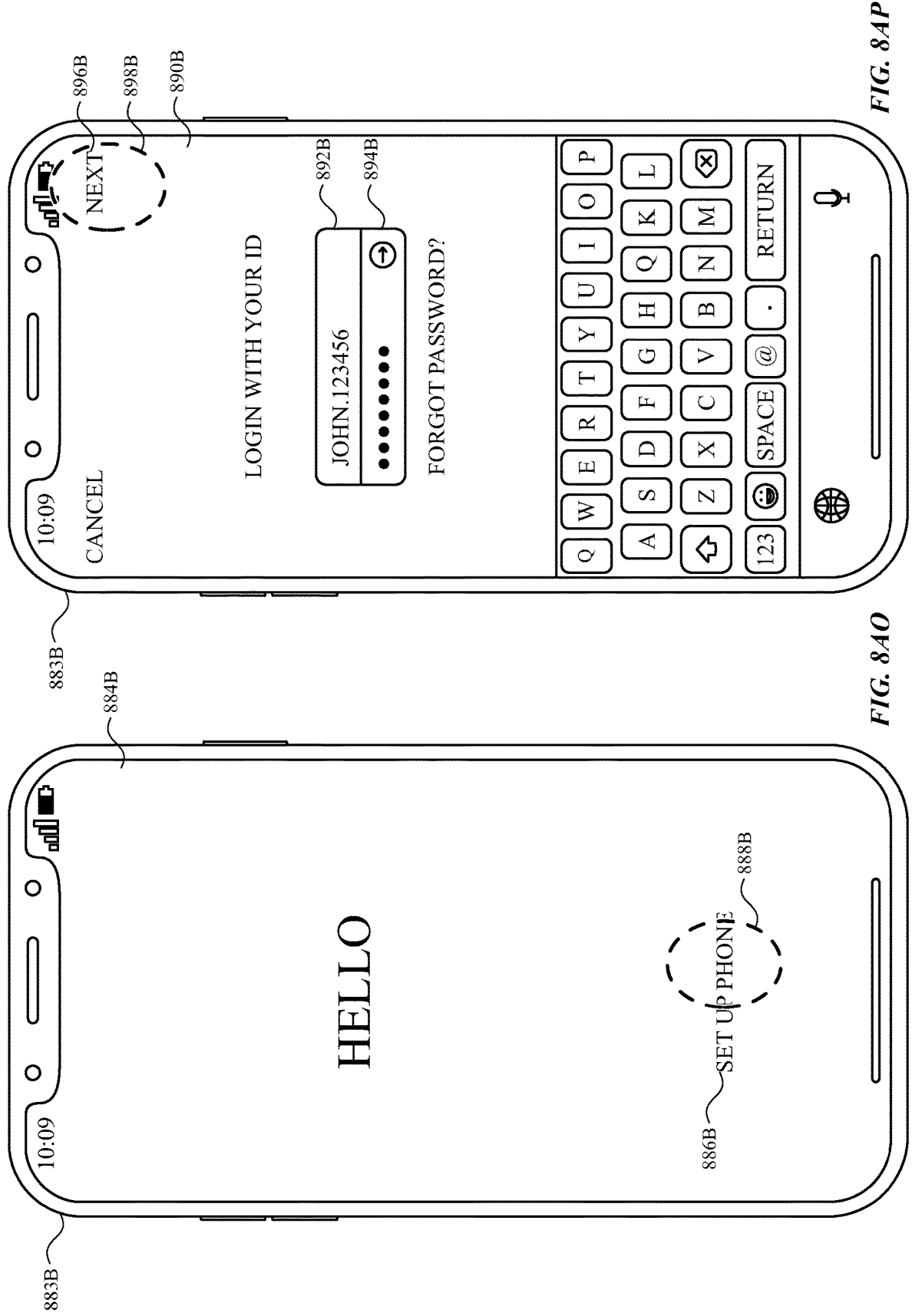

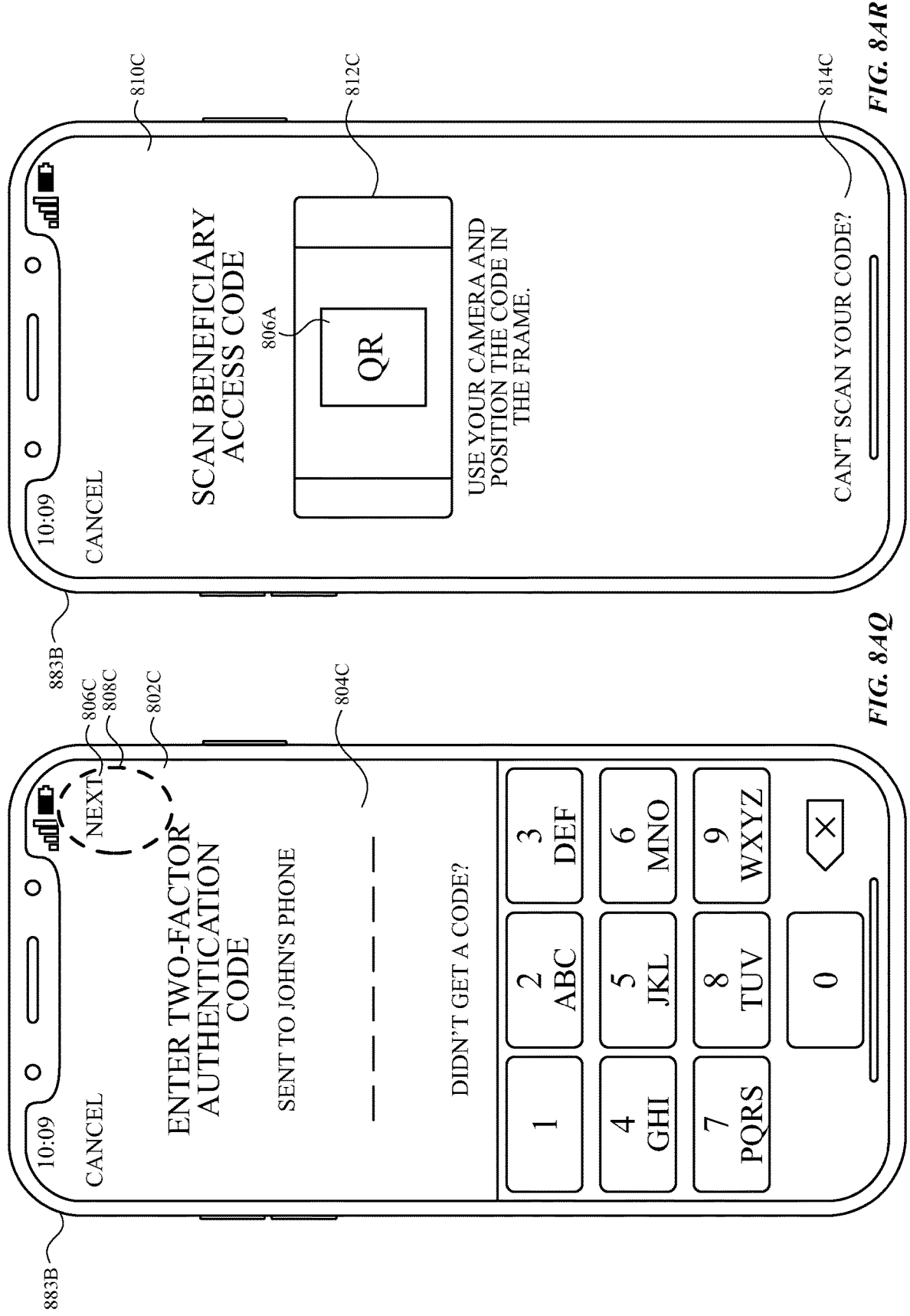

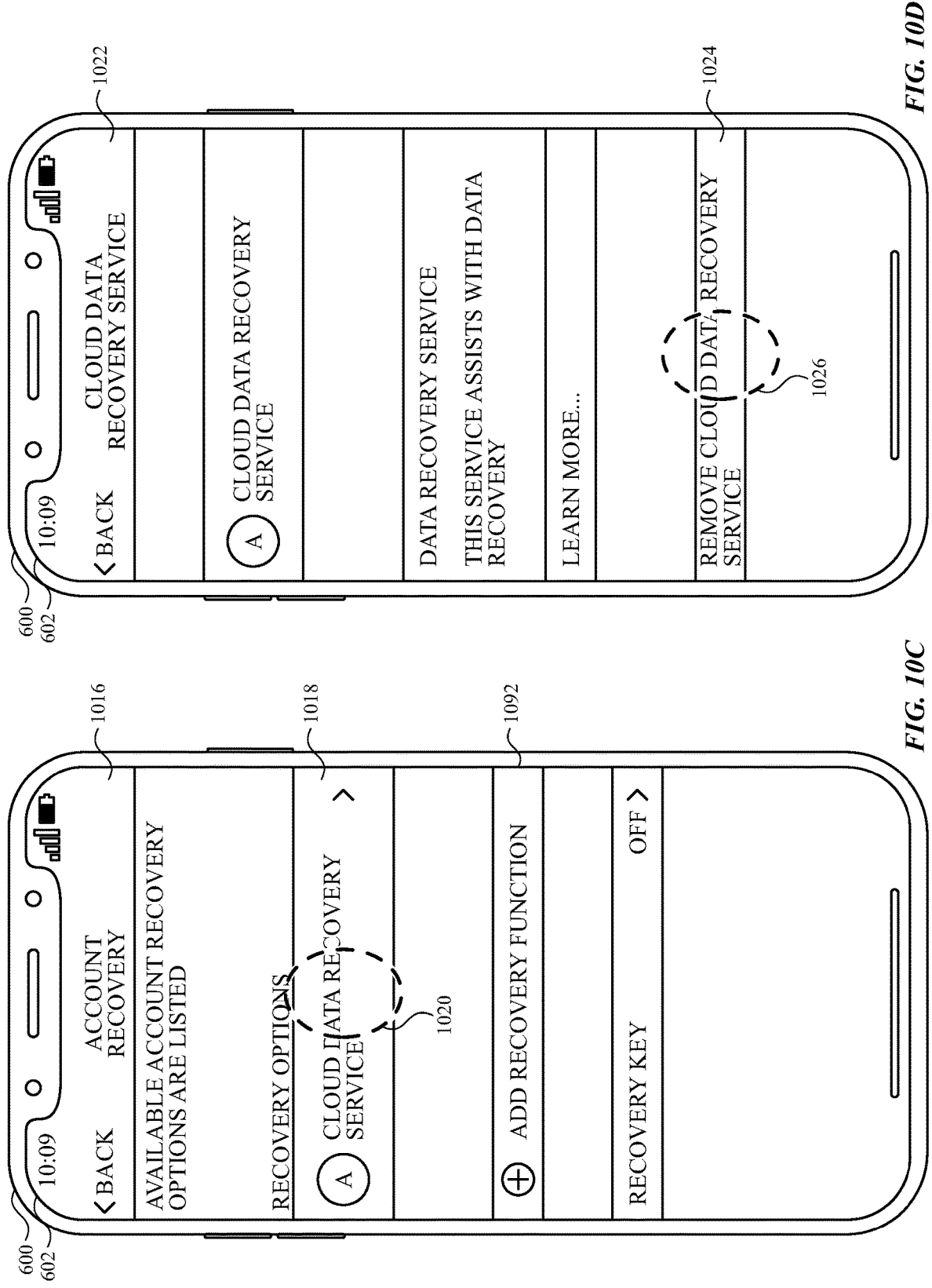

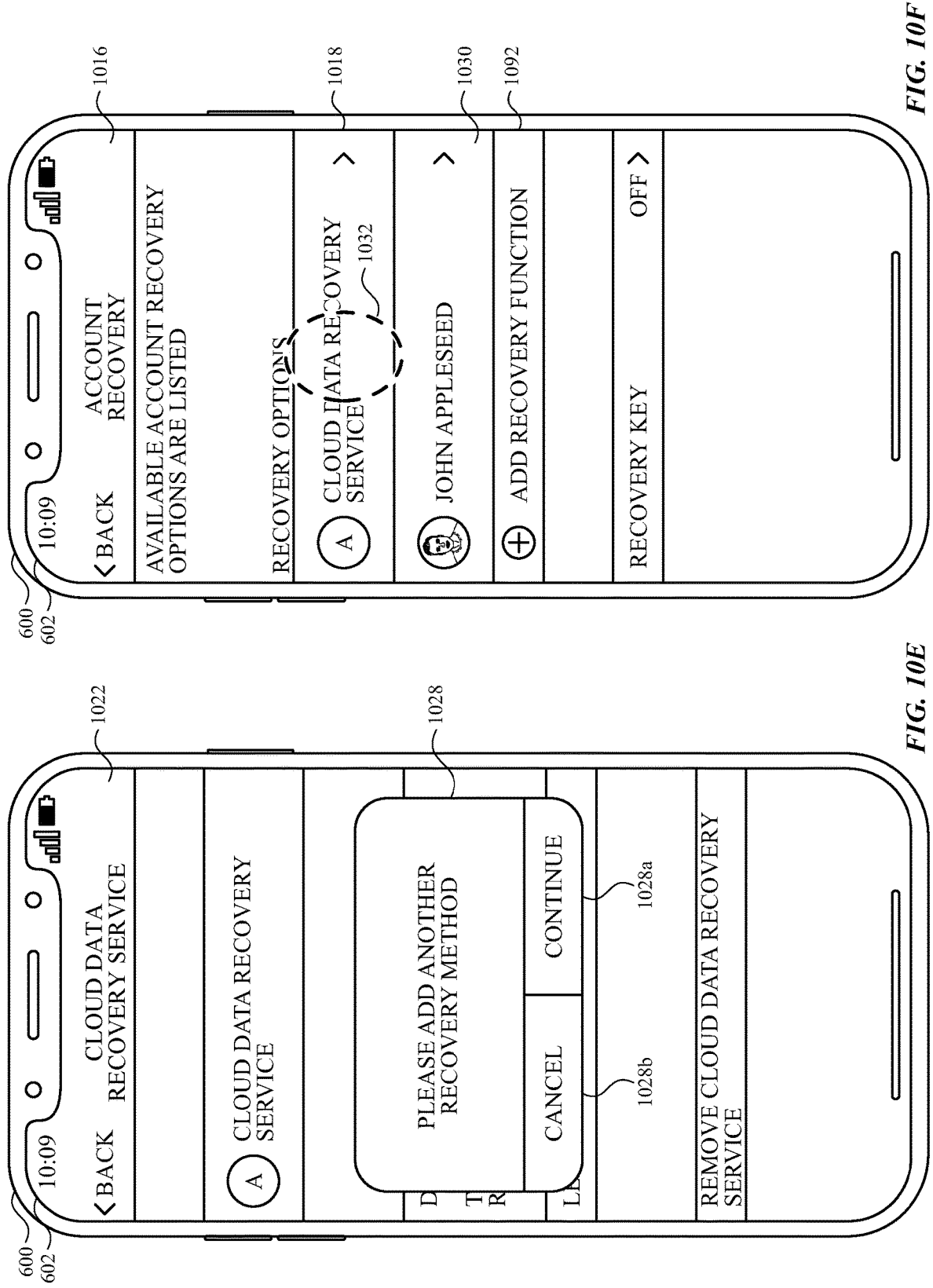

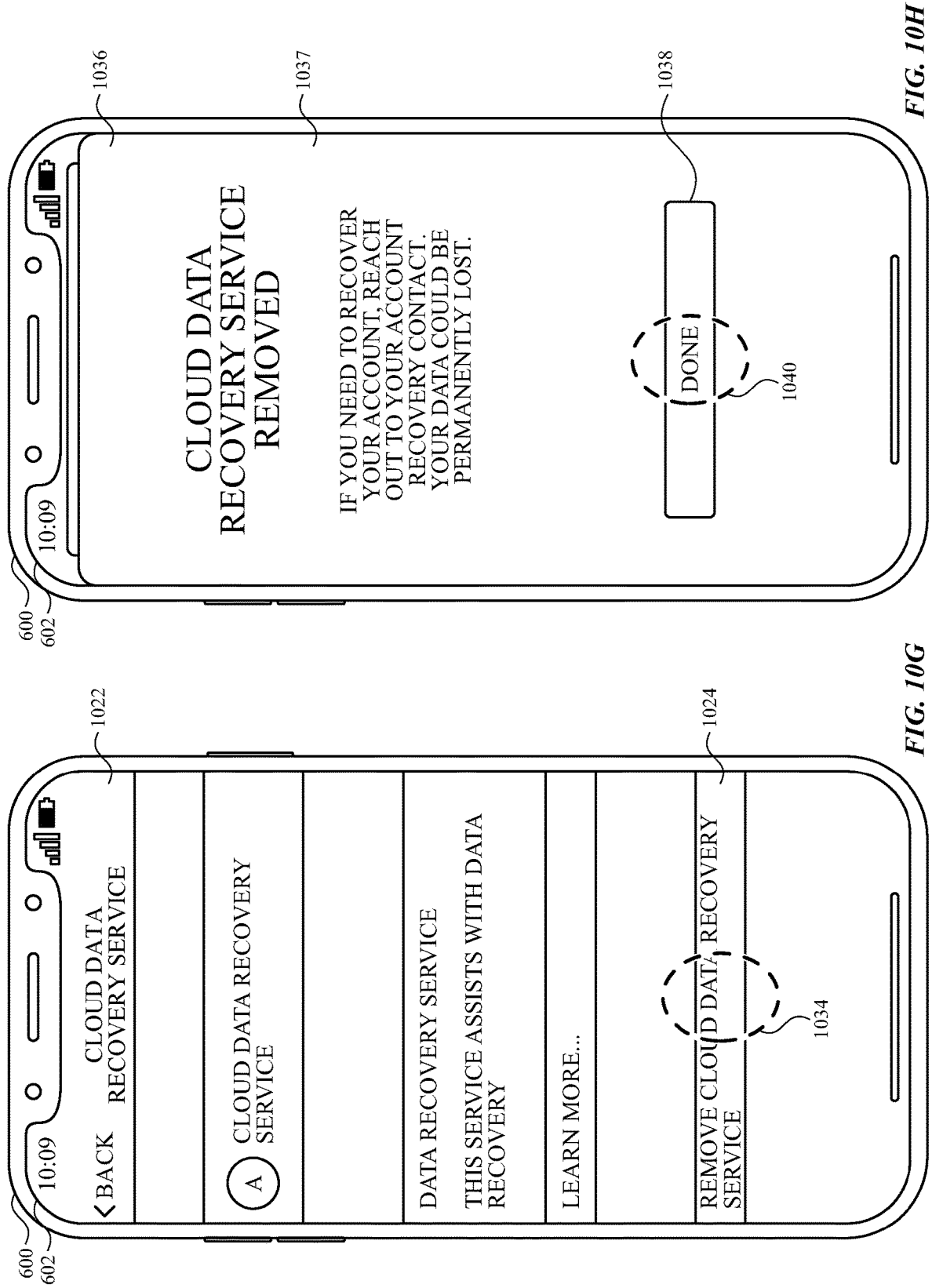

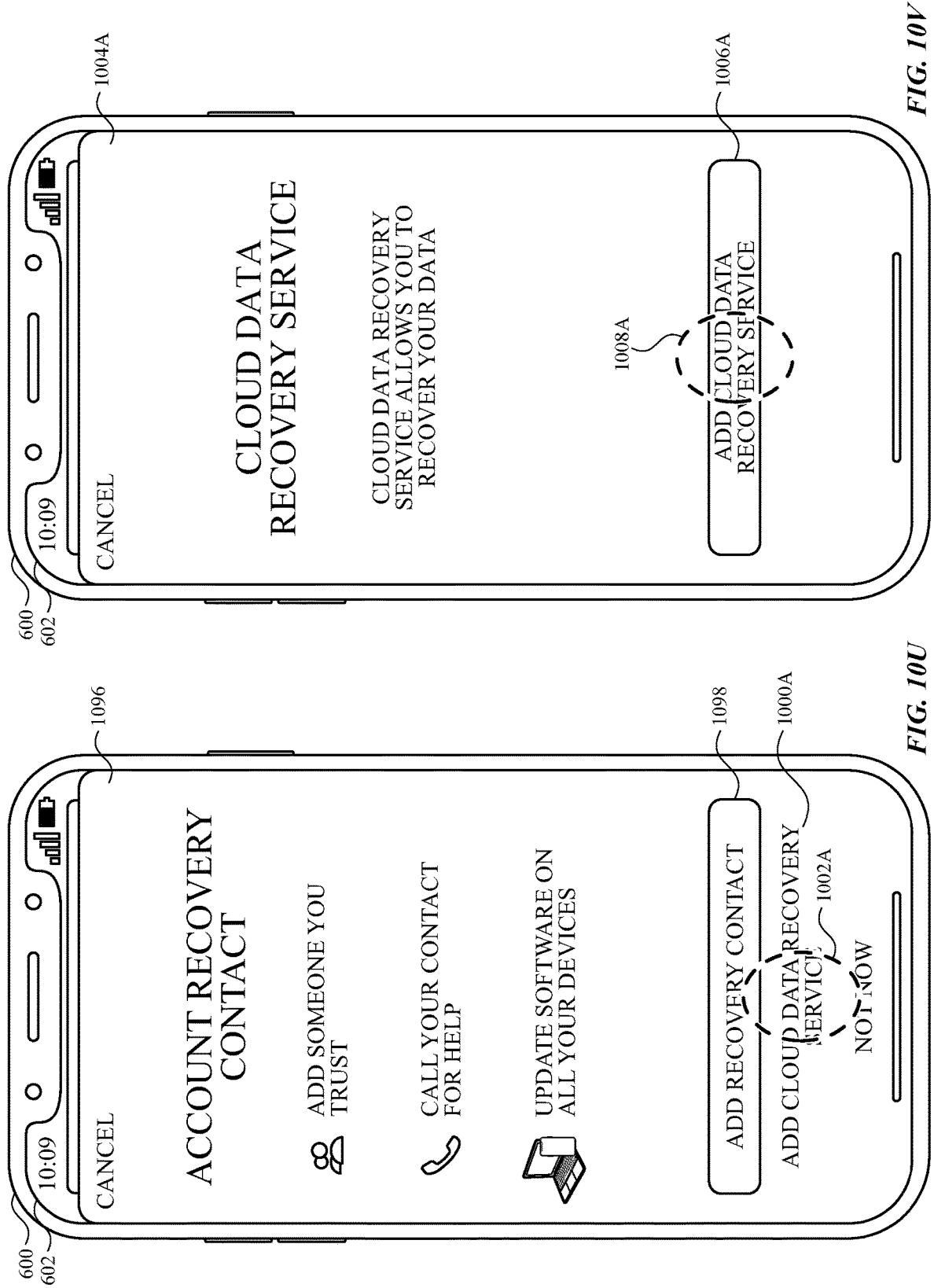

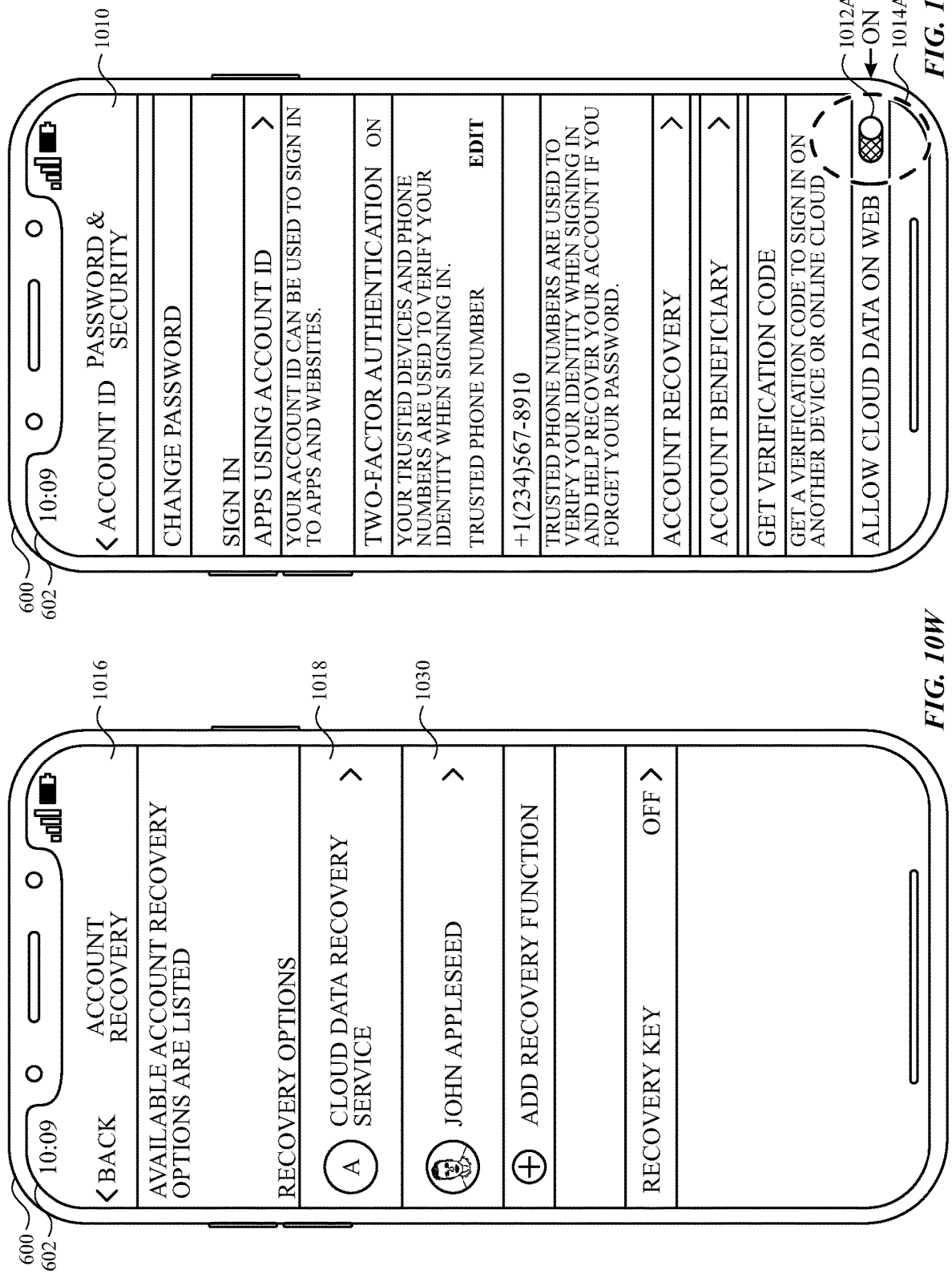

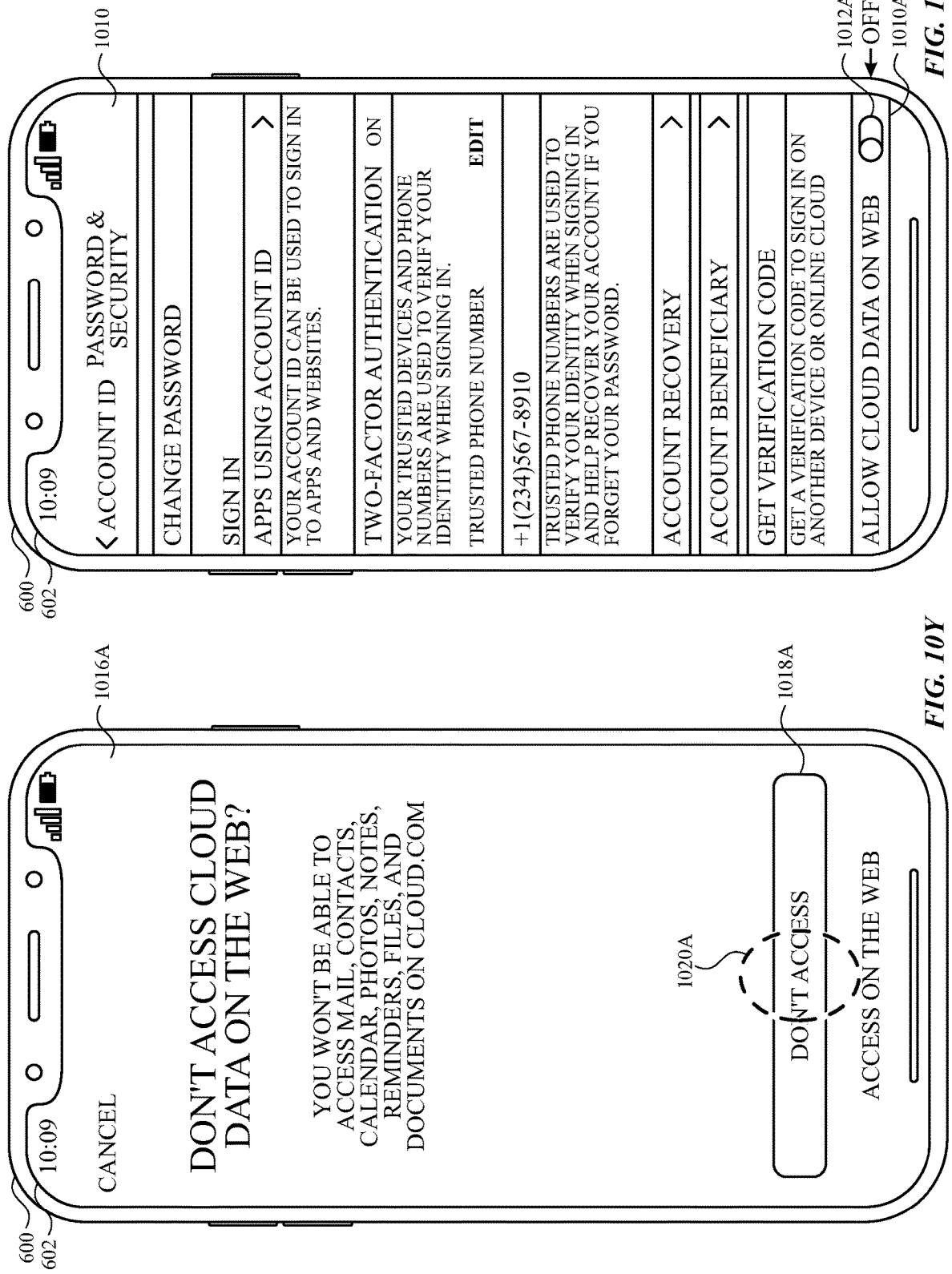

1300

1302
after displaying, via the display generation component, data of a first type, receive, via the one or more input devices, a request to display respective data

1304
in response to receiving the request to display the respective data:

1306
in accordance with a determination that the request to display the respective data satisfies access criteria, display the requested respective data

1308
in accordance with a determination that the request to display the respective data does not satisfy the access criteria:

1310
in accordance with a determination that the request to display the respective data is a request to display data of the first type, display, via the display generation component, the requested respective data

1312
in accordance with a determination that the request to display the respective data is not a request to display data of the first type, initiate a process to display a first notification on an external device for providing the computer system access to the requested respective data

*FIG. 13*

METHODS AND USER INTERFACES FOR ACCOUNT RECOVERY

CROSS-REFERENCE TO RELATED APPLICATIONS

This application claims priority to U.S. provisional patent application No. 63/197,499, entitled "METHODS AND USER INTERFACES FOR ACCOUNT RECOVERY", filed Jun. 6, 2021, and U.S. patent application No. 63/302,848 entitled "METHODS AND USER INTERFACES FOR ACCOUNT RECOVERY", filed Jan. 25, 2022 the entire contents of which are hereby incorporated by reference.

FIELD

The present disclosure relates generally to computer user interfaces, and more specifically to techniques for account recovery.

BACKGROUND

Personal electronic devices are typically protected using one or more authentication schemes, such as a password or biometric authentication. In some instances, if a user is unable to satisfy such authentication schemes, access to such devices or corresponding user accounts can be lost.

BRIEF SUMMARY

Some techniques for account recovery using electronic devices, however, are generally cumbersome and inefficient. For example, some existing techniques use a complex and time-consuming user interface, which may include multiple key presses or keystrokes. As another example, some existing techniques are insufficient to allow access to accounts when proper. Accordingly, existing techniques require more time than necessary and are inadequate, wasting user time and device energy. This latter consideration is particularly important in battery-operated devices.

Accordingly, the present technique provides electronic devices with faster, more efficient methods and interfaces for account recovery. Such methods and interfaces optionally complement or replace other methods for account recovery. Such methods and interfaces reduce the cognitive burden on a user and produce a more efficient human-machine interface. For battery-operated computing devices, such methods and interfaces conserve power and increase the time between battery charges, for instance, by reducing the number of inputs and/or time required such devices.

Example methods are described herein. An example method incudes, at a computer system in communication with a display generation component and one or more input devices: performing a recovery contact set up process including providing a notification to a contact; after performing the recovery contact set up process, receiving, via the one or more input devices, a request to initiate an account recovery process via the contact; in response to the request to initiate the account recovery process via the contact and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

An example method includes, at a computer system that is in communication with one or more input devices: receiving, via the one or more input devices, a request to initiate a process to access an account of an individual, wherein the process to access the account of the individual includes: providing an authentication code to another device; and providing a document indicative of a status of the individual to the another device; in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example method includes, at a computer system in communication with a display generation component and one or more input devices: receiving, via the one or more input devices, a set of one or more inputs corresponding to a request to disable an account recovery service for a user account; in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example method includes, at a computer system in communication with a display generation component and one or more input devices: after displaying, via the display generation component, data of a first type, receiving, via the one or more input devices, a request to display respective data; in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

Example non-transitory computer-readable storage media are described herein. An example non-transitory computer-readable storage medium stores one or more programs configured to be executed by one or more processors of a computer system that is in communication with a display generation component and one or more input devices and includes instructions for: performing a recovery contact set up process including providing a notification to a contact; after performing the recovery contact set up process, receiving, via the one or more input devices, a request to initiate an account recovery process via the contact; in response to the request to initiate the account recovery process via the contact and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

An example non-transitory computer-readable storage medium stores one or more programs configured to be executed by one or more processors of a computer system that is in communication with one or more input devices and includes instructions for: receiving, via the one or more input devices, a request to initiate a process to access an account of an individual, wherein the process to access the account of the individual includes: providing an authentication code to another device; and providing a document indicative of a status of the individual to the another device; in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example non-transitory computer-readable storage medium stores one or more programs configured to be executed by one or more processors of a computer system that is in communication with a display generation component and one or more input devices and includes instructions for: receiving, via the one or more input devices, a set of one or more inputs corresponding to a request to disable an account recovery service for a user account; in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example non-transitory computer-readable storage medium stores one or more programs configured to be executed by one or more processors of a computer system that is in communication with a display generation component and one or more input devices and includes instructions for: after displaying, via the display generation component, data of a first type, receiving, via the one or more input devices, a request to display respective data; in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

Example transitory computer-readable storage media are described herein. An example non-transitory computer-readable storage medium stores one or more programs configured to be executed by one or more processors of a computer system that is in communication with a display generation component and one or more input devices and includes instructions for: performing a recovery contact set up process including providing a notification to a contact; after performing the recovery contact set up process, receiving, via the one or more input devices, a request to initiate an account recovery process via the contact; in response to the request to initiate the account recovery process via the contact and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

An example transitory computer-readable storage medium stores one or more programs configured to be executed by one or more processors of a computer system that is in communication with one or more input devices and includes instructions for: receiving, via the one or more input devices, a request to initiate a process to access an account of an individual, wherein the process to access the account of the individual includes: providing an authentication code to another device; and providing a document indicative of a status of the individual to the another device; in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example transitory computer-readable storage medium stores one or more programs configured to be executed by one or more processors of a computer system that is in communication with a display generation component and one or more input devices and includes instructions for: receiving, via the one or more input devices, a set of one or more inputs corresponding to a request to disable an account recovery service for a user account; in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example transitory computer-readable storage medium stores one or more programs configured to be executed by one or more processors of a computer system that is in communication with a display generation component and one or more input devices and includes instructions for: after displaying, via the display generation component, data of a first type, receiving, via the one or more input devices, a request to display respective data; in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

Example systems are described herein. An example computer system is configured to communicate with a display generation component and one or more input devices and includes: one or more processors; and memory storing one or more programs configured to be executed by the one or more processors, the one or more programs including instructions for: performing a recovery contact set up process including providing a notification to a contact; after performing the recovery contact set up process, receiving, via the one or more input devices, a request to initiate an account recovery process via the contact; in response to the request to initiate the account recovery process via the contact and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

An example computer system is configured to communicate with one or more input devices and includes: one or more processors; and memory storing one or more programs configured to be executed by the one or more processors, the one or more programs including instructions for: receiving, via the one or more input devices, a request to initiate a process to access an account of an individual, wherein the process to access the account of the individual includes: providing an authentication code to another device; and providing a document indicative of a status of the individual to the another device; in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example computer system is configured to communicate with a display generation component and one or more input devices and includes: one or more processors; and memory storing one or more programs configured to be executed by the one or more processors, the one or more programs including instructions for: receiving, via the one or more input devices, a set of one or more inputs corresponding to a request to disable an account recovery service for a user account; in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example computer system is configured to communicate with a display generation component and one or more input devices and includes: one or more processors; and memory storing one or more programs configured to be executed by the one or more processors, the one or more programs including instructions for: after displaying, via the display generation component, data of a first type, receiving, via the one or more input devices, a request to display respective data; in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

An example computer system is configured to communicate with a display generation component and one or more input devices and includes means for performing a recovery contact set up process including providing a notification to a contact; means for, after performing the recovery contact set up process, receiving, via the one or more input devices, a request to initiate an account recovery process via the contact; means for, in response to the request to initiate the account recovery process via the contact and without providing a request to the contact, displaying, via the display generation component, a recovery code interface for receiving a set of recovery credentials; means for, while displaying of the recovery code interface, receiving the set of recovery credentials; means for, in accordance with a determination that the recovery credentials are valid, performing a recovery function; and means for, in accordance with a determination that the recovery credentials are not valid, forgoing performing the recovery function.

An example computer system is configured to communicate with one or more input devices and includes means for receiving, via the one or more input devices, a request to initiate a process to access an account of an individual, wherein the process to access the account of the individual includes: providing an authentication code to another device; and providing a document indicative of a status of the individual to the another device; means for, in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example computer system is configured to communicate with a display generation component and one or more input devices, comprising: means for receiving, via the one or more input devices, a set of one or more inputs corresponding to a request to disable an account recovery service for a user account; means for, in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example computer system is configured to communicate with a display generation component and one or more input devices, comprising: means for, after displaying, via the display generation component, data of a first type, receiving, via the one or more input devices, a request to display respective data; means for, in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

Example computer program products are described herein. An example computer program product includes one or more programs configured to be executed by one or more processors of a computer system that is in communication with a display generation component and one or more input devices, the one or more programs including instructions for: performing a recovery contact set up process including providing a notification to a contact; after performing the recovery contact set up process, receiving, via the one or more input devices, a request to initiate an account recovery process via the contact; in response to the request to initiate the account recovery process via the contact and without providing a request to the contact, displaying, via the display generation component, a recovery code interface for receiving a set of recovery credentials; while displaying of the recovery code interface, receiving the set of recovery credentials; in accordance with a determination that the recovery credentials are valid, performing a recovery function; and in accordance with a determination that the recovery credentials are not valid, forgoing performing the recovery function.

An example computer program product includes one or more programs configured to be executed by one or more processors of a computer system that is in communication with one or more input devices, the one or more programs including instructions for: receiving, via the one or more input devices, a request to initiate a process to access an account of an individual, wherein the process to access the account of the individual includes: providing an authentication code to another device; and providing a document indicative of a status of the individual to the another device; in accordance with a determination that a set of validation criteria is satisfied, receiving a credential to access the account of the individual wherein the set of validation criteria includes a first criterion that is satisfied when the authentication code is valid and a second criterion that is satisfied when the document is valid.

An example computer program product includes one or more programs configured to be executed by one or more processors of a computer system that is in communication with a display generation component and one or more input devices, the one or more programs including instructions for: receiving, via the one or more input devices, a set of one or more inputs corresponding to a request to disable an account recovery service for a user account; in response to receiving the set of one or more inputs corresponding to a request to disable the account recovery service, initiating a process for disabling the account recovery service for the user account, wherein the process for disabling the account recovery service for the user account includes: in accordance with a determination that the user account satisfies a set of service removal criteria, disabling the account recovery service for the user account; and in accordance with a determination that the user account does not satisfy the set of service removal criteria, displaying, via the display generation component, a prompt to perform a process for enabling an account recovery function for the user account.

An example computer program product includes one or more programs configured to be executed by one or more processors of a computer system that is in communication with a display generation component and one or more input devices, the one or more programs including instructions for: after displaying, via the display generation component, data of a first type, receiving, via the one or more input devices, a request to display respective data; in response to receiving the request to display the respective data: in accordance with a determination that the request to display the respective data satisfies access criteria, displaying the requested respective data; and in accordance with a determination that the request to display the respective data does not satisfy the access criteria: in accordance with a determination that the request to display the respective data is a request to display data of the first type, displaying, via the display generation component, the requested respective data; and in accordance with a determination that the request to display the respective data is not a request to display data of the first type, initiating a process to display a first notification on an external device for providing the computer system access to the requested respective data.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for account recovery, thereby increasing the effectiveness, efficiency, and user satisfaction with such devices. Such methods and interfaces may complement or replace other methods for account recovery.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 13 is a flowchart of a process for managing data access in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for account recovery. For example, computer systems, such as those described herein may provide a manner in which users can select contacts to assist in account recovery when access to user accounts is otherwise precluded. Such techniques can reduce the cognitive burden on a user who implements an account recovery process, thereby enhancing productivity. Further, such techniques can reduce processor and battery power otherwise wasted on redundant user inputs.

Figure 7:
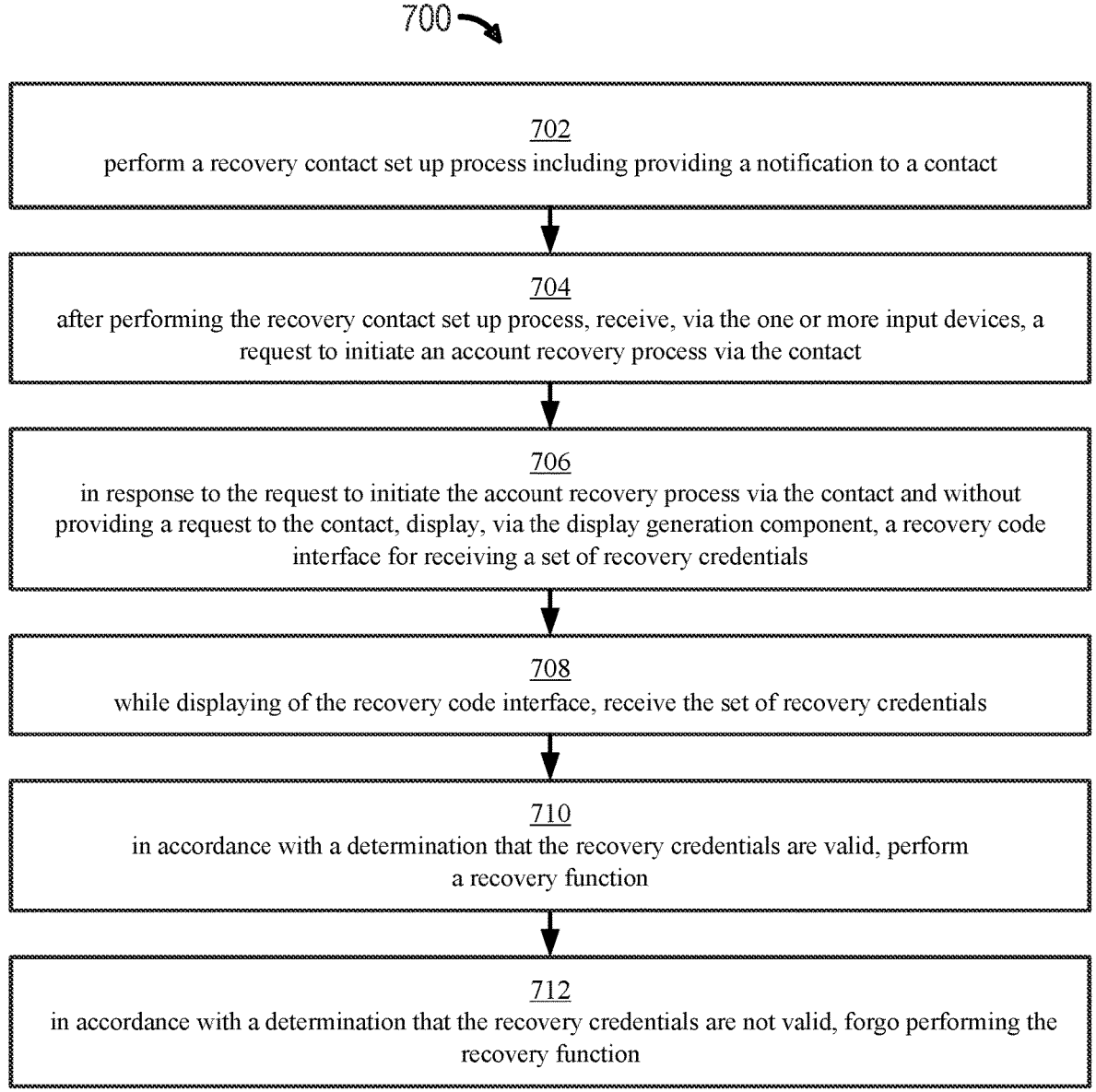
FIG. 7 is a flowchart of a process for recovering account access in accordance with some embodiments FIGS. 8A-8AS illustrate exemplary user interfaces for obtaining account access in accordance with some embodiments.
Figures 8A, 8B:
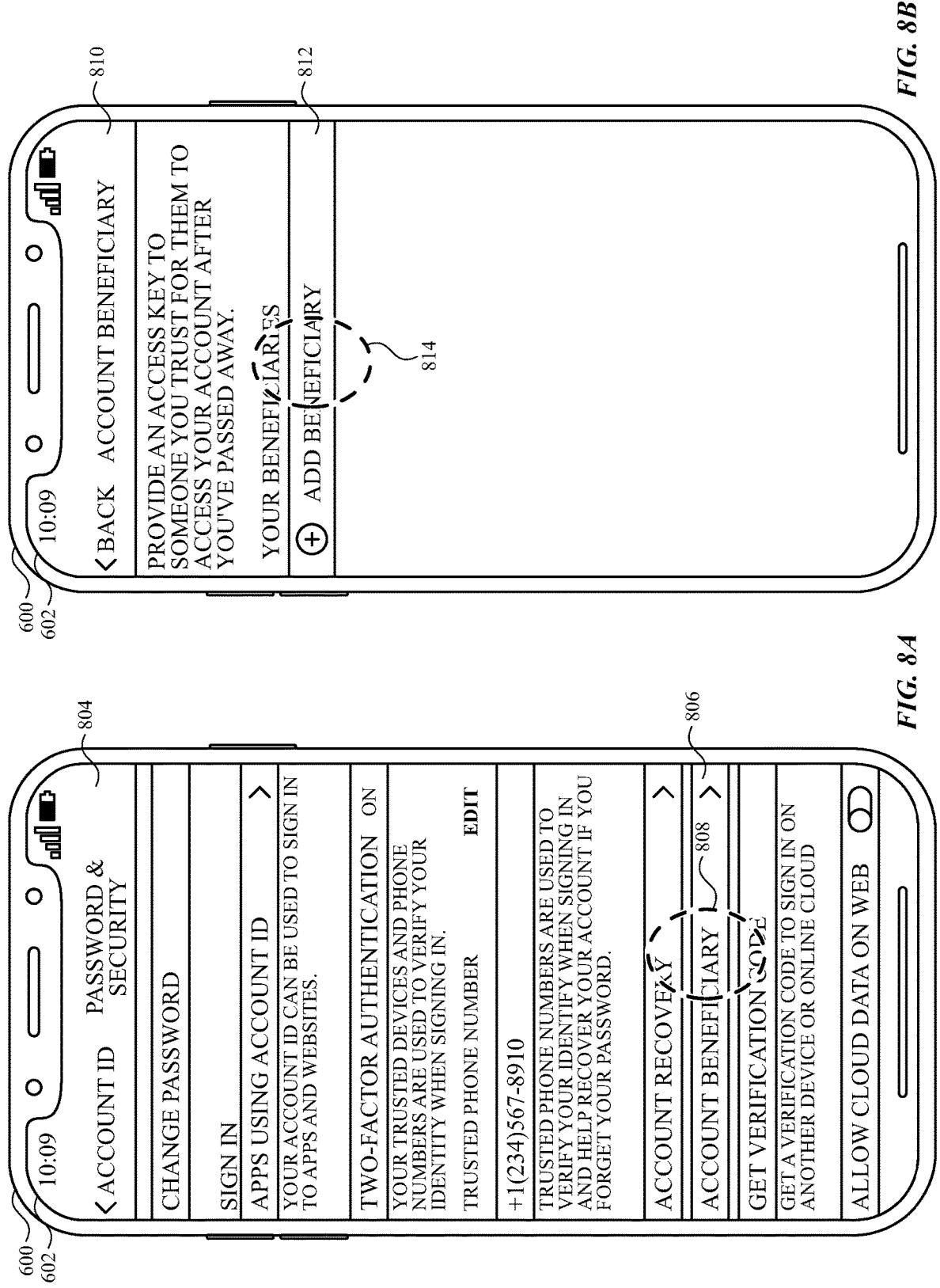
Figures 8C, 8D:
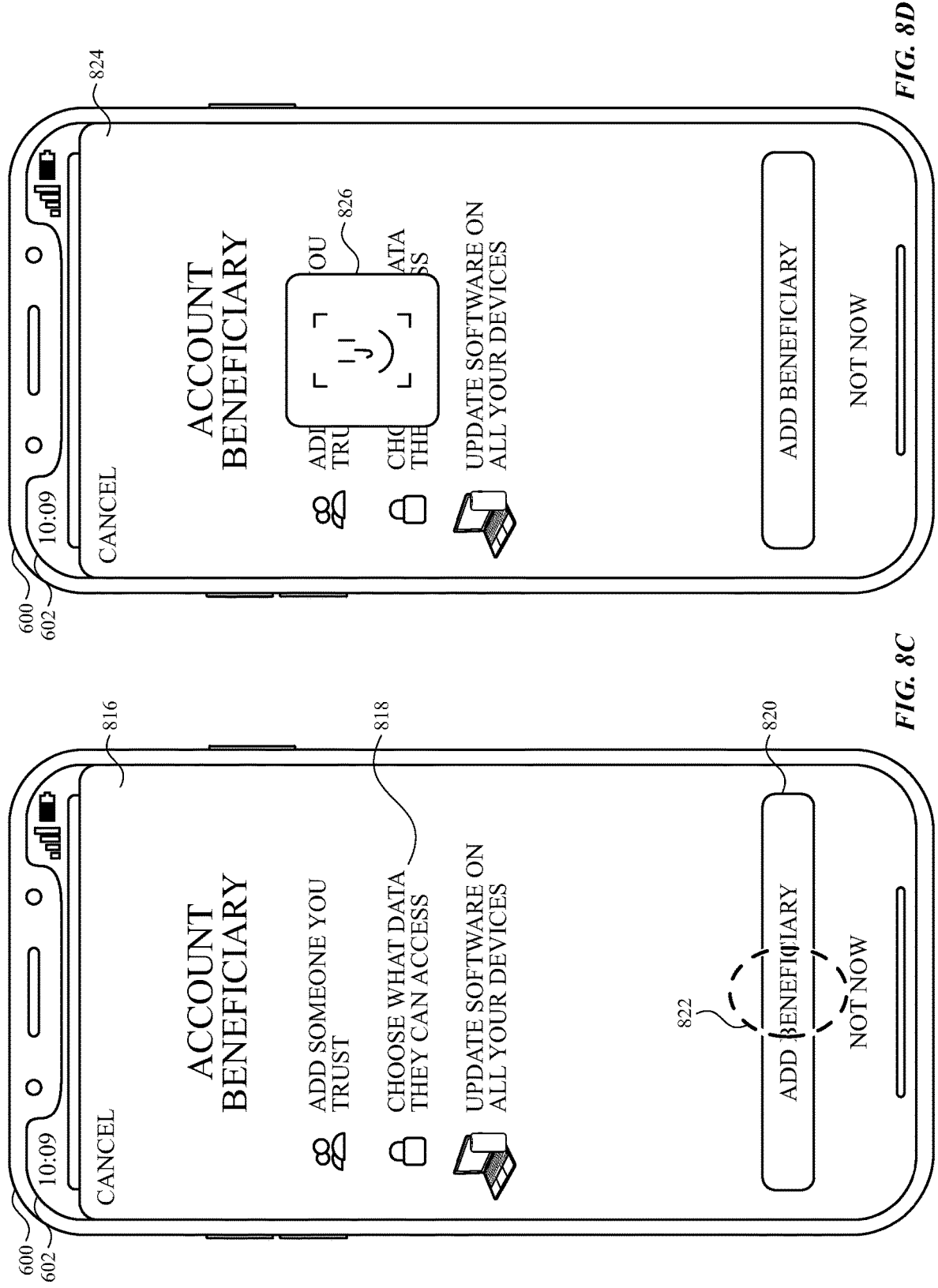
Figure 8F:
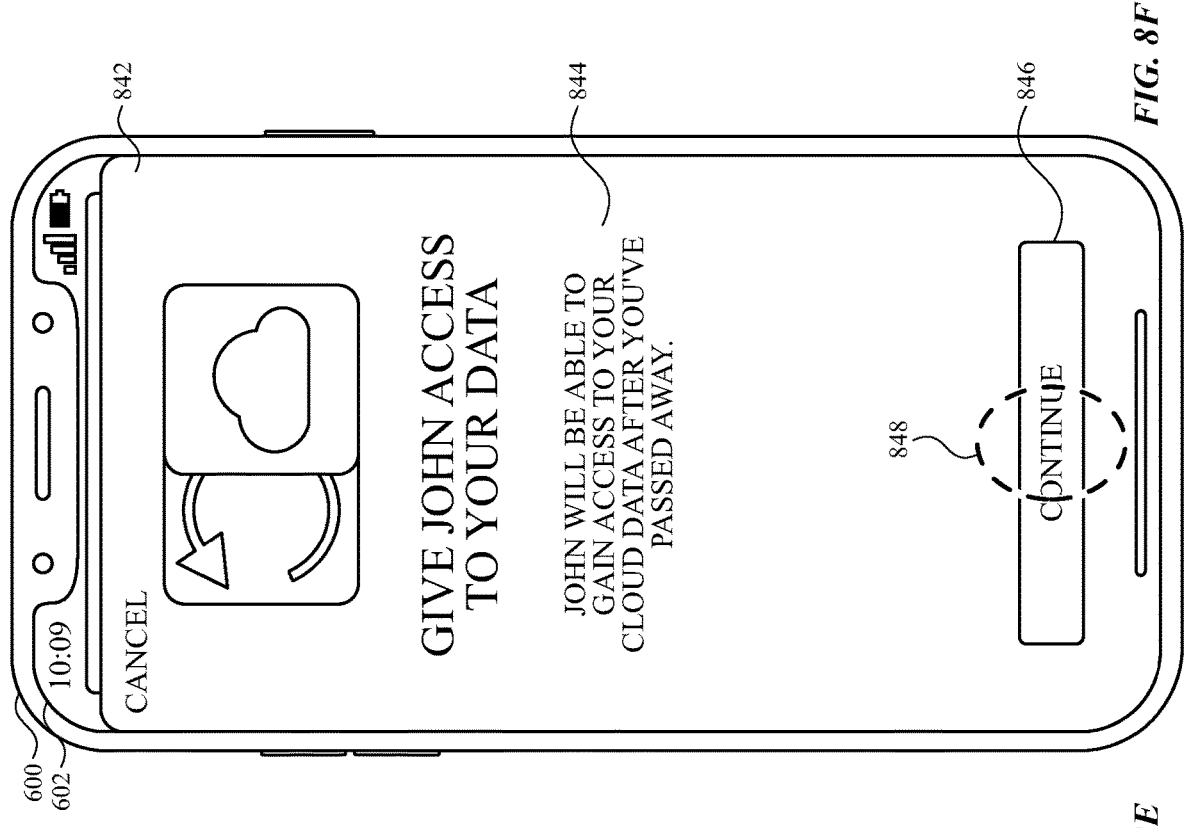
Figure 9:
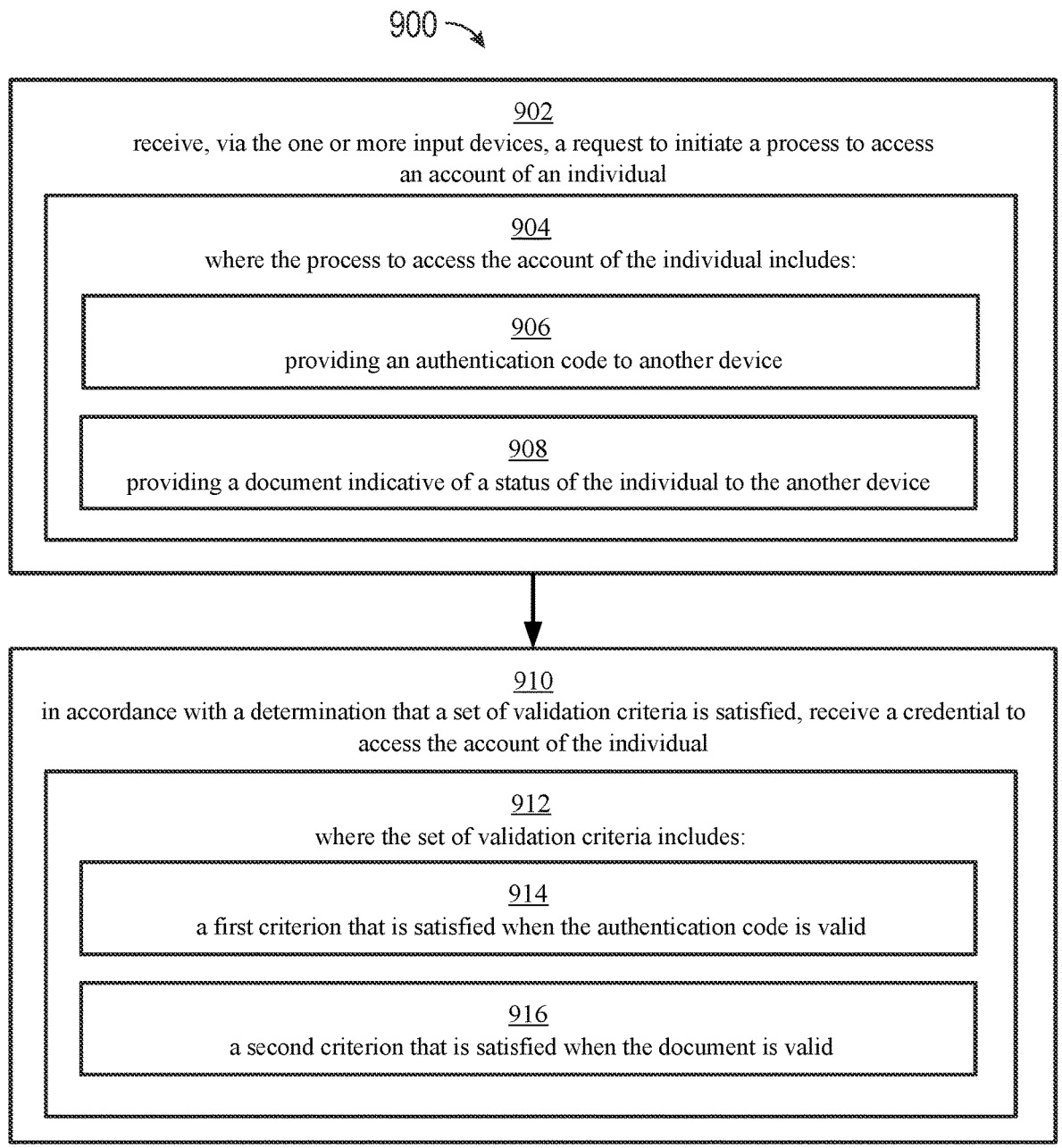
FIG. 9 is a flowchart of a process for obtaining account access in accordance with some embodiments.
Figure 10A:
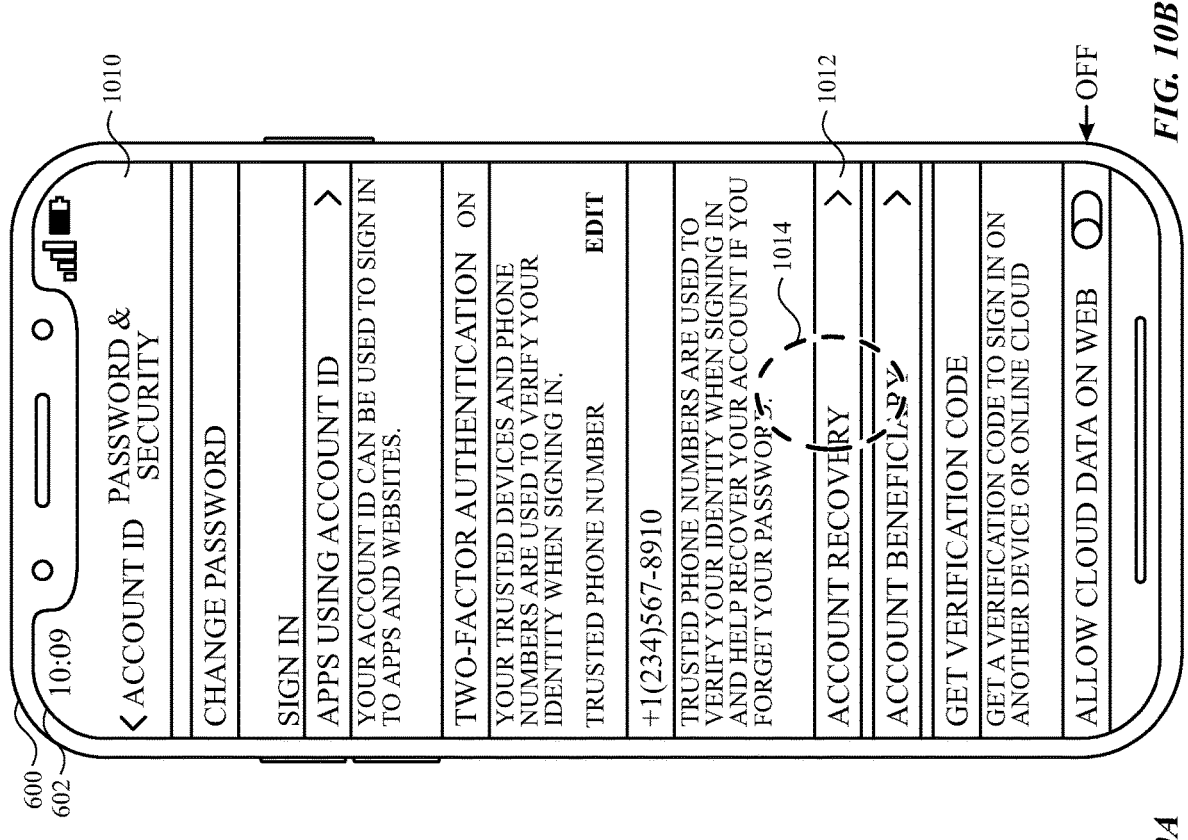
FIGS. 10A-10Z illustrate exemplary user interfaces for attempting to disable an account recovery service in accordance with some embodiments.
Figure 11:
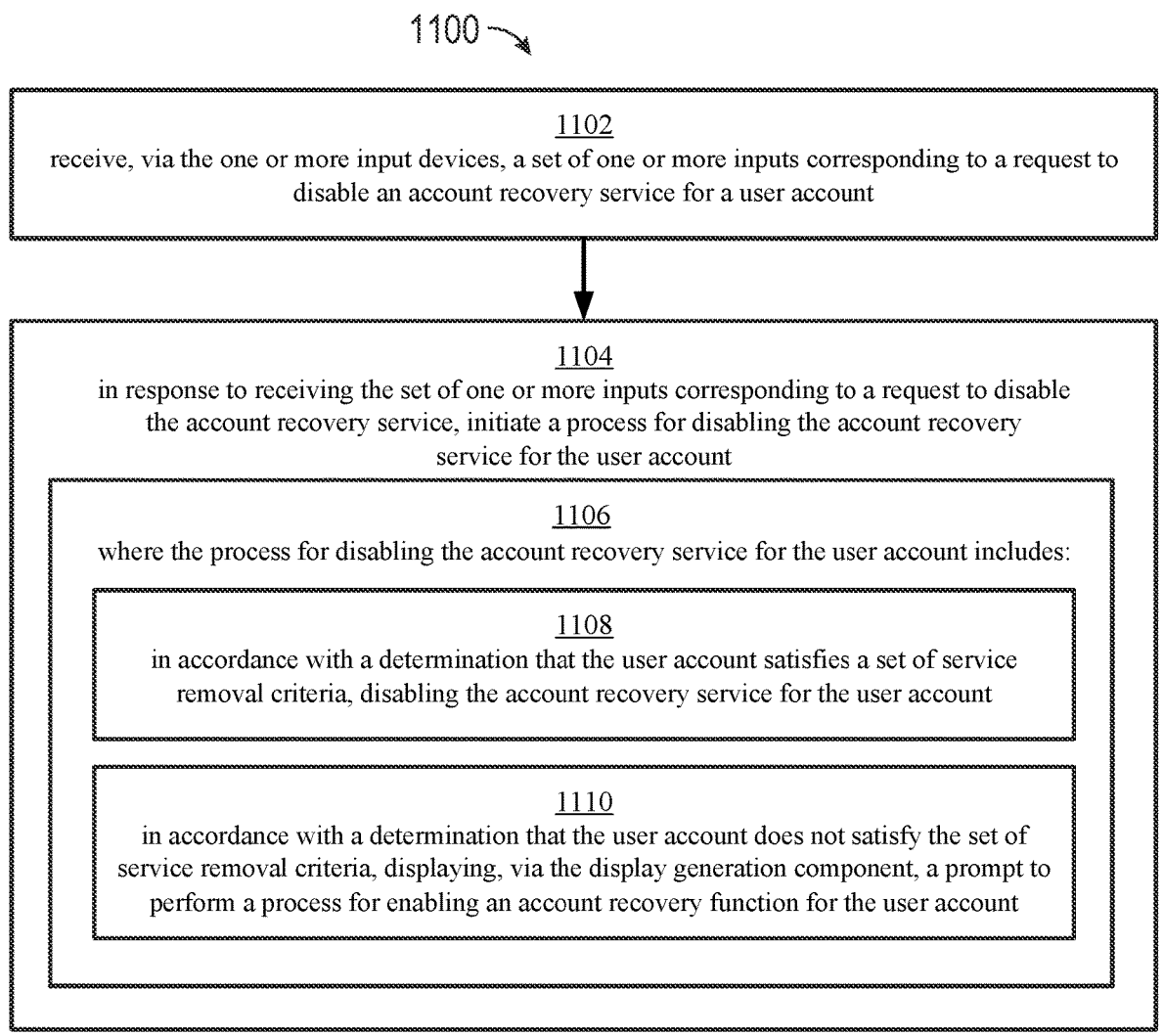
FIG. 11 is a flowchart of a process for attempting to disable an account recovery service in accordance with some embodiments.

Below, FIGS. 1A-1B, 2, 3, 4A-4B, and 5A-5B provide a description of exemplary devices for performing the techniques for account recovery. FIGS. 6A-AJ illustrate exemplary user interfaces for recovering account access. FIG. 7 is a flow diagram illustrating methods of recovering account access in accordance with some embodiments. The user interfaces in FIGS. 6A-AJ are used to illustrate the processes described below, including the processes in FIG. 7. FIGS. 8A-8S illustrate exemplary user interfaces for obtaining account access. FIG. 9 is a flow diagram illustrating methods of obtaining account access in accordance with some embodiments. The user interfaces in FIGS. 8A-8S are used to illustrate the processes described below, including the processes in FIG. 9. FIGS. 10A-10Z illustrate exemplary user interfaces for disabling an account recovery service. FIG. 11 is a flow diagram illustrating methods of attempting to disable an account recovery service in accordance with some embodiments. The user interfaces in FIGS. 10A-Z are used to illustrate the processes described below, including the processes in FIG. 11. FIGS. 12A-12K illustrate exemplary user interfaces for managing data access. FIG. 13 is a flow diagram illustrating methods of managing data access in accordance with some embodiments. The user interfaces in FIGS. 12A-K are used to illustrate the processes described below, including the processes in FIG. 13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
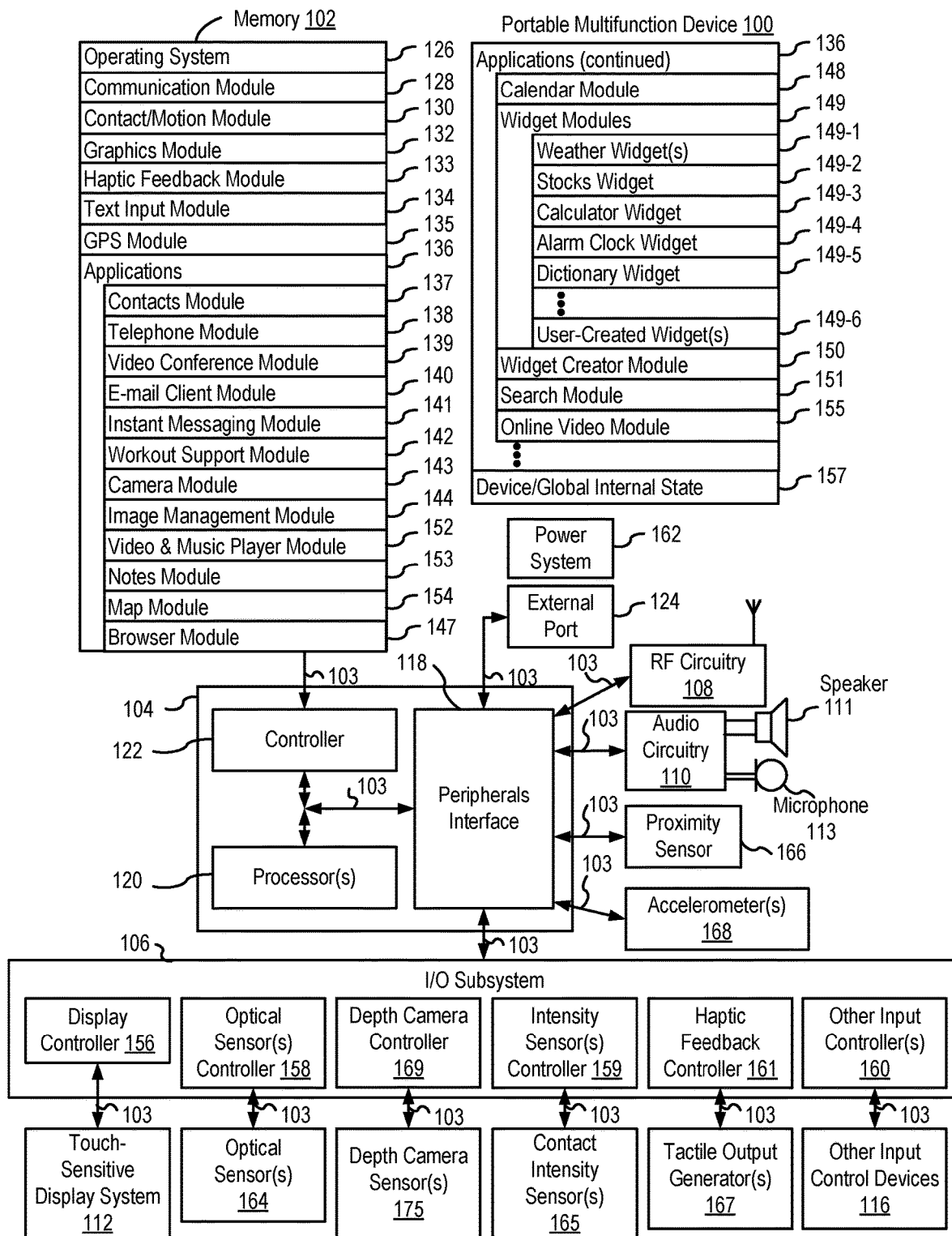
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
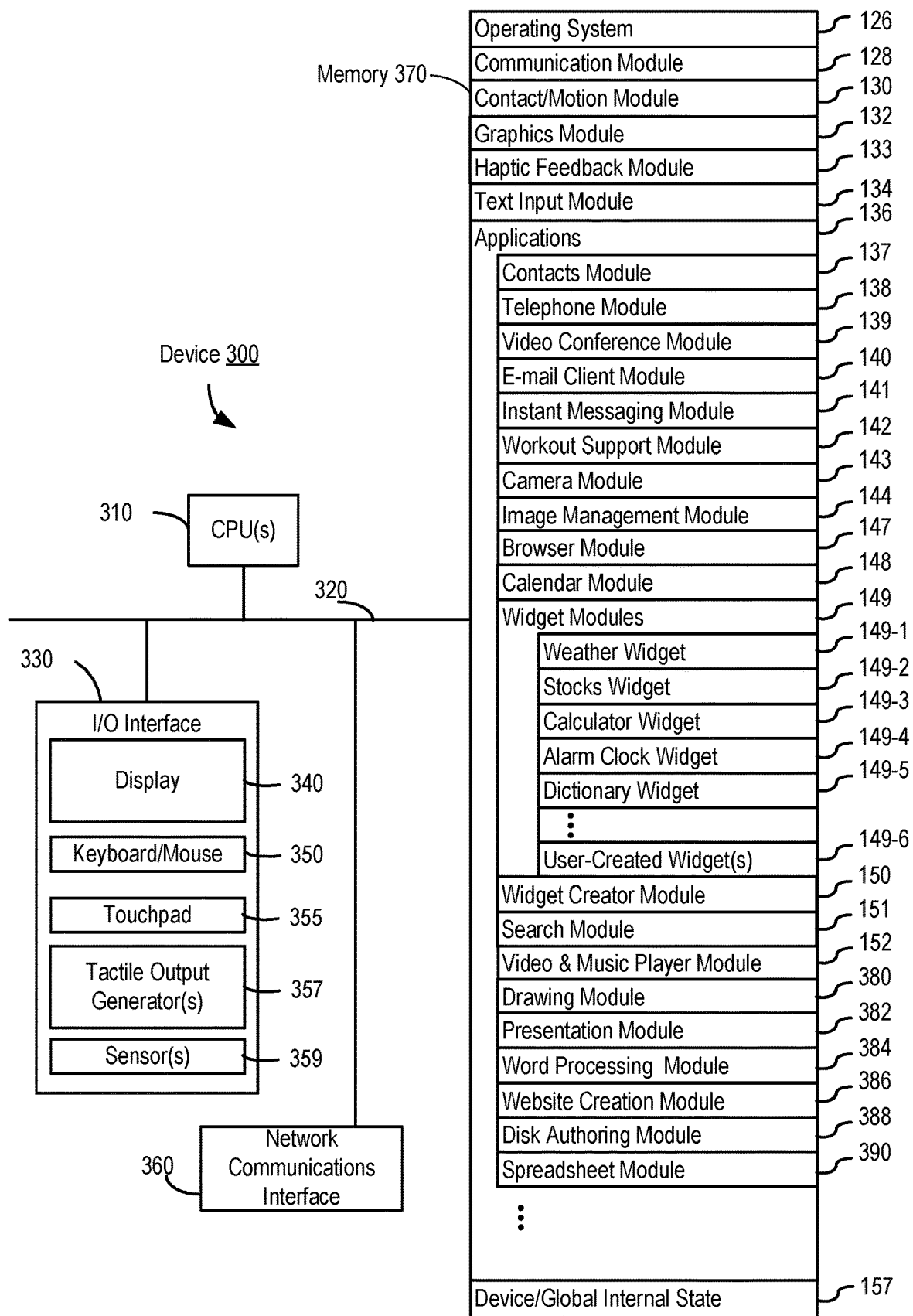
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list e.g., stored in application internal state 192 of contacts module 137 in memory 102 or memory 370), including; adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
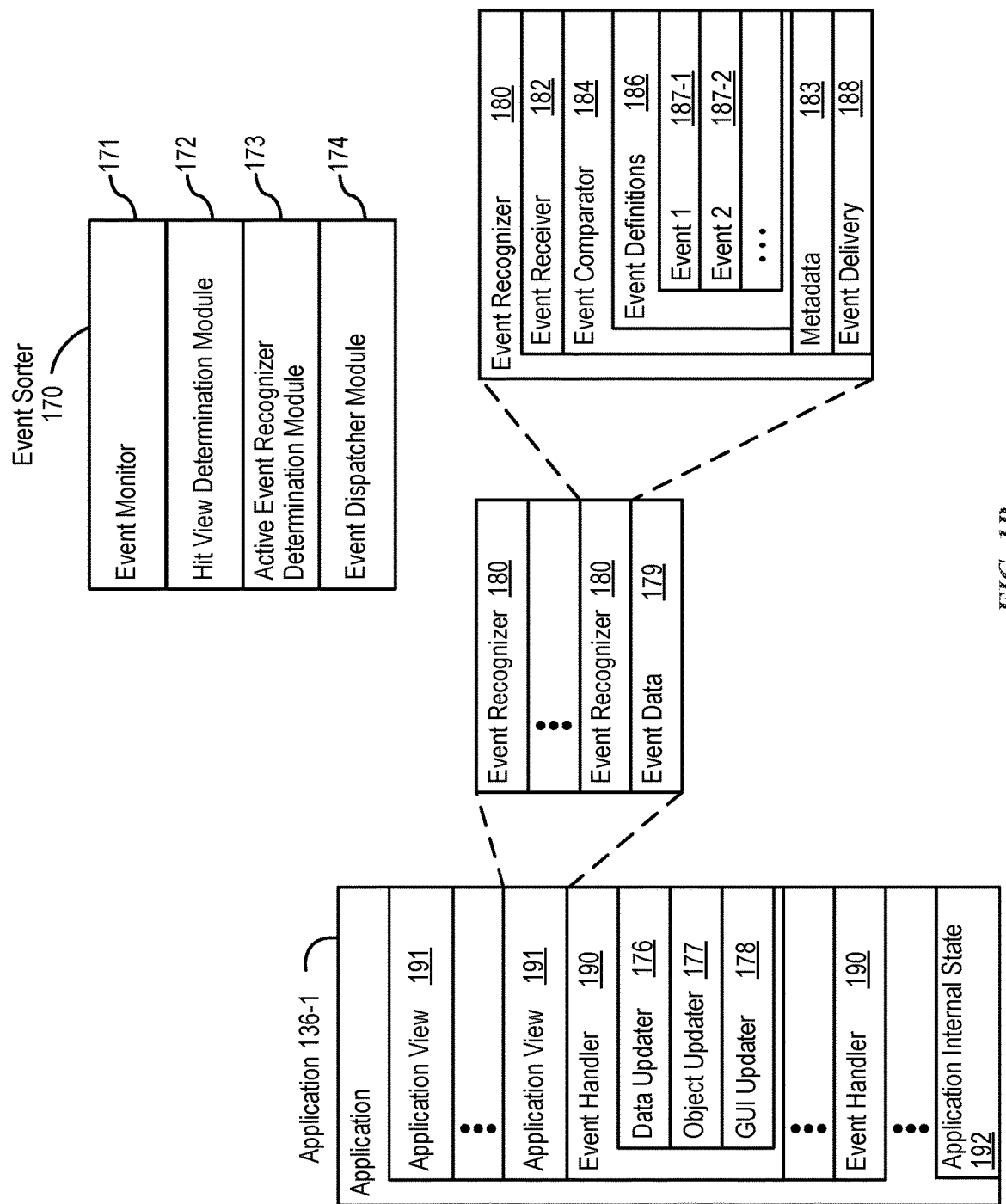
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
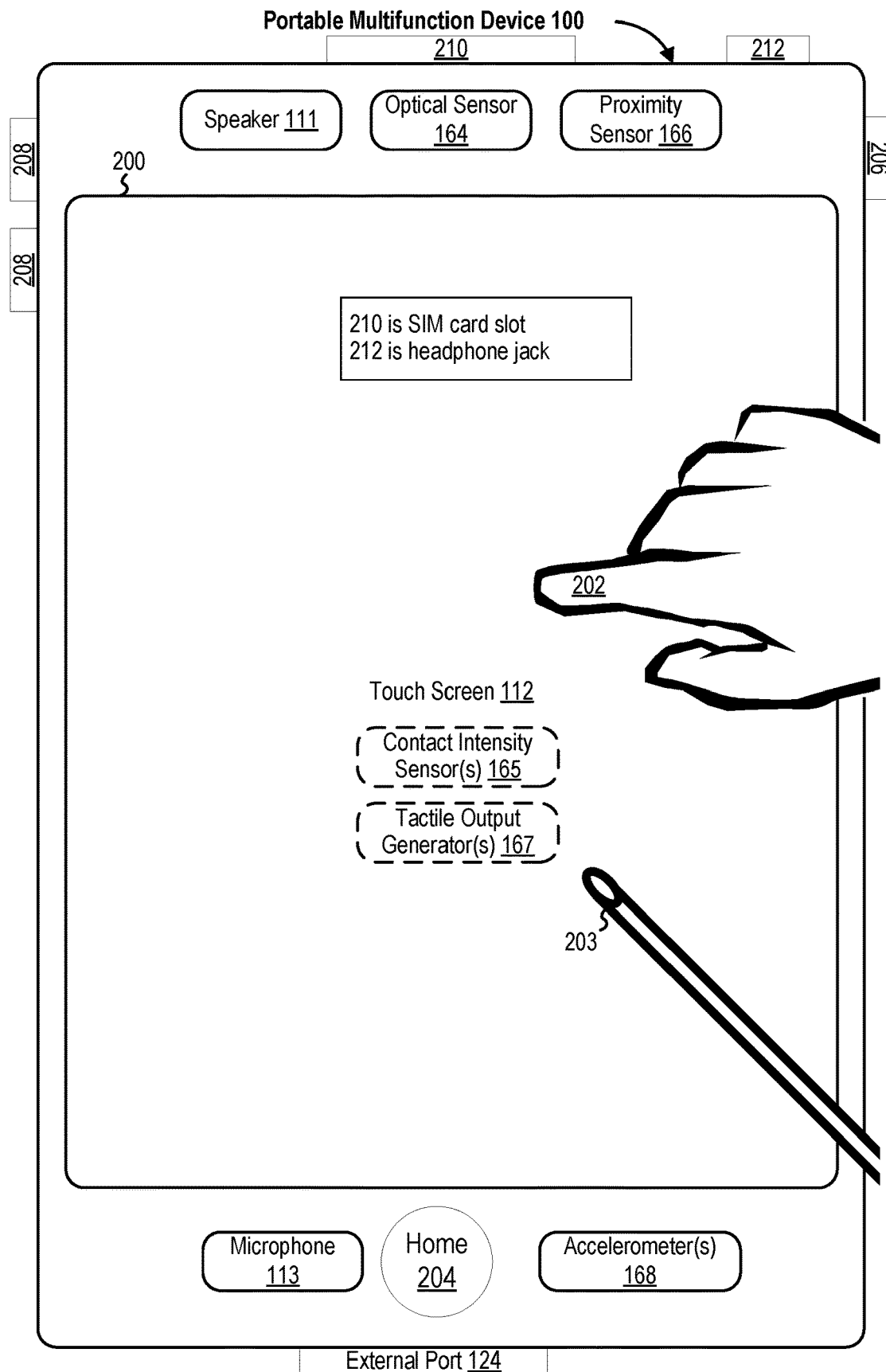
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
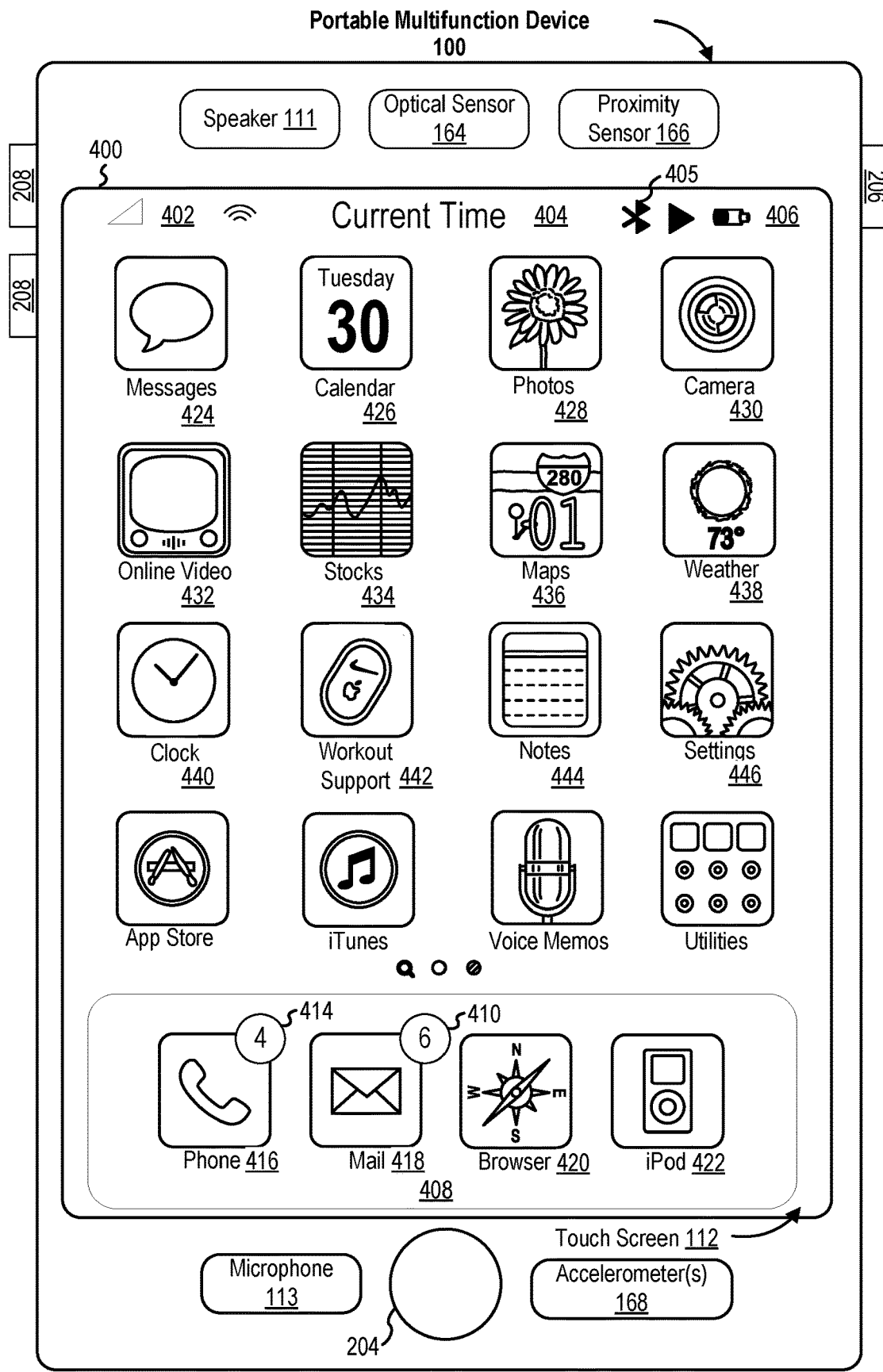
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
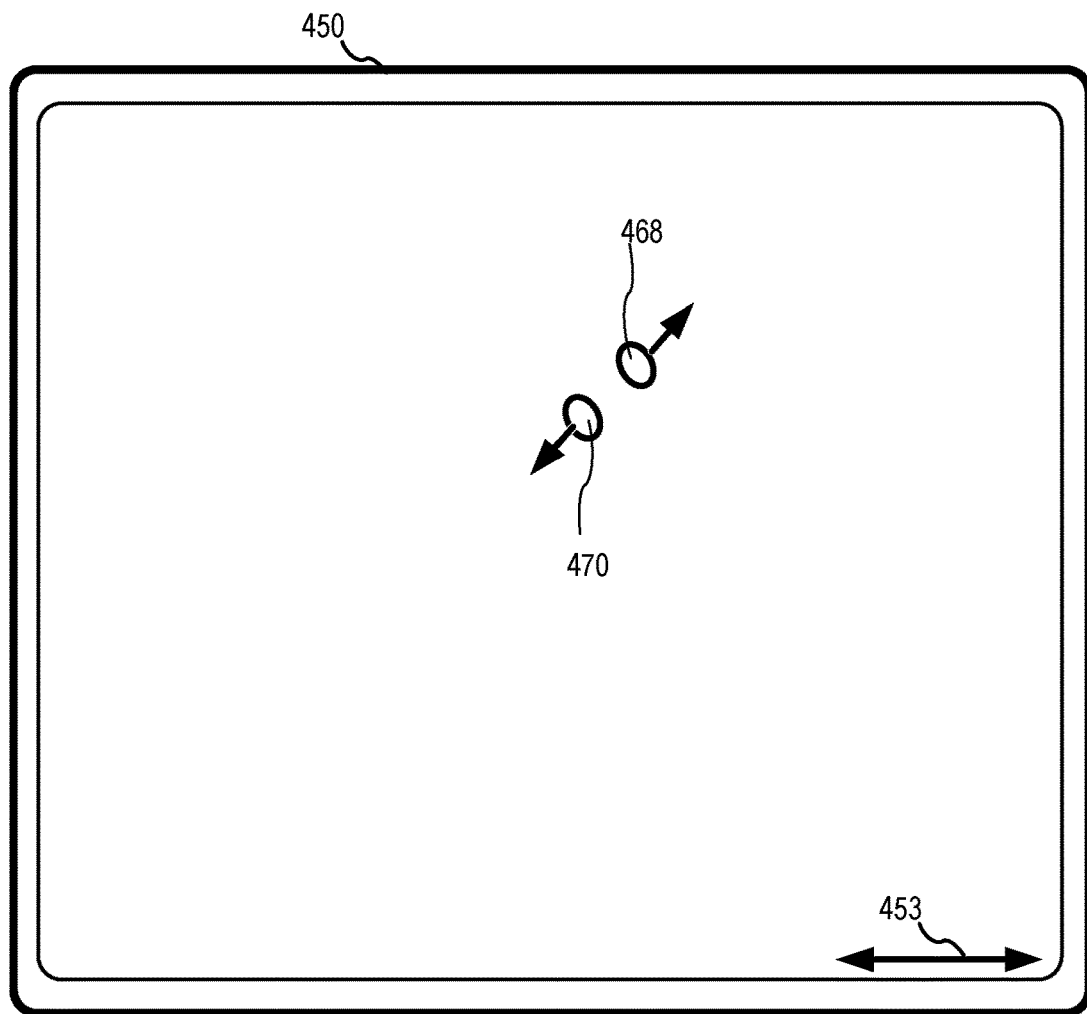
FIG. 4B illustrates an exemplary user interface for a multifunction device with a touch-sensitive surface that is separate from the display in accordance with some embodiments.
Figure 4B:
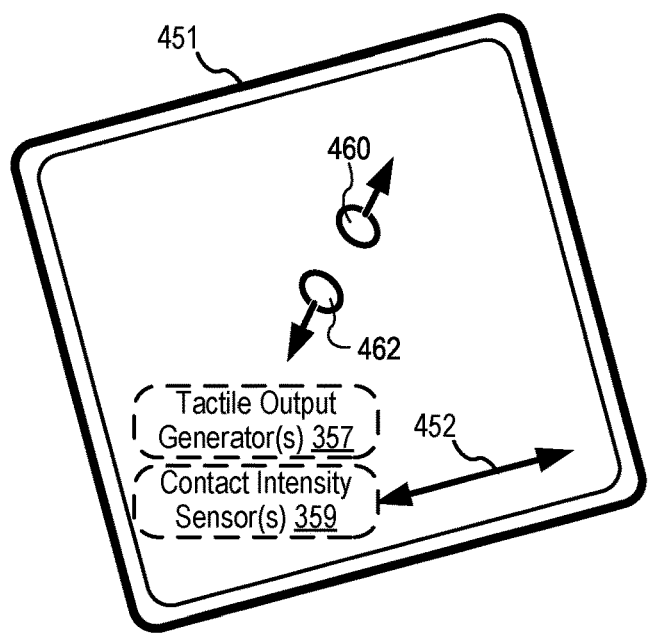

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
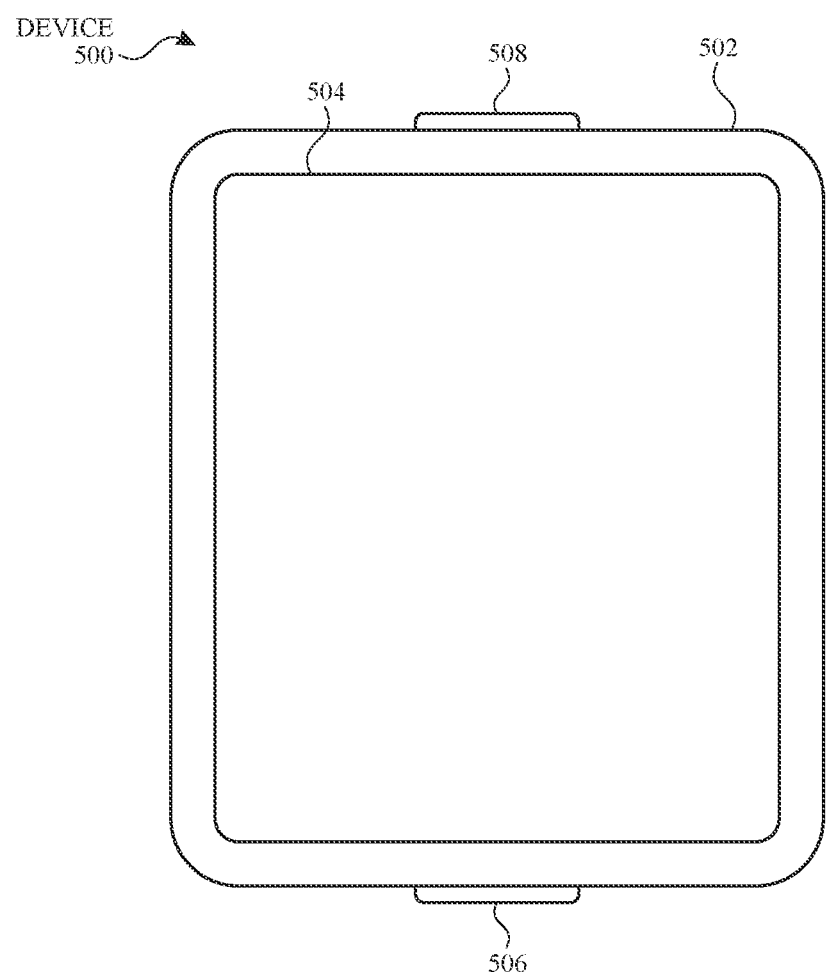
FIG. 5A illustrates a personal electronic device in accordance with some embodiments.
Figure 6C:
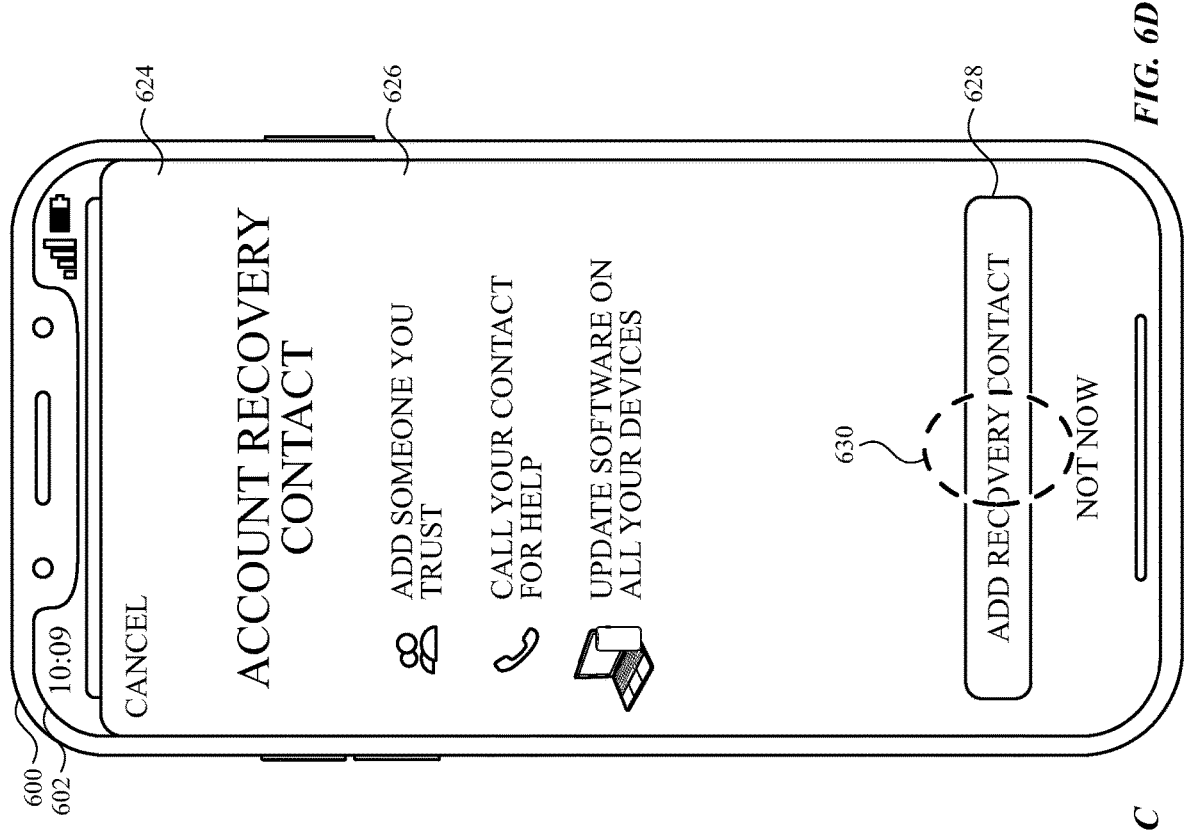
FIGS. 6A-6AJ illustrate exemplary user interfaces for recovering account access in accordance with some embodiments.
Figure 6D:
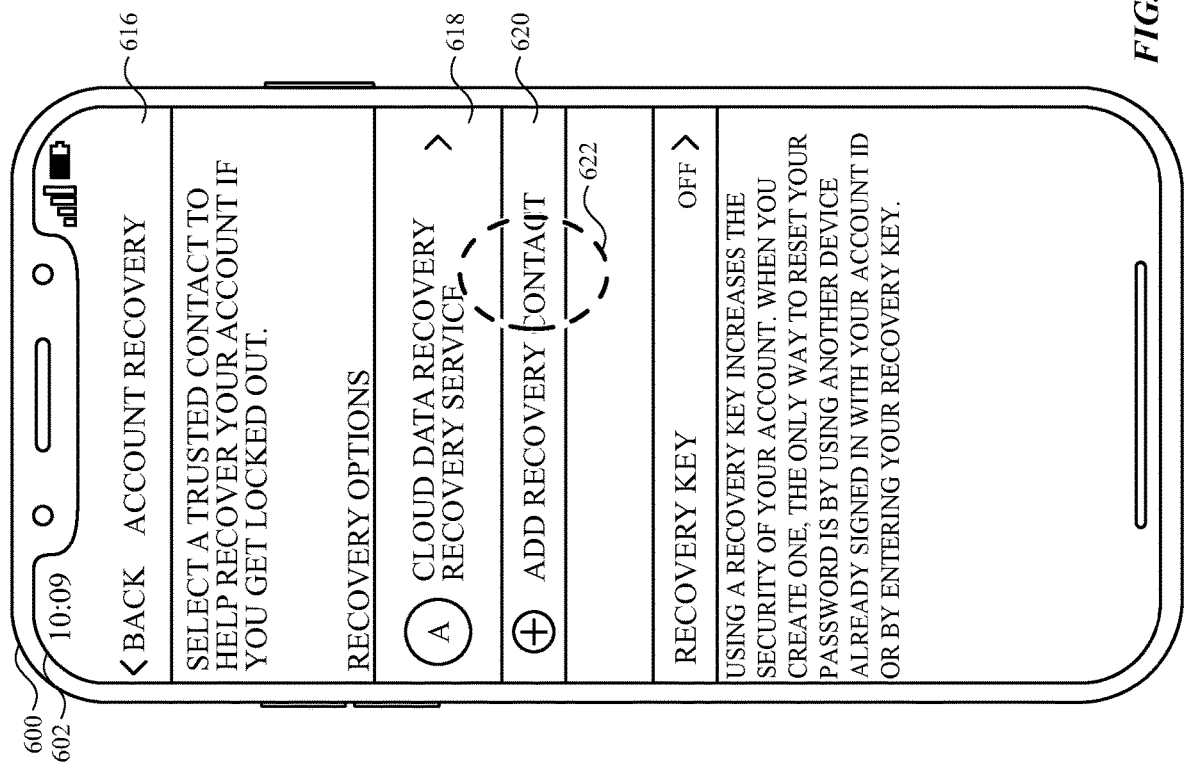
Figure 6E:
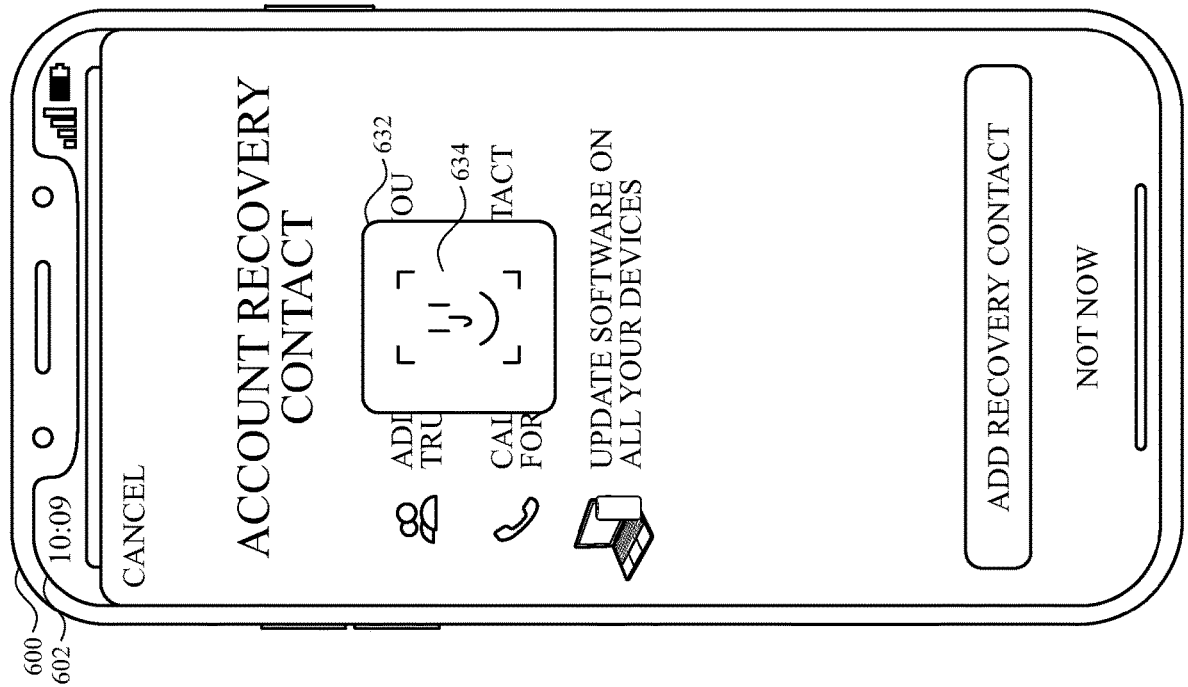
Figure 6F:
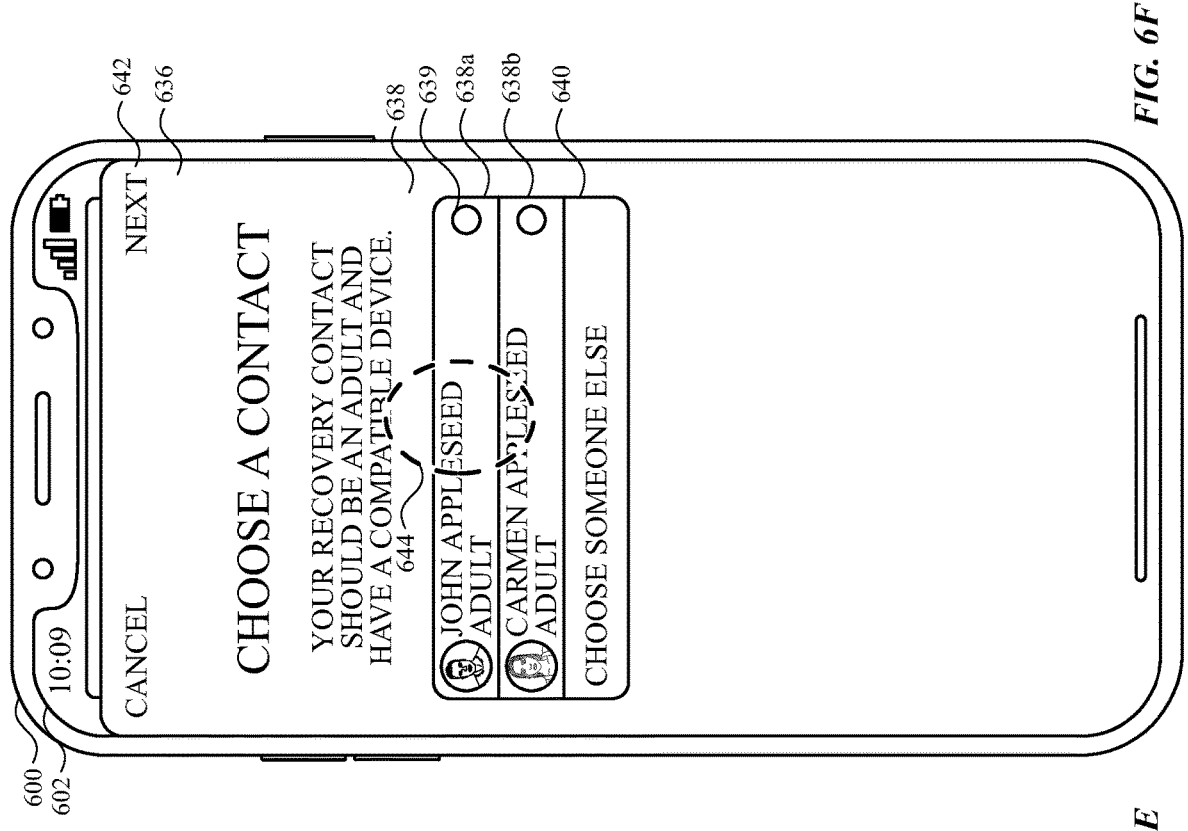
Figure 6I:
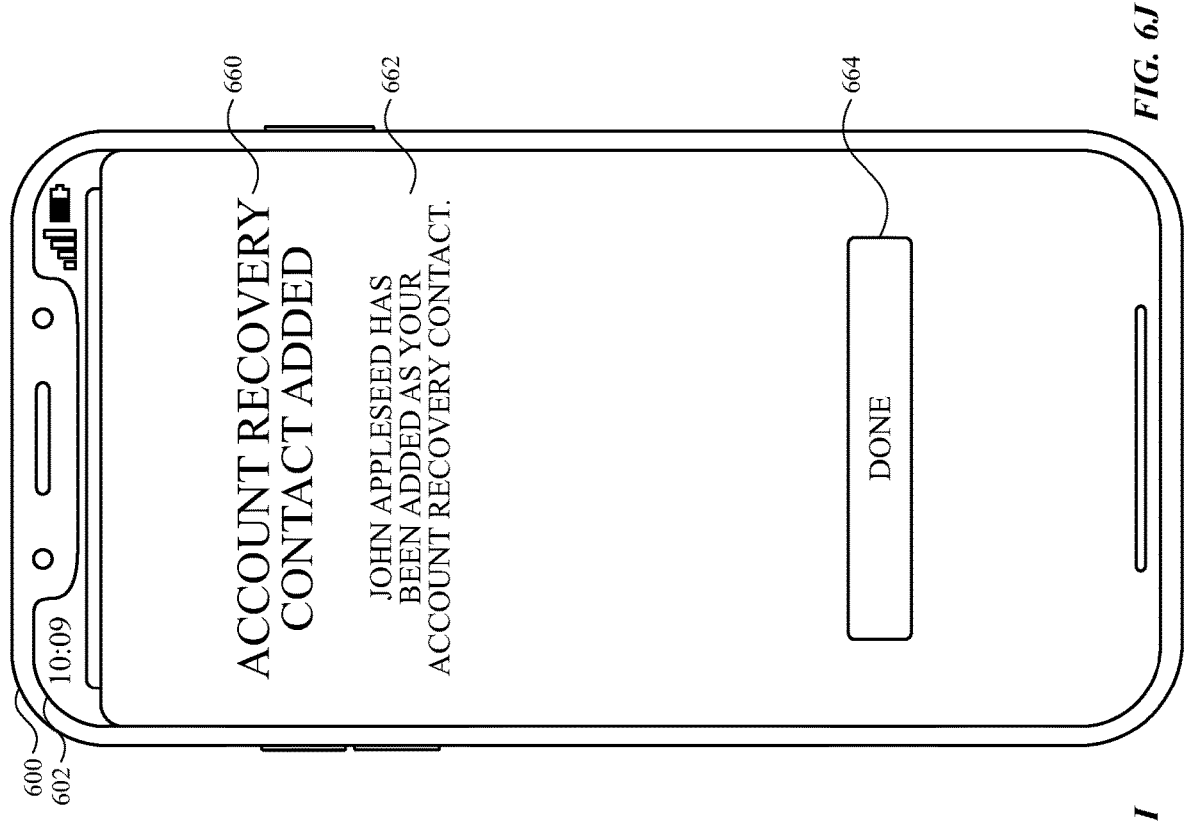
Figure 6J:
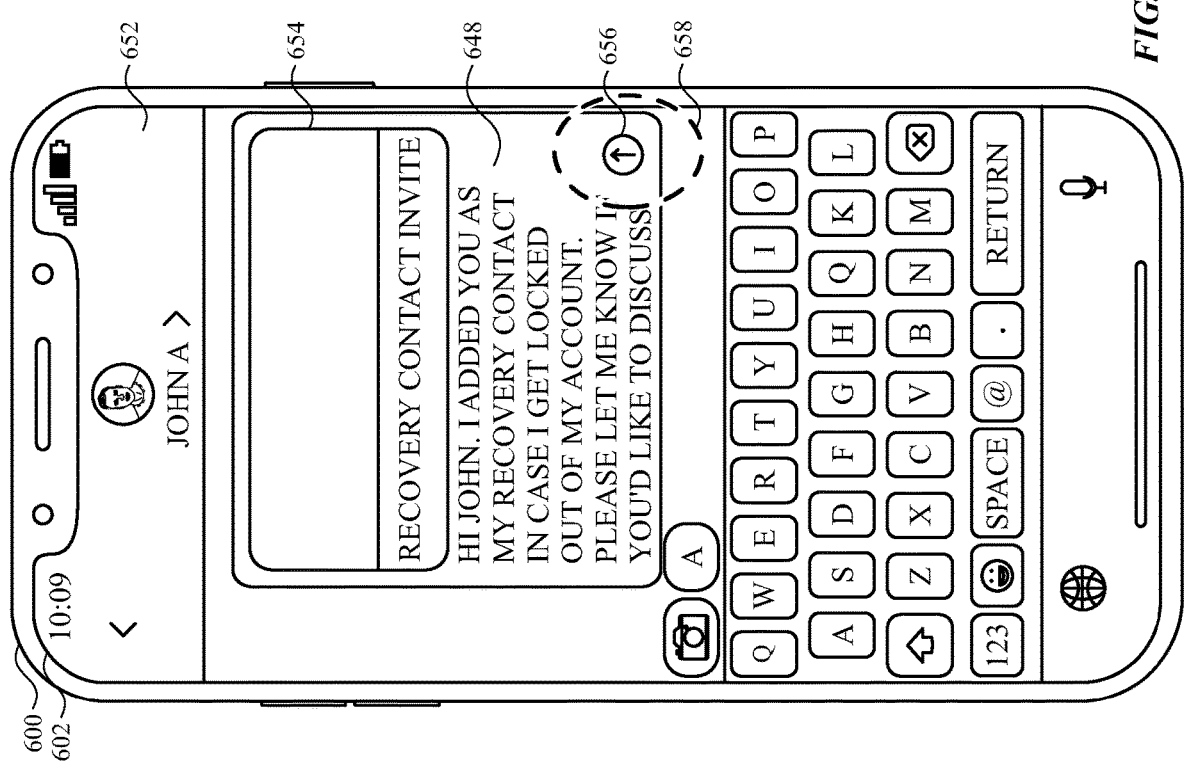
Figure 6L:
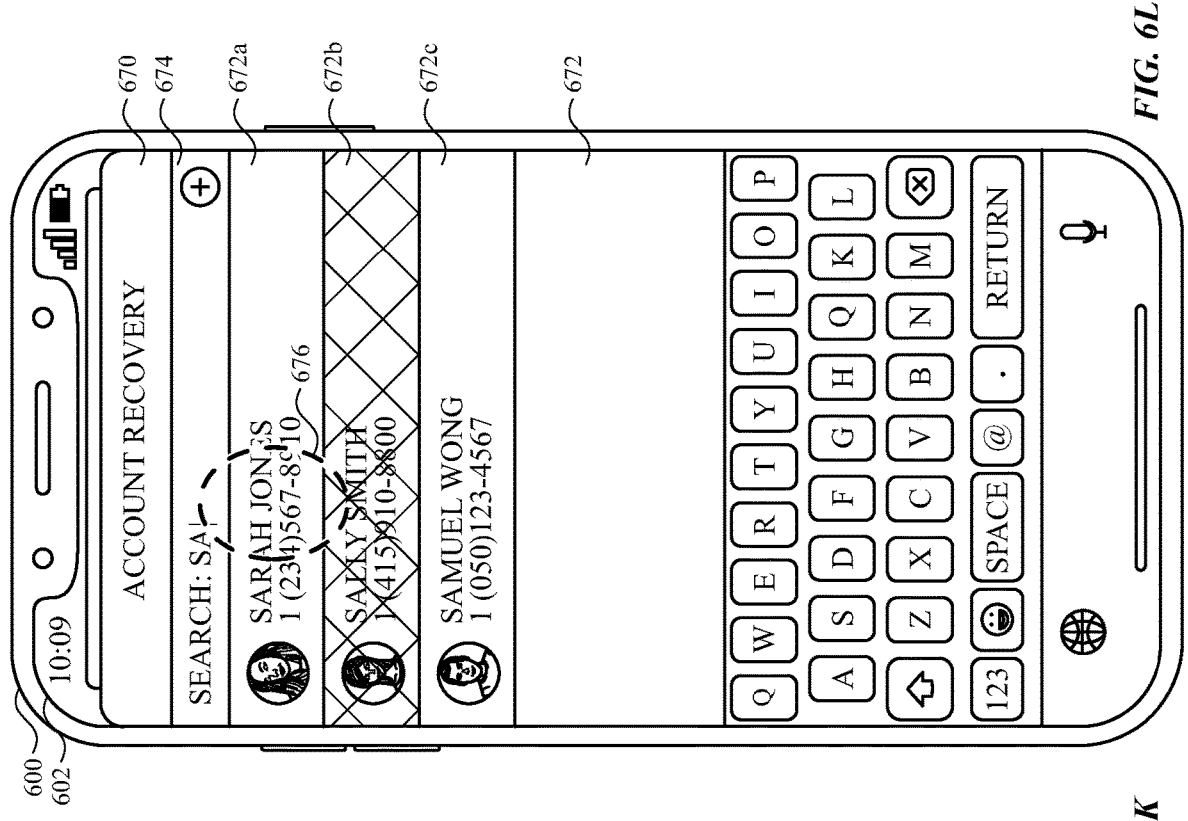
Figure 6K:
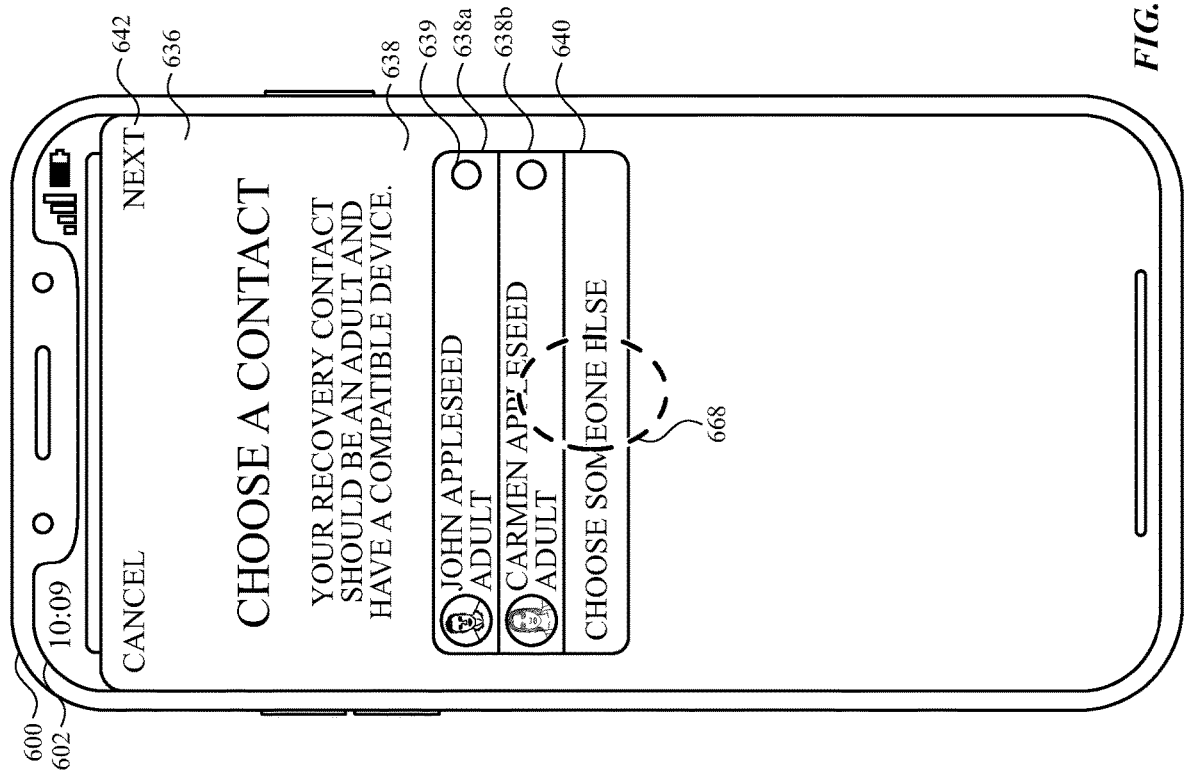
Figure 6N:
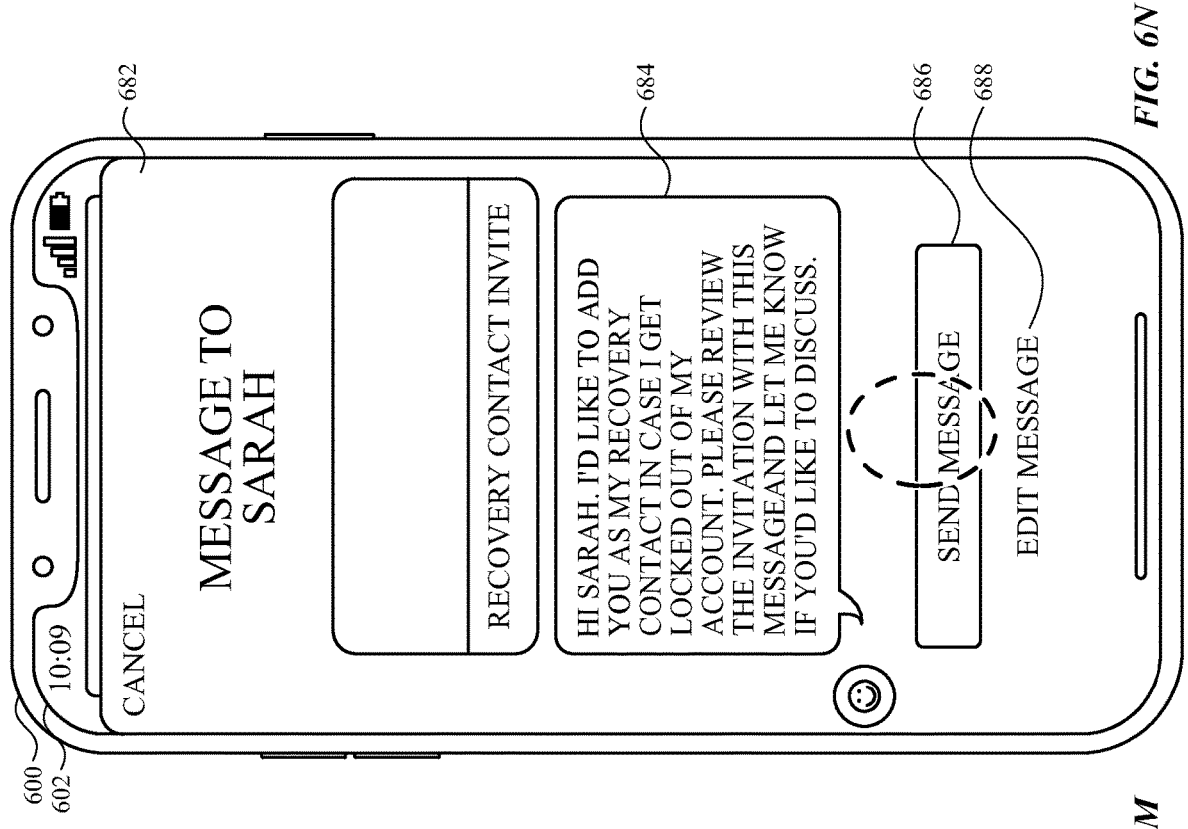
Figure 6M:
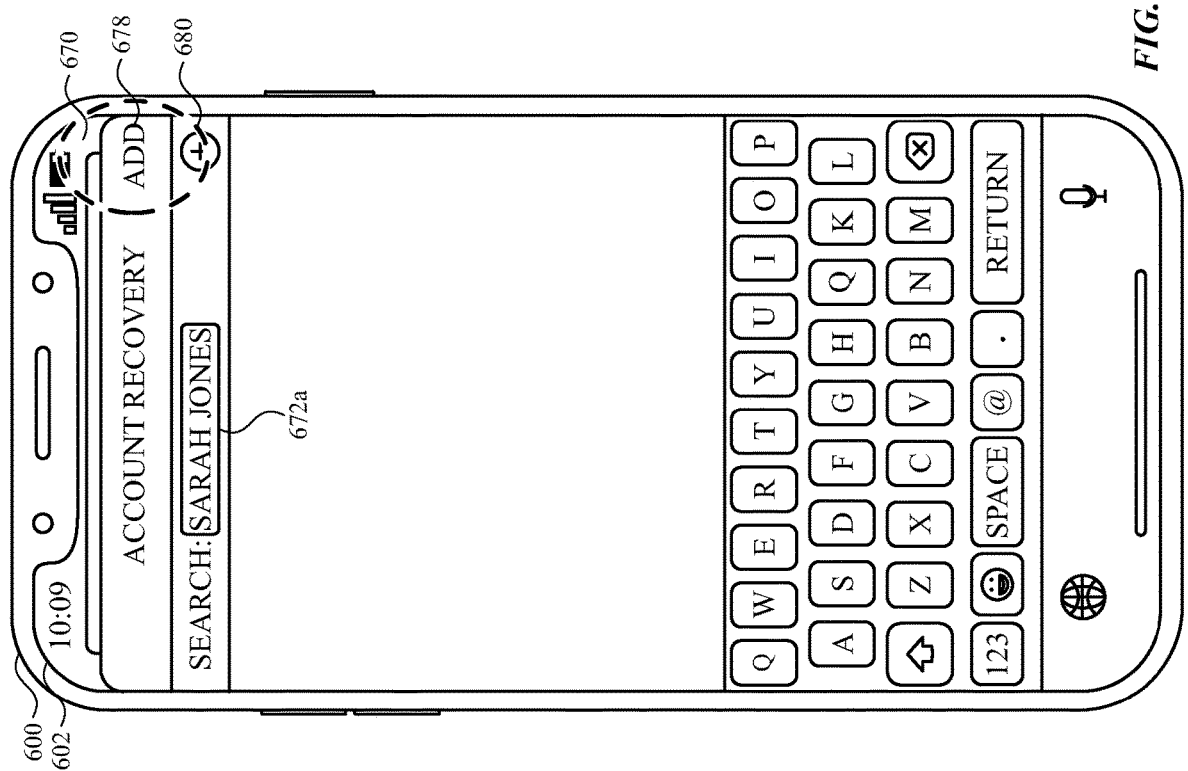
Figure 6R:
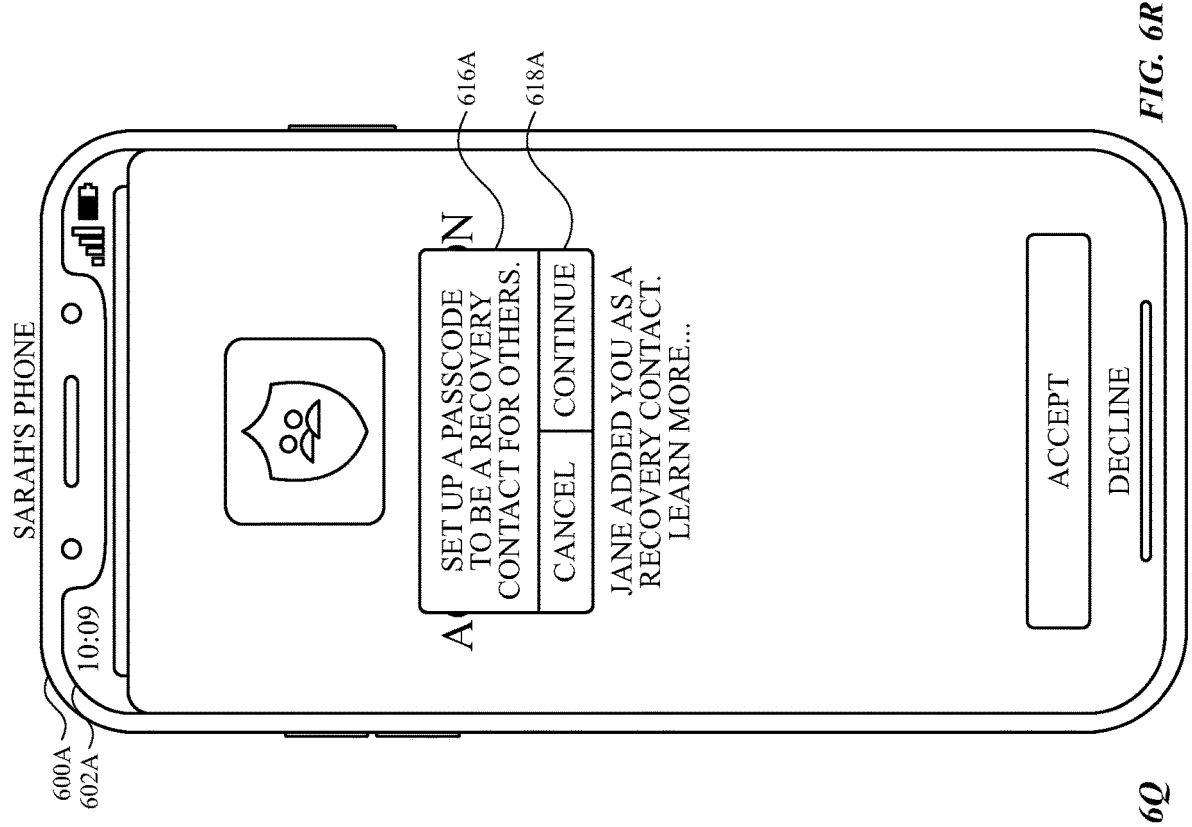
Figure 6Q:
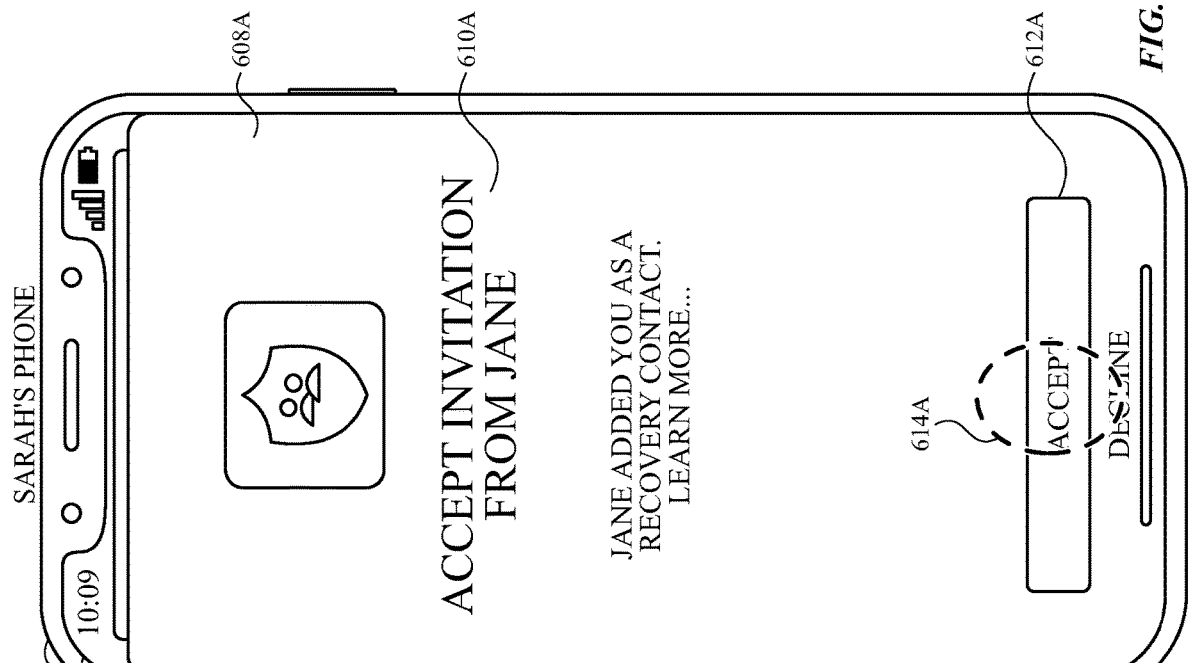

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
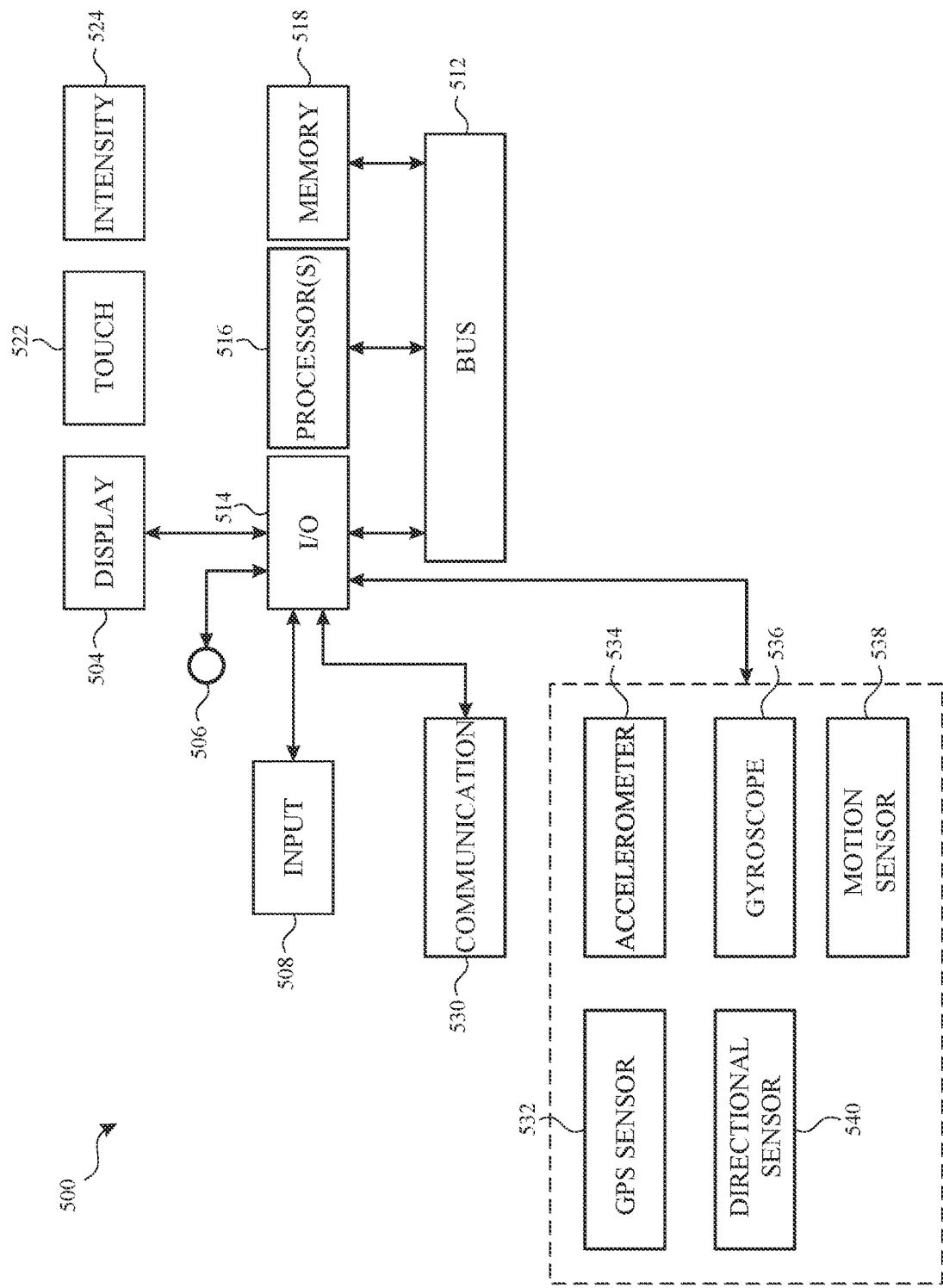
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100 and 1300 (FIGS. 7, 9, 11, 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-AJ illustrate exemplary user interfaces for recovering account access, in accordance with some embodiments. The user interfaces in these figures are used to illustrate the processes described below, including the processes in FIG. 7.

Generally, implementation of various the techniques for account recovery described below assists a user who is no longer otherwise able to access their user account. In some embodiments, such techniques provide a manner in which a contact of the user account is added as a recovery contact. Thereafter, access to the user account can be recovered using a recovery code provided by the recovery contact.

Figure 6T:
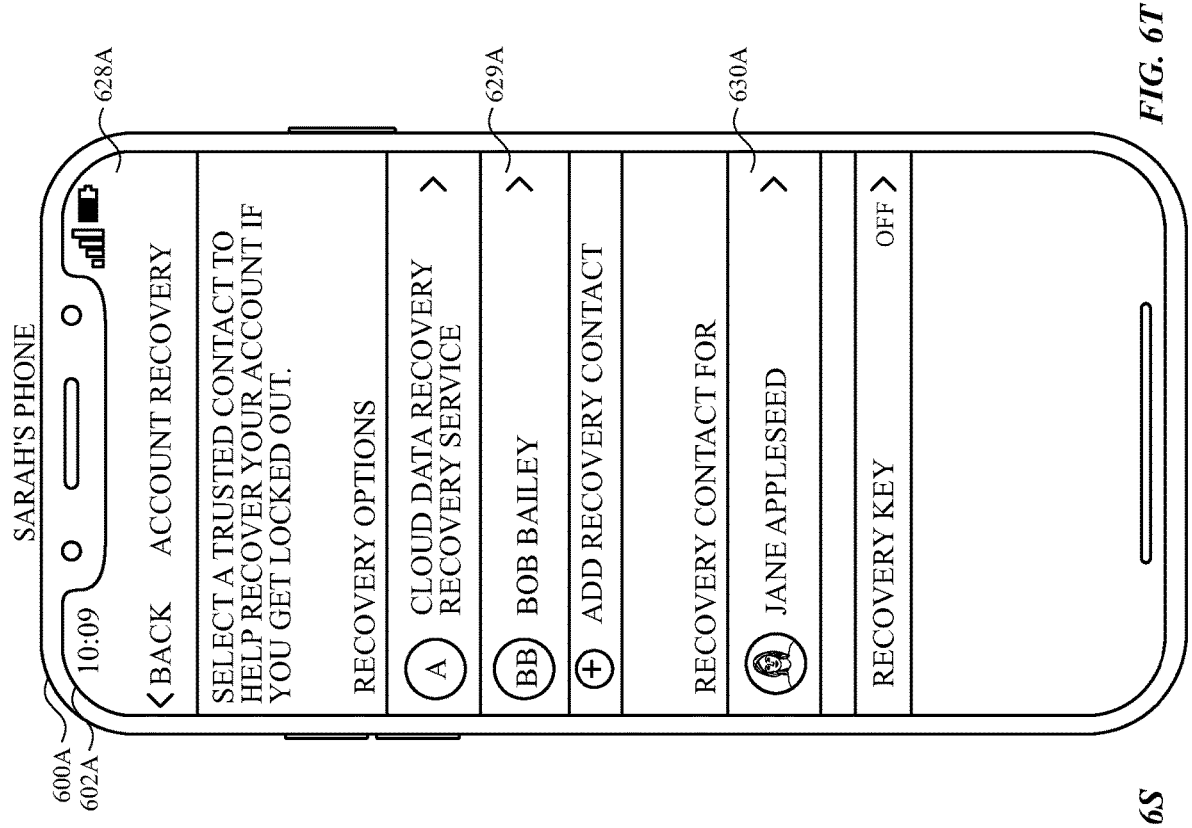
Figure 6S:
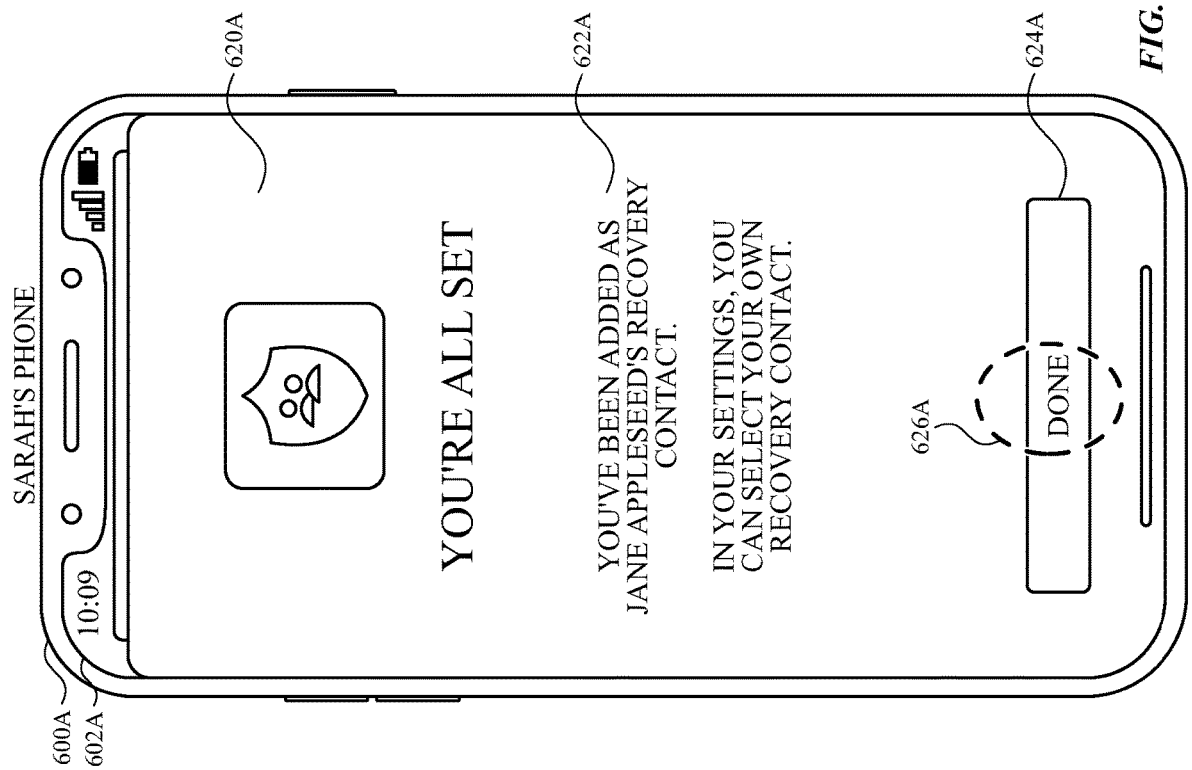
Figure 6Z:
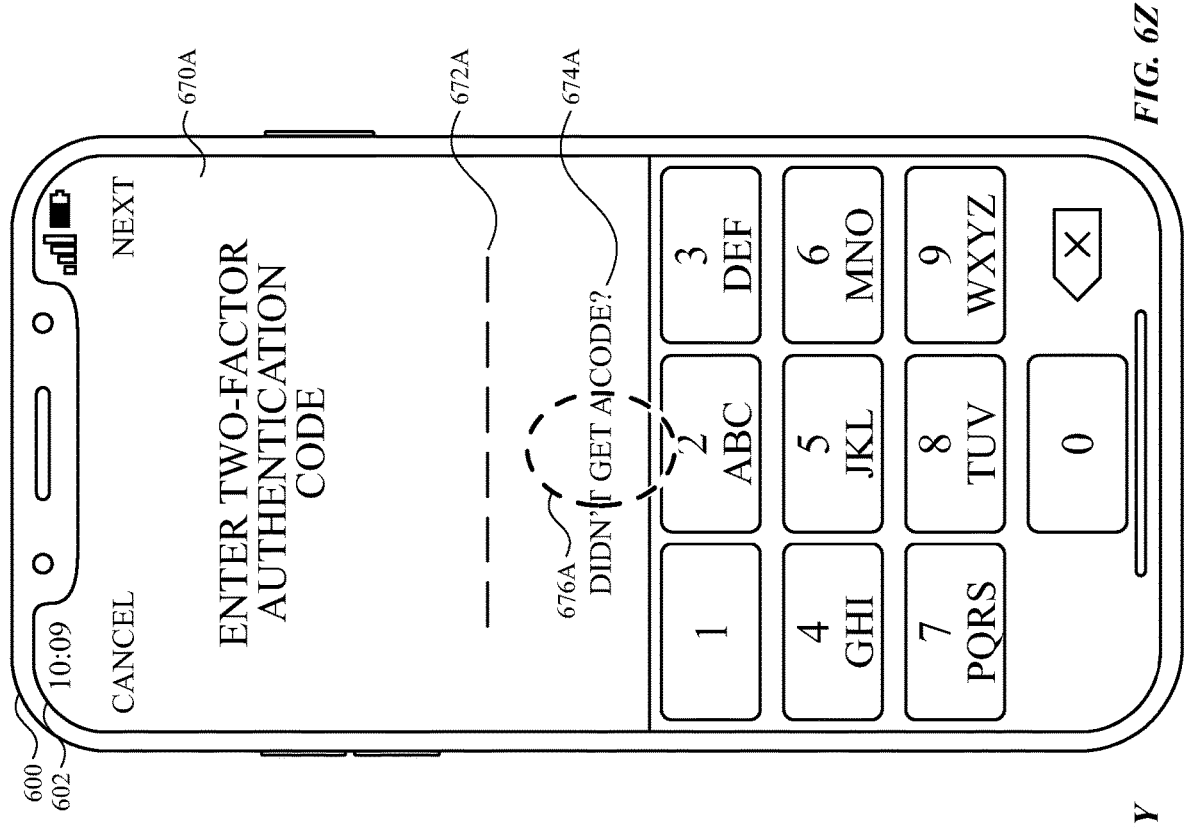
Figure 6Y:
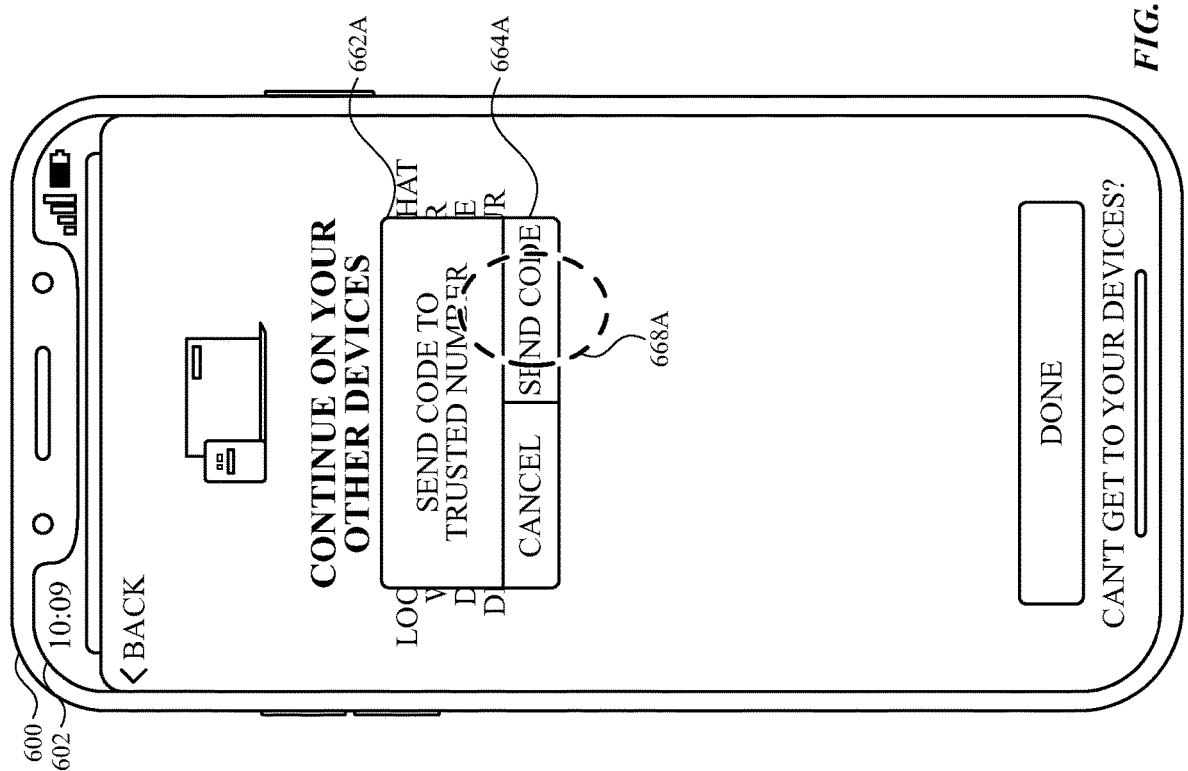
Figure 6A:
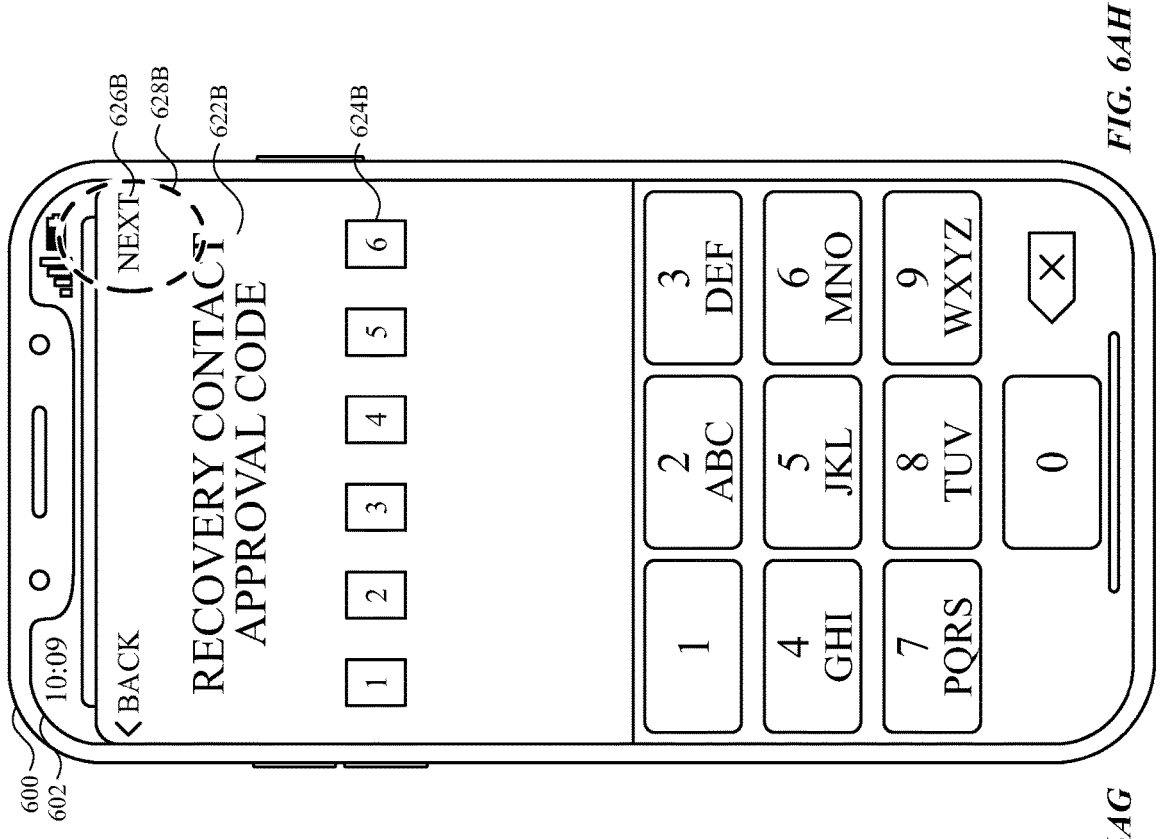
Figure 6A:
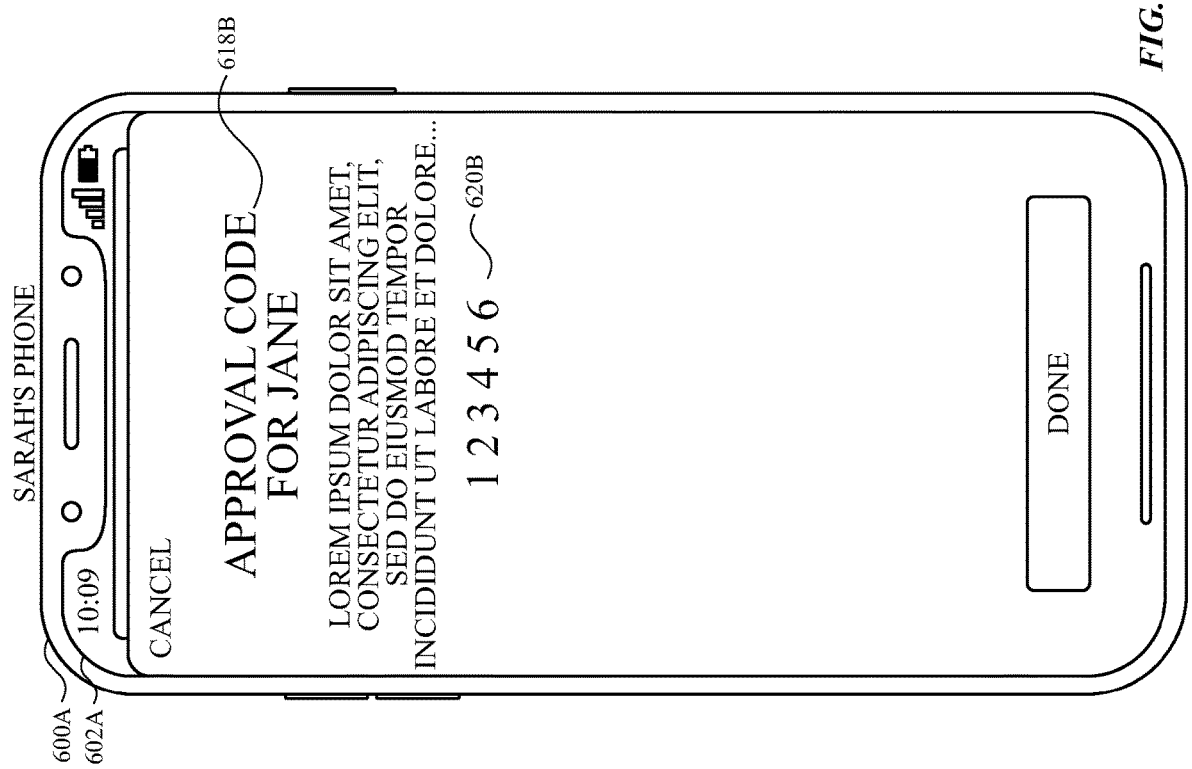

FIGS. 6A-6T illustrate techniques for adding a recovery contact for a user account. FIG. 6A illustrates electronic device 600. In FIG. 6A, electronic device 600 is a portable multifunction device and has one or more components described above in relation to one or more of devices 100, 300, and 500.

In FIG. 6A, device 600 displays, on display 602, an account interface 604 for a user account of a user Jane Appleseed. The account interface 604 is associated with a user account of device 600 in some embodiments. The account interface 604 includes various affordances for configuring features of the user account, including security affordance 606. In response to selection of security affordance 606, device 600 displays a security interface. While displaying account interface 604, device 600 detects selection of security affordance 606. The selection is a tap gesture 608 on security affordance 606. As shown in FIG. 6B, in response to detecting tap gesture 608, device 600 displays security interface 610.

Security interface 610 includes various affordances for managing access to the user account and/or data associated with the user account, including account recovery affordance 612. In response to selection of account recovery affordance 612, device 600 displays an account recovery interface. While displaying security interface 610, device 600 detects selection of account recovery affordance 612. The selection is a tap gesture 614 on account recovery affordance 612. As shown in FIG. 6C, in response to detecting tap gesture 614, device 600 displays account recovery interface 616.

Account recovery interface 616 includes cloud recovery affordance 618 and add recovery contact affordance 620. Selection of cloud recovery affordance 618 initiates a process for recovering data (e.g., for Jane Appleseed's user account) from a cloud storage environment. In response to selection of add recovery contact affordance 618, device 600 displays an initialization interface. While displaying account recovery interface 616, device 600 detects selection of add recovery contact affordance 620. The selection is a tap gesture 622 on add recovery contact affordance 606. As shown in FIG. 6D, in response to detecting tap gesture 622, device 600 displays initialization interface 624.

Initialization interface 624 includes information 626 and initialization affordance 628. Information 626 includes information describing one or more aspects of selecting a recovery contact and/or using a recovery contact for account recovery. Information 626 describes, for instance, that a recovery contact can be used to assist in recovering account access.

In response to selection of initialization affordance 628, device 600 initiates a recovery contact setup process for adding a recovery contact for the user account. While displaying initialization interface 624, device 600 detects selection of initialization affordance 628. The selection is a tap gesture 630 on initialization affordance 628.

In response to detecting tap gesture 630, device 600 initiates biometric authentication for the user of device 600, as shown in FIG. 6E. In some embodiments, initiating biometric authentication includes obtaining (e.g., capturing with one or more biometric sensors of device 600) data corresponding to at least a portion of the biometric feature. In FIG. 6E, while performing biometric authentication, device 600 displays biometric authentication interface 632, which may be overlaid on at least a portion of initialization interface 624. Biometric authentication interface 632 includes a biometric authentication glyph, such as biometric authentication glyph 634, to indicate a status of the biometric authentication (e.g., biometric authentication glyph 634 indicates successful biometric authentication).

In response to successful biometric authentication, device 600 displays recovery contact selection interface 636, as shown in FIG. 6F. In some embodiments, failure to successfully authenticate prevents display of interface 636. Recovery contact selection interface 636 includes candidate contacts 638 (e.g., candidate contacts 638a, 638b), selection affordance 640, and continue affordance 642.

Generally, recovery contact selection interface 636 can be used to add a recovery contact for a user account. A candidate contact 638, for example, can be added as a recovery contact. Candidate contacts are a subset of contacts of device 600, and optionally, determined to be trusted contacts (e.g., contacts designated as family (e.g., immediate family), contacts satisfying an age requirement (e.g., 18 years) and/or contacts sharing a home ecosystem with the user account). In some embodiments, candidate contacts 638 include all trusted contacts of device 600. In other embodiments, candidate contacts 638 include a subset of trusted contacts of device 600.

In the embodiment of FIGS. 6A-6AJ, trusted contacts, when selected as a recovery contact, are automatically added as recovery contacts (e.g., approval from the selected contact is not required for the contact to be added as a recovery contact). While displaying recovery contact selection interface 636, device 600 detects a selection of a candidate contact 638a (e.g., tap input 644) associated with a contact John Appleseed. As shown in FIG. 6G, in response to selection of candidate contact 638a, device 600 modifies display of selection indicator 639 to indicate that John Appleseed has been selected.

After modifying display of selection indicator 639, device 600 detects a selection of continue affordance 642. In response to selection of continue affordance 642, device 600 displays a message interface. While displaying recovery contact selection interface 636, device 600 detects selection of continue affordance 642. The selection is a tap gesture 646 on continue affordance 642. As shown in FIG. 6H, in response to detecting tap gesture 646, device 600 displays message interface 647.

Message interface 647 includes message 648, send affordance 649, and edit affordance 650. Message 648 is a preview of a message notifying the selected contact John Appleseed that they have been added as a recovery contact. In response to selection of edit affordance 650, device 600 allows for message 648 to be edited in message interface 647.

In response to selection of send affordance 649, device 600 opens (e.g., executes) a messaging application, as shown in FIG. 6I. Opening the messaging application in this manner includes displaying a message interface 652 and preloading the messaging application with message 648 and recovery contact notification 654.

While displaying message interface 652, device 600 detects selection of send affordance 656. The selection is a tap gesture 658 on send affordance 656. In response to selection of send affordance 656, device 600 provides (e.g., transmits) message 648 to a device of John Appleseed and adds (e.g., automatically adds) John Appleseed as a recovery contact for Jane Appleseed's user account (recall that adding trusted contacts as recovery contacts does not require approval by the contact).

Further in response to selection of send affordance 656, device 600 displays confirmation interface 660. Confirmation interface 660 includes indicator 662 and completion affordance 664. Indicator 662 indicates that John Appleseed has been successfully added as a recovery contact. In response to selection of completion affordance 664, device 600 terminates (e.g., completes) the recovery contact setup process.

In some embodiments, a contact that is not listed by device 600 as a candidate contact 638 can be selected as a candidate recovery contact. In FIG. 6K, device 600 displays recovery contact selection interface 636. While displaying recovery contact selection interface 636, device 600 detects selection of selection affordance 640. The selection is a tap gesture 668 on account recovery affordance 640. As shown in FIG. 6L, in response to detecting tap gesture 668, device 600 displays contact interface 670.

Contact interface 670 includes contacts 672 (e.g., contact 670a, contact 670b, contact 670c) and search field 674. Search field 674 can be used to search contacts of device 600. As shown, search field 674 includes a search string "sa", and a result, contacts of device 600, contacts 672a-c that include the search string "sa" are displayed. In some embodiments, contact interface 670 is initially displayed without any search string entered in search field 674.

Generally, contact interface 670 may be used to select a contact to be added as a recovery contact. In some embodiments, only a contact whose device satisfies a set of compatibility criteria for device 600 can be selected. In some embodiments, the set of compatibility criteria include a criterion that is met when device 600 and the device of a contact share a same manufacturer, type, model, and/or software package (e.g., operating system). In some embodiments, the compatibility criteria include a criterion that is met when the device of the contact supports one or more particular recovery contact features. In some embodiments, the compatibility criteria include a criterion that is met when an age of a user of the device meets or exceeds a threshold age (e.g., 18 years).

Contacts whose devices satisfy the set of compatibility criteria (e.g., contacts 672a, 672c) are displayed in a first manner, while contacts whose devices do not satisfy the compatibility criteria (e.g., contact 672b) are displayed in a second manner. For example, those contacts whose devices do not satisfy the set of compatibility criteria can, optionally, be greyed out, faded, and/or otherwise displayed in a manner suggesting those contacts are not eligible to be selected as recovery contacts.

While displaying contact interface 670, device 600 detects selection of contact 672a associated with a contact Sarah Jones. The selection is a tap gesture 676 on contact 672a. As shown in FIG. 6M, in response to detecting tap gesture 622, device 600 displays the name Sarah Jones in search field 674, indicating that the contact Sarah Jones has been selected as a recovery contact. Further in response to selection of contact 672a, device 600 removes display of other contacts 672 and displays add affordance 678.

As described, if a selected contact is a trusted contact, device 600 adds (e.g., automatically adds) the contact as a recovery contact without approval from the contact. Accordingly, if Sarah Jones is a trusted contact, in response to selection of add affordance 678, device 600 will provide a message for Sarah Jones and add Sarah Jones as a recovery contact, as described above with reference to FIGS. 6H-J.

If a selected contact is not a trusted contact, device 600 adds the contact as a recovery contact only if the contact approves being added as a recovery contact. As shown in FIG. 8N, if Sarah Jones is not a trusted contact, in response to selection of add affordance 678, device 600 displays message interface 682.

Message interface 682 includes message 684, send affordance 686, and edit affordance 688. Message 684 is a preview of a message requesting that Sarah Jones approve being added as a recovery contact for the user account. In response to selection of edit affordance 654, device 600 allows for message 684 to be edited in message interface 682.

In response to selection of send affordance 686, device 600 opens (e.g., executes) a messaging application, as shown in FIG. 6O. Opening the messaging application in this manner includes displaying a message interface 690 of the messaging application and preloading the messaging application with message 684 and recovery contact invite 692.

While displaying message interface 682, device 600 detects selection of send affordance 694. The selection is a tap gesture 696 on send affordance 694. In response to selection of send affordance 694, device 600 provides (e.g., transmits) message 684 and recovery contact invite 692 to device 600A (FIG. 6P) associated with the selected contact Sarah Jones. In some embodiments, device 600A includes one or more features of devices 100, 300, and/or 500.

In FIG. 6P, device 600A displays, on display 602A, message interface 604A of a messaging application (e.g., in response to receiving message 684 and/or recovery contact invite 692 from device 600). Message interface 604A includes message 684 and recovery contact invite 692. While displaying message interface 604A, device 600A detects selection of recovery contact invite 692. The selection is a tap gesture 606A on recovery contact invite 692. As shown in FIG. 6Q, in response to detecting tap gesture 606A, device 600 displays invite interface 608A.

Invite interface 608A includes indicator 610A, indicating that Sarah Jones has been selected as a recovery contact and that approval is required to add Sarah Jones as a recovery contact. Invite interface 608A further includes acceptance affordance 612A.

While displaying invite interface 608A, device 600A detects selection of acceptance affordance 612A. The selection is a tap gesture 614A on the acceptance affordance 612A. In response to selection of the accept affordance 612A, device 600A determines if device 600A is secured by a passcode. If device 600A is not secured by a passcode, device 600A displays (e.g., overlays on invite interface 608A) passcode interface 616A, as shown in FIG. 6R. Passcode interface 616 can be used for entry of a passcode used to secure access to a recovery code for the user account of device 600.

Once a passcode has been received by device 600A (or if device 600A was determined to already be secured by a passcode), device 600A sends an indication to device 600 that the request was accepted and displays completion interface 620A, as shown in FIG. 6S. Completion interface 620A includes indicator 622A and completion affordance 624A. Indicator 622A indicates that the request has been accepted, and Sarah Jones has been added as a recovery contact for Jane Appleseed's user account.

While displaying contact interface 620A, device 600A detects selection of completion affordance 624A. The selection is a tap gesture 626A on completion affordance 624A. As shown in FIG. 6T, in response to detecting tap gesture 626A, device 600A displays account recovery interface 628A. Account recovery interface 628A includes contact affordance 630A, indicating that Sarah Jones is a recovery contact for the user account associated with Jane Appleseed. Account recovery interface also includes contact recovery affordance 629A associated with a contact Bob Bailey, a recovery contact for Sarah Jones.

FIGS. 6U-6AG illustrate techniques for accessing a user account using a recovery contact. In FIG. 6U, device 600 displays login interface 632A, which can be used by a user to access a user account by providing a valid set of credentials corresponding to the user account. Login interface 632A includes forgot password affordance 634A. In response to selection of forgot affordance 634A, device 600 displays a forgot password interface. While displaying login interface 632A, device 600 detects selection of forgot password affordance 634A. The selection is a tap gesture 636A on forgot password affordance 634A. As shown in FIG. 6V, in response to detecting tap gesture 636A, device 600 displays forgot password interface 638A.

Forgot password interface 638A includes account field 640A and continue affordance 642A. Account field 640A can be used for entry of an account identifier associated with the user account to be recovered during an account recovery process. In response to selection of continue affordance 642A, device 600 displays a confirmation interface. While displaying forgot password interface 638A, device 600 detects selection of continue affordance 642A. The selection is a tap gesture 644A on the continue affordance 642A. As shown in FIG. 6W, in response to detecting tap gesture 644A, device 600 displays confirmation interface 646A.

Confirmation interface 646A includes phone number field 648A and continue affordance 650A. Phone number field 648A can be used to verify the phone number associated with a user account. In response to selection of continue affordance 650A, device 600 displays a recovery interface. While displaying confirmation interface 646A, device 600 detects selection of continue affordance 650A. The selection is a tap gesture 652A on continue affordance 650A. As shown in FIG. 6X, in response to detecting tap gesture 652A, device 600 displays recovery interface 654A.

Recovery interface 654A includes indicator 656A and help affordance 658A. Indicator 656A indicates that the user account can be accessed using another device associated with the user account. In response to selection of help affordance 658A, device 600 displays a passcode interface. While displaying recovery interface 654A, device 600 detects selection of help affordance 658A. The selection is a tap gesture 660A on continue affordance 658A. As shown in FIG. 6Y, in response to detecting tap gesture 658A, device 600 displays (e.g., overlays on recovery interface 654A) passcode interface 662A.

Passcode interface 662A includes a send code affordance 664A. In response to selection of send code affordance 664A, device 600 causes a passcode to be provided to the phone number entered in number field 648A (FIG. 8W). While displaying passcode interface 662A, device 600 detects selection of send code affordance 664A. The selection is a tap gesture 668A on send code affordance 664A. In response to detecting tap gesture 668A, device 600 causes a passcode to be provided (e.g., by text, using a remote authentication service) to the phone number entered in number field 648A.

As shown in FIG. 6Z, further in response to detecting tap gesture 668A, device 600 displays authentication interface 670A. Authentication interface 670A includes passcode field 672A and receipt failure affordance 674A. Passcode field 672A is used for entry of the passcode provided in response to selection of send code affordance 664A. Accordingly, a user associated with the user account can, optionally, verify their identity by authenticating on another device associated with the user account.

In response to selection of receipt failure affordance 674A, device 600 displays a passcode interface. While displaying authentication interface 670A, device 600 detects selection of receipt failure affordance 674A. The selection is a tap gesture 676A on help affordance 674A. As shown in FIG. 6AA, in response to detecting tap gesture 676A, device 600 displays passcode interface 678A.

Passcode interface 678A includes passcode field 680A and help affordance 682A. Passcode field 680A is used for entry of a passcode used to secure another device associated with the user account. In response to selection of help affordance 682A, device 600 displays a help user interface. While displaying passcode interface 678A, device 600 detects selection of help affordance 682A. The selection is a tap gesture 684A on help affordance 682A. As shown in FIG. 6AB, in response to detecting tap gesture 684A, device 600 displays help user interface 686A.

Help user interface 686A includes indicator 688A and ask for help affordance 690A. Indicator 688A indicates that a recovery contact can help recover access to the user account. In response to selection of help affordance 690A, device 600 initiates a process for requesting help from a recovery contact. While displaying recovery contact help interface 686A, device 600 detects selection of help affordance 690A. The selection is a tap gesture 692A on help affordance 690A. As shown in FIG. 6AC, in response to detecting tap gesture 692A, device 600 displays device type interface 694A.

Device type interface 694 includes candidate device types 696, including candidate device type 696Aa and candidate device type 696Ab. Candidate device type 689Aa is selected to access instructions for generating a recovery code on a phone type or tablet type device of the recovery contact. Candidate device type 689Ab is selected to access instructions for generating a recovery code on a computer type device of the recovery contact.

While displaying device type interface 694A, device 600 detects selection of candidate device type 696Aa. The selection is a tap gesture 698A on candidate device type 696Aa. As shown in FIG. 6AC, in response to detecting tap gesture 698A, device 600 displays instructions interface 600B.

Instructions interface 600B includes instructions 602B and continue affordance 604B. Instructions 602B include instructions for generating a passcode on a device of a recovery contact. In response to selection of continue affordance 604B, device 600 initiates a password change process and displays a recovery code interface, such as recovery code interface 622B, as described below with respect to FIG. 6AH.

FIGS. 6AE-6AG illustrate a process for providing a recovery code. In FIG. 6AE, device 600A, a smart phone associated with Sarah Jones (e.g., a recovery contact for Jane Appleseed, the user of device 600 shown in FIG. 6AD), displays account recovery interface 628A including contact affordance 630A. In some embodiments, the user of device 600A navigated to user interface 628A after being contacted by Jane Appleseed and being provided the instructions shown in FIG. 6AD. In response to selection of contact affordance 630A, device 600 displays a recovery management interface for the user account associated with contact affordance 630A (e.g., Jane Appleseed). While displaying account recovery interface 628A, device 600 detects selection of contact affordance 630A. The selection is a tap gesture 608B on contact affordance 630A. As shown in FIG. 6AF, in response to detecting tap gesture 608B, device 600A displays recovery management interface 610B.

In FIG. 6AF, recovery management interface 610B includes code affordance 612B and remove affordance 614B. In response to selection of remove affordance 614B, device 600A removes Sarah Jones as a recovery contact for the user account for Jane Appleseed. In response to selection of help affordance 612B, device 600A generates a recovery code that can be used to access the user account for Jane Appleseed. While displaying help interface 610B, device 600A detects selection of help affordance 612B. The selection is a tap gesture 616B on the help affordance 612B. As shown in FIG. 6AG, in response to detecting tap gesture 616B, device 600A displays code generation interface 618B including recovery code 620B.

Once a recovery code has been provided using the device of a recovery contact (e.g., device 600A), the recovery code can in turn be provided (e.g., entered) in a recovery code interface displayed on the device performing the recovery process (e.g., device 600), such as the recovery code interface 622B of FIG. 6AH, to provide access to the user account.

In FIG. 6AH, device 600, associated with Jane Appleseed, displays recovery code interface 622B including a recovery code field 624B and a continue affordance 626B. Recovery code field 624B is used for entry of the recovery code provided by device 600A of recovery contact Sarah Jones. In some embodiments, device 600A does not directly provide the recovery code to device 600; rather, the user of device 600A (e.g., Sarah Jones) communicates (e.g., by phone, in person) the code to the user of device 600. In response to selection of continue affordance 626B, device 600 submits the recovery code. While displaying recovery code interface 622B, device 600 detects selection of continue affordance 626B. The selection is a tap gesture 628B on continue affordance 626B. In response to detecting tap gesture 628B, device 600 determines whether the recovery code is valid for the user account. In some embodiments, device 600 validates the recovery code using a remote authentication service. In some embodiments, device 600 validates the recovery code locally.

If the recovery code is determined to be valid, device 600 initiates a password change process including displaying password generation interface 630B (FIG. 6AI), allowing a user to change a password for the user account. In some embodiments, if the recovery code cannot be validated, the password generation interface 630B is not displayed.

Password generation interface 630B includes new password field 632B, password verification field 634B, and continue affordance 636B. Password field 632B and password verification field 634B can be used for entry of a new password for the user account. Thereafter, device 600 submits the new password in response to selection of continue affordance 636B. While displaying password generation interface 630B, device 600 detects selection of continue affordance 636B. The selection is a tap gesture 638B on continue affordance 636B. As shown in FIG. 6AJ, in response to detecting tap gesture 638, device 600 displays confirmation interface 640B indicating that the password for the user account has been successfully changed.

FIG. 7 is a flow diagram illustrating a method recovering account access using a computer system in accordance with some embodiments. Method 700 is performed at a computer system (e.g., 100, 300, 500, 600) (e.g., a smartphone, a tablet, a computer) that is in communication with a display generation component (e.g., a television, a display controller, an internal or external touch-sensitive display system) and one or more input devices (e.g., a touch-sensitive surface, a mouse, a keyboard). Some operations in method 700 are, optionally, combined, the orders of some operations are, optionally, changed, and some operations are, optionally, omitted.

As described below, method 700 provides an intuitive way for recovering account access. The method reduces the cognitive burden on a user for recovering account access, thereby creating a more efficient human-machine interface. For battery-operated computing devices, enabling a user to recover account access faster and more efficiently conserves power and increases the time between battery charges.

The computer system (e.g., 600) performs (702) a recovery contact set up process including providing a notification (e.g., 654, 692) to a contact. In some embodiments, the recovery contact set up process is a process by which a user of a device selects a contact as a recovery contact, which can assist in restoring account access for the user. In some embodiments, the contact is another user of a same device ecosystem (e.g., same device type, same device manufacturer, etc.). In some embodiments, the contact is selected from known contacts (e.g., 638a-c, 672a-c) of a device of the user (e.g., a contactable user a device associated with the contactable user). In some embodiments, the notification is a notification of a first type indicating that the contact has been added as a recovery contact. In some embodiments, the notification is a notification of a second type indicating that a user would like to add the contact as a recovery contact and further includes a request that, when accepted by the contact, allows for the contact to be added as a recovery contact. In some embodiments, if the contact is a trusted contact (e.g., family member), the notification is a notification of the first type. In some embodiments, if the contact is not a trusted contact, the notification is a notification of the second type. In some embodiments, the notification is provided using a messaging application (e.g., first-party messaging application).

After performing the recovery contact set up process, the computer system receives (704), via the one or more input devices, a request (e.g., 692A, 604B) to initiate an account recovery process via the contact. In some embodiments, the request is received during an account authentication process (e.g., any process where user identity must be confirmed, such as a process to change password). In some embodiments, the request includes a set of user inputs (644A, 650A, 658A, 668A, 676A, 684A, 692A, 604B) (e.g., one or more user inputs) that navigate through a set of recovery interfaces. In some embodiments, the request includes a selection of a help affordance (e.g., "Ask for help"), which when selected, causes display of instructions for generating recovery credentials on the recovery contact's device. In some embodiments, prior to displaying the instructions, the computer system prompts the user to select a type of the recovery contact's device and the displays instructions corresponding to the selected type of the recovery contact's device.

In response to the request to initiate the account recovery process via the contact and without providing a request without transmitting a request, without communicating with the recovery contact) to the contact, the computer system displays (706), via the display generation component, a recovery code interface (e.g., 622B) (e.g., an interface including one or more fields for receiving credentials, such as a passcode) for receiving a set of recovery credentials (e.g., 624B) (e.g., passcode generated at recovery contact's device). In some embodiments, the set of recovery credentials can only be used to perform the recovery credentials from the recovery contact interface (e.g., the recovery contact credentials are different than the user's normal authentication information (e.g., the user's normal password).

While displaying of the recovery code interface, the computer system receives (708) the set of recovery credentials.

In accordance with a determination that the recovery credentials are valid (in some embodiments, and in response to receiving the set of recovery credentials) (e.g., the passcode is valid), the computer system performs (710) a recovery function (e.g., as shown in FIG. 6AI) (e.g., initiating a password change process). In some embodiments, the computer system displays a user interface by which the user can enter a new password for his or her account. In some embodiments, once a user has provided a valid password entry, the computer system confirms that the user's password has been changed).

In accordance with a determination that the recovery credentials are not valid (in some embodiments, and in response to receiving the set of recovery credentials), the computer system forgoes (712) performing the recovery function. Providing a user with access to account using a recovery contact provides an additional manner in which a user can quickly and efficiently recover access if the user is otherwise unable to authenticate their identity, which reduces the number of inputs needed to perform an operation.

In some embodiments, the computer system is associated with a user. In some embodiments, performing the recovery contact set up process includes authenticating (e.g., as shown in 6E), via the one or more input devices, the user. In some embodiments, during a recovery contact set up process, the computer system authenticates (e.g., biometrically authenticates) a user to ensure that only authorized users add recovery contacts for a user account.

In some embodiments, performing the recovery contact set up process includes receiving a first user input (e.g., 644, 676) corresponding to the contact (e.g., 638a, 672a) (e.g., an input on an affordance corresponding to the contact). In some embodiments, performing the recovery contact set up process includes, in response to receiving the first user input and in accordance with a determination that the contact is a contact of a first type (e.g., a trusted contact; a contact that has been identified as a family member of a user of the computer system; a contact that has been designated as an emergency contact), adding (e.g., automatically adding) the contact as a recovery contact. In some embodiments, providing the notification to the contact occurs in response to receiving the first user input. In some embodiments, the computer system displays an interface from which a user can select a recovery contact from a list of contacts (e.g., recovery contact selection interface, contact interface). In some embodiments, the interface is displayed in response to a set of inputs, for instance, used to navigate a settings menu. In some embodiments, the interface includes only contacts of the first type. In some embodiments, the interface includes contacts of the first type and the second type. In some embodiments, only a subset of contacts of the second type are eligible to be selected as a recovery contact. In some embodiments, contacts of the second type are selectively highlighted based on whether they are eligible to be selected as a recovery contact (e.g., ineligible contacts are greyed out). In some embodiments, the notification is a notification (e.g., provided via a messaging application) indicating that the contact has been added as a recovery contact. In some embodiments, contacts are automatically added as recovery contacts during the recovery contact set up process if the contact is a trusted contact of a user. Adding trusted contacts as recovery contacts without requiring approval by the recovery contact allows a user to quickly and efficiently add trustworthy recovery contacts for their account, which reduces the number of inputs needed to perform an operation.

In some embodiments, providing the notification to the contact includes, in response to the first user input and in accordance with a determination that the contact is not a contact of the first type (in some embodiments, in accordance with a determination that the contact is a contact of a second type that is different from the first type), providing a request (e.g., 692) to the contact to add the contact as a recovery contact, without adding the contact as a recovery contact in response to (e.g., automatically in response to) the first user input. In some embodiments, the notification is a notification (e.g., provided via a messaging application) requesting that the contact be added as a recovery contact. In some embodiments, contacts are not automatically added as recovery contacts during the recovery contact set up process if the contact is not a trusted contact of a user, but rather the contact must authorize being added as a contact via the request.

In some embodiments, after providing the request to the contact to add the contact as a recovery contact, the computer system receives, from the contact, an approval (e.g., 614A) of the request to add the contact as a recovery contact. In some embodiments, after a user has requested for a contact to be a recovery contact, the contact accepts the request, authorizing that the user add the contact as a recovery contact. In some embodiments, the computer system displays a notification indicating that the request has been authorized). In some embodiments, in response to receiving the approval, the computer system adds the contact as a recovery contact.

In some embodiments, performing the recovery contact set up process includes initiating the recovery contact set up process. In some embodiments, after initiating the recovery contact set up process (e.g., during the process or after completion of the process), the computer system displays a recovery settings interface (e.g., 628A). In some embodiments, the recovery setting interface includes a first recovery contact graphical object (e.g., 630A) (e.g., a user-interactive graphical object) that corresponds to a first recovery contact that is authorized to receive the set of recovery credentials for use in the recovery function. In some embodiments, the recovery setting interface includes a first recovery contactee graphical object (e.g., 629A) (e.g., a user-interactive graphical object) that indicates a second contact that a user of the computer system is authorized to assist with (e.g., by providing a second set of recovery credentials for) a second recovery function (e.g., an indication of a contact for which the user is a recovery contact). Displaying an interface with both a recovery contact affordance and a custodian affordance provides the user with visual feedback regarding whether the user has selected recovery contacts and/or is a recovery contact for another user, which provides improved visual feedback.

In some embodiments, prior to displaying the recovery code interface, the computer system displays, via the display generation component, an authentication interface (e.g., 670A, 678A) that includes a set of one or more user-interactive graphical user interface objects (e.g., 672A, 680A) (e.g., passcode entry affordances) for authenticating a user of the computer system. In some embodiments, the computer system receives a first set of one or more user inputs that includes a second user input (e.g., an input that corresponds to a "forgot passcode" affordance) that is received while displaying the authentication interface. In some embodiments, in response to the second user input, a help user interface is displayed. In some embodiments, the help user interface includes an "ask for help" affordance and the first set of user inputs includes a third user input corresponding to the "ask for help" affordance and the recovery code interface is displayed in response to the third user input. In some embodiments, in response to receiving the first set of one or more user inputs, the computer system ceases to display the authentication interface, without authenticating a user of the computer system. In some embodiments, the first set of one or more user inputs is the request to initiate the account recovery process (e.g., the recovery code interface is displayed in response to the first set of one or more user inputs).

In some embodiments, the authentication interface (e.g., 678A) includes a forgot passcode user-interactive graphical user interface object (e.g., 682A) that, when selected, causes the authentication interface to cease being displayed without authenticating a user of the computer system. In some embodiments, the second user input (e.g., 684A) corresponds to the forgot passcode user-interactive graphical user interface object.

In some embodiments, the first set of one or more user inputs includes a third user input (e.g., 692A). In some embodiments, in response to the third user input, the computer system displays a help user interface (e.g., 686A) that includes an ask for help user-interactive graphical user interface object (e.g., 690A). In some embodiments, the third user input corresponds to the ask for help user-interactive graphical user interface object. In some embodiments, the recovery code interface is displayed in response to the third user input. In some embodiments, the recovery code interface is displayed in response to a subsequent input, received after the third user input, of the first set of one or more user inputs.

In some embodiments, the first set of one or more user inputs includes a fourth user input (e.g., 698A). In some embodiments, after ceasing to display the authentication interface, without authenticating a user of the computer system, the computer system displays a plurality of device user-interactive graphical user interface objects (e.g., 696Aa, 696Ab) that corresponds to external electronic devices (e.g., smart phones, personal computers, tablet computers) associated with the contact. In some embodiments, the fourth user input corresponds to a first device user-interactive graphical user interface object (e.g., 696Aa) of the plurality of device user-interactive graphical user interface objects that corresponds to a first external electronic device associated with the contact.

In some embodiments, in response to the fourth user input, the computer system displays, in accordance with a determination that the first external electronic device is a device of a first type (e.g., a smart phone), a first set of instructions (e.g., 602B) for providing (e.g., generating) the set of recovery credentials on the first external electronic device. In some embodiments, in response to selection of the first device type affordance, the computer system displays a set of instructions for providing a set of recovery credentials (e.g., recovery code) on devices of the first type. In some embodiments, devices of the first type include phones, tablets, or other small factor devices.

In some embodiments, in response to the fourth user input, the computer system displays, in accordance with a determination that the first external electronic device is a device of a second type (e.g., a personal computer), a second set of instructions (e.g., instructions that would be displayed after selecting 696Ab), different from the first set of instructions, for providing (e.g., generating) the set of recovery credentials on the first external electronic device. In some embodiments, in response to selection of the first device type affordance, the computer system displays a set of instructions for providing a set of recovery credentials on devices of the second type. In some embodiments, devices of the first type include personal computers, laptops, or other large factor devices. Displaying instructions that may be used to select a particular device type and subsequently access instructions relevant to that device type allows a user to quickly and efficiently access instructions for generating a recovery code on a device of a recovery contact, which reduces the number of inputs needed to perform an operation.

In some embodiments, the account recovery process is performed for a user account (e.g., as shown in 6AI). In some embodiments, performing the recovery function includes initiating a password change process for the user account. In some embodiments, once the computer system has validated the set of recovery credentials, the computer system performs a recovery function, such as initiating a password change process. In some embodiments, the computer system displays a user interface by which the user can enter a new password for their account. In some embodiments, once a user has provided a valid password, the computer system confirms that the user's password has been changed.

In some embodiments, the computer system (e.g., 600, 600A) receives, from a first external computer system (e.g., 600, 600A), a request (e.g., 692) for the user of the computer system to be added as a recovery contact for the first external computer system. In some embodiments, the request is provided by the first computer system to the second computer system via a messaging application. In some embodiments, in response to selection of the request (e.g., in the messaging application), the second computer system displays an invite interface (e.g., 608A) including an accept affordance (e.g., 612A), which when selected, causes the second computer system to approve (e.g., accept) the request to add the user as a recovery contact. In some embodiments, the interface further includes a decline affordance, which when selected, causes the second computer system to reject the request to add the user as a recovery contact.

In some embodiments, in response to receiving the request for the user of the computer system to be added as a recovery contact for the first external computer system, the computer system displays (e.g., in an interface of a messaging application; as part of a text message) an acceptance user-interactive graphical user interface object (e.g., 612A). In some embodiments, the computer system receives a user input corresponding to the acceptance user-interactive graphical user interface object. In some embodiments, in response to receiving the user input (e.g., 614A) corresponding to the acceptance user-interactive graphical user interface object, the computer system transmits, to the first external computer system, an indication that the request was accepted (e.g., an indication that the user of the computer system accepted being a recovery contact for the first external computer system (e.g., for an account associated with the first external computer system.

In some embodiments, after transmitting, to the first external computer system, the indication that the request was accepted, the computer system receives a second set of one or more user inputs (e.g., 616B). In some embodiments, in response to receiving the second set of one or more user inputs, providing (e.g., generating, displaying) a second set of recovery credentials (e.g., 620B) that, when entered at the first external computer system, enables a second recovery function (e.g., a recovery function for an account associated with the first external computer system).

Note that details of the processes described above with respect to method 700 (e.g., FIG. 7) are also applicable in an analogous manner to the methods described below. For example, method 900 optionally includes one or more of the characteristics of the various methods described above with reference to method 700. For example, an authentication provided to access an account, as described in method 900, could be a code provided by a recovery contact, as described in method 700. For brevity, these details are not repeated below.

FIGS. 8A-8AS illustrate exemplary user interfaces for obtaining account access, in accordance with some embodiments. The user interfaces in these figures are used to illustrate the processes described below, including the processes in FIG. 9.

Generally, techniques for obtaining account access described below enable a user associated with a user account to select a contact as a beneficiary of the user account. Thereafter, should a status of the user change (e.g., the user becomes incapacitated, deceased), the contact, as a beneficiary, can access the user account and/or data associated with the user account.

FIGS. 8A-8R illustrate techniques for adding a contact as a beneficiary (e.g., trustee) for a user account. In FIG. 8A, device 600 displays, on display 602, security interface 804 associated with a user account for a user Jane Appleseed. In some embodiments, security interface 804 is displayed in response to selection of a security affordance of an account interface, such as the security affordance 606 of account interface 604 (FIG. 6A). Security interface 804 includes various affordances for managing access to a user account and/or data associated with the user account, including account beneficiary affordance 806. In some embodiments, in response to selection of account beneficiary affordance 806, device 600 displays an account beneficiary interface. While displaying security interface 804, device 600 detects selection of the account beneficiary affordance 806. The selection is a tap gesture 808 on the account beneficiary affordance 806. As shown in FIG. 8B, in response to detecting tap gesture 808, device 600 displays account beneficiary interface 810.

Account beneficiary interface 810 includes add beneficiary affordance 812. In response to selection of add beneficiary affordance 812, device 600 displays an initialization interface. While displaying account beneficiary interface 810, device 600 detects selection of add beneficiary affordance 812. The selection is a tap gesture 814 on add beneficiary affordance 812. As shown in FIG. 8C, in response to detecting tap gesture 814, device 600 displays initialization interface 816.

Initialization interface 816 includes information 818 and initialization affordance 820. Information 818 includes information describing various aspects of selecting a contact as a beneficiary. In response to selection of initialization affordance 820, device 600 initiates a process for selecting a beneficiary for (e.g., adding a beneficiary to) the user account. While displaying initialization interface 820, device 600 detects selection of the initialization affordance 820. The selection is a tap gesture 822 on the initialization affordance 820.

In response to detecting tap gesture 822, device 600 initiates biometric authentication, as shown in FIG. 8D. Initiating biometric authentication includes obtaining (e.g., capturing with one or more biometric sensors of the device 600) data corresponding to at least a portion of the biometric feature. In FIG. 8D, while performing biometric authentication, device 600 displays biometric authentication interface 824, which may be overlaid on at least a portion of the initialization interface 816. Biometric authentication interface 824 includes a biometric authentication glyph, such as biometric authentication glyph 826, to indicate a status of the biometric authentication (e.g., biometric authentication glyph 826 indicates successful biometric authentication).

Figure 8E:
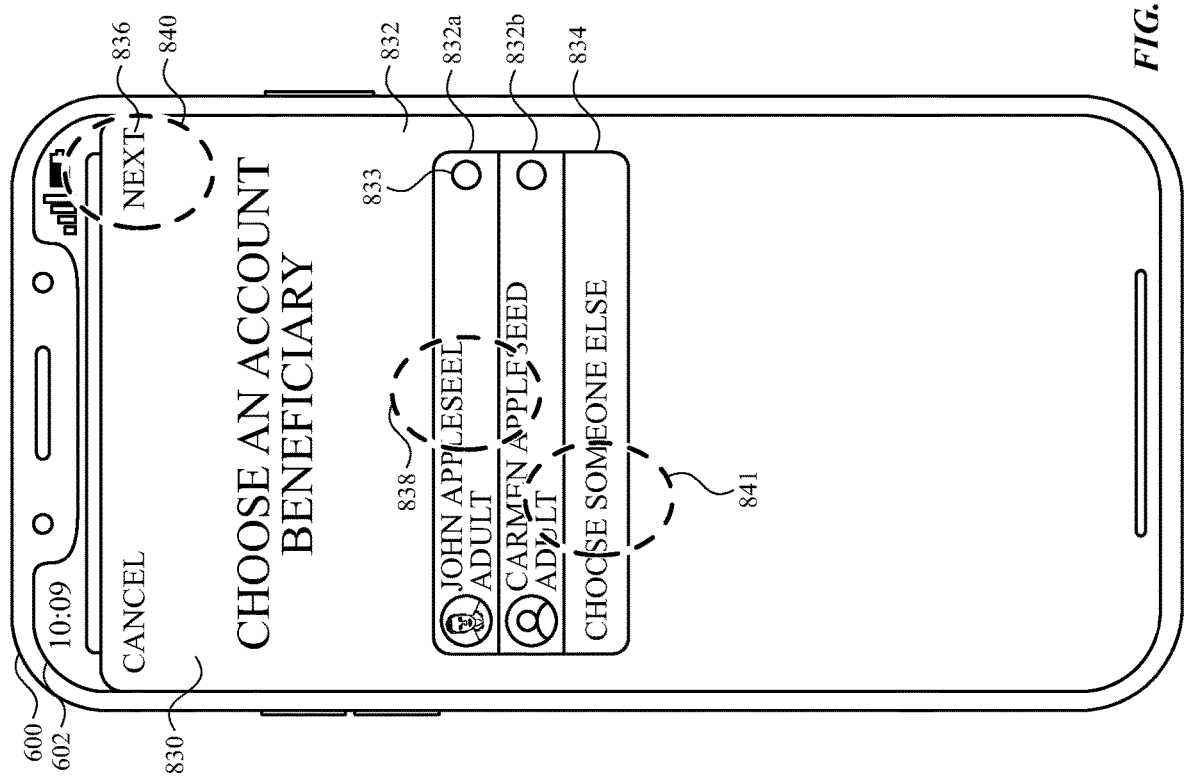
Figure 8H:
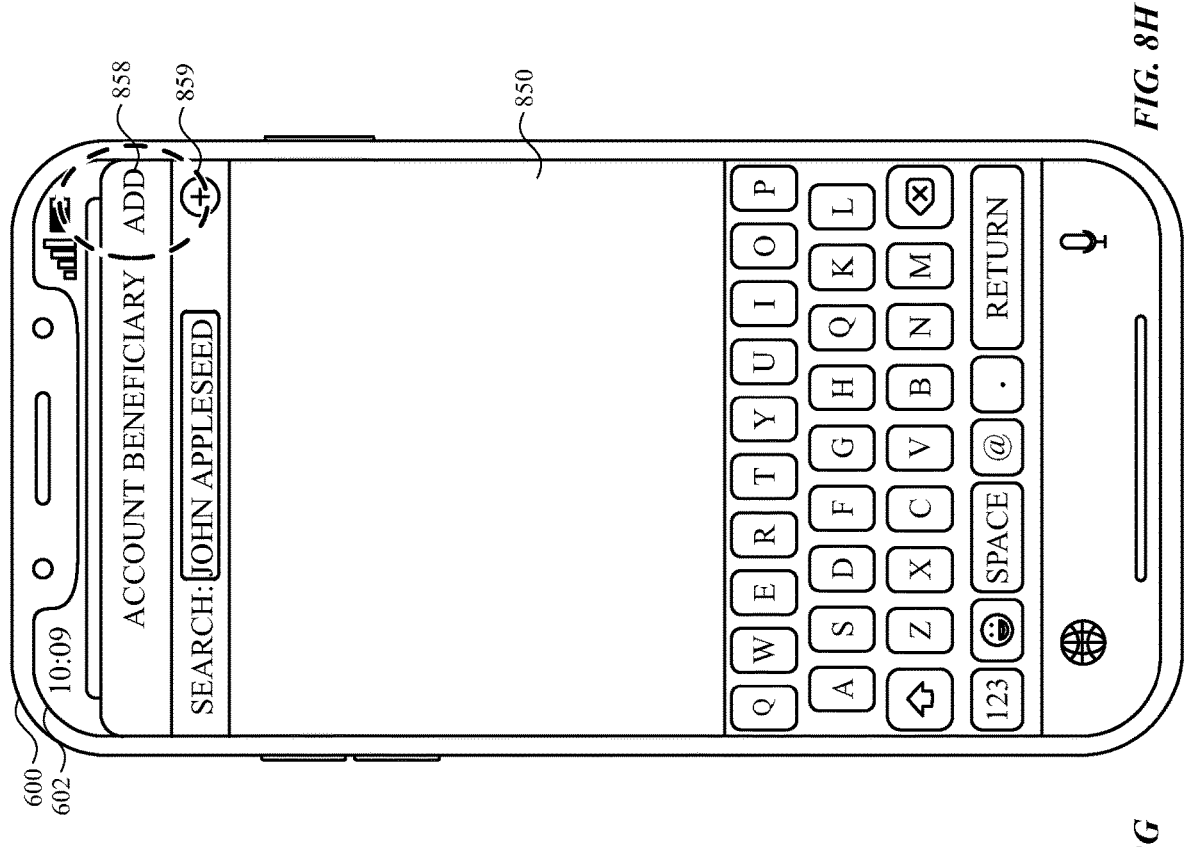

In response to successful biometric authentication, device 600 displays beneficiary selection interface 830, as shown in FIG. 8E. Beneficiary selection interface 830 includes candidate contacts 832 (e.g., candidate contacts 832a, 832b), selection affordance 834, and continue affordance 836. In some embodiments, if authentication is not successful, device 600 does not display beneficiary selection interface 830 and/or requests alternative authentication.

Generally, beneficiary selection interface 830 can be used to select a beneficiary for the user account. A beneficiary can be selected by selecting a candidate contact 832 of beneficiary selection interface 830. Candidate contacts are a set of contacts of the user determined to be trusted contacts (e.g., contacts designated as family (e.g., immediate family), contacts satisfying an age requirement (e.g., 18 years), and/or contacts sharing a home ecosystem with the user). In some embodiments, candidate contacts 832 include all trusted contacts of device 600. In other embodiments, candidate contacts 832 include a subset of trusted contacts of device 600.

While displaying recovery contact selection interface 830, device 600 detects a selection of a candidate contact 832a (e.g., tap input 644) associated with a contact John Appleseed. In some embodiments, in response to selection of candidate contact 832a, device 600 modifies display of selection indicator 833 to indicate that the user has selected John Appleseed.

After detecting selection of candidate contact 832a, device 600 detects a selection of continue affordance 836. In response to selection of continue affordance 836, device 600 displays a confirmation interface. While displaying beneficiary selection interface 830, device 600 detects selection of continue affordance 836. The selection is a tap gesture 840 on continue affordance 836. As shown in FIG. 8F, in response to detecting tap gesture 840, device 600 displays the confirmation interface 842, which can be used to confirm selection of a beneficiary, as described below.

Figure 8G:
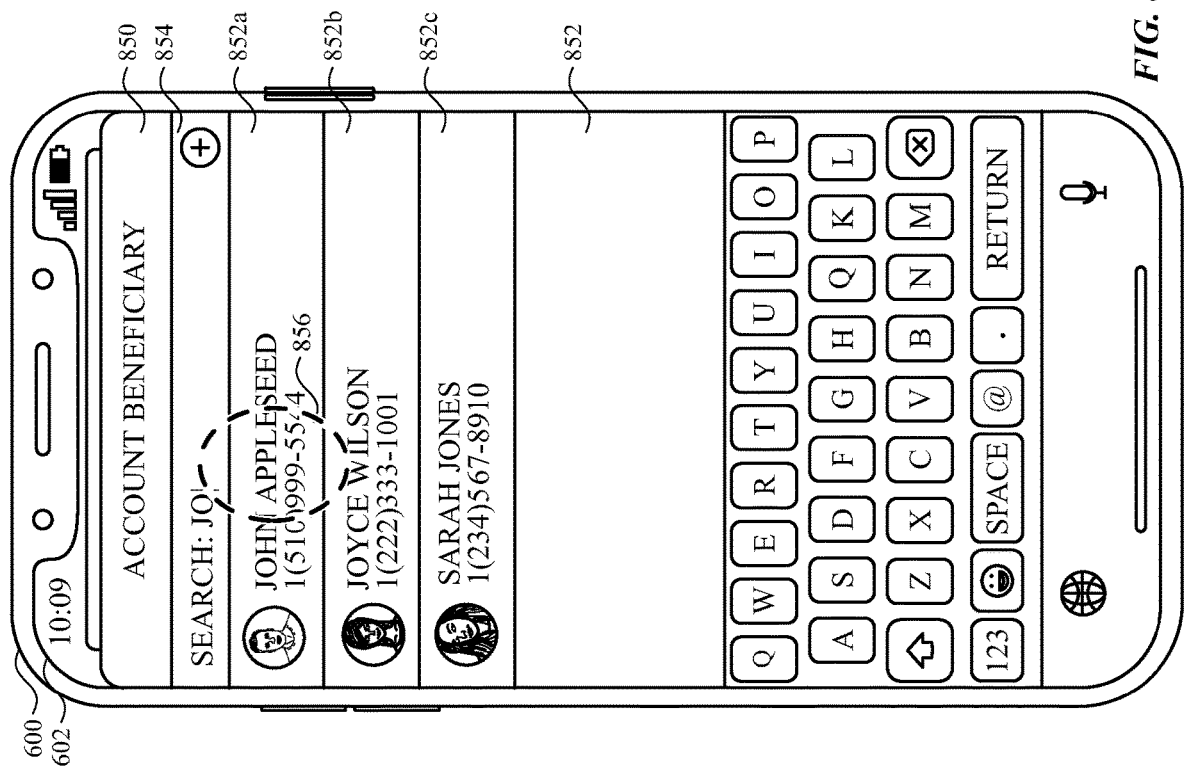

A contact can also be selected as a beneficiary using a selection affordance, such as selection affordance 834 of FIG. 8E. While displaying beneficiary selection interface 830, device 600 detects selection of selection affordance 834. The selection is a tap gesture 841 on selection affordance 834. As shown in FIG. 8G, in response to detecting tap gesture 841, device 600 displays contact interface 850.

Contact interface 850 includes contacts 852 and search field 854. Search field 854 can be used to search contacts of the user account on device 600. As shown, search field 854 includes a search string "jo", and a result, contacts of the user account, contacts 854a-c that include the search string "jo", are displayed. In some embodiments, contact interface 850 is initially displayed with search field 854 unpopulated.

While displaying contact interface 850, device 600 detects selection of contact 852a associated with contact John Appleseed. The selection is a tap gesture 856 on contact 852a. As shown in FIG. 8H, in response to detecting tap gesture 856, device 600 displays the name John Appleseed in search field 854. Further in response to selection of contact 852a, device 600 removes display of other contacts 852 and displays add affordance 858.

While displaying contact interface 850, device 600 detects selection of add affordance 858. The selection is a tap gesture 859 on add affordance 858. In response to detecting tap gesture 859, device 600 displays a confirmation interface, such as confirmation interface 842 (FIG. 8F).

In FIG. 8F, confirmation interface 842 includes information 844 and continue affordance 846. Information 818 includes information describing one or more privileges provided to a contact when selected as a beneficiary. A beneficiary of a user account receives no additional privileges until a status of the user associated with the user account changes. If the user associated with the user account passes away, for instance, the beneficiary for the user account can request access to the user account and, upon approval of the request, access the user account (e.g., as seen in FIGS. 8S-8AS).

In response to selection of continue affordance 846, a selected contact (e.g., John Appleseed) is added (e.g., stored (e.g., on device 600) as a beneficiary for the account of Jane Appleseed. In some embodiments, a selected contact is added as a beneficiary on device 600 if a device of the contact satisfies a set of compatibility criteria for device 600. In some embodiments, the set of compatibility criteria includes a criterion that is met when the device of the contact and device 600 share a same manufacturer, type, model, and/or software package (e.g., operating system). In some embodiments, the set of compatibility criteria includes a criterion that is met when the device of the contact supports one or more particular beneficiary features. In some embodiments, the compatibility criteria include a criterion that is met when an age of a user of the device exceeds a threshold age (e.g., 18 years). In some embodiments, a device of a selected contact does not satisfy the compatibility criteria, the selected contact is not added as a beneficiary on device 600, but still serves as a beneficiary for the user account (e.g., the selected contact can still obtain access to the user account and/or is stored as a beneficiary on another device, such as a server for a beneficiary access service), as described below.

Figure 8I:
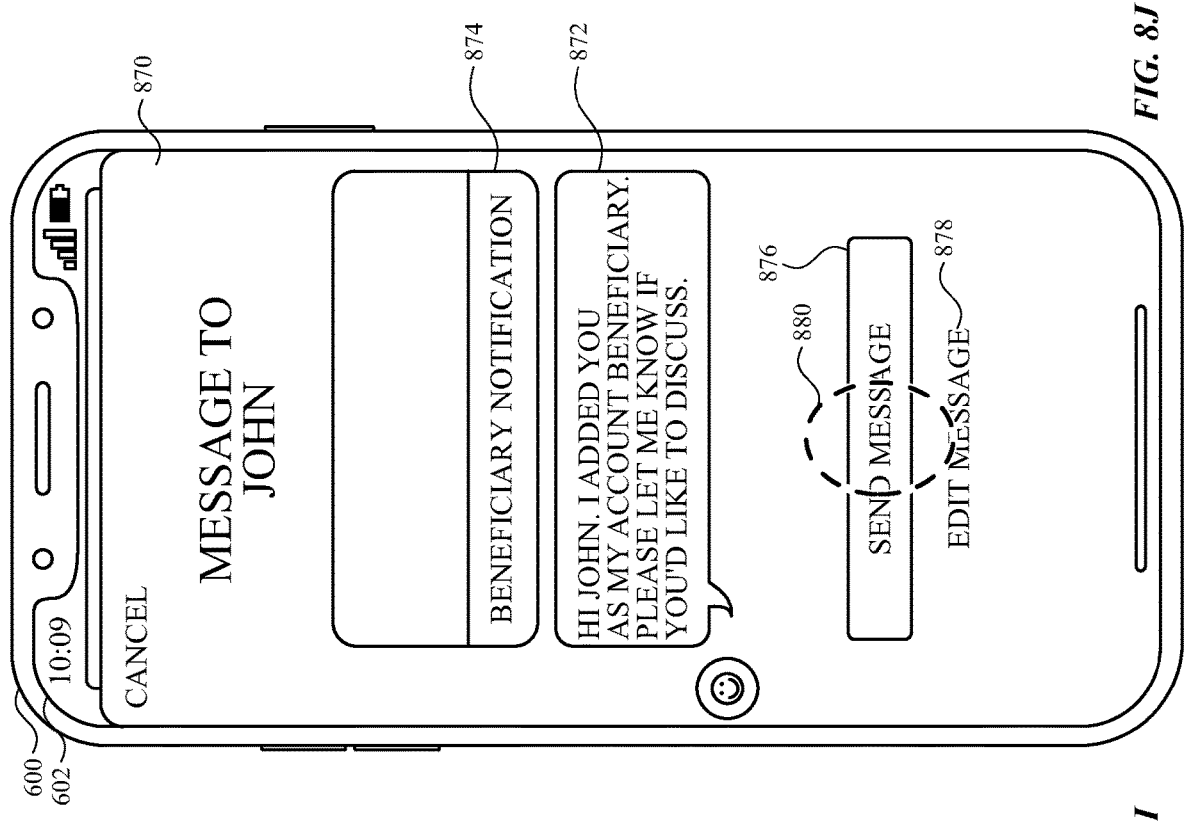
Figure 8J:
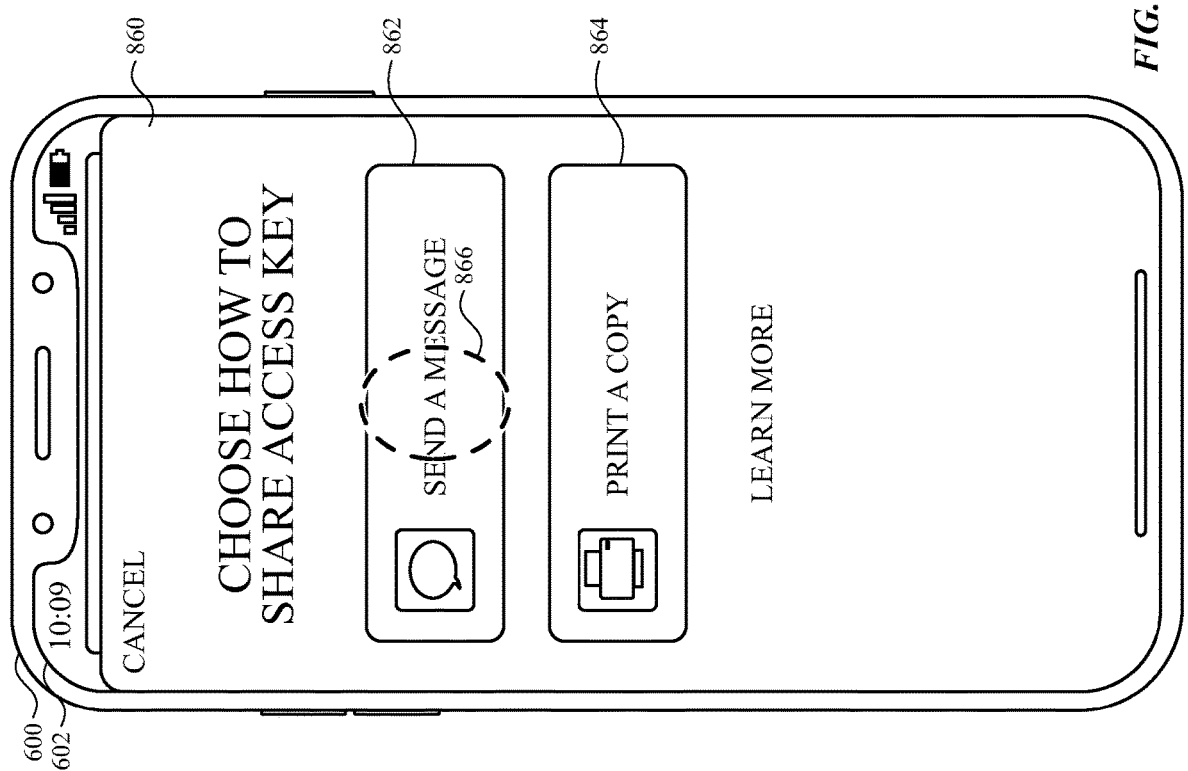
Figure 8L:
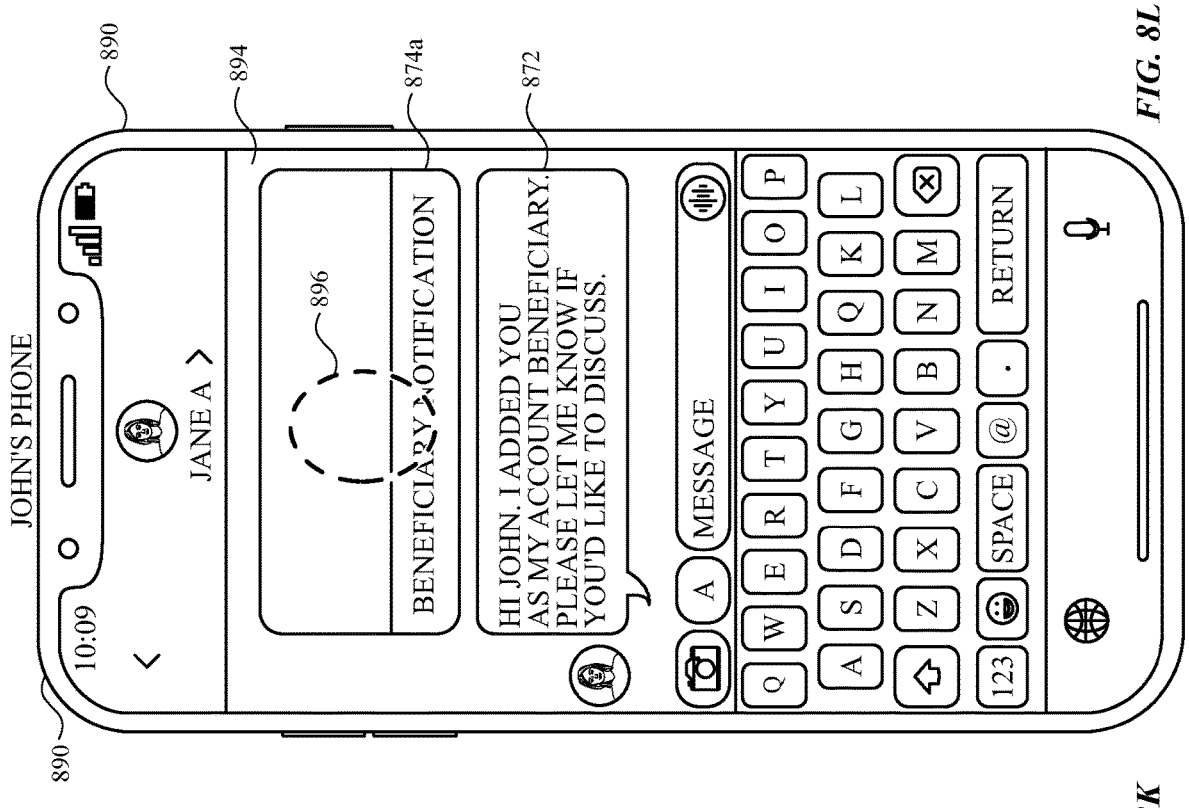

Further in response to selection of continue affordance 846, device 600 displays share interface 860, as shown in FIG. 8I. Share interface 860 is used to select a manner in which an access key for the user account is shared with a beneficiary. Share selection interface 860 includes message affordance 862 and print affordance 864. Message affordance 862 is used to send an access key electronically, for instance, using a messaging application. While displaying share interface 860, device 600 detects selection of message affordance 862. The selection is a tap gesture 866 on message affordance. As shown in FIG. 8J, in response to detecting tap gesture 866, device 600 displays message interface 870.

Message interface 870 includes message 872, notification 874, send affordance 876, and edit affordance 878. Message 872 is a preview of a message notifying John Appleseed that they have been added as a beneficiary for the user account. In response to selection of edit affordance 878, device 600 allows for message 872 to be edited in message interface 870.

Figure 8K:
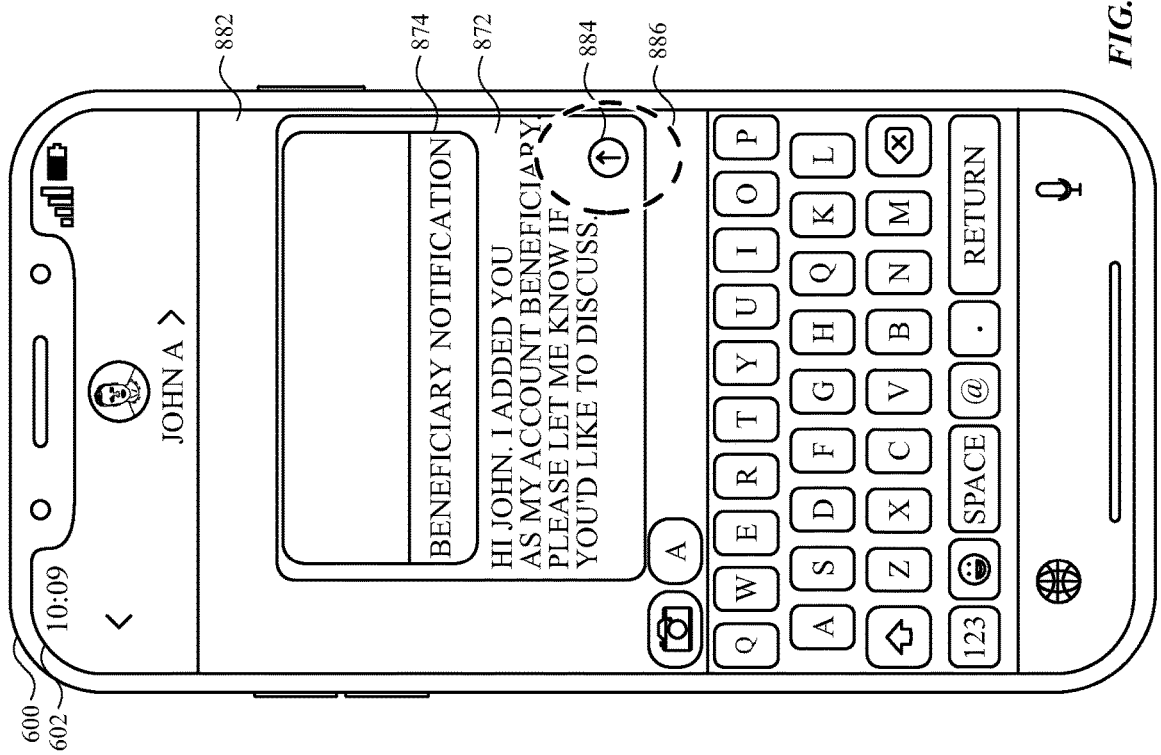

In response to selection of send affordance 876, device 600 opens (e.g., executes) a messaging application, as shown in FIG. 8K. Opening the messaging application in this manner includes displaying a message interface 882 and preloading the messaging application with message 872 and beneficiary notification 874.

Figure 8P:
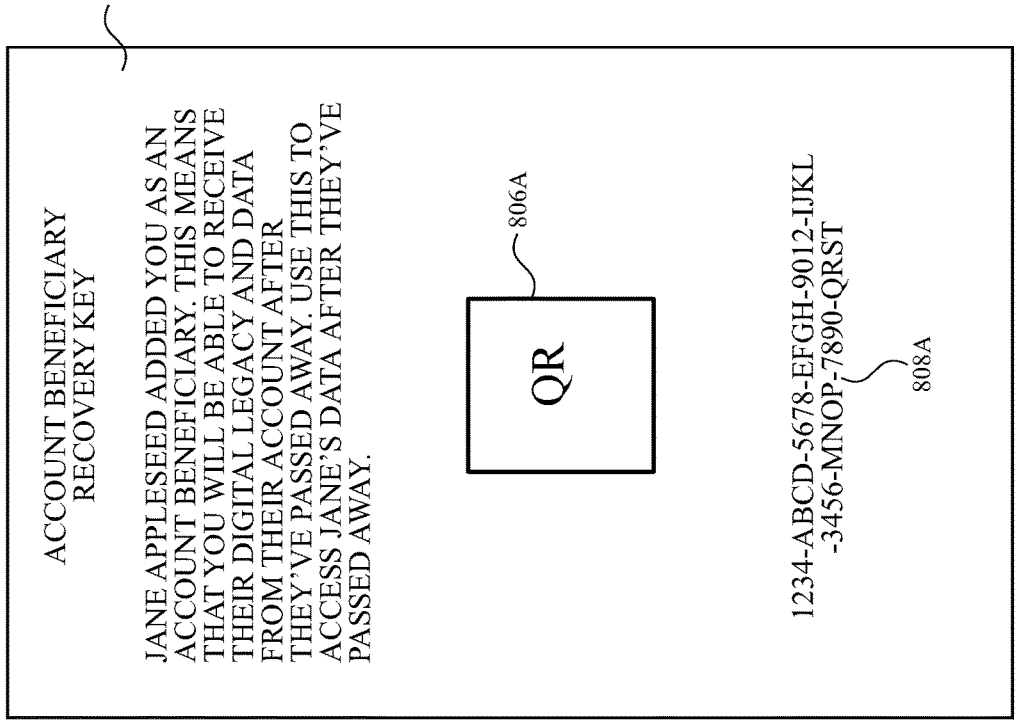

Beneficiary notification 874 includes an access key for accessing the user account as a beneficiary. In some embodiments, the manner in which the access key is provided is based on whether a device of the beneficiary satisfies the set of compatibility criteria. If, for example, a device of a beneficiary satisfies the set of compatibility criteria, device 600 includes (e.g., embeds) the access key in the notification such that receipt of notification causes the access key to be stored (e.g., automatically stored) in a beneficiary key store (recall that a device of the contact can support one or more beneficiary features) of the device of the beneficiary. If a device of a beneficiary does not satisfy the set of compatibility criteria, the device 600 includes a representation of the access key (e.g., an alphanumeric representation, an image) in the notification, such as the representation 804A (FIG. 8P).

While displaying message interface 882, device 600 detects selection of send affordance 884. The selection is a tap gesture 886 on send affordance 884. In response to selection of send affordance 884, device 600 provides (e.g., transmits) message 872 and notification 874 to device 890 (FIG. 8L) associated with John Appleseed.

In FIG. 8L, device 890 displays message 872 and notification 874a in user interface 890 of a messaging application (e.g., in response to receiving message 872 and/or notification 874 from device 600). In some embodiments, device 890 includes one or more features of devices 100, 300, and/or 500. If device 890 satisfies the set of compatibility criteria, device 890 automatically stores an access key included in notification 874a, for instance, in response to receipt of the notification 874a. If device 890 does not satisfy the set of compatibility criteria, device 892 does not automatically store the access key included in notification 874.

As shown in FIG. 8M, in response to selection of the beneficiary notification 874a (e.g., input 892), device 890 displays beneficiary interface 894 indicating that the contact has been added as a beneficiary for the user account of Jane Appleseed.

Figure 8O:
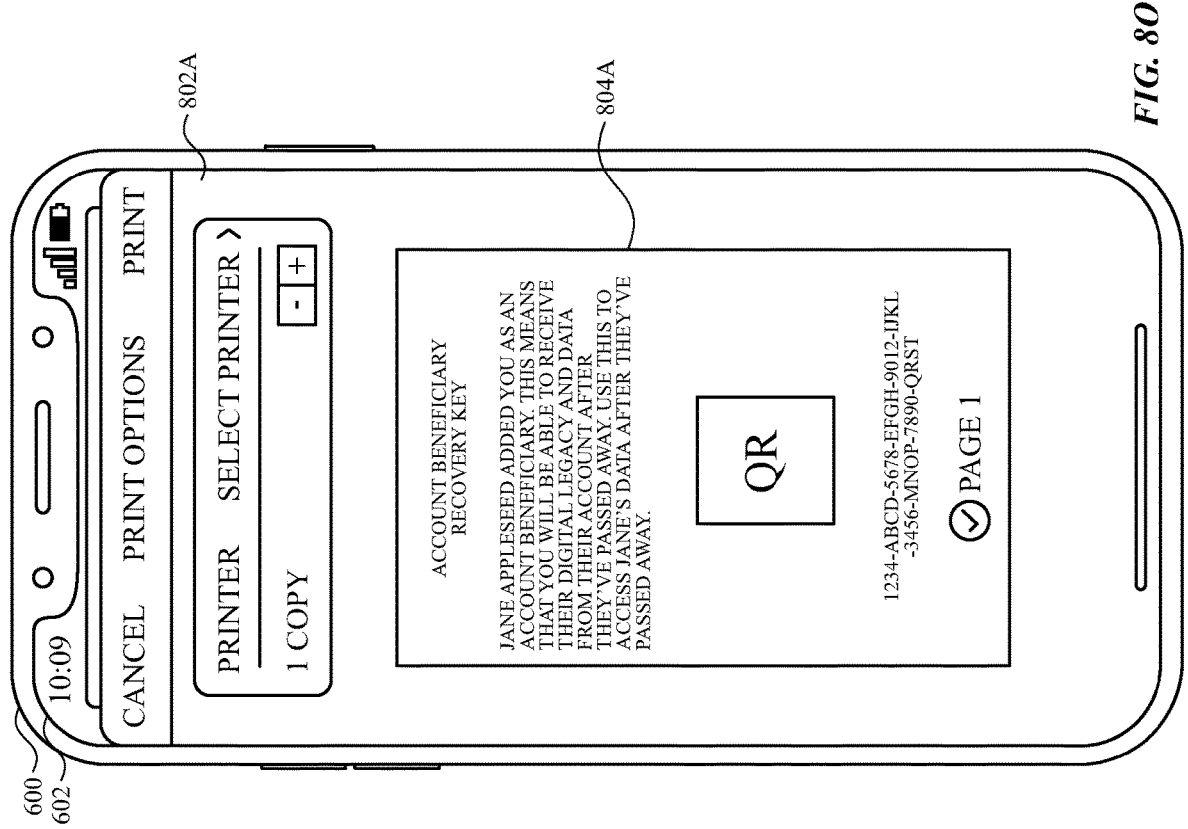

As shown in FIG. 8N, a print affordance of share selection interface 860, displayed on device 600 associated with Jane Appleseed, can be used to provide an access key to a beneficiary manually. While displaying share selection interface 860, device 600 detects selection of print affordance 864. The selection is a tap gesture 800A on print affordance 864. As shown in FIG. 8O, in response to detecting tap gesture 800A, device 600 displays print interface 802A.

Print interface 802A includes representation 804A, which is a representation of an access key. As shown in FIG. 8P, representation 804A includes QR (quick response) code 806A and alphanumeric code 808A, each of which can be used as the access key. Print interface 802A can be used to print a copy of the representation 804A; the printed copy can then be provided to a beneficiary offline, allowing for subsequent access to the user account.

Once an access key has been provided (e.g., electronically or manually), device 600 displays completion interface 810A in FIG. 8Q. Completion interface 810A includes completion affordance 812A. In response to selection of completion affordance 812A (e.g., input 814A), device 600 terminates the account beneficiary selection process and displays an account beneficiary interface 810, as shown in FIG. 8R. Because John Appleseed was successfully added as a beneficiary, account beneficiary interface 810 includes affordance 816A associated with John Appleseed.

FIGS. 8S-8AG illustrate processes to access a user account as a beneficiary. FIGS. 8S-8Y illustrate a process to access a user account using device 890 that satisfies a set of compatibility criteria of device 600.

In FIG. 8S, device 890 displays account beneficiary interface 820A associated with user John Appleseed, the user of device 890. Beneficiary interface 820A includes add beneficiary affordance 822A and user account affordance 824A. As described, in response to selection of add beneficiary affordance 822A, device 890 displays an initialization interface (e.g., FIG. 8C), which is used to initialize a process for adding a beneficiary, as described above.

Figure 8T:
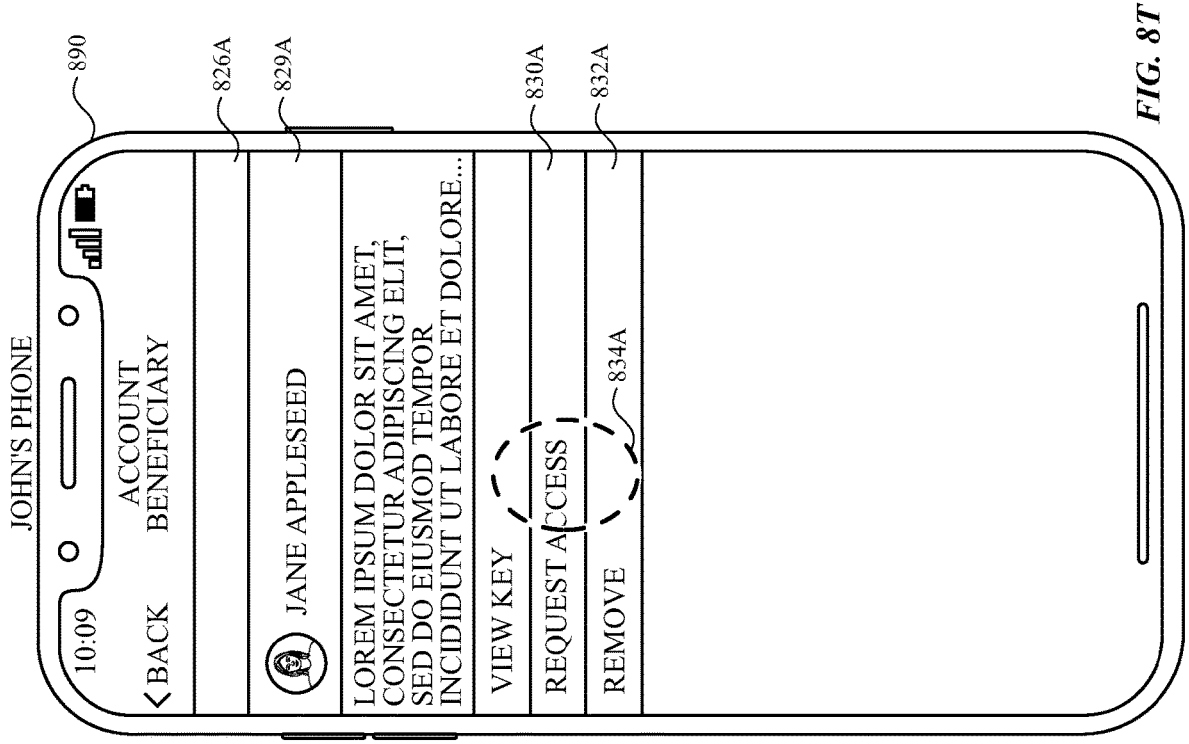
Figure 8S:
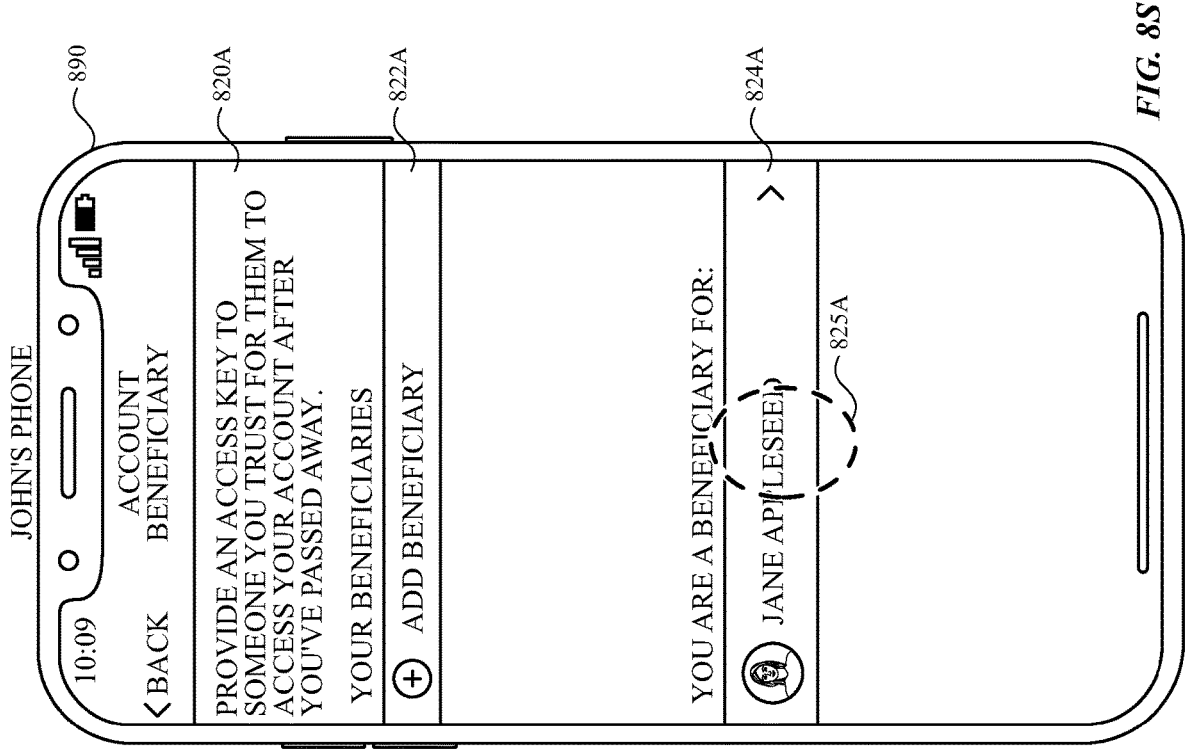

In FIG. 8S, user account affordance 824A corresponds to the user account for Jane Appleseed for which John Appleseed is a beneficiary. In response to selection of user account affordance 824A, device 890 displays a beneficiary management interface. While displaying account beneficiary interface 820A, device 600 detects selection of the user account affordance 824A. The selection is a tap gesture 825A on user account affordance 824A. As shown in FIG. 8T, in response to detecting tap gesture 825A, device 890 displays beneficiary management interface 826A associated with the user account for Jane Appleseed.

Beneficiary management interface 826A includes request access affordance 830A and remove affordance 832A. Remove affordance 832A, when selected, causes device 890 to remove John Appleseed as the beneficiary of the user account for Jane Appleseed. The request access affordance 830A is used to initiate a process to access the user account for Jane Appleseed. While displaying beneficiary management interface 826A, device 890 detects selection of request access affordance 830A. The selection is a tap gesture 834A on the request access affordance 830A. As shown in FIG. 8U, in response to detecting tap gesture 834A, device 890 displays request access interface 836A.

Request access interface 836A includes information 838A and continue affordance 840A. Information 838A includes information regarding various aspects of requesting access as a beneficiary. For example, information 838A describes that a request for access must include a document (e.g., death certificate) indicating a status of a user of the user account for which access is being requested (e.g., the user account of Jane Appleseed). While displaying request access interface 836A, device 890 detects selection of the continue affordance 840A. The selection is a tap gesture 842A on the continue affordance 840A. As shown in FIG. 8V, in response to detecting tap gesture 840A, device 890 displays certificate interface 844A.

Certificate interface 844A includes upload affordance 846A. In response to selection of the upload affordance 846A, device 890 provides an upload interface by which a beneficiary can upload the document indicating a status of the user associated with the user account. While displaying certificate interface 844A, device 890 detects selection of the upload affordance 846A. The selection is a tap gesture 848A on the upload affordance 846A. As shown in FIG. 8W, in response to detecting tap gesture 848A, device 890 displays upload interface 850A.

Figure 8X:
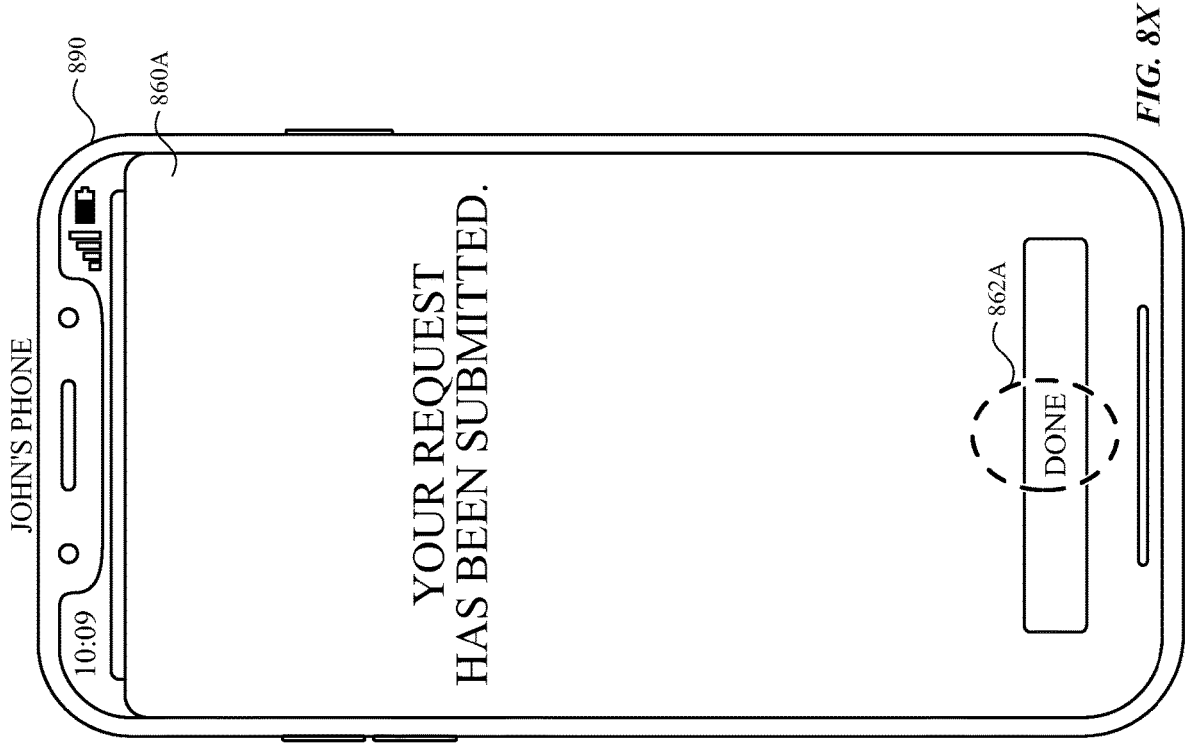
Figure 8W:
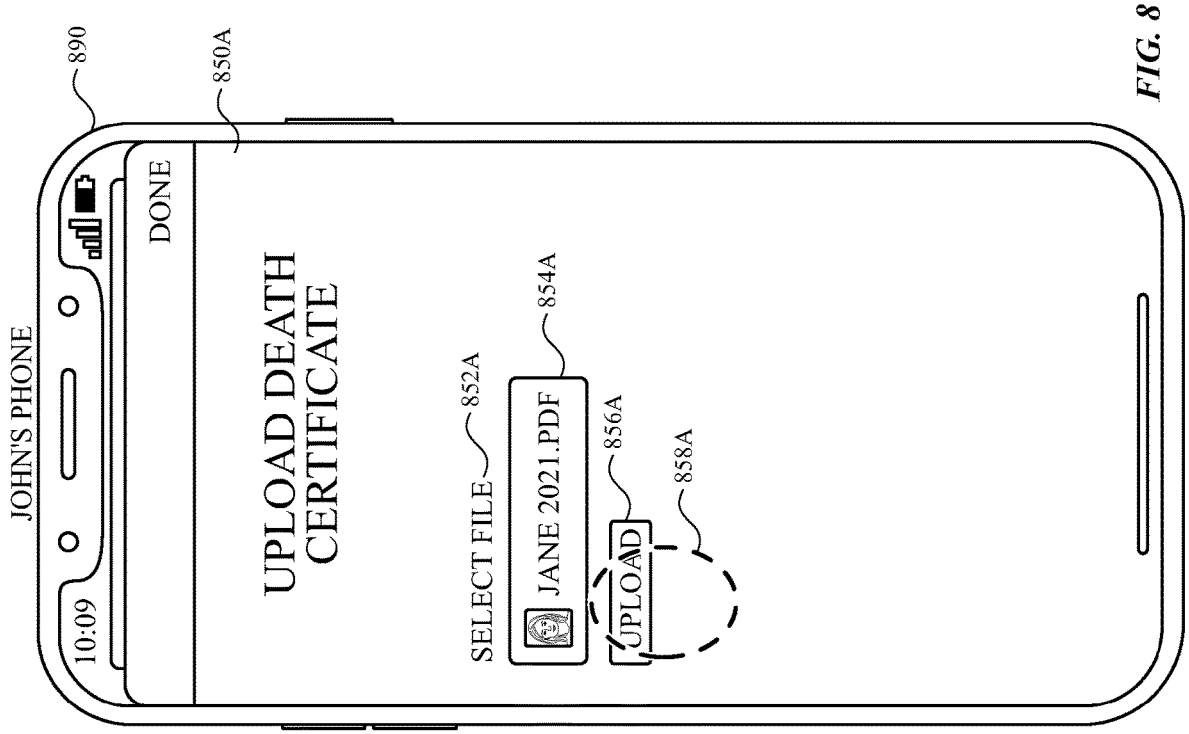

Upload interface 850A includes select file affordance 852A and upload affordance 856A. In response to a selection of select file affordance 852A, device 890 provides a process by which a document (e.g., document 854A) is selected for inclusion in the access request. In FIG. 8W, the process initiated by selection of select file affordance 852A has already been used to select document 854A. In the embodiment of FIGS. 8S-8AG, the document indicates a status of the user (e.g., Jane Appleseed) of the user account. While displaying upload interface 850A, device 890 detects selection of the upload affordance 856A. The selection is a tap gesture 858A on the upload affordance 856A. As shown in FIG. 8X, in response to detecting tap gesture 858A, device 890 submits the document to a remote access service and displays confirmation interface 860A, indicating that the request for access has been submitted.

Figure 8Y:
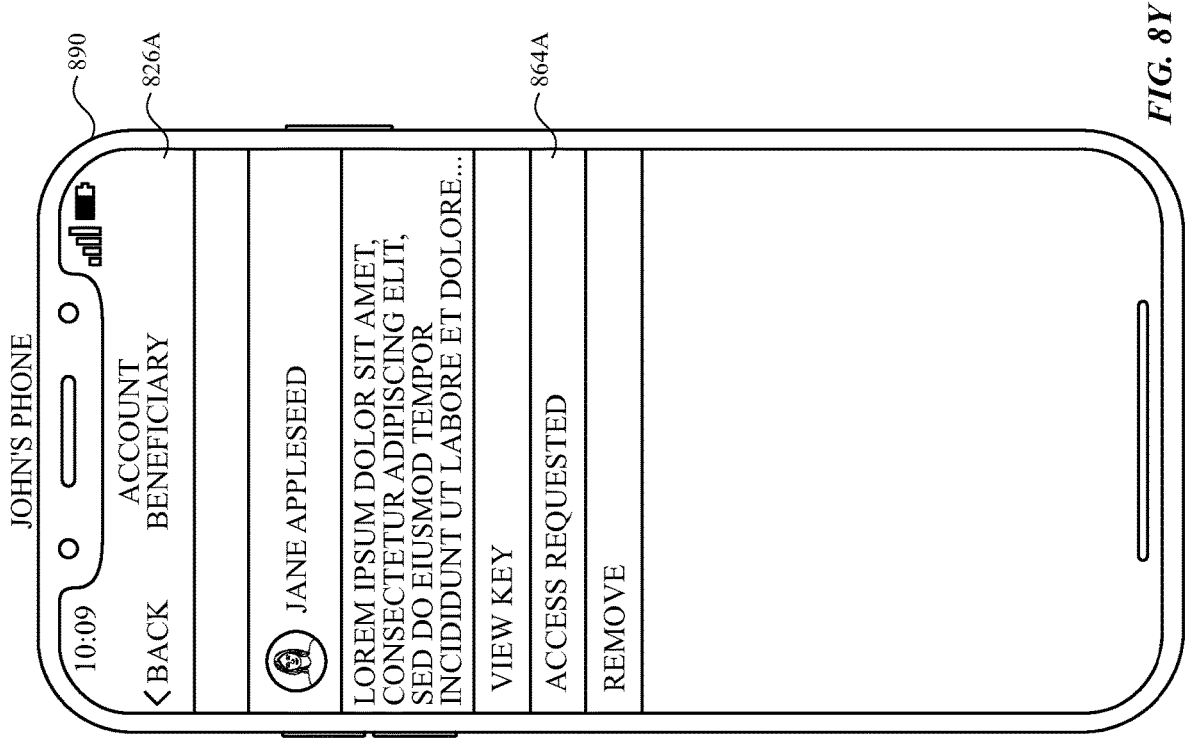

Confirmation interface 860A includes a completion affordance 862A. In response to selection of completion affordance 862A, device 890 displays beneficiary management interface 826A. As shown in FIG. 8Y, because the request for access has been submitted (and remains pending), device 890 replaces display of affordance 830A (FIG. 8T) with indicator 864A to indicate that access has been requested.

In some embodiments, a request for access includes providing both a document indicating a status of the user of the user account and the access key provided to a beneficiary. As described, device 890 is, in some examples, a device satisfying the set of compatibility criteria for device 600, and as a result, stores the access key for Jane Appleseed in a beneficiary key store. Accordingly, when providing the access request (e.g., when submitting document 854A), device 890 includes (e.g., automatically includes) the access key in the request for access (e.g., without additional user input), ensuring that both the document indicating status of the user associated with the user account and the access key are provided in the access request for the user account.

Figure 8Z:
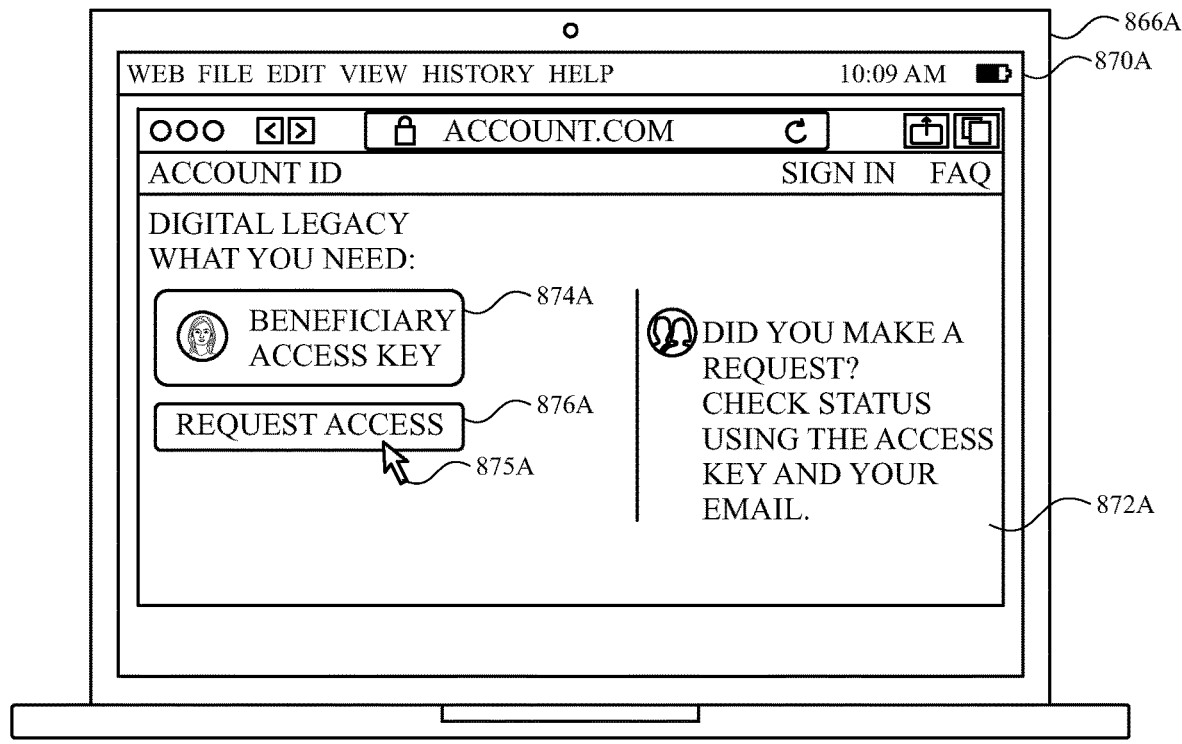
Figure 8A:
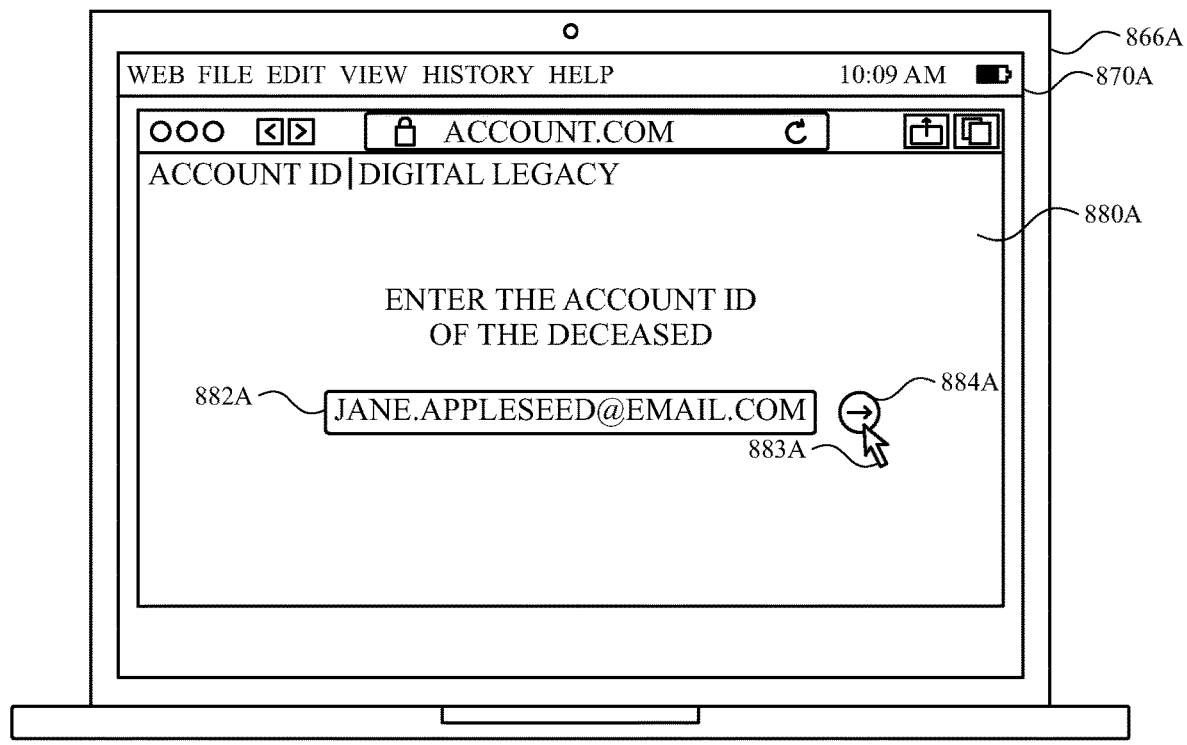
Figure 8A:
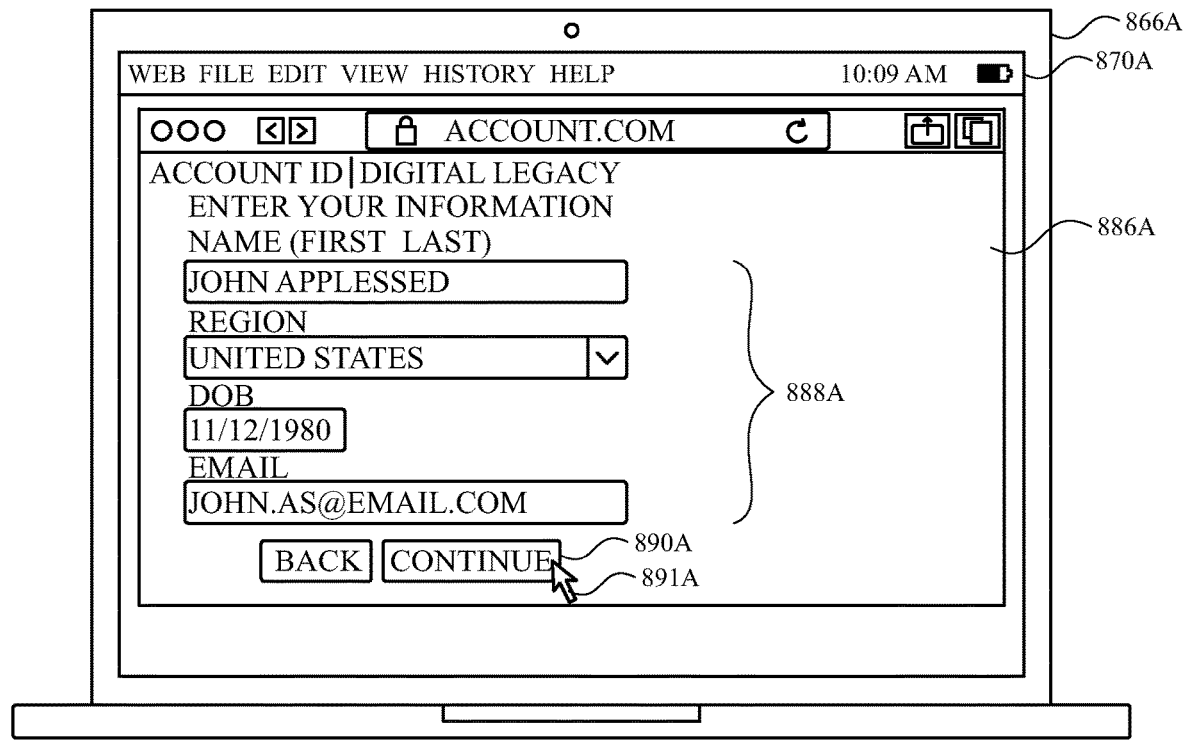
Figure 8A:
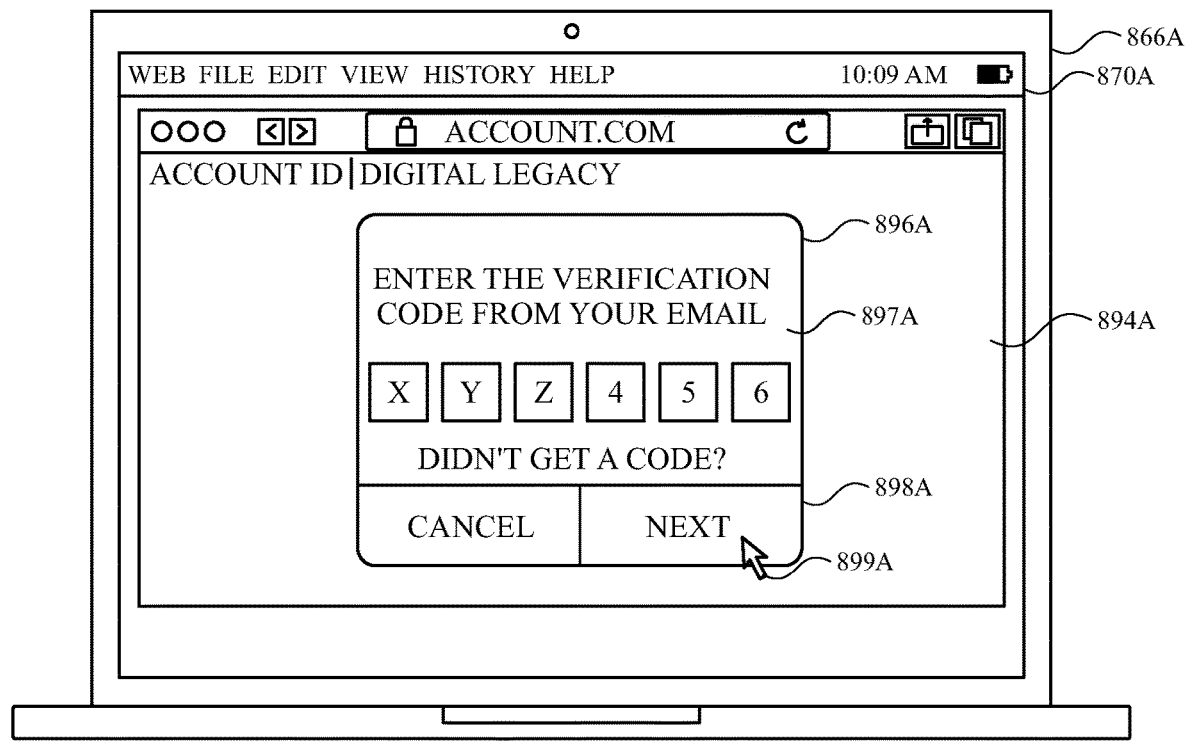
Figure 8A:
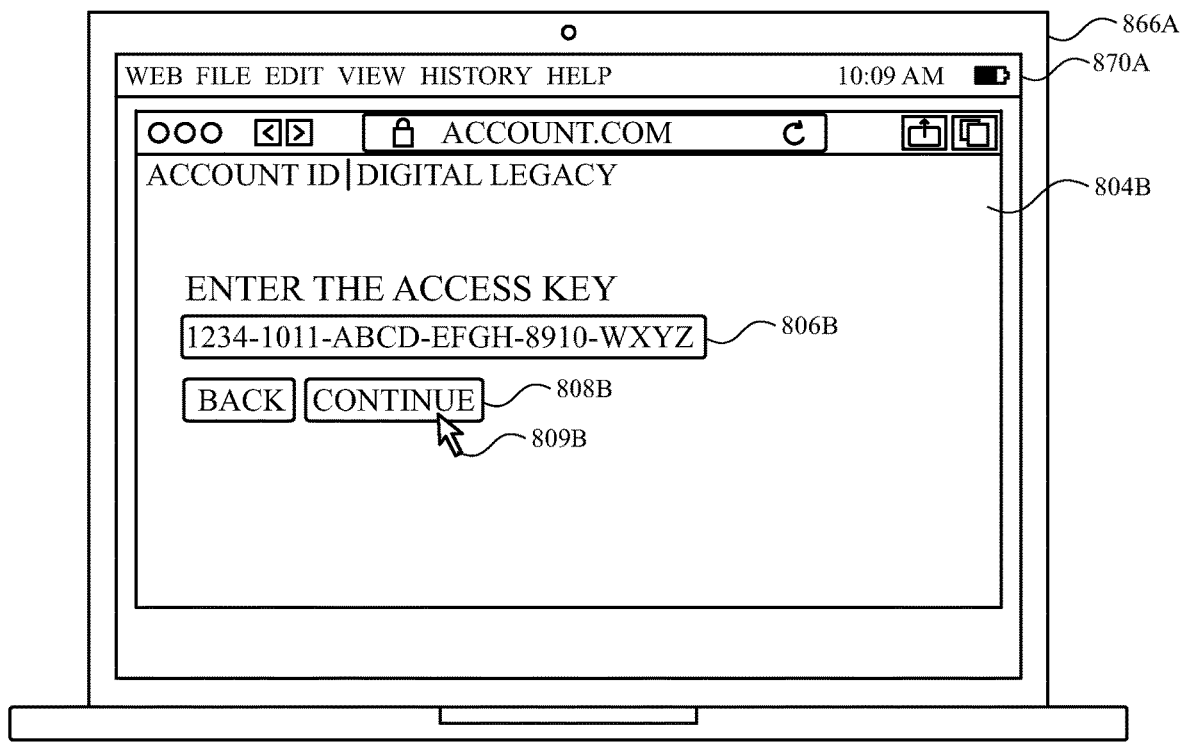
Figure 8A:
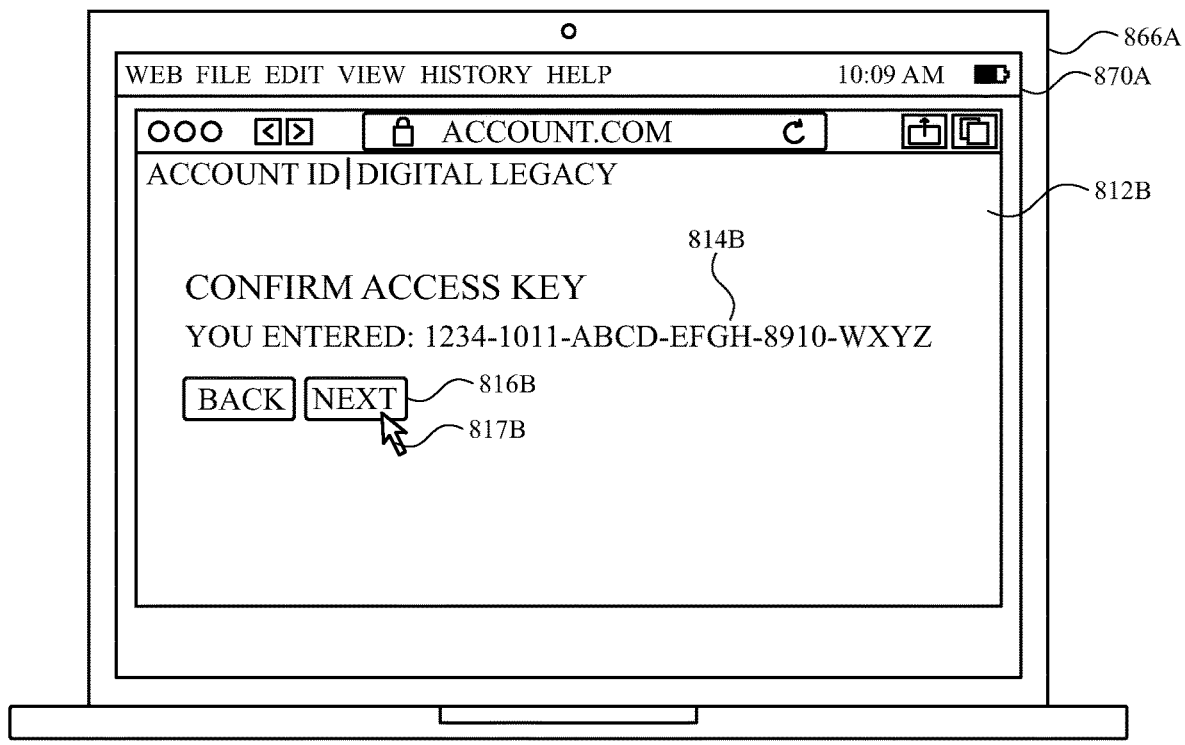
Figure 8A:
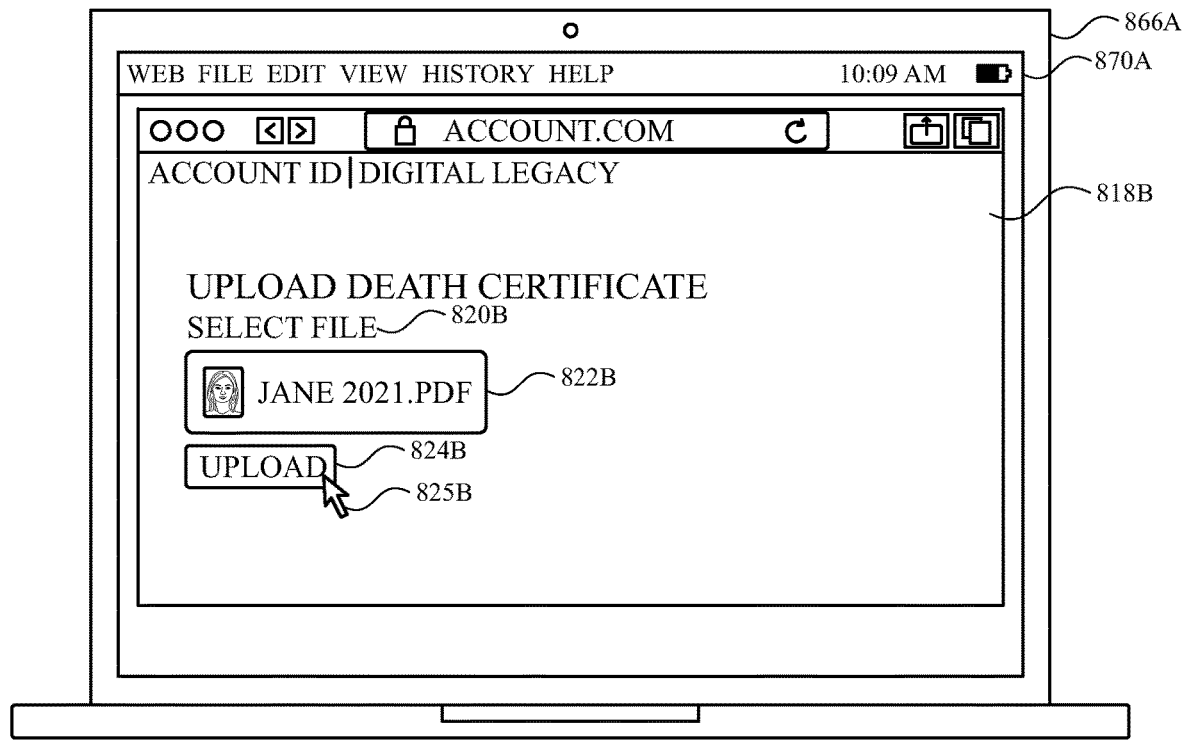
Figure 8A:
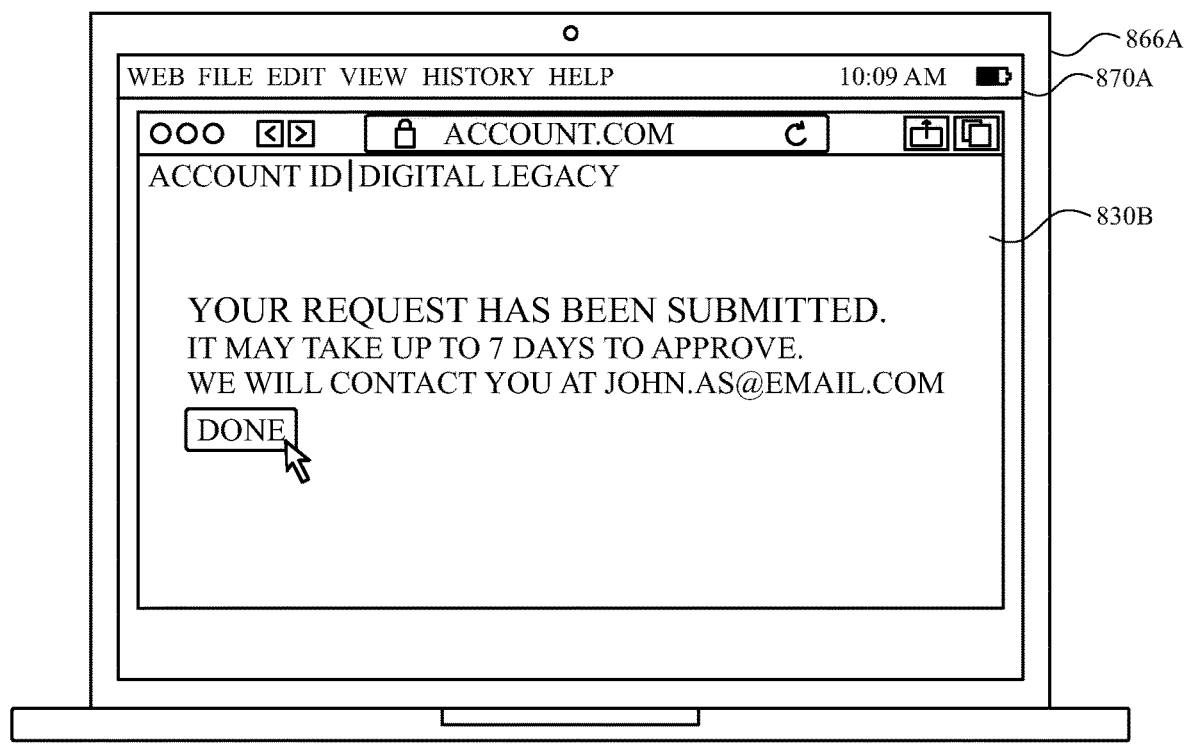
Figure 8A:
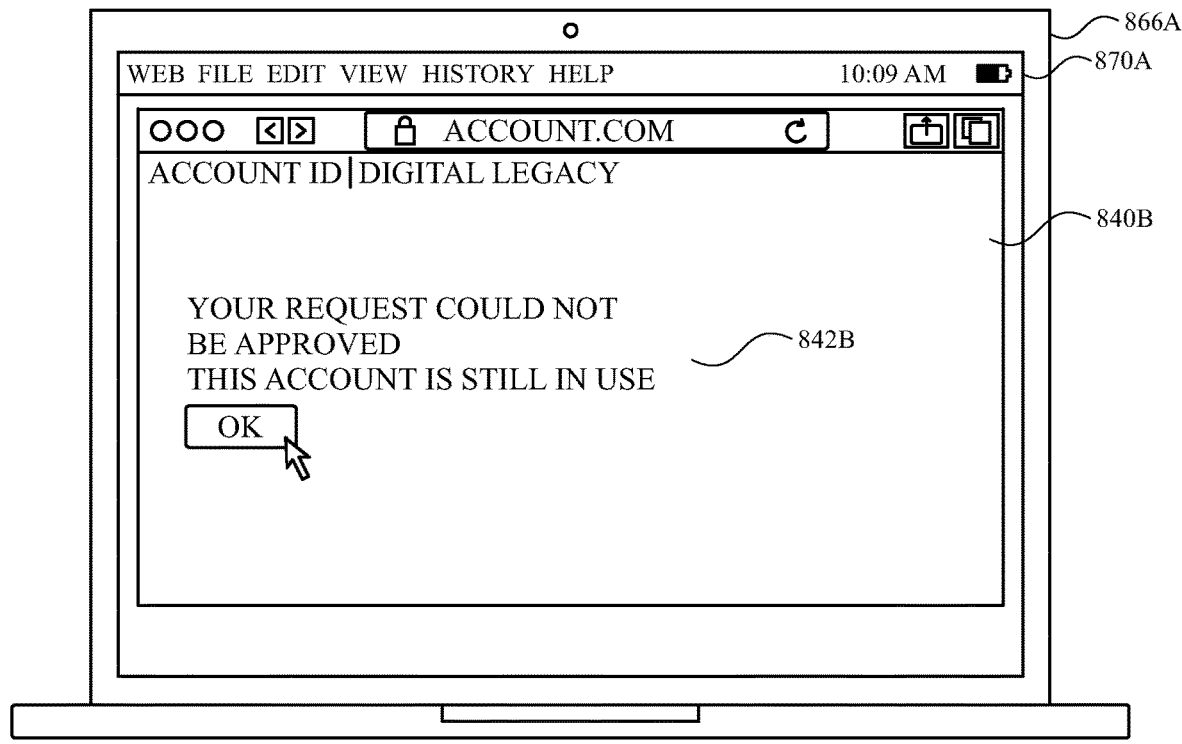
Figure 8A:
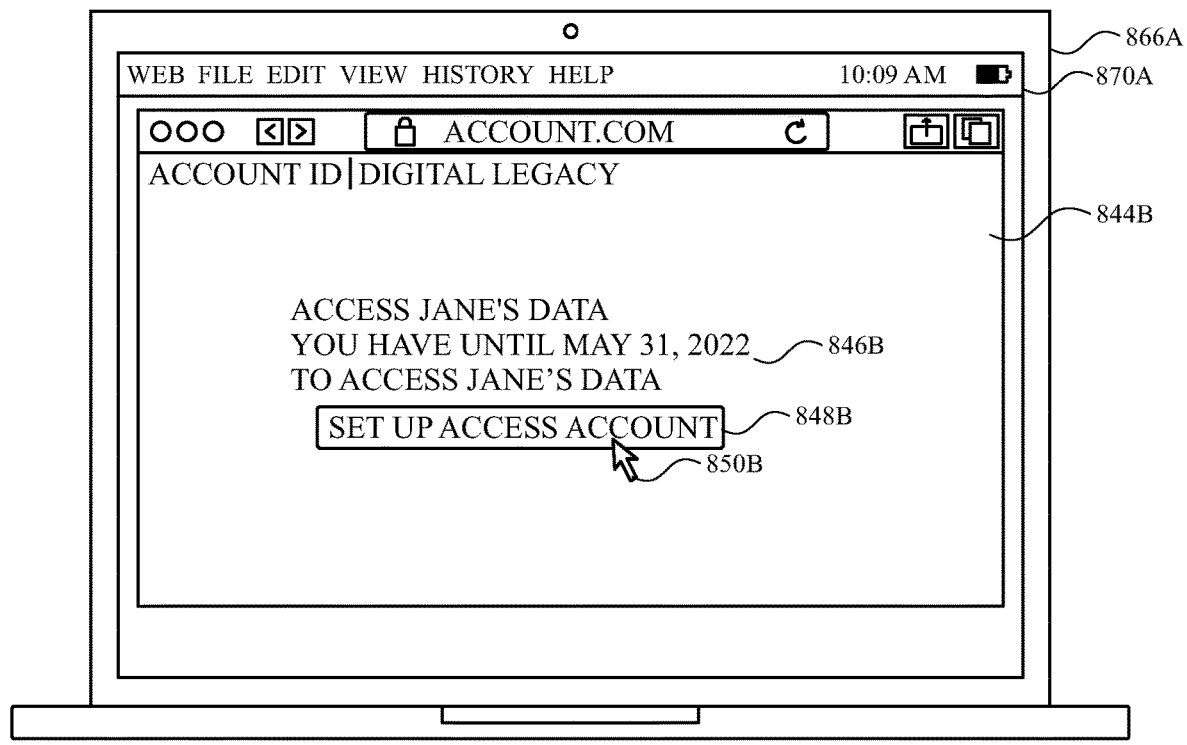
Figure 8A:
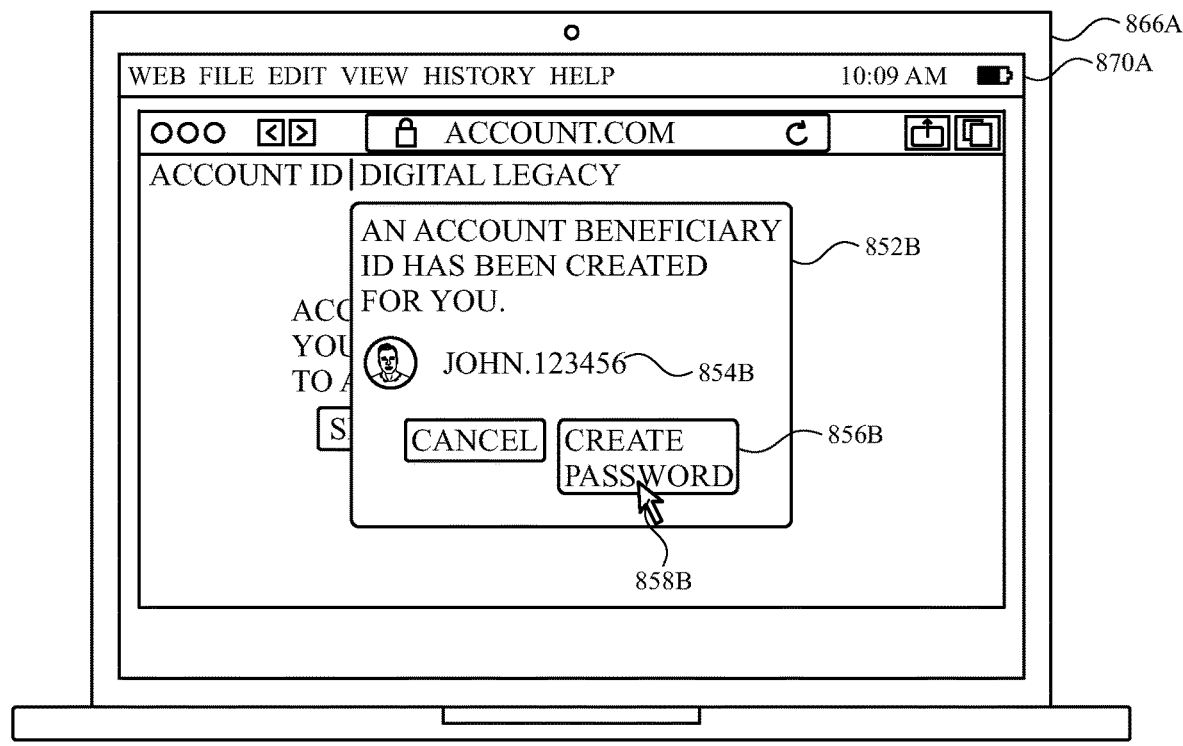
Figure 8A:
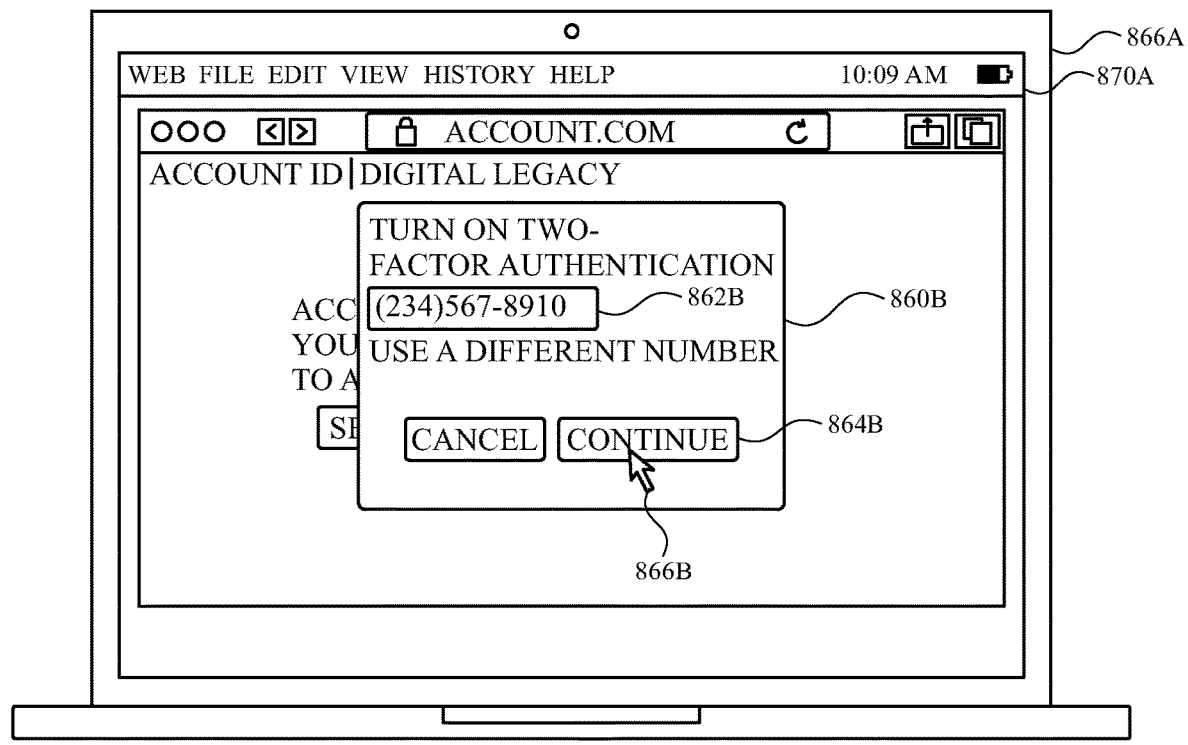
Figure 8A:
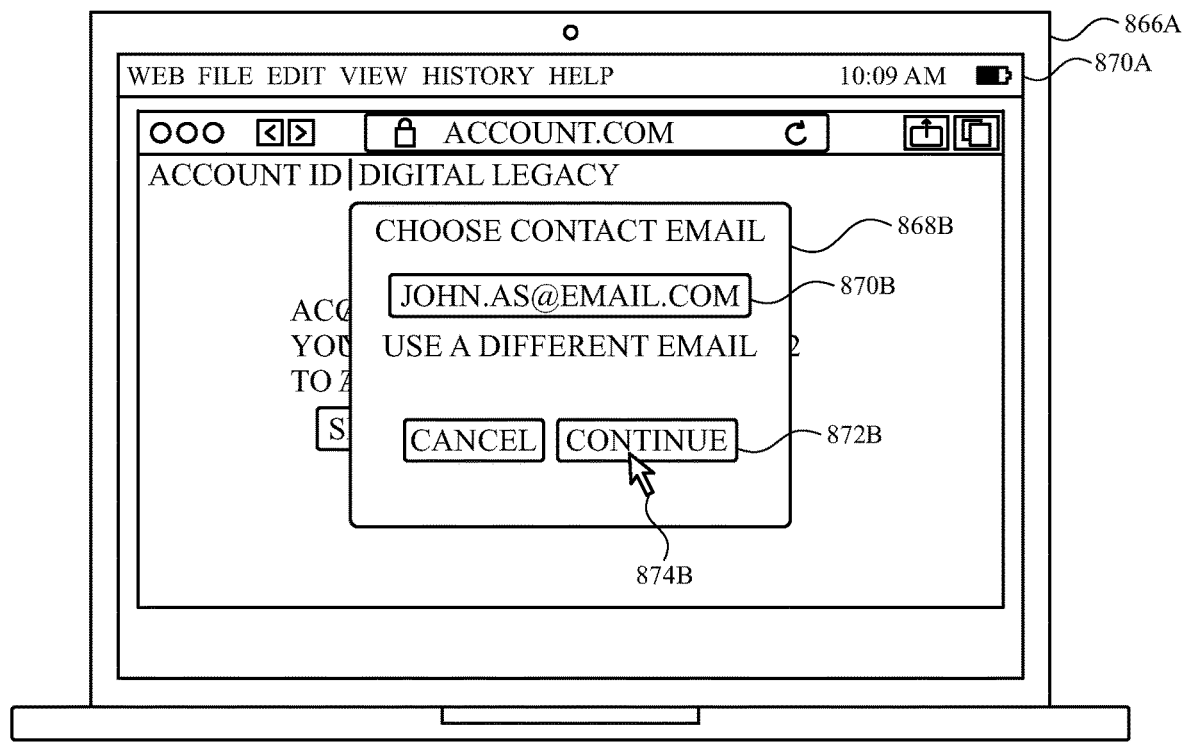
Figure 8A:
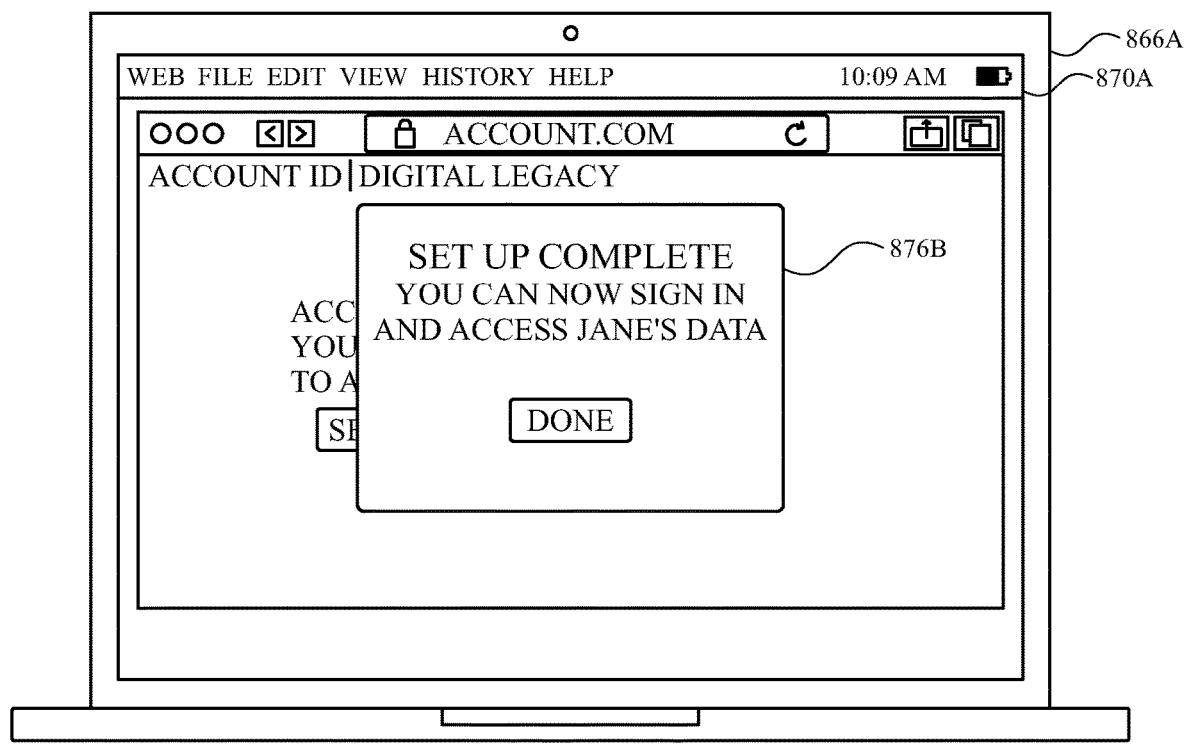
Figure 8A:
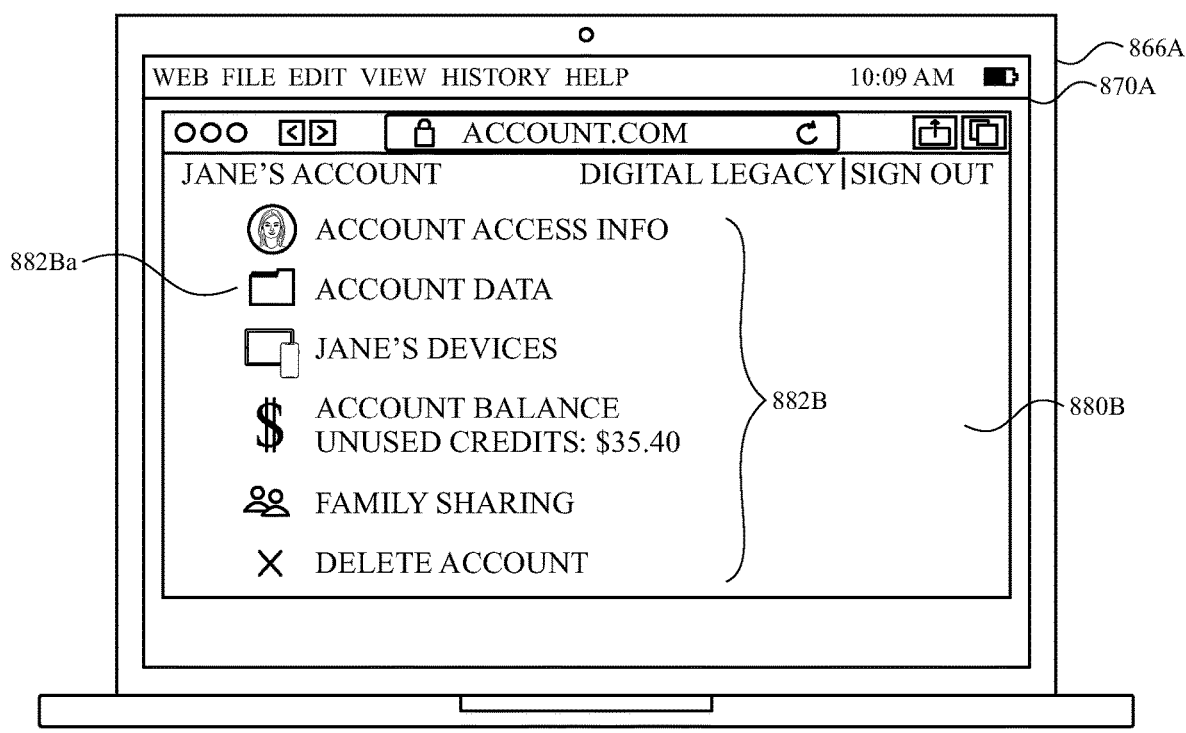
Figure 8A:
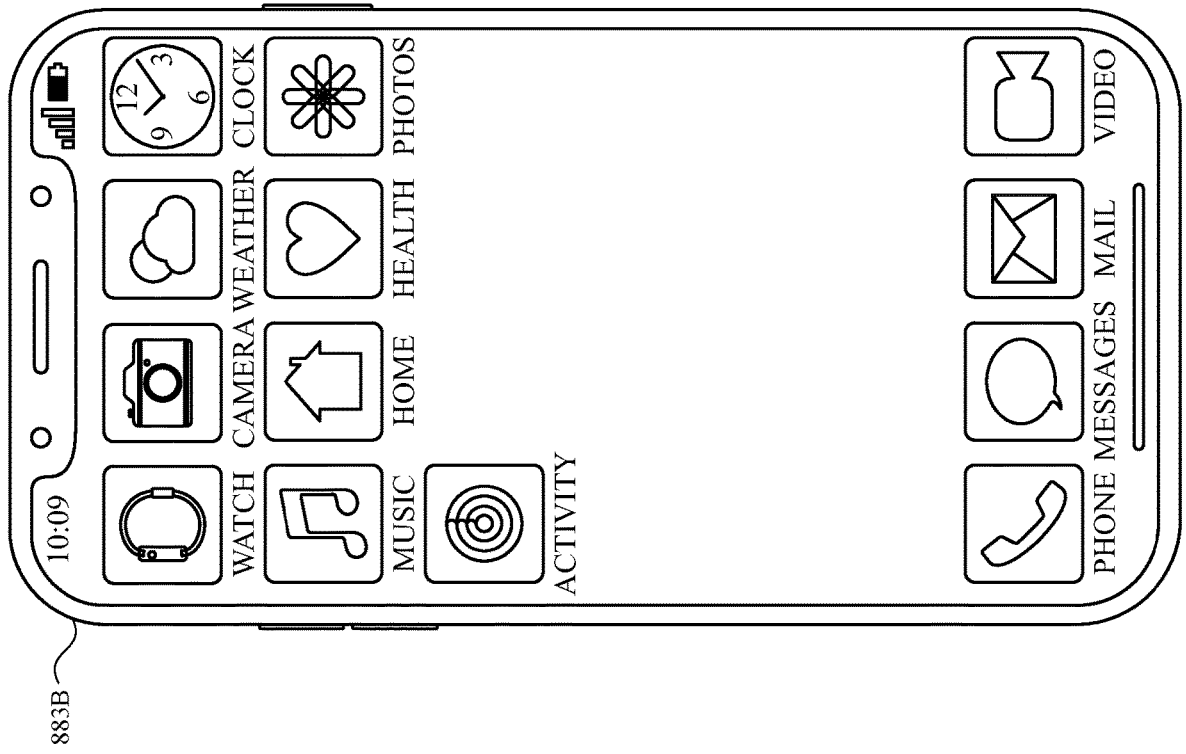

FIGS. 8Z-AG illustrate an exemplary technique for requesting access using device 866A that does not satisfy a set of compatibility criteria.

At FIG. 8Z, device 866A displays, on display 870A, request access interface 872A, which can be a user interface of a web browser in some embodiments. In some embodiments, device 866A includes one or more features of devices 100, 300, and/or 500. Request access interface 872A includes information 874A and continue affordance 876A.

Information 874A includes information about the process for requesting access as a beneficiary. Information 874A describes that a request for access must include a document (e.g., death certificate) indicating a status of a user of the user account and/or an access key for the user account. While displaying request access interface 872A, device 866A detects selection of the continue affordance 876A. The selection is a user input 875A (e.g., mouse click) on the continue affordance 876A. As shown in FIG. 8AA, in response to user input 875A, device 866A displays account identification interface 880A.

Account identification interface 880A includes account identification field 882A and continue affordance 884A. Account identification field 882A is used for entry of an identifier (e.g., email or username) of the user account (e.g., the account associated with Jane Appleseed) to be accessed by the beneficiary. In some embodiments, account identification interface 880A is initially displayed with account identification field 882A unpopulated. While displaying account identification interface 880A with account identification field 882A populated, device 866A detects selection of the continue affordance 884A. The selection is a user input 883A (e.g., mouse click) on the continue affordance 884A. As shown in FIG. 8AB, in response to user input 883A, device 866A displays beneficiary information interface 886A.

Beneficiary information interface 886A includes information fields 888A and continue affordance 890A. In some embodiments, beneficiary information interface 886A is initially displayed with information fields 888A unpopulated. Information fields 888A are used for entry of various items of personal information associated with the beneficiary (e.g., name, location, date of birth, email, phone number). While displaying beneficiary information interface 886A with information fields 888A populated, device 866A detects selection of the continue affordance 890A. The selection is a user input 891A (e.g., mouse click) on the continue affordance 890A. As shown in FIG. 8AC, in response to user input 891A, device 866A displays beneficiary verification interface 894A.

Verification interface 894A includes verification region 896A, which is used to verify one or more items of personal information submitted using beneficiary information interface 886A. In some embodiments, verification interface 894A is displayed with verification region 896A unpopulated. As an example, after selection of continue affordance 890A, a beneficiary receives a passcode (e.g., in an email) which is entered using a passcode field 897A of verification region 896A. Verification region 896A further includes continue affordance 898A, which is used to submit the passcode entered in passcode field 897A. While displaying verification interface 894A with verification region 896A populated, device 866A detects selection of continue affordance 898A. The selection is a user input 899A (e.g., mouse click) on continue affordance 898A. As shown in FIG. 8AD, in response to user input 899A and in accordance with a determination that the passcode in passcode 897A is valid, device 866A displays key entry interface 804B. In some embodiments, if the passcode is invalid, key entry interface 804B is not displayed and/or device 866A requests a valid passcode.

Key entry interface 804B includes key field 806B and continue affordance 808B. In some embodiments, key entry interface 804B is displayed with key field 806B unpopulated. Key field 806B is used for entry of the access key for the user account. In some embodiments, key entry interface 804B does not include key field 806B and instead includes a QR code scanner (not shown) such that the access key for the user account is entered by scanning a QR code representation of the access key. As described, an access key can be provided to a beneficiary electronically via a notification, or optionally, can be printed and provided to the beneficiary offline (recall that a device that does not meet the set of compatibility criteria does not automatically store an access key). While displaying key entry interface 894A with key field 806B populated, device 866A detects selection of continue affordance 808B. The selection is a user input 809B (e.g., mouse click) on continue affordance 808B. As shown in FIG. 8AE, in response to user input 809B, device 866A displays key confirmation interface 812B.

Key confirmation interface 812B is used to confirm correct entry of the access key in key field 806B (FIG. 8AE). Key confirmation interface 812B includes key 814B, which is representation of the key entered in key field 806B. Key confirmation interface 812B further includes continue affordance 816B. While displaying key confirmation interface 812B, device 866A detects selection of continue affordance 816B. The selection is a user input 817B (e.g., mouse click) on continue affordance 816B. As shown in FIG. 8AF, in response to user input 817B, device 866A displays upload interface 818B.

Upload interface 818B includes select file affordance 820B and upload affordance 820B. In response to a selection of select file affordance 820B, device 866A provides a process by which a document (e.g., document 822B) is selected for inclusion in the access request. In FIG. 8AF, the process initiated by selection of select file affordance 820B has already been used to select document 854A. In the embodiment of FIGS. 8S-8AG, the document indicates a status of the user of the user account. While displaying upload interface 818B, device 866A detects selection of the continue affordance 824B. The selection is a user input 825B (e.g., mouse click) on the continue affordance 898A. As shown in FIG. 8AG, in response to user input 825B, device 866A submits the document to a remote access service and displays confirmation interface 830B, indicating that the request for access has been submitted. In some embodiments, the request includes submitting, to a remote access service, the access key of FIG. 8AE as well as document 822B.

As described, an access request is provided by a beneficiary to request access to the user account following a change in status of the user associated with the user account. In some embodiments, an access request is provided (e.g., submitted) to a remote access service, which reviews the document and access key provided in the access request, and determines if the access request is valid. In some embodiments, access to the user account is approved if a set of beneficiary access criteria is met. As an example, the set of beneficiary access criteria can include a criterion that is met when the user account has been inactive for a predetermined amount of time. As another example, the set of beneficiary access criteria can include a criterion that is met when the change in status of the account has been confirmed by the remote access service using an independent source (e.g., obituary).

If an access request is not approved (e.g., the set of beneficiary access criteria is not met), a beneficiary is notified that the access request is not approved (e.g., denied), as shown in FIG. 8AH. In FIG. 8AH, device 866 displays denial interface 840B, which can be a user interface of a web browser. Denial interface 840B includes information 842B, which indicates that an access request is denied because the set of beneficiary access criteria is not met. As illustrated, the set of beneficiary access criteria is not met at least because the user account is still in use.

As described in FIGS. 8AI-8AM, if an access request is approved (e.g., the set of beneficiary access criteria is met), a beneficiary is notified that the access request has been approved, and optionally, device 866A performs a beneficiary account setup process.

In FIG. 8AI, device 866 displays approval interface 844B, which can be a user interface of a web browser. Approval interface 844B includes information 846B and setup affordance 848B. Information 846B indicates that the request to access the user account (e.g., of Jane Appleseed) has been approved and that access to the user account is available for a particular amount of time (e.g., 6 months, 1 year).

While displaying approval interface 844B, device 866A detects selection of the setup affordance 848B. The selection is a user input 850B (e.g., mouse click) on the continue affordance 848B. As shown in FIG. 8AJ, in response to user input 850B, device 866A displays password generation interface 852B. In some embodiments, displaying password generation interface 852B includes overlaying password generation interface 852B on approval interface 844B.

Password generation interface 852B includes identifier 854B and create password affordance 856B. Identifier 854B is a credential (e.g., username) that can be used to access the user account. In some embodiments, the identifier 854B is provided (e.g., generated) by the remote access service, for instance, in response to approving an access request. In response to selection of create password affordance 856B (e.g., user input 858B), device 866A provides a field (not shown) that is used for entry of a passcode (e.g., a password to be used in combination with identifier 854B). Once the passcode has been entered, device 866A displays multi-factor interface 860B, as shown in FIG. 8AK. In some embodiments, displaying multi-factor interface 860B includes overlaying multi-factor interface 860B on approval interface 844B.

Multi-factor interface 860B includes contact information field 862B and continue affordance 864B. In some embodiments, multi-factor interface 860B is displayed with contact information field 862B unpopulated. Contact information field 862B is used to enter a set of contact information (e.g., phone number, email address) that can be used to implement multi-factor authentication. In this manner, multi-factor authentication may be implemented for access to the user account. While displaying multi-factor interface 860B with contact information field 862B populated, device 866A detects selection of continue affordance 864B. The selection is a user input 866B (e.g., mouse click) on the continue affordance 864B. As shown in FIG. 8AL, in response to user input 866B, device 866A displays contact information interface 868B. In some embodiments, displaying contact information interface 868B includes overlaying contact information interface 868B on approval interface 844B.

Contact information interface 868B includes contact information field 870B and continue affordance 872B. In some embodiments, contact information interface 868B is displayed with contact information field 870B unpopulated. Contact information field 870B is used to enter a set of contact information (e.g., phone number, email address) for the beneficiary. While displaying contact information interface 868B, device 866A detects selection of the continue affordance 872B with contact information field 870B populated. The selection is a user input 874B (e.g., mouse click) on the continue affordance 874B. As shown in FIG. 8AM, in response to user input 874B, device 866A displays completion interface 876B, indicating that the beneficiary setup process is complete. In some embodiments, displaying completion information interface 868B includes overlaying contact information interface 868B on approval interface 844B.

After completing the beneficiary setup process, the user account for (e.g., the user account for Jane Appleseed) can be accessed using the set of beneficiary credentials of FIGS. 8AJ-8AL. In FIG. 8AN, device 866A displays an account management interface 880B for the user account. Account management interface 880B includes account features 882B, which can be used to manage various aspects of the user account. As an example, account feature 882Ba can be used to access data of the user account (e.g., photos, videos, calendar, contacts).

In some embodiments, a beneficiary can access a device backup associated with the user account. In some embodiments, the device backup does not include data that was only locally stored on a device associated with the user account being accessed, because such data was not included in an online backup. In some embodiments, the device backup provides access only to particular types of data (e.g. photos, contacts, calendar, cloud storage).

In FIG. 8AO, device 883B is operating in a factory reset state (e.g., includes no personalized data for a user account) and displays initial interface 884B. In some embodiments, device 883B includes one or more features of devices 100, 300, and/or 500. Initial interface 884B includes setup affordance 886B. While displaying initial interface 884B, device 883B detects selection of the setup affordance 886B. The selection is a tap gesture 888B on setup affordance 886B. As shown in FIG. 8AP, in response to user input 888B, device 883B displays login interface 890B.

Login interface 890B includes identifier field 892B, password field 894B, and continue affordance 896B. In some embodiments, login interface 980B is initially displayed with fields 892B and 894B unpopulated. Fields 892B, 894B are used for entry of the set of beneficiary credentials (e.g., beneficiary username and password for the user account). While displaying login interface 809B with fields 892B and 894B populated, device 883B detects selection of the continue affordance 896B. The selection is a tap gesture 898B on continue affordance 896B. In response to user input 898B, device 833B determines if the set of beneficiary credentials is valid for the user account. If so, device 833B displays authentication interface 802C. In some embodiments, if the credentials are not valid, authentication interface 802C is not displayed and/or device 883B requests valid credentials.

Authentication interface 802C includes code field 804C, which is used for entry of a passcode provided to the beneficiary. In some examples, the passcode is provided to a device (e.g., device 890) associated with the beneficiary. Authentication interface 802C further includes continue affordance 806C. While displaying authentication interface 802C with code field 804C populated, device 883B detects selection of the continue affordance 806C. The selection is a tap gesture 808C on continue affordance 806C. In response to user input 808C, device 883B displays access code interface 810C, as shown in FIG. 8AR.

Access code interface 810C includes camera preview 812C and manual entry affordance 814C. Access code interface 810C is used for entry of an access key for the user account. Accordingly, live preview 810C shows the output of a camera of device 833B such that device 833B can be used to scan a QR code including the access key for the user account (e.g., QR code 806 of FIG. 8P). In response to selection of manual entry affordance 814C, device 833B displays an interface that is used to manually enter an alphanumeric representation of the access key (e.g., alphanumeric code 808A of FIG. 8P).

After receiving an entry of the access key, device 833B determines whether the access key is valid. If so, device 833B loads a device backup associated with the user account, as shown in FIG. 8AS, providing the beneficiary (e.g., John Appleseed) with access to the device backup associated with the user account (e.g., Jane Appleseed's user account). In some embodiments, if the access code is not valid, device 833B does not load the device backup and/or requests a valid access key.

FIG. 9 is a flow diagram illustrating a method for obtaining account access using a computer system in accordance with some embodiments. Method 900 is performed at a computer system (e.g., 100, 300, 500, 600) (e.g., a personal computer, a tablet, a smartphone) that is in communication with one or more input devices (e.g., a touch-sensitive surface, a mouse, a keyboard). Some operations in method 900 are, optionally, combined, the orders of some operations are, optionally, changed, and some operations are, optionally, omitted.

As described below, method 900 provides an intuitive way for obtaining account access. The method reduces the cognitive burden on a user for obtaining account access, thereby creating a more efficient human-machine interface. For battery-operated computing devices, enabling a user to recover account access faster and more efficiently conserves power and increases the time between battery charges.

The computer system (e.g., 600) receives (902), via the one or more input devices, a request (e.g., 858A, 825B) to initiate a process to access an account (e.g., a data account, an account that is associated with data of a user, including email, text messages, and media; a secured account that requires authentication to access) of an individual (e.g., a user).

The process to access the account of the individual includes providing an authentication code (e.g., 806A, 808A, 814B) to another device (e.g., access key, QR code). In some embodiments, the authentication code includes a first key for account access and a second key for access to data associated with the account. In some embodiments, the code includes a key (e.g., decryption key). In some embodiments, the another device is a remote device (e.g., server). In some embodiments, the code is provided as an image. In some embodiments, the code is provided as an alphanumeric string. In some embodiments, the authentication code is stored on the computer system, and the computer system automatically provides the authentication code in response to the request to initiate the process to access the account of the individual. In some embodiments, the authentication code is manually entered (e.g., identified) by a user, for instance, using a file browser or keyboard. In some embodiments, the authentication code is different from the authentication credentials that would be normally used to access the account (e.g., is different than the account password).

The process to access the account of the individual includes providing a document (e.g., 854A, 822B) indicative of a status of the individual to the another device. In some embodiments, the document is a death certificate for the user. In some embodiments, the document is a PDF or an image, though it will be appreciated that the document may be an electronic document of any known type. In some embodiments, once the code and document have been provided, the computer system confirms that the request to access the account has been submitted).

In accordance with a determination that a set of validation criteria is satisfied, the computer system receives (904) a credential (e.g., 854B) to access the account of the individual (e.g., receiving a user name associated with the account that is specific to the user requesting access. In some embodiments, the user is further prompted to create a password for future authentication). The set of validation criteria includes a first criterion that is satisfied when the authentication code (e.g., 806A, 808A, 814B) is valid and a second criterion that is satisfied when the document (e.g., 854A, 822B) is valid. In some embodiments, the authentication code is validated by one or more remote devices. In some embodiments, after providing the document, the veracity of the document (e.g., 854A, 822B) is automatically and/or manually verified, for instance, by a third-party. In some embodiments, in accordance with a determination that the set of validation criteria are not satisfied, the computer system does not receive (e.g., forgoes receiving) a credential to access the account of the individual. Providing credential for accessing an account in response to validation criteria being satisfied provides a manner in which a user (e.g., beneficiary) can quickly and efficiently recover access to a device of an individual, for instance, if the account beneficiary would otherwise be unable to access the device, which reduces the number of inputs needed to perform an operation.

In some embodiments, the computer system is associated with an account (e.g., account for John Appleseed) of a first user (e.g., 832a, 852a) of the computer system. In some embodiments, the computer system performs an account beneficiary (e.g., trustee) selection process. In some embodiments, the account beneficiary selection process includes receiving a first set of one or more user inputs that includes a first input (e.g., 838, 856) corresponding to a first contact (e.g., 832a, 852a) (e.g., a contactable user with contact information; a contactable user account) associated with the account of the first user (e.g., an input on an affordance corresponding to the contact). In some embodiments, the account beneficiary selection process includes, in response to receiving the first set of one or more user inputs, providing, to the first contact, a notification (e.g., 872, 874) (e.g., indicating that the contact has been selected as a beneficiary for an account of the user) that indicates that the first contact has been requested (e.g., a request that does not need approval/acceptance) as a beneficiary of the account of the first user (e.g., an individual who is authorized to request access to the account of the first user under certain circumstances (e.g., process 900). In some embodiments, the notification is provided using a messaging application. In some embodiments, the notification, when selected by the contact, causes display of a beneficiary notification interface on a device of the contact.

In some embodiments, in response to receiving the first set of one or more user inputs (e.g., 838, 846, 856, 858, 866, 880, 886, 800A), and in accordance with a determination that the first contact is a contact of a first type (e.g., if a device of the contact satisfies a set of compatibility criteria (e.g., belongs to a same device ecosystem) as the computer system), the computer system causes (e.g., automatically adding; adding without requiring approval/acceptance) the contact (e.g., 832a, 852a) to be added as a beneficiary of the account of the first user. In some embodiments, adding the contact as a beneficiary for the account of the user includes providing the authentication code to the selected contact without receiving additional user input. In some embodiments, the authentication code is provided with the notification. In some embodiments, adding the beneficiary includes adding the beneficiary to a list of beneficiaries for the user account. In some embodiments, a beneficiary may be removed from the user account. In some embodiments, removing the beneficiary invalidates the authentication code. Causing contacts to be added as beneficiaries in response to determining the contacts are a particular type allows a user to quickly and efficiently add contacts as account beneficiaries for their account, which reduces the number of inputs needed to perform an operation.

In some embodiments, in accordance with a determination that the contact is not a contact of the first type (e.g., if the device of the contact does not a set of compatibility criteria), the notification includes an image (e.g., 804A) of a second authentication code for use in a process to access the account of the user. In some embodiments, a contact not of the first type is not automatically added as an account beneficiary. In some embodiments, the individual may instead elect to send the authentication code using other means. In some embodiments, the authentication code is sent as an image to the contact, for instance, using a messaging application. In some embodiments, the authentication code can be printed and provided to the selected contact by other means (e.g., offline) (e.g., without adding the contact as a beneficiary in response to (e.g., automatically in response to) the first user input). In some embodiments, contacts not of the first type are automatically added as beneficiaries and removal of a beneficiary invalidates the authentication code.

In some embodiments, performing the account beneficiary selection process further includes displaying an account beneficiary selection interface (e.g., 830) that includes a plurality of candidate account beneficiary contact user-interactive graphical objects (e.g., 832a-c). In some embodiments, the plurality of candidate account beneficiary contact user-interactive graphical objects includes a first candidate account beneficiary contact user-interactive graphical object (e.g., 832*a*) that corresponds to the first contact that meets one or more trust criteria. In some embodiments, the plurality of candidate account beneficiary contact user-interactive graphical objects includes a second candidate account beneficiary contact user-interactive graphical object (e.g., 832*b*) that corresponds to a second contact that meets one or more trust criteria, different from the first contact. In some embodiments, the first input of the set of one or more user inputs is an input (e.g., 838) corresponding to the first candidate account beneficiary contact user-interactive graphical object. In some embodiments, in response to selection of the contact selection affordance, the computer system displays a contact interface (e.g., list of device contacts, list of account contacts) including contacts of the first type and contacts of the second type.

In some embodiments, providing the authentication code (e.g., 806A, 808A, 814B) includes providing the authentication code in response to the request (e.g., 858A, 825B) to initiate the process to access the account of the individual (e.g., automatically in response to; without requiring further input other than the request to initiate). In some embodiments, the authentication code is provided upon initiation of the account access process. In some embodiments, the authentication code is provided in this manner when a computer system (e.g., device) of the account beneficiary shares a device ecosystem with the computer system of the individual of the account. Providing the authentication code in response to the request to initiate the process to access the account of the individual allows for the authentication code to be provided without requiring additional user input, which reduces the number of inputs needed to perform an operation.

In some embodiments, providing the authentication code includes displaying an authentication code entry user-interactive graphical object (e.g., 806B) (e.g., a text box). In some embodiments, providing the authentication code includes receiving, via the one or more input devices, a set of one or more user inputs that includes entry of the authentication code (e.g., receive manual entry of the authentication code) in the authentication code entry user-interactive graphical object. In some embodiments, the authentication code is provided manually prior to submitting a request to access the account of the individual. In some embodiments, the authentication code is provided manually, for instance, using a web interface, when a computer system (e.g., device) of the account beneficiary does not share a device ecosystem with the computer system of the individual of the account.

In some embodiments, the process to access the account of the individual includes providing a set of personal information (e.g., 882A) (e.g., personal identification information, address, email, date of birth) for the individual of the account. In some embodiments, the computer system provides personal information for the individual of the account and/or the account beneficiary.

In some embodiments, after providing the document indicative of the status of the individual, the computer system receives a notification (e.g., 842B, 846B) indicating whether access to the account of the individual has been approved. In some embodiments, the notification is a notification received at a device and the notification is provided by a system level function (e.g., operating system notification). In some embodiments, of the request has been approved, selection of the notification initiates a beneficiary set up process for creating a login to the account of the individual. In some embodiments, the notification is an e-mail. In some embodiments, if the request has been approved, the e-mail optionally includes an account setup affordance. In some embodiments, the account setup affordance includes a hyperlink to a portal for performing the beneficiary set up process. In some embodiments, a request is denied for instance, due to ongoing activity of the account of the individual.

In some embodiments, the notification includes an indication (e.g., 846B) that access to the account of the individual has been approved. In some embodiments, the notification includes an account setup user-interactive graphical object (e.g., 848B) (e.g., an affordance). In some embodiments, the computer system detects selection (e.g., 850B) of the account setup user-interactive graphical object. In some embodiments, in response to detecting selection of the account setup user-interactive graphical object, the computer system initiates a beneficiary account setup process. In some embodiments, the beneficiary set up process is a process by which a beneficiary registers an account with a service to generate a set of beneficiary credentials for accessing the account of the individual. In some embodiments, the set of beneficiary credentials may be used to access the account of the individual of (e.g., account management features) and/or data associated with the account of the individual (e.g., photos, applications, contacts. In some embodiments, during the beneficiary set up process, the beneficiary provides a set of personal information for the beneficiary (e.g., personal identification information, address, phone number email, date of birth). Detecting selection of an account setup user-interactive graphical object and initiating a beneficiary set up process in response to selection of the account setup affordance allows for a beneficiary set up process to be quickly and efficiently initiated, which reduces the number of inputs needed to perform an operation.

In some embodiments, the beneficiary account setup process includes providing a set of personal information (e.g., information entered into fields 888A) (e.g., personal identification information, address, phone number email, date of birth) for an account beneficiary of the account of the individual. In some embodiments, personal information is confirmed and/or newly entered. In some embodiments, the beneficiary account setup process includes providing a set of beneficiary credentials (e.g., 854B, password entered in response to input 858B) including the credential (e.g., 854B) for the account beneficiary to access the account of the individual. In some embodiments, the beneficiary provides credentials, such as a password, that will be used in a set of beneficiary credentials for accessing the account of the individual. In some embodiments, the set of beneficiary credentials (e.g., 854B, password created using affordance 856B, credentials entered in fields 892B, 894B) are used to access one or more secured functions (e.g., accessing device backup of device 883B (FIG. 8AS)) of the account of the individual. In some embodiments, the beneficiary credentials include a user name and a password. In some embodiments, the user name is provided by the account recovery service and the password is provided by the beneficiary during the beneficiary set up process. In some embodiments, in response to submitting the beneficiary credentials during an access, the beneficiary is prompted to provide an access code. In some embodiments, the access code is a two-factor authentication code provided to the beneficiary's account and/or device (e.g., a device separate from the computer system displaying the login interface). In some embodiments, the access code (e.g., QR code, decryption key) is an authentication code for the account of the individual. In some embodiments, access requires both the two-factor authentication code and authentication code for the account of the individual. In some embodiments, access is provided to all secured functions of an account. In some embodiments, access is provided to a subset of all secured functions of an account. In some embodiments, access is provided only for secured functions provided on a device configured for the beneficiary. In some embodiments, access is provided for data for the account (e.g., photos, contacts, calendar)). In some embodiments, web-based access is not provided to a beneficiary such that data for the account cannot be accessed using a web browser.

FIGS. 10A-10Z illustrate exemplary user interfaces for disabling an account recovery service, in accordance with some embodiments. The user interfaces in these figures are used to illustrate the processes described below, including the processes in FIG. 11.

Generally, various techniques for disabling an account recovery service described below allow a user to disable an account recovery service associated with their user account. In some embodiment, such techniques ensure an alternative account recovery function is enabled for the user account prior to disabling the account recovery service, thereby ensuring a user can recover their account after disabling the account recovery service.

FIGS. 10A-10E illustrate techniques for attempting to disable an account recovery service for a user account in which an alternative account recovery function is not enabled. In some embodiments, an alternative account recovery function is any function and/or feature by which a user can recover their account, including but not limited to a recovery contact and/or a recovery key.

FIG. 10A illustrates electronic device 600. In FIG. 10A, electronic device 600 is a portable multifunction device and has one or more components described above in relation to one or more of devices 100, 300, and 500.

Figure 10B:
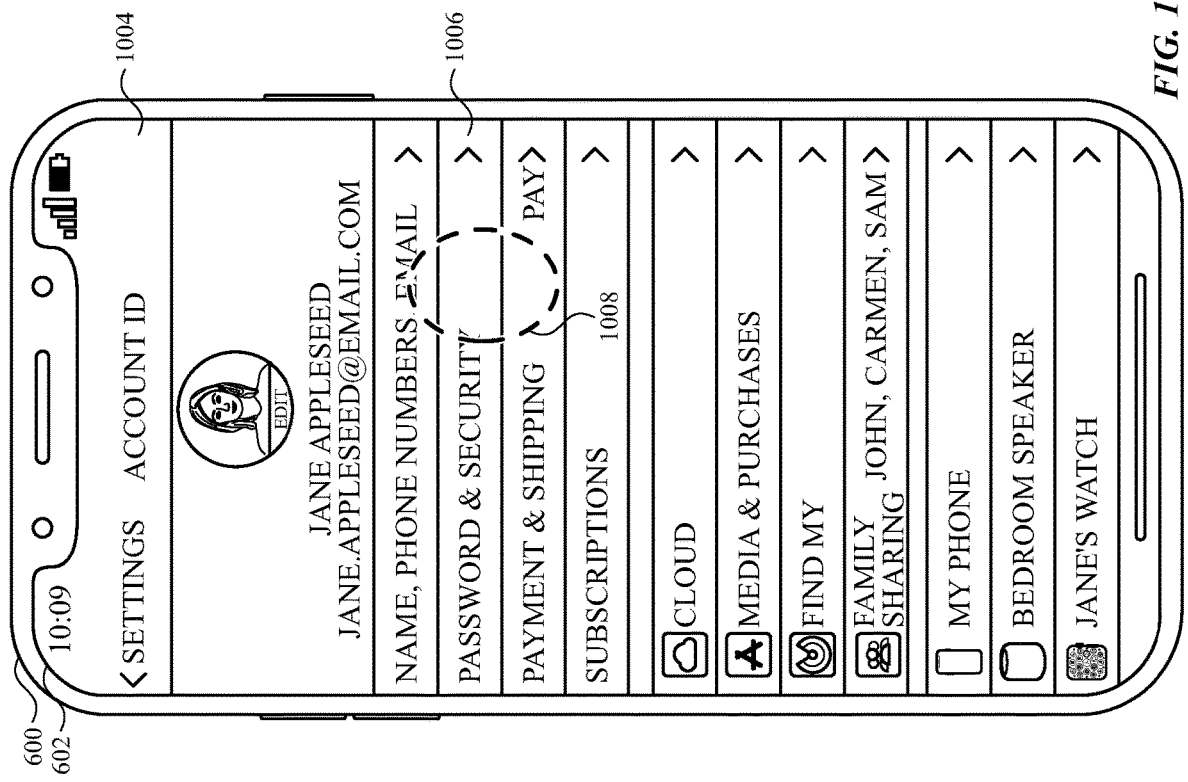

In FIG. 10A, device 600 displays, on display 602, an account interface 1004 for a user account of a user Jane Appleseed. The account interface 1004 is associated with a user account of device 600 in some embodiments. The account interface 1004 includes various affordances for configuring features of the user account, including security affordance 1006. In response to selection of security affordance 1006, device 600 displays a security interface. For example, while displaying account interface 1004, device 600 detects selection of security affordance 1006. The selection is a tap gesture 1008 on security affordance 1006. As shown in FIG. 10B, in response to detecting tap gesture 1008, device 600 displays security interface 1010.

Security interface 1010 includes various affordances for managing access to the user account and/or data associated with the user account, including account recovery affordance 1012. In response to selection of account recovery affordance 1012, device 600 displays an account recovery interface. For example, while displaying security interface 1010, device 600 detects selection of account recovery affordance 1012. The selection is a tap gesture 1014 on account recovery affordance 1012. As shown in FIG. 10C, in response to detecting tap gesture 1014, device 600 displays account recovery interface 1016.

Account recovery interface 1016 includes recovery service affordance 1018 and add recovery function affordance 1092. Selection of add recovery function affordance 1092 causes device 600 to initiate a process for adding an account recovery function, such as a recovery contact or an account recovery service, for a user account (e.g., Jane Appleseed's account) (e.g., as described with respect to process 600). In response to selection of recovery service affordance 1018, device 600 displays a recovery service interface. For example, while displaying account recovery interface 1016, device 600 detects selection of recovery service affordance 1018. The selection is a tap gesture 1020 on recovery service affordance 1018. As shown in FIG. 10D, in response to detecting tap gesture 1020, device 600 displays recovery service interface 1022.

Recovery service interface 1022 includes remove service affordance 1024. In response to selection of remove service affordance 1024, via tap gesture 1026, device 600 initiates a process for disabling the account recovery service for the user account. In some embodiments, the recovery service associated with recovery service interface 1022 is a first party, cloud-based recovery service provided by the manufacturer of device 600 and/or the provider of the operating system of device 600 (e.g., a default recovery service).

In some embodiments, the process for disabling the account recovery service includes determining whether a set of service removal criteria have been met. In some embodiments, the set of service removal criteria includes a criterion that is met when an alternative account recovery function is enabled for the user account. Such alternative account recovery functions include but are not limited to recovery contacts and recovery keys.

If device 600 (or an external device in communication with device 600) determines that service removal criteria is not met, device 600 prompts a user to enable (e.g., add) an alternative account recovery function for their user account. For example, as illustrated in FIG. 10E, device 600 determines that service removal criteria is not met (e.g., no alternative account recovery function is enabled for the user account) and displays add recovery function interface 1028 including continue affordance 1028a and cancel affordance 1028b. In some embodiments, add recovery function interface 1028 is overlaid on recovery assistance interface 1022.

In response to selection of continue affordance 1028a, device 600 initiates a process for adding an alternative account recovery function (e.g., recovery contact) to the user account (e.g., a process for adding a recovery contact as described with respect to FIGS. 6C-6J). Thereafter, the user, optionally, completes the process for disabling the account recovery service, as described below. In response to selection of affordance 1028b, device 600 ceases display of add recovery function interface 1028 and terminates the process for disabling the account recovery service.

FIGS. 10F-10I illustrate techniques for disabling an account recovery service for a user account in which an alternative account recovery function is enabled.

In FIG. 10F, device 600 displays account recovery interface 1016 (e.g., in response to selection of an account recovery affordance of a security interface, such as the tap gesture 1014 of FIG. 10B). Account recovery interface 1016 includes recovery service affordance 1018 and add recovery function affordance 1092. As described, selection of add recovery function affordance 1092 initiates a process for adding an account recovery function for a user account (e.g., Jane Appleseed's account) (e.g., as described with respect to process 600). Because an alternative account recovery function (e.g., recovery contact John Appleseed) is enabled for the user account, account recovery interface 1016 further includes recovery contact affordance 1030 corresponding to a recovery contact of the user account.

While displaying account recovery interface 1016, device 600 detects selection of recovery service affordance 1018. The selection is a tap gesture 1032 on recovery service affordance 1018. As shown in FIG. 10G, in response to detecting tap gesture 1032, device 600 displays recovery service interface 1022.

Recovery service interface 1022 includes recovery service removal affordance 1024. In response to selection of remove service affordance 1024, device 600 initiates a process for disabling the account recovery service for the user account.

As described, the process for disabling the account recovery service includes determining whether a set of service removal criteria have been met. If device 600 (or an external device in communication with device 600) determines that the set of service removal criteria have been met, device 600 disables the account recovery service for the user account. In response to selection of remove service affordance 1024, device 600 displays a completion interface. For example, while displaying recovery service interface 1022, device 600 detects selection of remove service affordance 1024. The selection is a tap gesture 1034 on remove service affordance 1024. As shown in FIG. 10H, in response to selection of remove service affordance 1024, device 600 displays completion interface 1036. In some embodiments, one or more confirmation notifications and/or interfaces (e.g., notifications and/or interfaces requiring additional confirmation inputs) are shown prior to completing the removal and display of completion interface 1036.

Figure 10J:
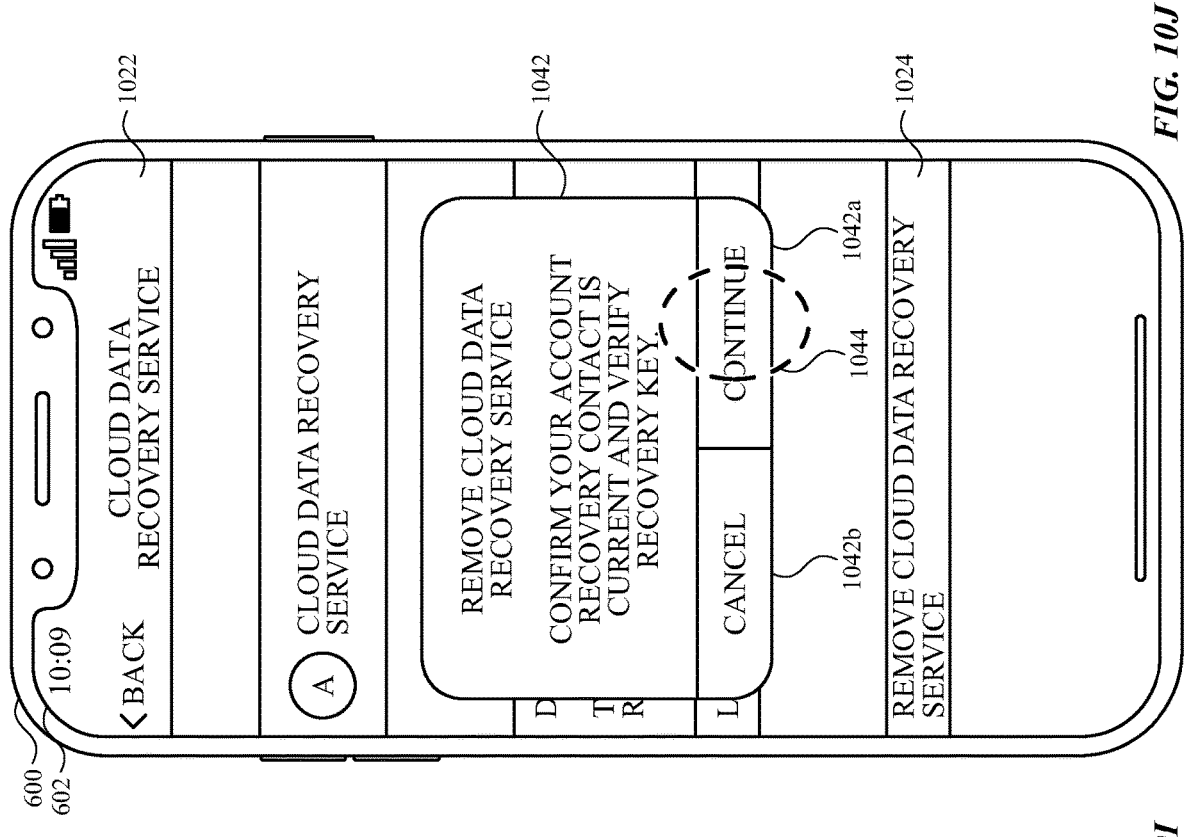
Figure 10I:
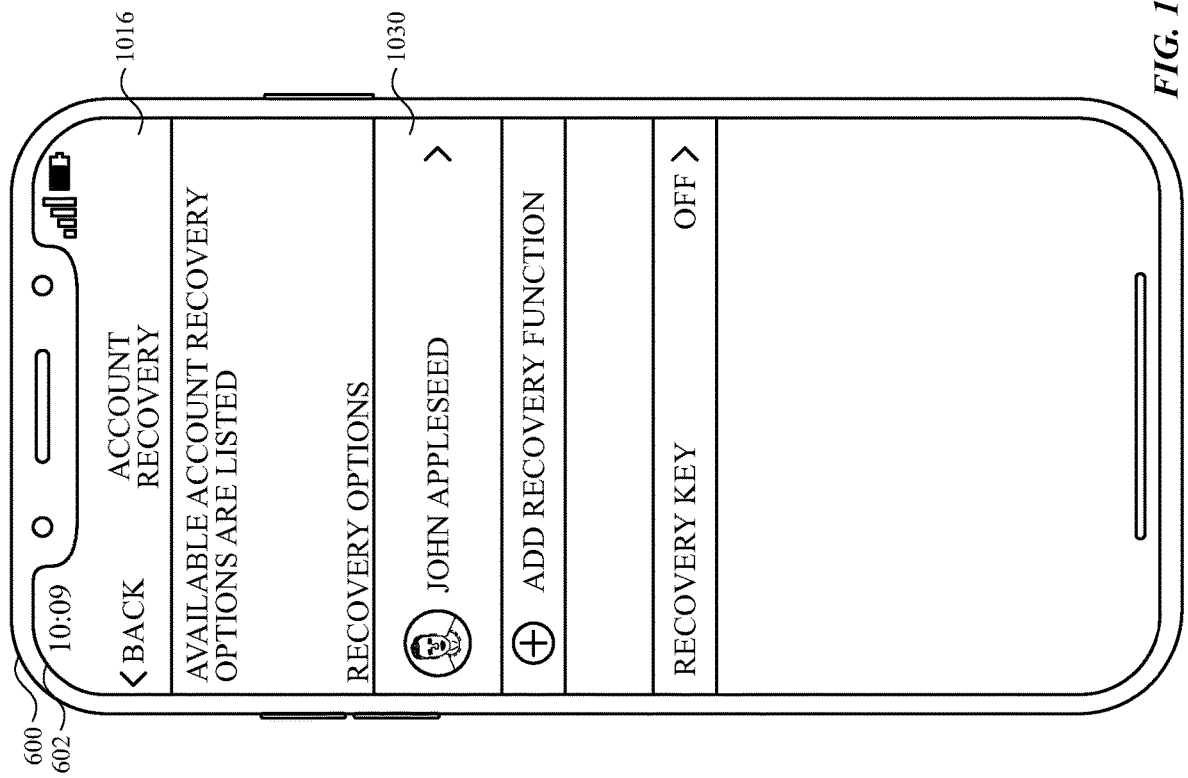

Completion interface 1036 includes information 1037 and completion affordance 1038. Information 1037 indicates that the process to disable the account recovery service for the user account has been completed, and optionally, that account recovery for the user account requires use of an alternative account recovery function. In response to selection of completion affordance 1038, device 600 displays (e.g., resumes display of) account recovery interface 1016, as shown in FIG. 10I. Because the account recovery service has been disabled for the user account, recovery service affordance 1018 (FIG. 6F) is no longer included in account recovery interface 1016.

In some embodiments, prior to completing the process to disable an account recovery service, device 600 requires that a user confirms one or more aspects of an alternative account recovery function. For example, as shown in FIG. 10J, device 600 displays confirmation interface 1042 (e.g., after receiving tap gesture 1034 and prior to displaying completion interface 1036). In some embodiments, confirmation interface 1042 is displayed (e.g., overlaid on recovery service interface 1022) in response to selection of a remove service affordance, such as remove service affordance 1024 (FIG. 10G). Confirmation interface 1042 includes continue affordance 1042a and cancel affordance 1042b. In response to selection of cancel affordance 1042b, devices 600 terminates the process for disabling the account recovery service.

Figure 10L:
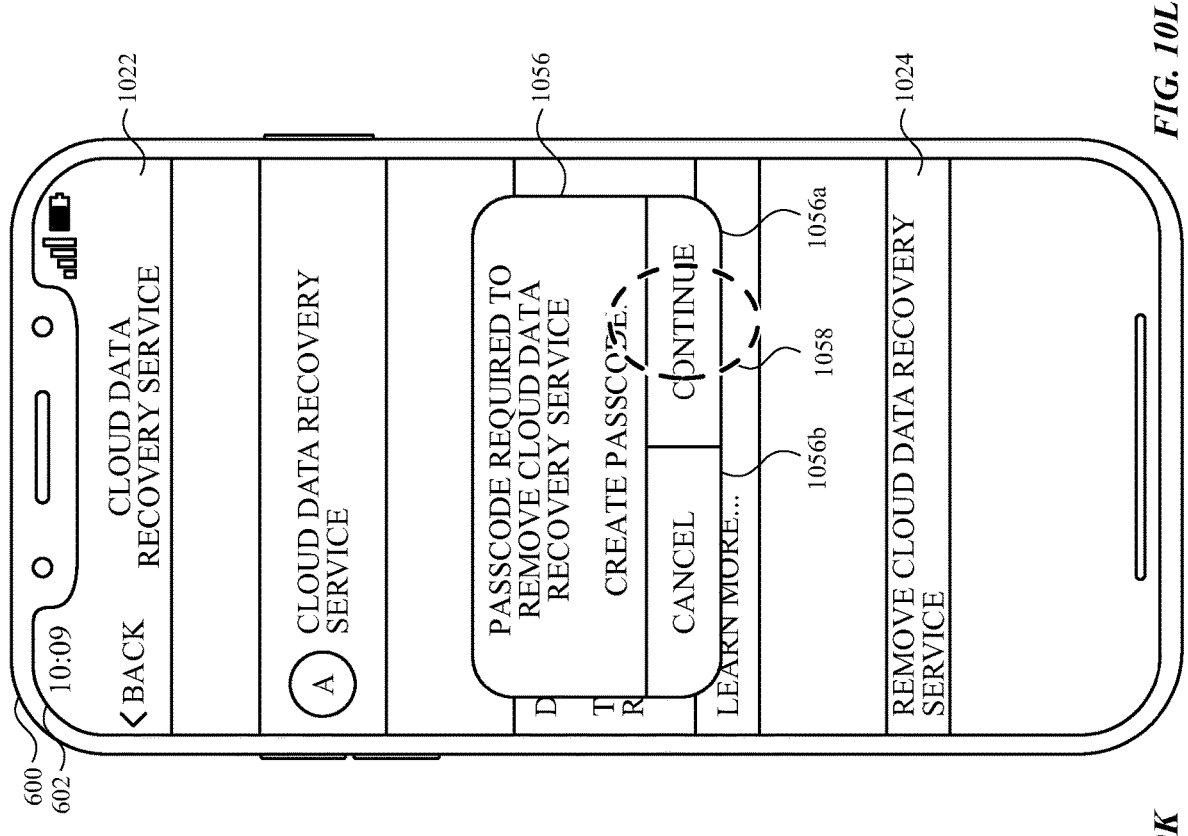
Figure 10K:
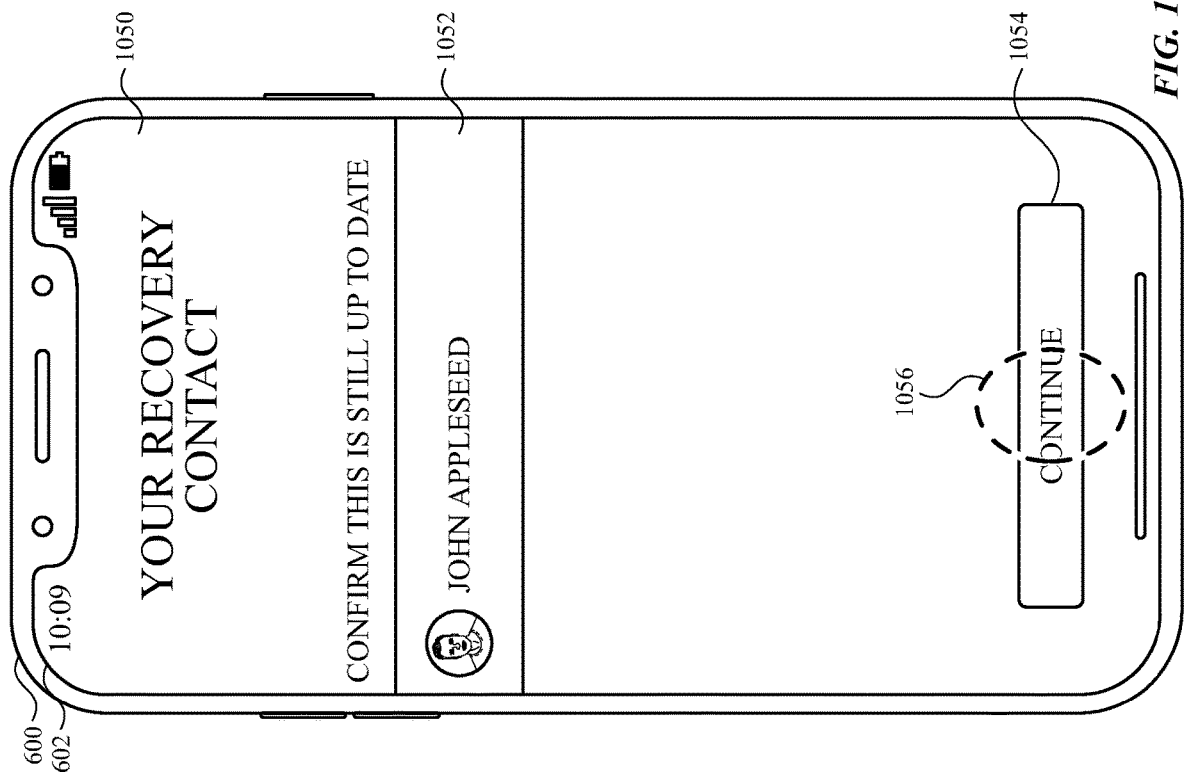

In response to selection of continue affordance 1042a, device 600 initiates a process for confirming information associated with a recovery contact to the user account. In response to selection of continue affordance 1042a, device 600 displays a recovery contact confirmation interface. For example, while displaying confirmation interface 1042, device 600 detects selection of continue affordance 1042a. The selection is a tap gesture 1044 on continue affordance 1042a. As shown in FIG. 10K, in response to detecting tap gesture 1044, device 600 displays recovery contact confirmation interface 1050.

Recovery contact confirmation interface 1050 includes recovery contact affordance 1052 and continue affordance 1054. Selection of recovery contact affordance 1052 allows for a user to confirm and/or update one or more aspects of a recovery contact corresponding to recovery contact affordance 1052 (e.g., John Appleseed). For example, selection of recovery contact affordance 1052 causes, in some embodiments, device 600 to display one or more interfaces through which a user can specify information associated with the recovery contact. In response to selection of continue affordance 1054, device 600 completes the process for disabling the account recovery service and displays a completion interface, such as completion interface 1036 (FIG. 10H), indicating that the process for disabling the account recovery service has been completed.

While description is made herein with respect to device 600 providing for a user to confirm details associated with a recovery contact it will be appreciated that, in some embodiments, device 600 additionally or alternatively confirms (or initiates a process to confirm via an external device) information about one or more other alternative account recovery functions, such as an additional recovery contact and/or a recovery key (e.g., confirming that a user is in possession of a recovery key prior to removal of the account recovery service). Thereafter, the user, optionally, completes the process for disabling the account recovery service, as described.

In some embodiments, after initiating the process to disable the account recovery service (e.g., in response to selection of recovery service removal affordance 1024 (FIG. 10D), device 600 determines whether a passcode is enabled on device 600. If so, device 600 continues to perform the process to disable the account recovery service, as described. If not, device 600 prompts a user to provide a passcode for device 600. For example, as shown in FIG. 10L, if device 600 determines that no passcode is enabled on device 600, device 600 displays passcode interface 1056. In some embodiments, passcode interface 1056 is overlaid on recovery service interface 1022.

Figure 10N:
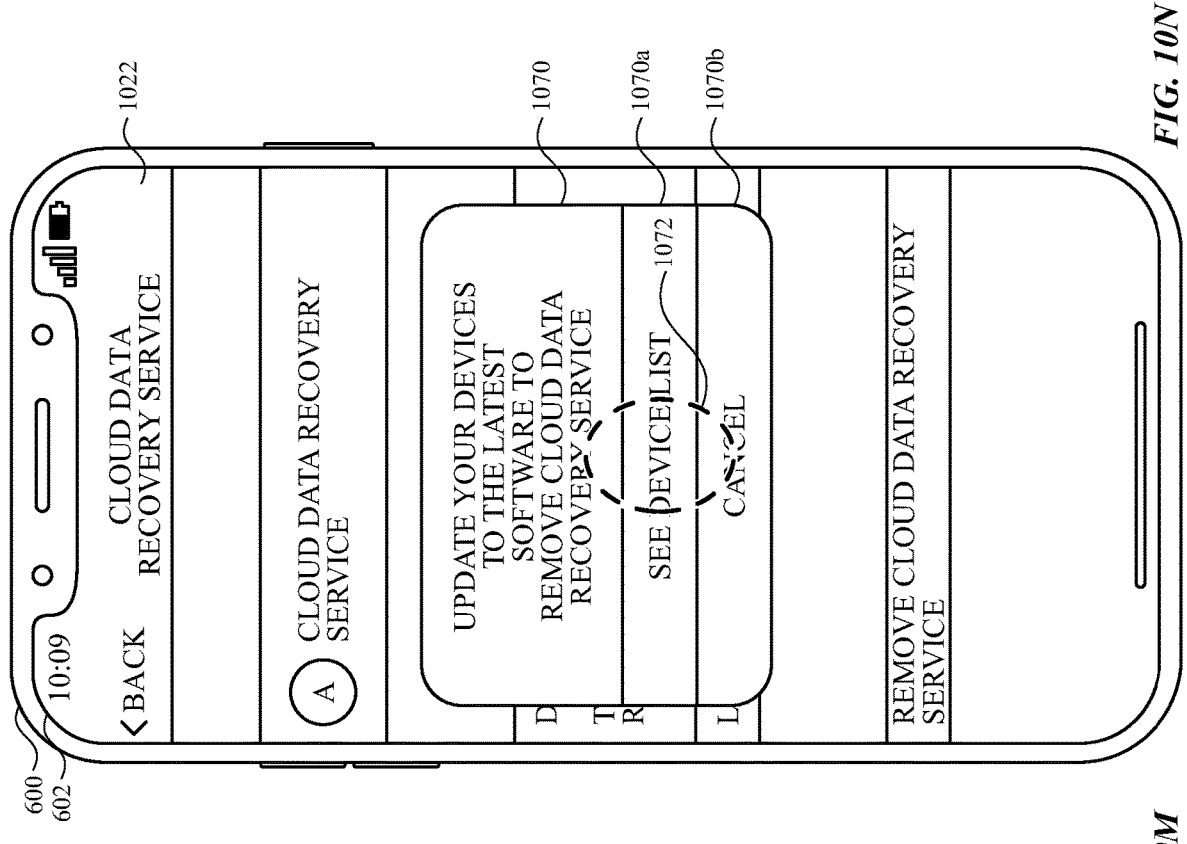
Figure 10M:
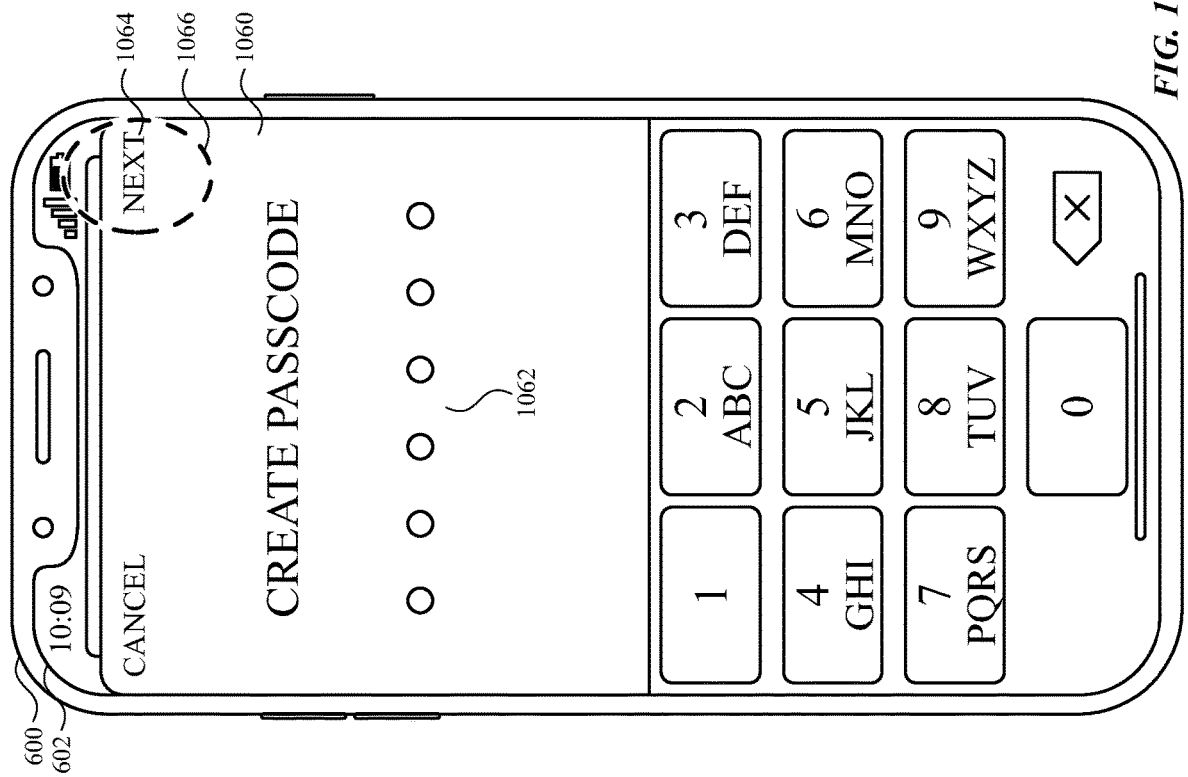

Passcode interface 1056 includes continue affordance 1056a and cancel affordance 1056b. In response to selection of cancel affordance 1056b, devices 600 terminates the process for disabling the account recovery service. In response to selection of continue affordance 1056a, device 600 provides (e.g., displays) a passcode entry interface for providing a passcode. For example, while displaying confirmation interface 1056, device 600 detects selection of continue affordance 1056a. The selection is a tap gesture 1058 on continue affordance 1056a. As shown in FIG. 10M, in response to detecting tap gesture 1058, device 600 displays passcode entry interface 1060.

Passcode entry interface 1060 includes passcode progress indicator 1062 and continue affordance 1064. Passcode progress indicator 1062 indicates the number of passcode digit entries a user has made while entering the passcode, for instance, using the numeric keypad of the passcode entry interface 1060. In some embodiments, passcode progress indicator 1062 displays the numbers selected for the passcode. In other embodiments, passcode progress indicator 1062 does not display the numbers selected for the passcode (e.g., the selected numbers are hidden). In response to selection of continue affordance 1064, device 600, optionally, confirms the passcode is valid and continues to perform the process to disable the account recovery service, as described.

In some embodiments, after (e.g., upon) initiating the process to disable the account recovery service (e.g., in response to selection of recovery service removal affordance 1024 (FIG. 10D), device 600 determines whether software (e.g., an operating system) of device 600 and/or one or more external devices satisfies version criteria. In some embodiments, version criteria is satisfied when a version of software is a particular version (e.g., latest version) of the software.

If device 600 determines that version criteria is met, device 600 continues to perform the process to disable the account recovery service, as described. If not, device 600 terminates the process to disable the account recovery service and provides an indication as to which of device 600 and the one or more external devices include software that does not satisfy the version criteria. For example, as shown in FIG. 10N, if device 600 determines that version criteria is not met, device 600 displays device interface 1070. In some embodiments, device interface 1070 is overlaid on recovery service interface 1022.

Figure 10O:
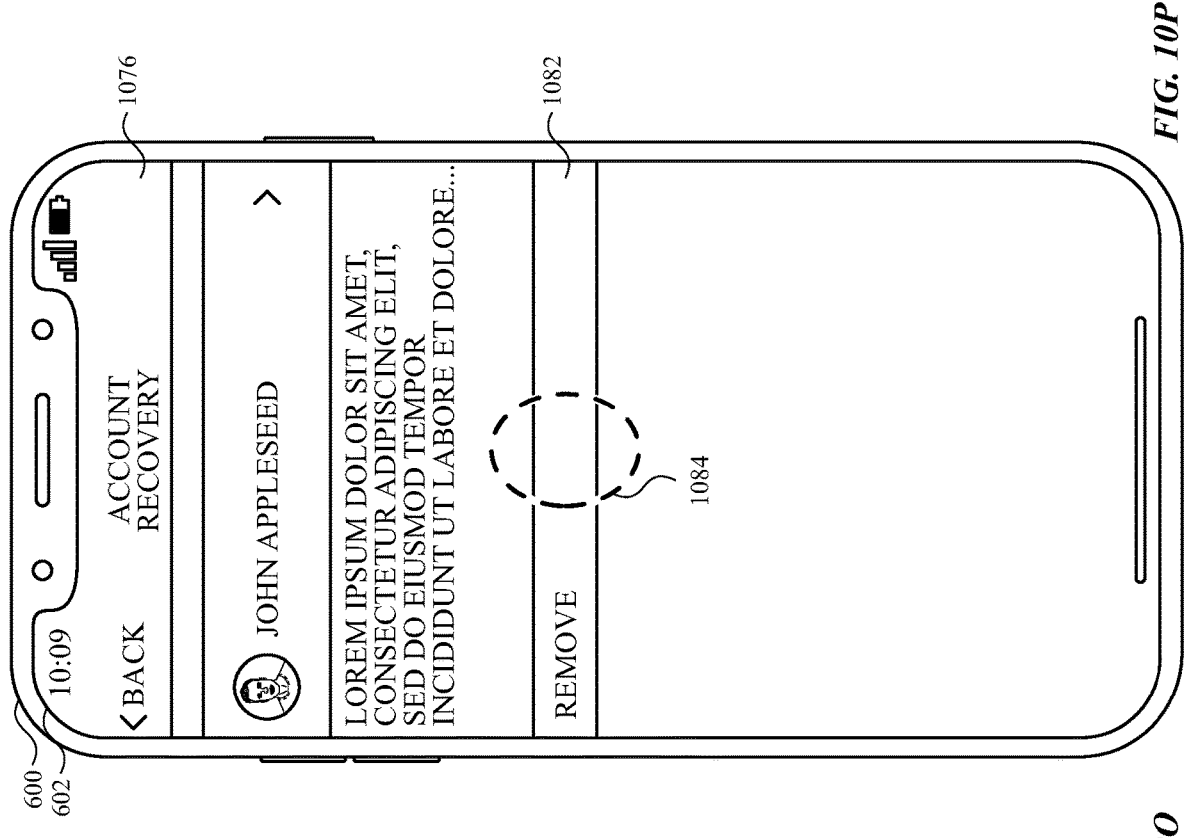

Device interface 1070 includes device list affordance 1070a and cancel affordance 1070b. In response to selection of cancel affordance 1056b, device 600 ceases to display device interface 1070. In response to selection of device list affordance 1070a, device 600 provides (e.g., displays) a device update interface indicating which of the devices include software that failed the version criteria. For example, while displaying device interface 1070, device 600 detects selection of device list affordance 1070a. The selection is a tap gesture 1072 on continue affordance 1070a. As shown in FIG. 10O, in response to detecting tap gesture 1072, device 600 displays device update interface 1074. As illustrated, device update interface 1074 includes a list of devices 1075 and indicates whether each device 1075 has software that satisfies version criteria (e.g., has software that is up-to-date). Thereafter, a user may update software such that all devices have software that satisfies the version criteria and disable the account recovery service by reinitiating the process to disable the account recovery service.

In some instances, a user may wish to remove a recovery contact from a user account for which the account recovery service is disabled. In response, device 600 prompts the user to add an alternative account recovery function (e.g., recovery contact) prior to removing the recovery contact. In this manner, device 600 ensures that at least one recovery function is available for the user account after the recovery contact is removed.

Figure 10P:
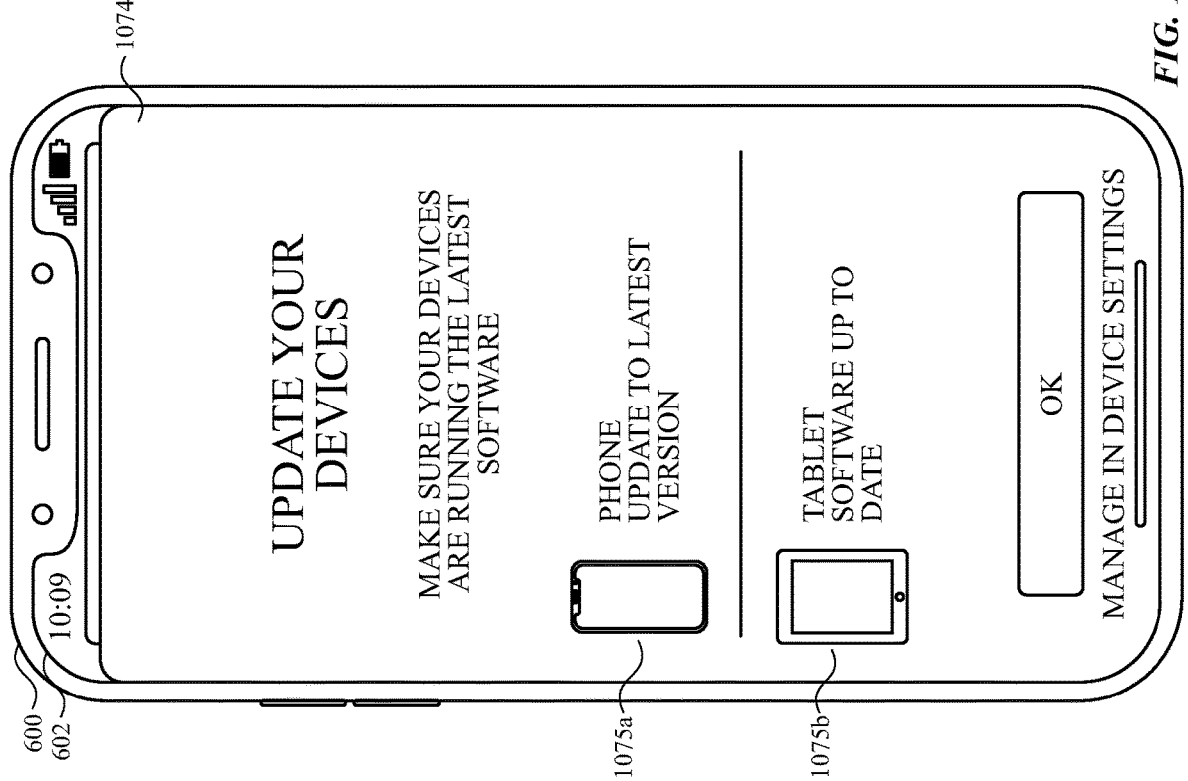

For example, in FIG. 10P, device 600 displays recovery contact interface 1076. Recovery contact interface 1076 includes remove affordance 1082. In response to selection of remove affordance 1082, device 600 initiates a process for removing the recovery contact. In some embodiments, the process for removing the recovery contact includes determining whether another alternative account recovery function is enabled for the user account. If so, the recovery contact is removed from the user account as a recovery contact. If not, device 600 prompts a user to add an alternative account recovery function to their user account. For example, while displaying confirmation interface 1076, device 600 detects selection of remove affordance 1082. The selection is a tap gesture 1084 on remove affordance 1082. As shown in FIG. 10Q, in response to detecting tap gesture 1084, device 600 displays add recovery function interface 1082. In some embodiments, add recovery function interface 1082 is overlaid on confirmation interface 1076.

Add recovery function interface 1082 includes add recovery function interface continue affordance 1082a and cancel affordance 1082b. In response to selection of cancel affordance 1082a, device 600 terminates the process for removing the recovery contact. In response to selection of continue affordance 1082b, device 600 initiates a process for adding an alternative account recovery function (e.g., recovery contact) to the user account.

Figure 10R:
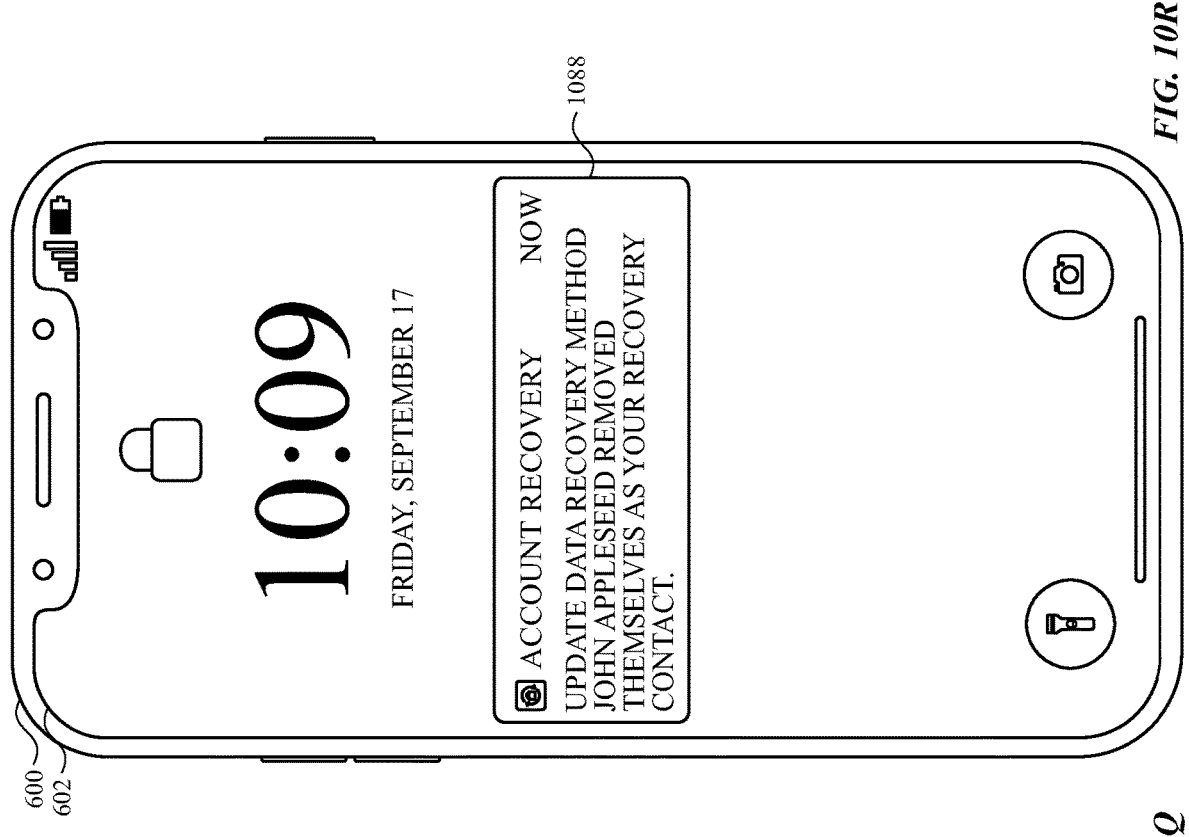
Figure 10Q:
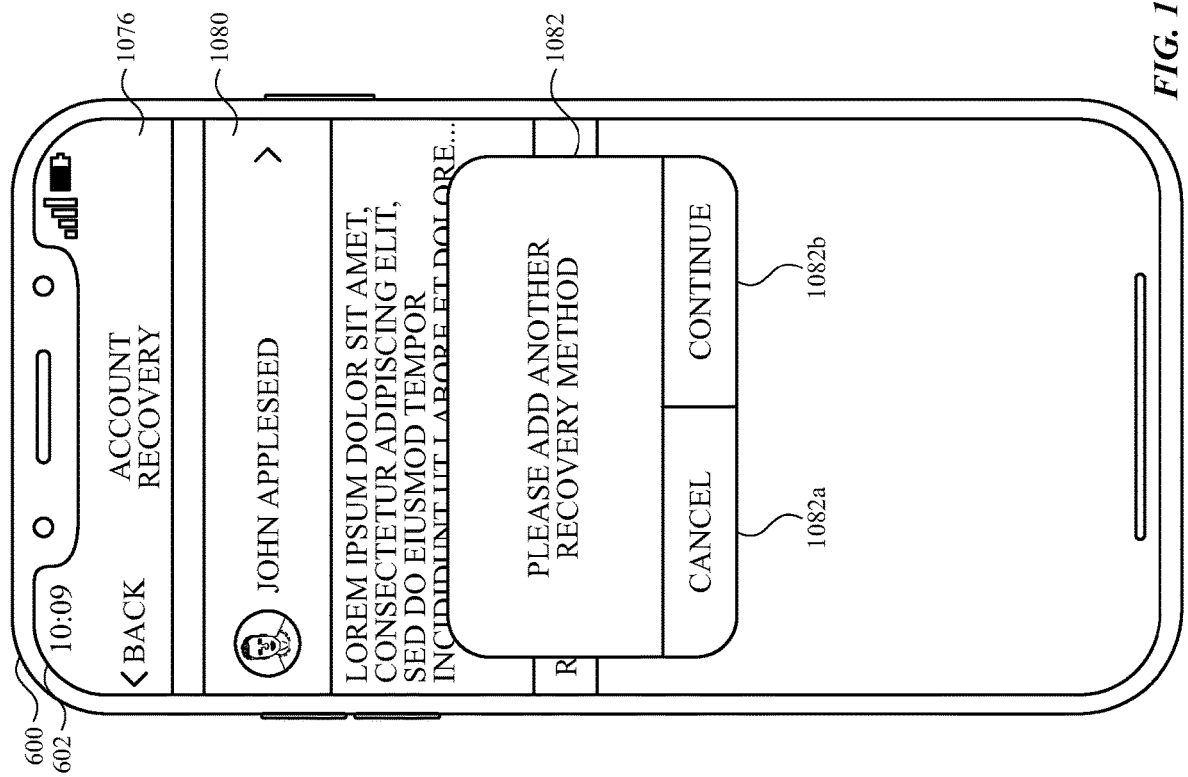
Figure 10T:
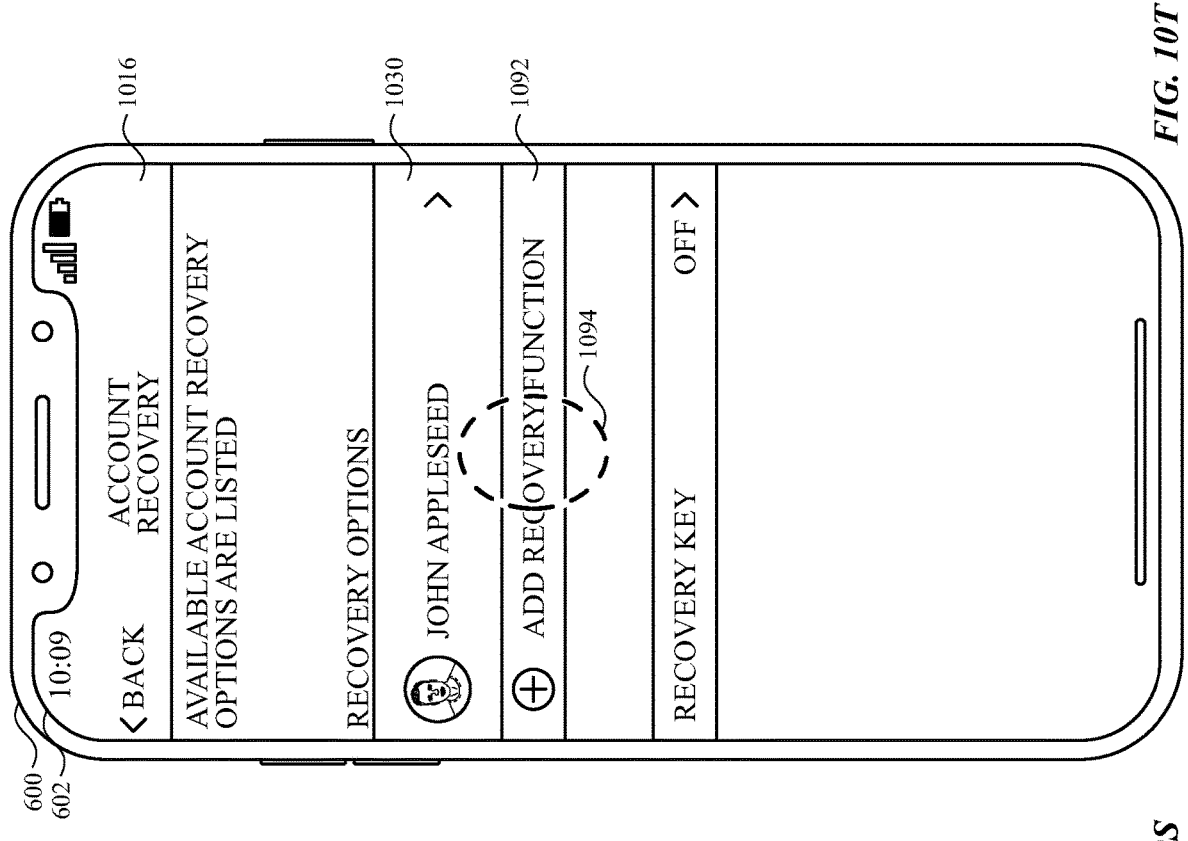
Figure 10S:
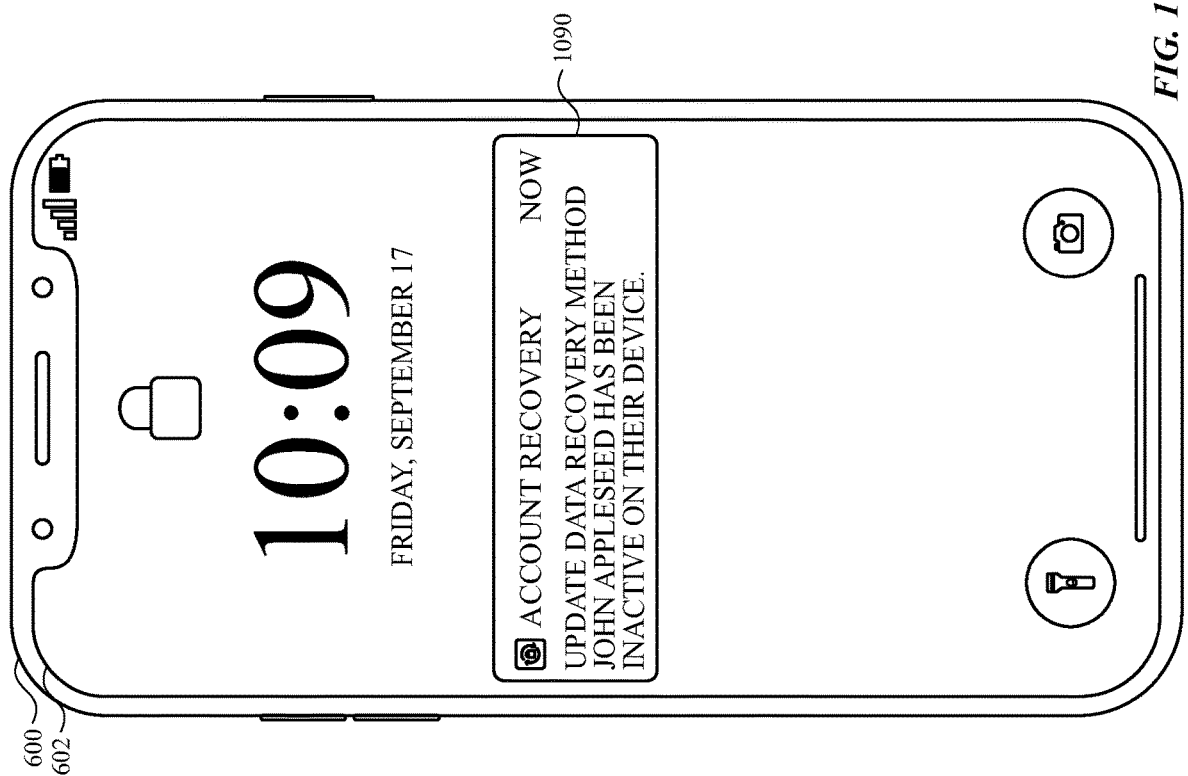

FIGS. 10R-10S illustrate exemplary recovery contact notifications. In some embodiments, device 600 notifies a user if a recovery contact fails to satisfy recovery contact criteria. In some embodiments, recovery contact criteria includes a criterion that is satisfied if a recovery contact has not removed themselves as a recovery contact. Accordingly, if a recovery contact removes themselves as a recovery contact, device 600 displays a notification, such as the notification 1088 of FIG. 10R, indicating that recovery contact has removed themselves as a recovery contact and that the user should update and/or enable one or more alternative account recovery functions for the user account of the user.

In some embodiments, recovery contact criteria includes a criterion that is satisfied if a recovery contact has been active within a threshold amount of time. Accordingly, if a recovery contact is inactive for at least the threshold amount of time (e.g., a week, two weeks, a month, 6 months), device 600 displays a notification, such as the notification 1090 of FIG. 10S, indicating that the recovery contact has been inactive for the threshold amount of time and that the user should update and/or add one or more alternative account recovery functions.

FIGS. 10T-10W illustrate techniques for enabling an account recovery service for a user account. In FIG. 10T, device 600 displays the account recovery interface 1016 including an add recovery function affordance 1092.

As described, selection of recovery function affordance 1092 initiates a process for adding an account recovery function. For example, while displaying account recovery interface 1016, device 600 detects selection of add recovery function affordance 1092. The selection is a tap gesture 1094 on add recovery function affordance 1092. As shown in FIG. 10U, in response to detecting tap gesture 1094, device 600 displays add account recovery function interface 1096.

Add account recovery function interface 1096 includes add recovery contact affordance 1098 and add account recovery service affordance 1000A. In response to selection of the add recovery contact affordance 1098, device 600 initiates a process to add a recovery contact to the user account. In response to selection of the add account recovery service affordance 1000A, device 600 initiates a process for enabling the account recovery service for the user account. For example, while displaying add account recovery function interface 1096, device 600 detects selection of add account recovery service affordance 1000A. The selection is a tap gesture 1002A on add account recovery service affordance 1000A. As shown in FIG. 10V, in response to detecting tap gesture 1002A, device 600 displays add recovery service interface 1004A.

Add recovery service interface 1004A includes add affordance 1006A. In response to selection of add affordance 1006A, the account recovery service is enabled for the user account, and device 600 displays (e.g., resumes display of) account recovery interface 1016, as shown in FIG. 10W. Because the account recovery service has been enabled for the user account, the account recovery interface 1016 includes recovery service affordance 1018.

While description has been made herein with respect disabling an account recovery service for recovery of a user account, in some examples, a user may additionally or alternatively wish to disable web access to data for the user account. In some embodiments, this includes causing a service hosting data for the user account to delete at least a portion of the data for the user account. Data for a user account may thereafter be stored locally on one or more user devices, such as device 600. In some embodiments, disabling web access includes encrypting data hosted by the service such that the service can no longer read the data. FIGS. 10X-10Z illustrate techniques for disabling access to data.

In FIG. 10X, device 600 displays security interface 1010 including data access option 1012A. As illustrated, data access option 1012A is in an enabled state indicating that data associated with the user account can be accessed by the service.

While displaying security interface 1010, device 600 detects selection of data access option 1012A. The selection is a tap gesture 1014A on data access option 1012A. As shown in FIG. 10Y, in response to selection of option 1012A, device 600 displays data access interface 1016A.

Data access interface 1016A includes access removal affordance 1018A. While displaying data access interface 1016A, device 600 detects selection of access removal affordance 1018A. The selection is a tap gesture 1020A on access removal affordance 1018A. As shown in FIG. 10Z, in response to selection of access removal affordance 1018A, device 600 displays security interface 1010 in which data access option 1012A is in a disabled state, indicating that data associated with the user account cannot be accessed by the service.

FIG. 11 is a flow diagram illustrating a method for disabling an account recovery service using a computer system in accordance with some embodiments. Method 1100 is performed at a computer system (e.g., 100, 300, 500, 600) (e.g., a personal computer, a tablet, a smartphone) that is in communication with a display generation component (602) (e.g., a television, a display controller, an internal or external touch-sensitive display system) and one or more input devices (e.g., a touch-sensitive surface, a mouse, a keyboard). Some operations in method 1100 are, optionally, combined, the orders of some operations are, optionally, changed, and some operations are, optionally, omitted.

As described below, method 1100 provides an intuitive way for disabling an account recovery service. The method reduces the cognitive burden on a user for disabling an account recovery service, thereby creating a more efficient human-machine interface. For battery-operated computing devices, enabling a user to disable an account recovery service faster and more efficiently conserves power and increases the time between battery charges.

The computer system (e.g., 600) receives (1102), via the one or more input devices, a set of one or more inputs (e.g., 1026, 1034, 1040, 1044, 1058) (e.g., user inputs) corresponding to a request to disable an account recovery service (e.g., an account recovery service corresponding to the recovery service affordance 1018) for a user account. In some embodiments, the set of one or more inputs includes a touch input (e.g., 1026, 1034, 1040, 1044, 1058). In some embodiments, the set of one or more inputs includes a speech input. In some embodiments, the account recovery service is a cloud-based service for restoring account access (e.g., a cloud-based service that hosts one or more aspects of a user account including authentication information and/or data associated with the user account). In some embodiments, the service is a first-party service (e.g., provided by a developer and/or distributor of an operating system of the computer system). In some embodiments, the service authenticates a user during an authentication process and/or stores data (e.g. photos, contacts, calendar) associated with the user account. In some embodiments, when disabling the account recovery service, the account recovery service is removed from the account recovery service the computer system and/or one or more devices associated with a user account. In some embodiments, when disabling the account recovery service, the account recovery service remains on the computer system (e.g., 600) and/or one or more devices associated with the user account (e.g., 1075a, 1075b).

In response to receiving the set of one or more inputs corresponding to a request to disable the account recovery service, the computer system initiates (1104) a process for disabling the account recovery service for the user account. In some embodiments, disabling the account recovery service from the user account includes disabling the service such that the service is no longer available to perform account recovery using the service.

In some embodiments, the process for disabling the account recovery service for the user account includes (1106), in accordance with a determination that the user account satisfies a set of service removal criteria, disabling (1108) the account recovery service for the user account. In some embodiments, the process includes determining whether the user account satisfies service removal criteria. In some embodiments, the service removal criteria includes a requirement that one or more of a set of alternative account recovery functions (e.g., a recovery contact (e.g., a recovery contact corresponding to recovery affordance 1030) (e.g., a personal contact that is authorized to assist the user of the account with a recovery function), recovery key) is enabled for the user account. In some embodiments, the service removal criteria requires that a user confirm removal of the service, for instance, using a prompt (e.g., 1042) provided (e.g., displayed) by the computer system. In some embodiments, the service removal criteria requires that a user be authenticated, for instance, using biometric authentication (e.g., facial recognition). In some embodiments, the service removal criteria includes a requirement that a security function (e.g., passcode as seen in FIG. 10M) is enabled for the computer system. In some embodiments, the service removal criteria includes a requirement that a version of an operating system of the computer system satisfies version criteria (e.g., is at least a particular version (e.g., as seen in FIGS. 10N-10O). In some embodiments, the service removal criteria includes a requirement that an authentication function is enabled for the computer system and/or the user account (e.g., two-factor authentication). In some embodiments, if the service removal criteria is satisfied, the computer system removes (e.g., disassociates) the account recovery service from the user account. In some embodiments, prior to disabling the account recovery service, the computer system confirms one or more aspects of an alternative account recovery function. In some embodiments, the computer system confirms the identity and/or information of a recovery contact. In some embodiments, the computer system prompts a user to confirm a recovery key. In some embodiments, as a result of disabling the account recovery service, a service associated with the account recovery service no longer has access to data for the user account stored by the service. In some embodiments, disabling the account recovery service disables web-based access to one or more types of data associated with the user account.

In some embodiments, the process for disabling the account recovery service for the user account includes, in accordance with a determination that the user account does not satisfy the set of service removal criteria, displaying (1110), via the display generation component, a prompt to perform a process for enabling an account recovery function for the user account (e.g., 1028). In some embodiments, if the service removal criteria is not satisfied (e.g., no account recovery function is enabled for the user account), the computer system prompts the user to enable an account recovery function for the user account. In some embodiments, enabling the account recovery function includes adding a recovery contact for the user account. In some embodiments, enabling the account recovery function includes generating and/or displaying an account recovery key for the user account. Displaying a prompt to perform a process for enabling an account recovery function if a set of service removal criteria is not satisfied provides a quick and efficient manner for a user to enable the account recovery function when disabling the account recovery service, which reduces the number of inputs needed to perform an operation.

In some embodiments, the service removal criteria includes a criterion that is satisfied when a first alternative account recovery function (e.g., recovery contact, recovery key) is enabled for the user account (e.g., as described with reference to FIGS. 10A-10E). Requiring that a first alternative account recovery function is enabled prior to disabling the account recovery service ensures that a user can quickly and efficiently recover their account even after disabling the account recovery service, which reduces the number of inputs needed to perform an operation.

In some embodiments, the account recovery service is a first-party service (e.g., the account recovery service is provided by a manufacturer and/or provider of the computer system and/or the operating system of the computer system (e.g., as described with reference to FIG. 10D).

In some embodiments, prior to receiving the set of one or more inputs (e.g., 1026, 1034, 1040, 1044, 1058), the computer system displays an account recovery interface (e.g., 1016) (e.g., a settings interface for configuring and/or managing account recovery features). In some embodiments, in accordance with a determination that an authentication function of a first type (e.g., two-factor authentication) is enabled (e.g., enabled for the user account and/or for the computer system), the account recovery interface includes an affordance (e.g., 1024), that, when selected, initiates the process for disabling the account recovery service for the user account. In some embodiments, the set of one or more inputs (e.g., 1026, 1034, 1040, 1044, 1058) includes an input corresponding to the affordance that, when selected, initiates a process for disabling the account recovery service. In some embodiments, in accordance with a determination that the authentication function of the first type (e.g., two-factor authentication) is not enabled, the account recovery interface does not include the affordance (e.g., 1024) that, when selected, initiates a process for disabling the account recovery service for the user account. In some embodiments, the affordance (e.g., 1024) to remove the account recovery service is only available if a predetermined authentication mechanism, such as two-factor authentication, is enabled on the computer system. Including an affordance that disables the account recovery service in an account recovery interface only if an authentication function is enabled ensures that a user is aware of what account recovery functions are available and/or enabled on a device, which provides improved visual feedback.

In some embodiments, the process for disabling the account recovery service for the user account further includes, in accordance with a determination that prompting criteria is met, issuing (e.g., displaying, outputting audibly) a prompt (e.g., 1042) to confirm information corresponding to a second alternative account recovery function (e.g., recovery contact John Appleseed). In some embodiments, the prompting criteria is met when the process for disabling the account recovery service for the user account has been initiated and an alternative account recovery function is enabled for the user account. In some embodiments, the computer system prompts the user of the user account to confirm information regarding an account recovery function (e.g., recovery contact and/or recovery key associated with the user account). In some embodiments, the prompt is a notification (e.g., 1098) displayed on the display generation component of the computer system and, optionally, includes instructions (e.g., 1037) for recovering the user account using the alternative recovery function.

In some embodiments, the process for disabling the account recovery service for the user account further includes, in accordance with a determination that a passcode security function is not enabled on the computer system, initiating a process to enable the passcode security function. In some embodiments, the process for disabling the account recovery service includes determining whether a passcode security function is not enabled on the computer system. If not, the computer system prompts (e.g., using interface 1056) a user of the computer system to provide a passcode for the computer system. In some embodiments, the process for disabling the account recovery service includes determining whether one or more devices (e.g., the computer system and/or one or more other devices associated with the user account) have a particular version of an operating system. If not, the computer system prompts (e.g., using interface 1072) the user to update the operating system on the devices that do not have the particular version of the operating system. In some embodiments, if the computer system determines that a device does not have the particular operating system, the computer system ends the process for disabling the account recovery service for the user account.

In some embodiments, after disabling the account recovery service for the user account, the computer system receives a request to enable (e.g., add) the account recovery service for the user account (e.g., 1094, 1002A, 1008A). In some embodiments, in response to the request to enable the account recovery service for the user account, the computer system initiates a process for enabling the account recovery service for the user account. In some embodiments, enabling the account recovery service for the user account includes enabling the service such that the service is available to perform account recovery using the service. In some embodiments, enabling the account recovery service requires that a user be authenticated, for instance, using biometric authentication (e.g., facial recognition).

In some embodiments, after disabling the account recovery service for the user account, the computer system receives an indication (e.g., 1088, 1090) that a recovery contact associated with the user account has failed to satisfy recovery contact criteria. In some embodiments, if a recovery contact fails to satisfy recovery contact criteria, the computer system receives an indication (e.g., 1088, 1090) from an external device indicating the same. In some embodiments, the indication is received from a remote server, such as a first-party remote server. In some embodiments, in response to the indication that the recovery contact associated with the user account has failed the recovery contact criteria, the computer system displays, via the display generation component, a notification indicating that the recovery contact associated with the user account has failed the recovery contact criteria. In some embodiments, the computer system notifies the user that the user's recovery contact has failed to satisfy recovery contact criteria. In some embodiments, recovery contact criteria is not satisfied if the recovery contact removes themselves as a recovery contact, for instance, using their own device (e.g., resulting in device 600 displaying notification 1088). In some embodiments, recovery contact criteria is not satisfied if the recovery contact is inactive (e.g., does not use a particular device, does not login into a corresponding user account) for at least a threshold amount of time (e.g., resulting in device 600 displaying notification 1090). In some embodiments, selection of the notification initiates a process for selecting a new recovery contact. In some embodiments, the notification is displayed on a lock screen (e.g., lock screen of FIGS. 6R, 6S) and/or a home screen of the computer system. In some embodiments, the notification is displayed in a settings interface of a settings application of the computer system. Displaying a notification that a recovery contact has failed recovery contact criteria allows a user to quickly and efficiently determine that one or more changes are necessary to maintain a current and reliable recovery contact for account recovery, which provides improved visual feedback.

In some embodiments, the recovery contact criteria includes a criterion that is met when the recovery contact has not removed themselves as a recovery contact (e.g., for the user account) (e.g., as described with reference to FIG. 10R).

In some embodiments, the recovery contact criteria includes a criterion that is met when the recovery contact has been active (e.g., active on one or more devices and/or accounts associated with the recovery contact) within a predetermined period of time (e.g., a week, a month, two months, 6 months (e.g., as described with reference to FIG. 10S).

In some embodiments, in accordance with a determination (e.g., a determination made after disabling the account recovery service) that a process to sign the user account out of the last device to which the user account is signed in, the computer system provides a prompt to add a recovery method.

Note that details of the processes described above with respect to method 1100 (e.g., FIG. 11) are also applicable in an analogous manner to the methods described below. For example, method 700 optionally includes one or more of the characteristics of the various methods described above with reference to method 1100. For example, adding a recovery contact, as described in method 700, could be used to add a recovery contact when disabling an account recovery service, as described in method 1100. For brevity, these details are not repeated below.

FIGS. 12A-12K illustrate exemplary user interfaces for managing data access, in accordance with some embodiments. The user interfaces in these figures are used to illustrate the processes described below, including the processes in FIG. 13.

Generally, techniques for managing data access described below enable a user to access data of their user account even when a service (e.g., first-party service) hosting the data does not have access to the data (e.g., the data is encrypted such that the service cannot read the data, as described above with respect to FIGS. 10X-10Z). As will be described in more detail below, in some embodiments, the user accesses the data by temporarily authorizing the service to access the data such that the user can in turn access the data via the service.

Figure 12A:
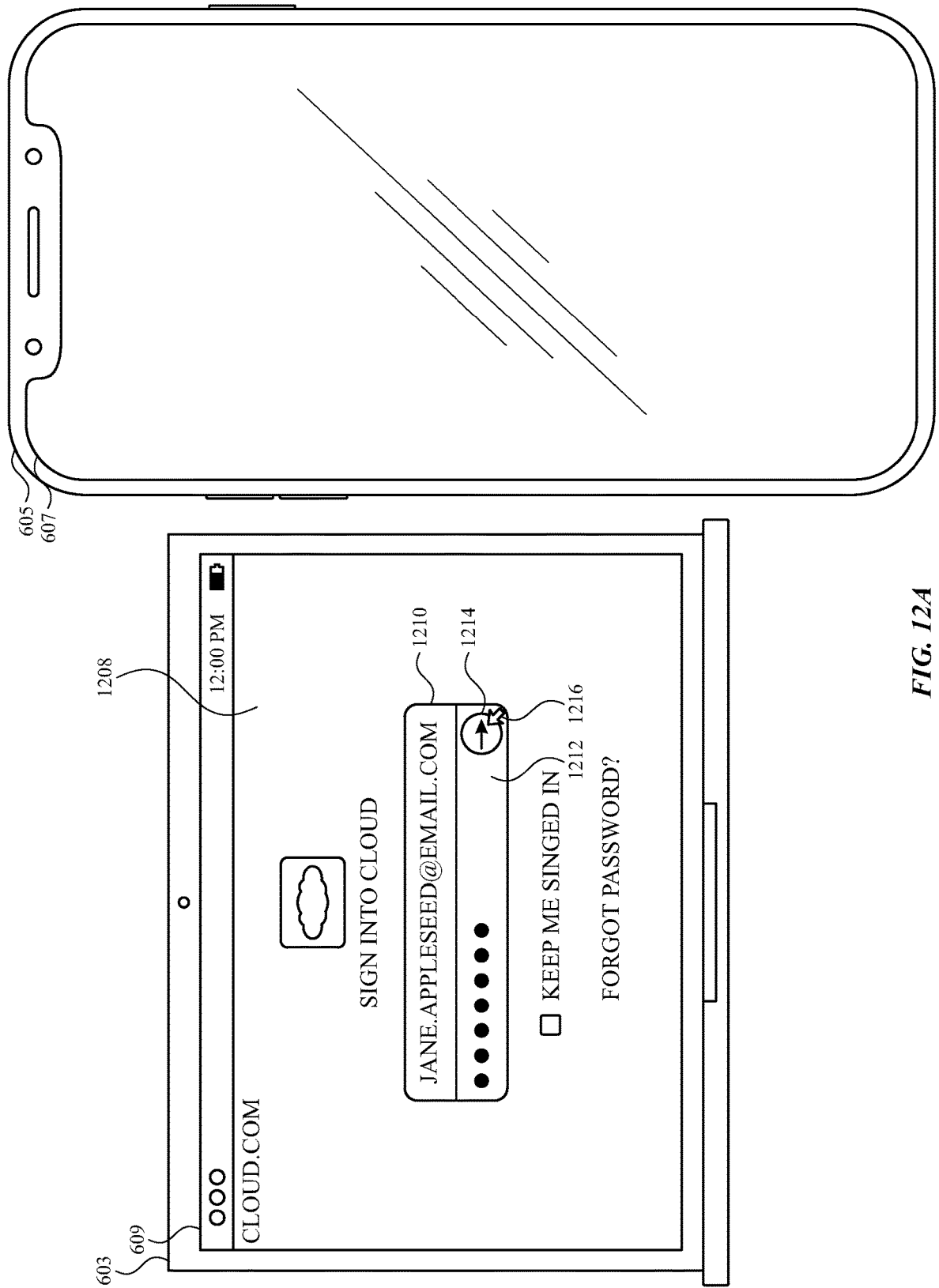
FIGS. 12A-12K illustrate exemplary user interfaces for managing data access in accordance with some embodiments.

FIGS. 12A-12F illustrate techniques for providing access to data of a user account in which access to the data by the service hosting the data has been disabled. FIG. 12A illustrates electronic devices 603, 605. In FIG. 12A, each of electronic devices 603, 605 is a multifunction device (e.g., portable multifunction device) and has one or more components described above in relation to one or more of devices 100, 300, 500, and/or 600. In some embodiments, devices 603, 605 are in communication with each other and/or one or more external devices, such as a remote server of a service.

In FIG. 12A, device 603 displays, on display 609, login interface 1208, which can be a user interface of a web browser in some embodiments. Login interface 1208 includes username field 1210, password field 1212, and submit affordance 1214. Username field 1210 and password field 1212 are used to provide respective user account credentials to initiate a process to authenticate a user of device 603 in response to selection of submit affordance 1214.

Figure 12B:
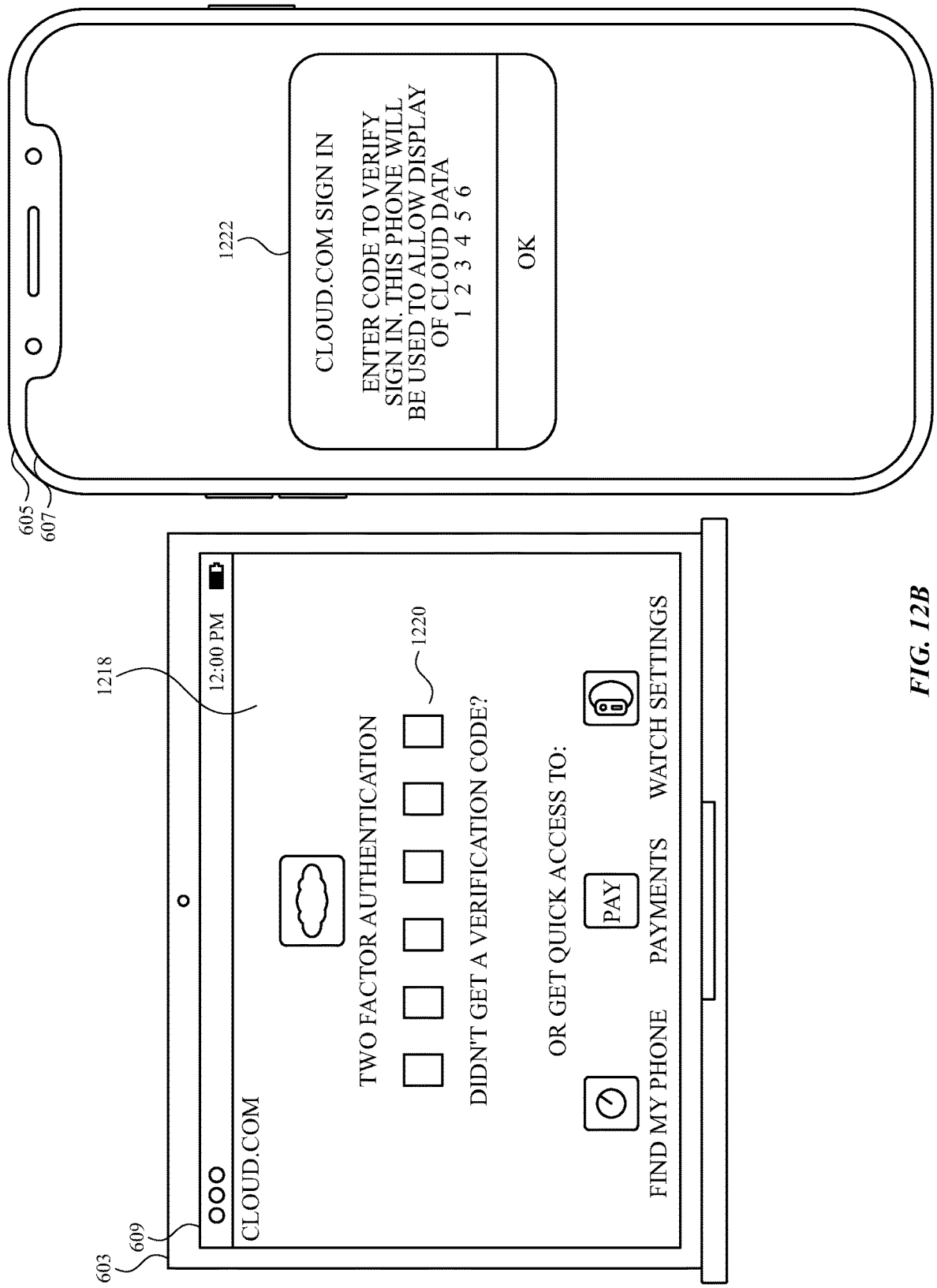

For example, while displaying login interface 1208, device 603 receives credentials for a user Jane Appleseed in username field 1210 and password field 1212, respectively, and detects selection of the submit affordance 1214. The selection is a user input 1216 (e.g., mouse click) on the submit affordance 1214. In response to user input 1216, device 603 initiates, using the credentials, authentication of a user with a service (e.g., first-party service) hosting data for a user account of the user. In some embodiments, authentication with the service requires two-factor authentication. Accordingly, as shown in FIG. 12B, after submitting the credentials, device 603 displays authentication interface 1218, prompting the user to perform two-factor authentication using devices 603, 605.

Figure 12C:
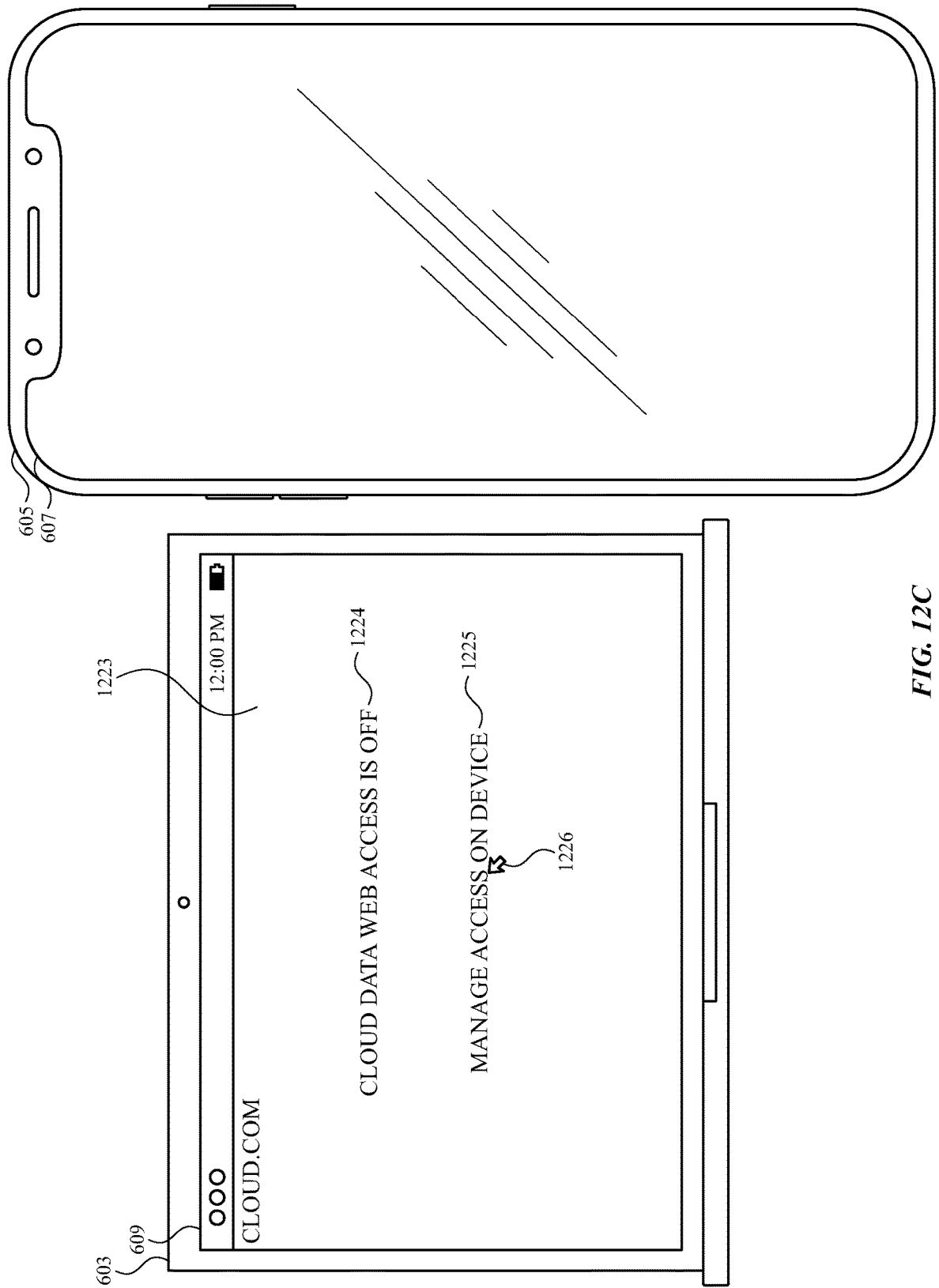

Authentication interface 1218 includes passcode indicator 1220, in which the user can enter a passcode provided to device 605 by the service (e.g., provided in notification 1222). Once the passcode has been entered such that two-factor authentication is complete, the user is authenticated and device 603 displays a user account interface 1223, as shown in FIG. 12C.

Because data access has been disabled for the service, user account interface 1223 includes information 1124 indicating that the service cannot access data for the user account. User account interface 1223 further includes access affordance 1225, which when selected, initiates a process for enabling (e.g., temporarily enabling) data access by the service such that the user can access the data using device 603 (or device 605).

Figure 12D:
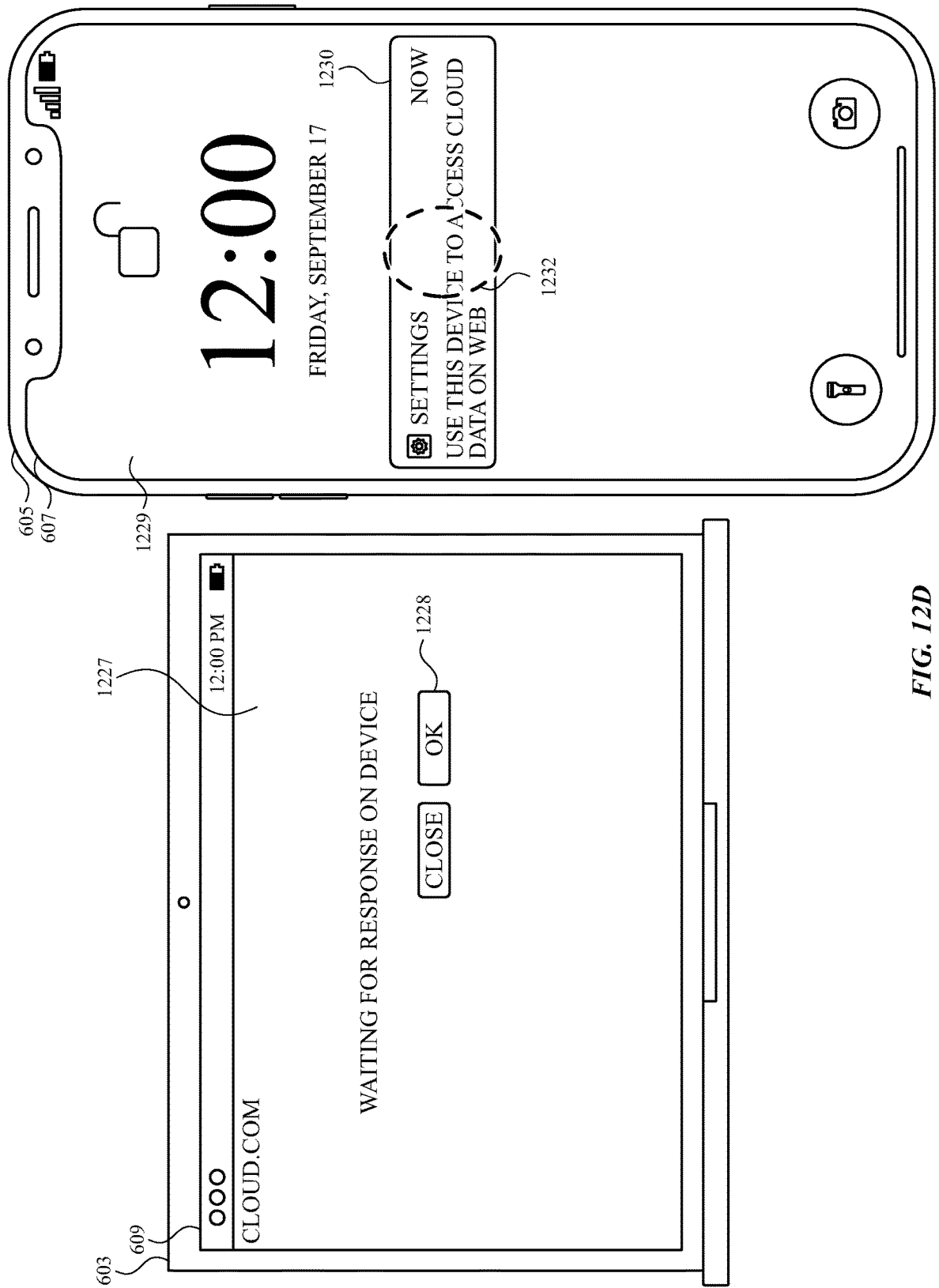

For example, while displaying user account interface 1223, device 603 detects selection of access affordance 1225. The selection is a user input 1226 (e.g., mouse click) on access affordance 1225. As shown in FIG. 12D, in response to selection of access affordance 1225, device 603 displays confirmation interface 1227 and device 605 displays notification 1230 on lock screen interface 629. Confirmation interface 1227 includes acknowledgement affordance 1228, which when selected, causes device 603 to display a data interface, described in further detail below.

Figure 12E:
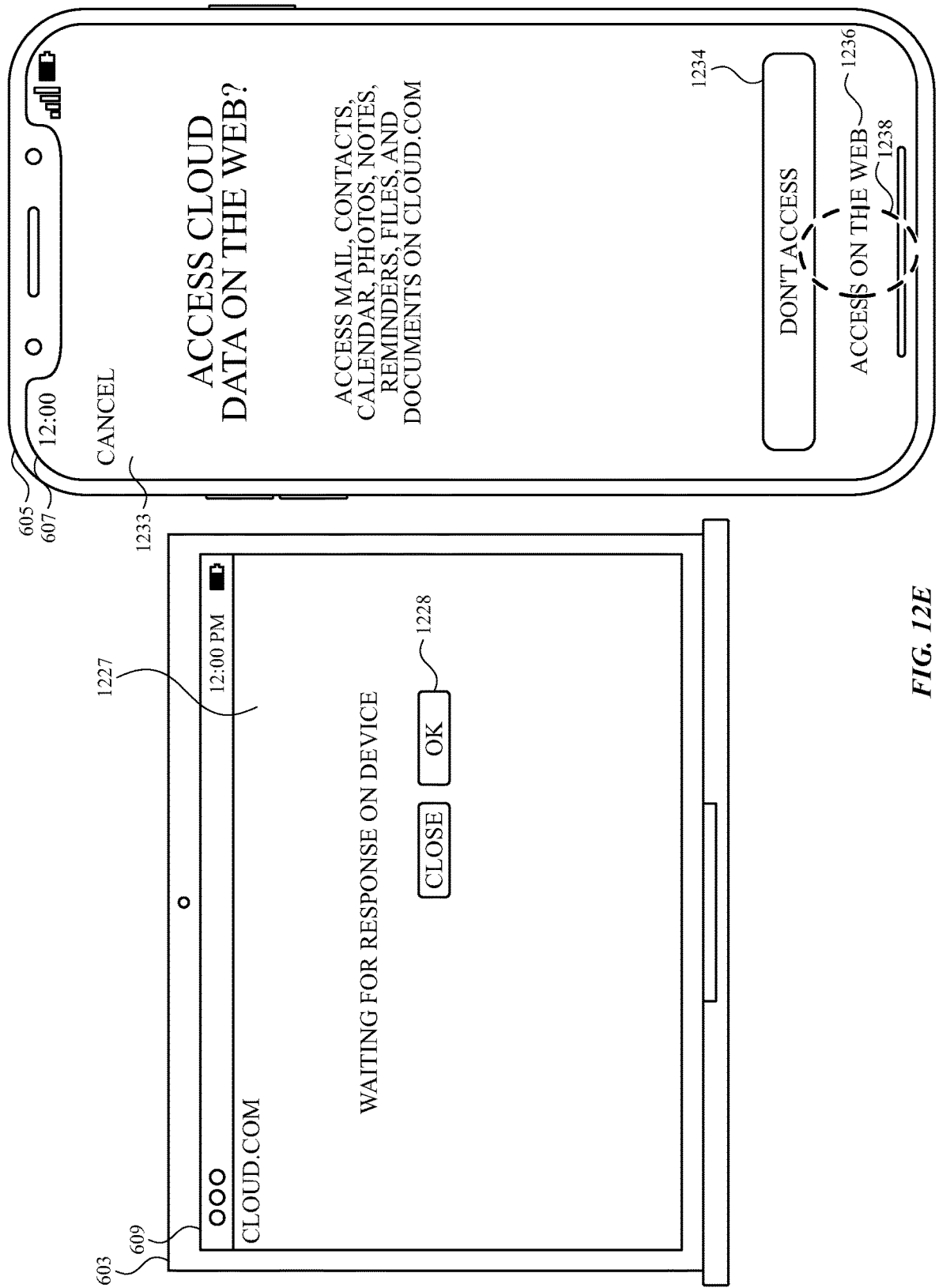

In response to selection of notification 1230, device 605 prompts a user to authorize the service to access data associated with the user account. For example, while displaying notification 1230 on lock screen interface 1229, device 604 detects selection of notification 1230. The selection is a tap gesture 1232 on notification 1230. As shown in FIG. 12E, in response to detecting tap gesture 1232, device 605 displays access authorization interface 1233.

Figure 12F:
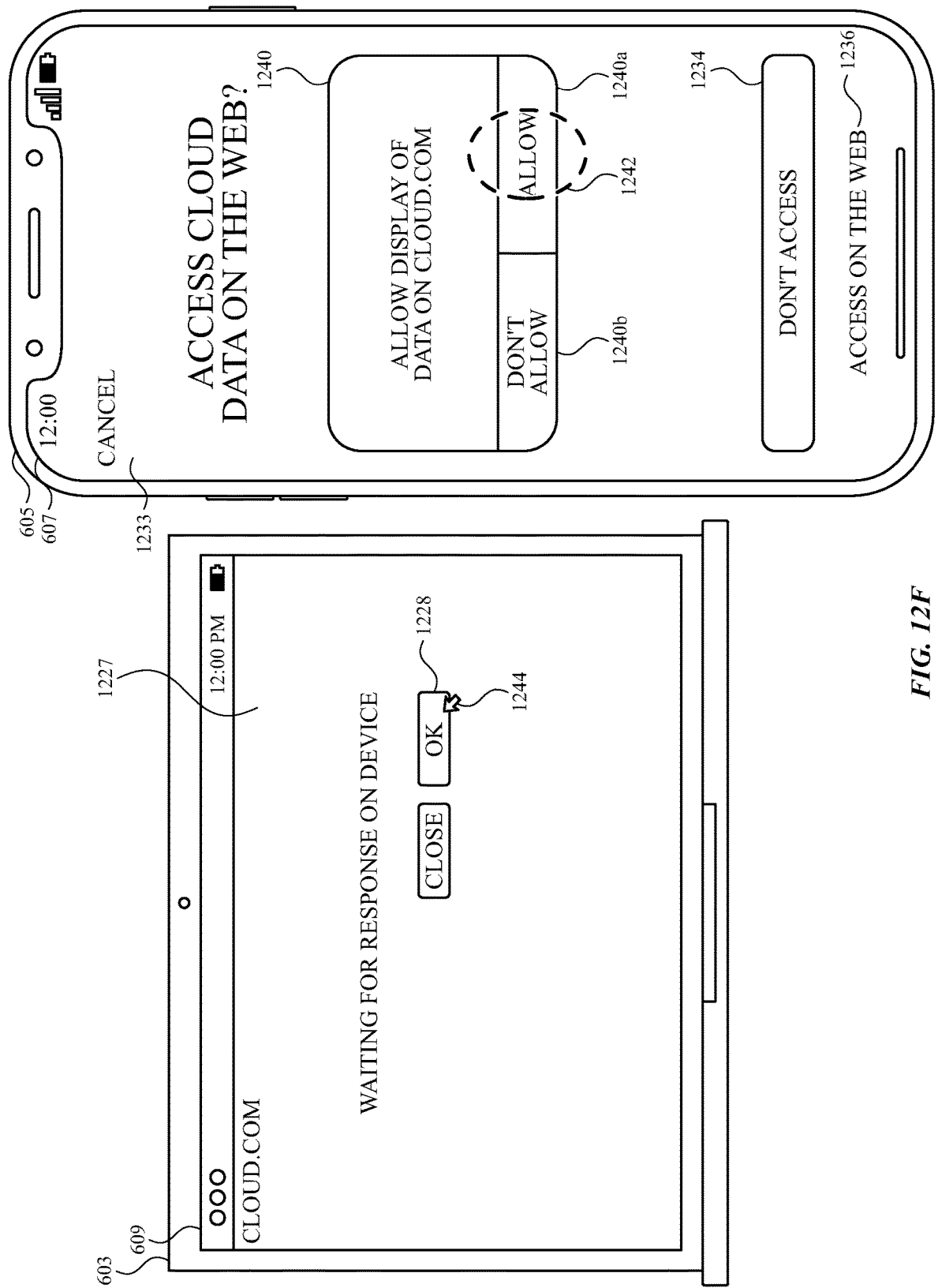

Access authorization interface 1233 includes access rejection affordance 1234 and access approval affordance 1236. Selection of access rejection affordance 1234 causes device 605 to terminate the process for authorizing the service to access data. Selection of access approval affordance 1236 causes device 605 to display an access confirmation interface. For example, while displaying access authorization interface 1233, device 605 detects selection of access approval affordance 1236. The selection is a tap gesture 1238 on access approval affordance 1236. As shown in FIG. 12F, in response to detecting tap gesture 1238, device 605 displays access confirmation interface 1240. In some embodiments, access confirmation interface 1240 is overlaid on access authorization interface 1233.

Access confirmation interface 1240 includes continue affordance 1240*a* and cancel affordance 1240*b*. In response to selection of cancel affordance 1240*b*, device 605 ceases to display access confirmation interface 1240 and, optionally, terminates the process for authorizing the service to access data. In response to selection of continue affordance 1240*a*, device 605 authorizes the service (and device 603, using the service) to access data associated with the user account. In some embodiments, the service is authorized to access data for a predetermined amount of time. In the illustrated example, for instance, the service has been authorized at 12:00 PM to access data for 1 hour.

In some embodiments, the service cannot yet access data even when authorized to access the data. For example, in some embodiments, the service accesses data only after receiving a request for data (e.g., from device 603). In response to the request for data, the service retrieves the necessary decryption key from device 605 to access the data, decrypts the data using the decryption key to access the data, and in turn provides the data (e.g., to device 603) in response to the request. Device 605 provides decryption key(s) in this manner during the time in which the service is authorized to access data.

In some embodiments, data for a user account is encrypted based on data type. For example, photos data may be encrypted using a first key and calendar data may be encrypted using a second key. Accordingly, in some embodiments, the service accesses data based on the type of data being accessed. By way of example, if a request to access data is directed to photos data, the service retrieves a decryption key for photos data, and if a request to access data is directed to files data, the service retrieves a decryption key for files data. Because a user may request to access multiple data types, the service may retrieve multiple decryption keys while authorized to access data.

Figure 12G:
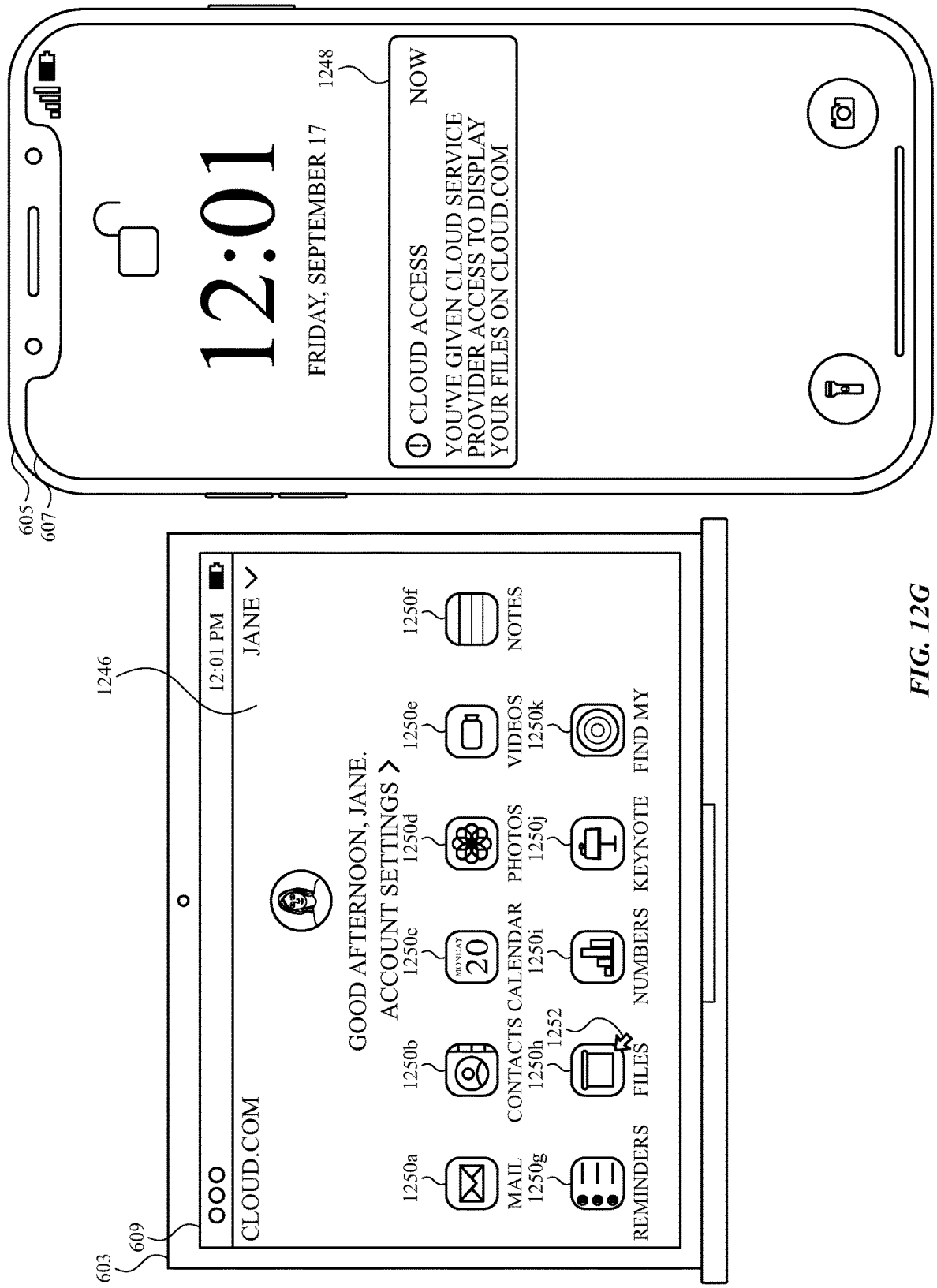
Figure 12H:
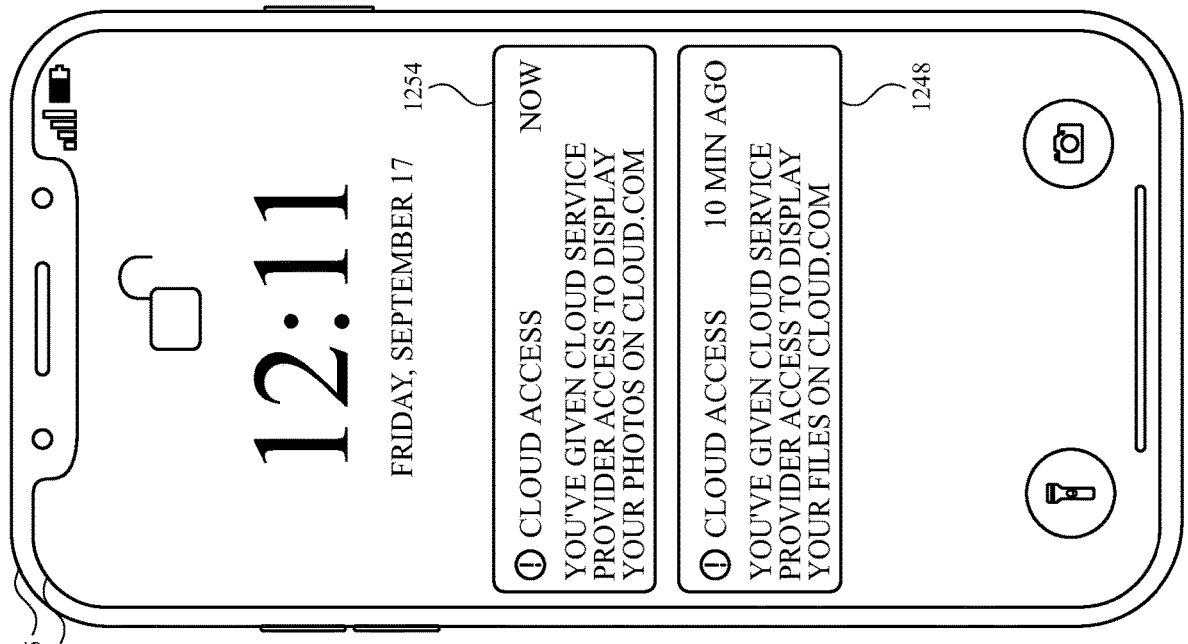
Figure 12H:
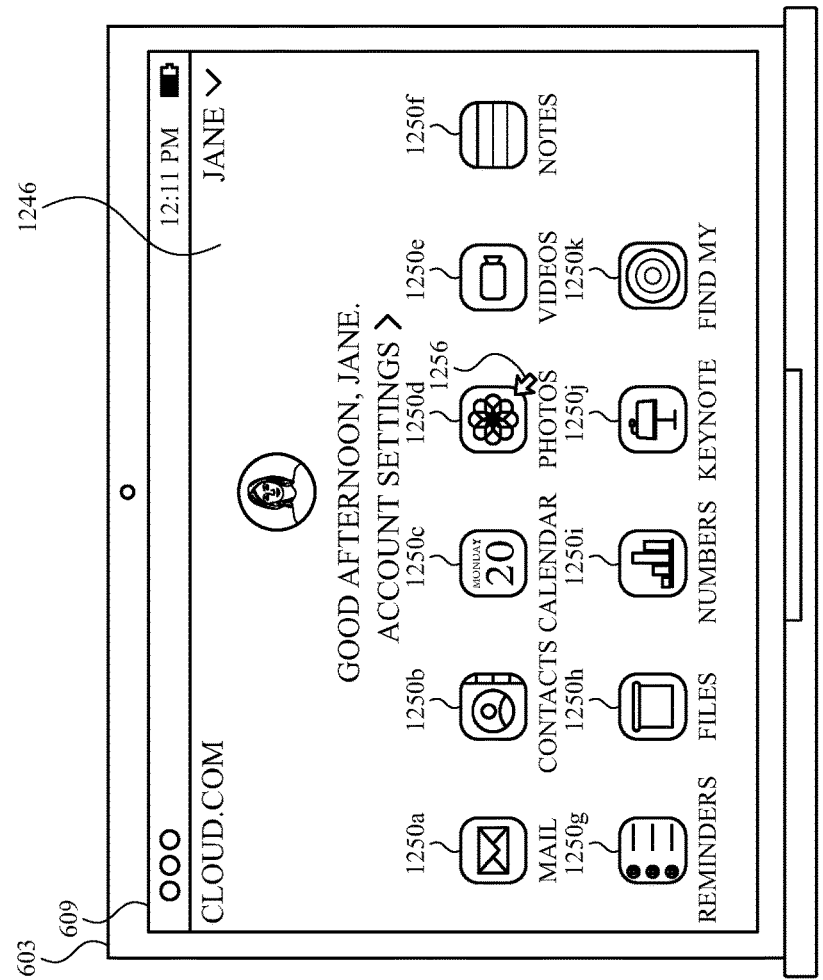
Figure 12I:
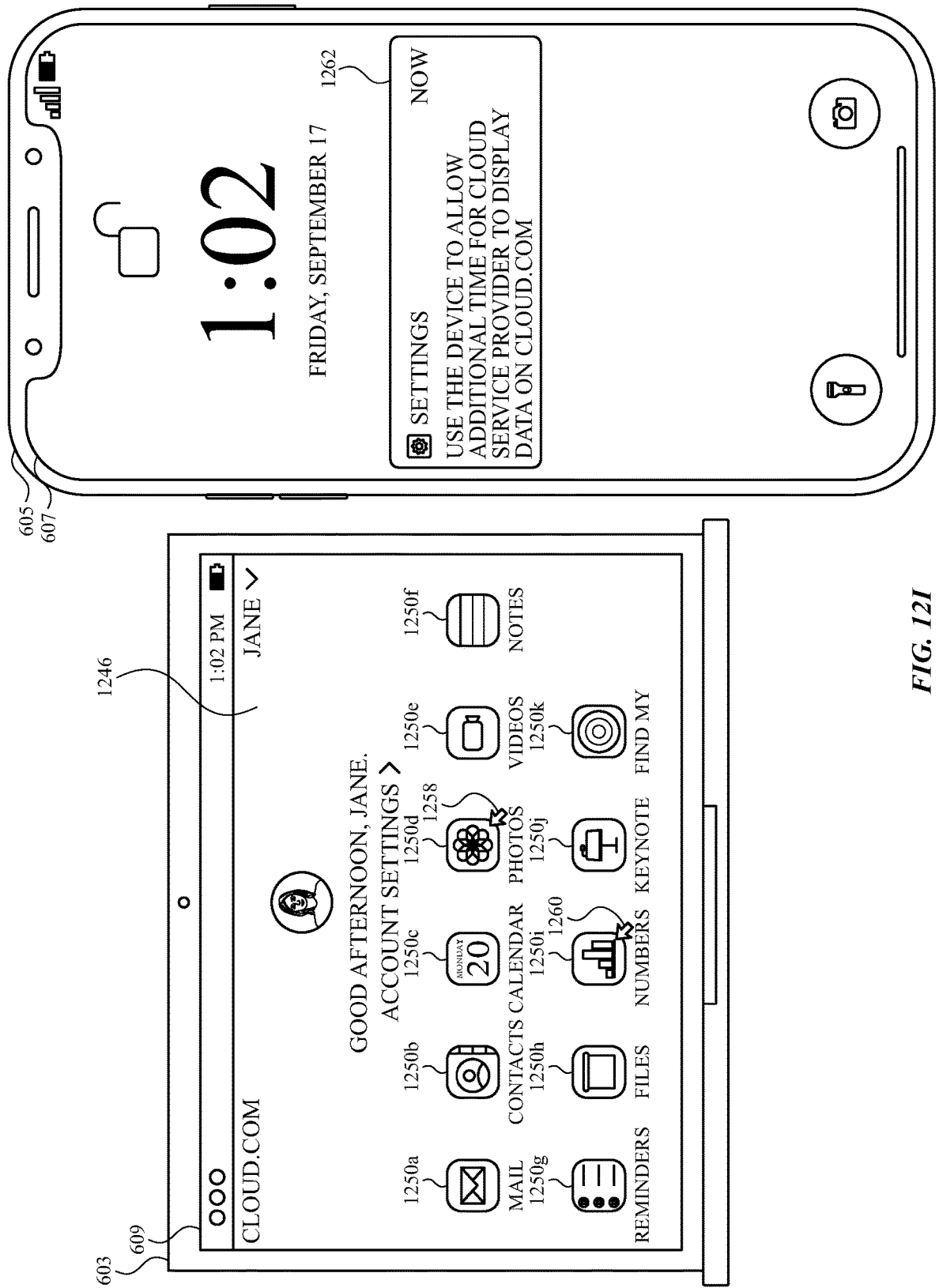

Once the service has been authorized to access data, device 603 may thereafter (e.g., for a given session, for a given period of time) be used to access user data. For example, while displaying confirmation interface 1227, device 603 detects selection of acknowledgement affordance 1228. The selection is a user input 1244 (e.g., mouse click) on the acknowledgement affordance 1228. In response to user input 1244, device 603 displays data interface 1246, as shown in FIG. 12G.

Data interface 1246 includes data affordances 1250*a-k*, each of which corresponds to a respective data type. For example, data affordance 1250*a* corresponds to a mail data type, data affordance 1250*b* corresponds to contacts data, data affordance 1250*c* corresponds to calendar data, data affordance 1250*d* corresponds to photos data, data affordance 1250*e* corresponds to videos data, data affordance 1250*f* corresponds to notes data, data affordance 1250*g* corresponds to task data, data affordance 1250*h* corresponds to files data, data affordance 1250*i* corresponds to numbers data, data affordance 1250*j* corresponds to presentation data, and data affordance 1250*k* corresponds to device geolocation data.

Each data affordance 1250 may be used to access data of the corresponding type. For example, while displaying the data interface 1246, device 603 detects selection of data affordance 1250*h* corresponding to files data. The selection is a user input 1252 (e.g., mouse click) on the data affordance 1250*h*. In response to selection of data affordance 1250*h*, at 12:01 PM, device 603 provides a request to the service for access to files data for the user account. Because, at 12:01 PM the service is authorized to access data (recall that the service was authorized at 12:00 PM for 1 hour), in turn, the service retrieves the decryption key for files data from device 605, decrypts the data using the decryption key, and provides the requested files data to device 603.

In some embodiments, upon providing the decryption key to the service, device 605 indicates that access has been provided to the service. With reference to FIG. 12G, device 605 displays notification 1248 indicating that the service has been provided with access to files data.

Thereafter, other types of data may be accessed so long as the service is authorized to access data. For example, in FIG. 8H, while displaying the data interface 1246, device 603 detects selection of data affordance 1250*d* corresponding to photos data. The selection is a user input 1256 (e.g., mouse click) on the data affordance 1250*d*. In response to selection of data affordance 1250*d*, at 12:11 PM, device 603 provides a request to the service for access to photos data for the user account. Because, at 12:11 PM the service is authorized to access data (recall that the service was authorized at 12:00 PM for 1 hour), the service retrieves the decryption key for photos data from device 605, decrypts the data using the decryption key, and provides the requested photos data to device 603. Additionally, device 605 displays notification 1254 indicating that the service has been provided with access to photos data.

In some embodiments, the service can access data even after the service is no longer authorized to access data. For example, in FIG. 8I, while displaying the data interface 1246, device 603 detects selection of data affordance 1250*d* corresponding to photos data. The selection is a user input 1258 (e.g., mouse click) on the data affordance 1250*d*. In response to selection of data affordance 1250*d*, at 1:02 PM, device 603 provides a request to the service for access to photos data for the user account. Although the service is no longer authorized to access data at 1:02 PM (recall that the service was authorized at 12:00 PM for 1 hour), the service is still in possession of the decryption key for photos data, and can provide photos data in response to the request provided by device 603. In some embodiments, the service retains keys in this manner for the time in which the user remains authenticated by the service.

In some embodiments, the time for which the service is authorized may be extended and/or renewed. With further reference to FIG. 8I, while displaying the data interface 1246, device 603 detects selection of data affordance 1250*i* corresponding to numbers data. The selection is a user input 1260 (e.g., mouse click) on the data affordance 1250*i*. In response to selection of data affordance 1250*d*, at 1:02 PM, device 603 provides a request to the service for access to numbers data for the user account. Because the service is no longer authorized to access data, device 605 does not provide the service with a decryption key necessary to access the numbers data for the user account. Rather, device 605 displays a notification 1262 which, when selected, prompts the user to authorize (e.g., re-authorize) the service to access data associated with the user account, as described.

In some embodiments, a subset of data types do not require authorization to be accessed or may be accessed without fully authenticating a user with two-factor authentication. In FIG. 8J, for instance, device 603 displays data interface 1263 in an example in which the service has not been authorized to access data. As shown, data affordances

Figure 12J:
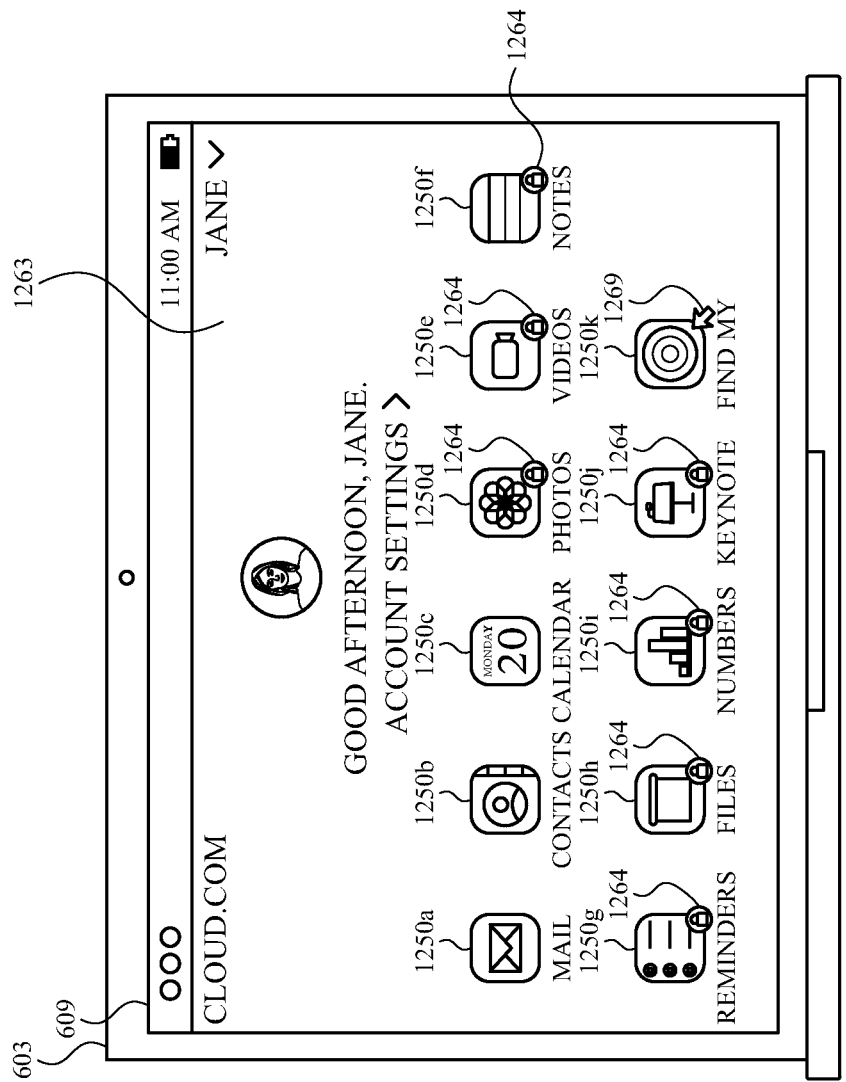
Figure 12K:
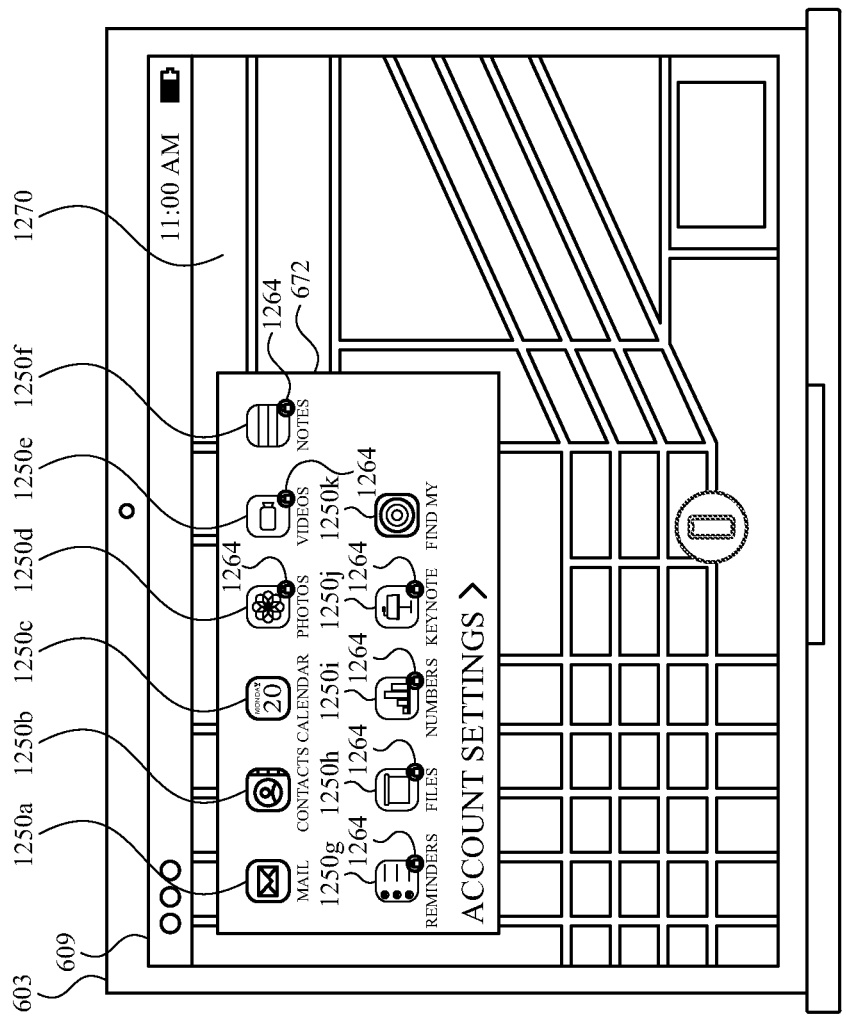

1250d-j are displayed with indicators 1264, indicating that data types associated with data affordances 1250d-j, respectively, require authorization to be accessed. Data affordances 1250a-c,k are not displayed with an indicator, indicating that data types associated with data affordances 1250a-c,k do not require authorization to access. For example, while displaying data interface 1263, device 603 detects selection of data affordance 1250k corresponding to device geolocation data. The selection is a user input 1269 (e.g., mouse click) on data affordance 1250k. As shown in FIG. 12K, in response to selection of data affordance 1250k, device 603 displays map interface 1270 corresponding to the requested device geolocation data.

FIG. 13 is a flow diagram illustrating a method for managing data access using a computer system in accordance with some embodiments. Method 1300 is performed at a computer system (e.g., 100, 300, 500, 600, 603, 605) (e.g., a personal computer, a tablet, a smartphone) that is in communication with a display generation component (e.g., a television, a display controller, an internal or external touch-sensitive display system) and one or more input devices (e.g., a touch-sensitive surface, a mouse, a keyboard). Some operations in method 1300 are, optionally, combined, the orders of some operations are, optionally, changed, and some operations are, optionally, omitted.

As described below, method 1300 provides an intuitive way for managing data access. The method reduces the cognitive burden on a user for managing data access, thereby creating a more efficient human-machine interface. For battery-operated computing devices, enabling a user to manage data access faster and more efficiently conserves power and increases the time between battery charges.

After displaying, via the display generation component (609), data of a first type (e.g., photos, contacts, notes, calendar), the computer system (e.g., 603) receives (1302), via the one or more input devices, a request (e.g., 1256, 1258, 1260, 1269) to display respective data. In some embodiments, the request is a user input (e.g., 1256, 1258, 1260, 1269), such as a mouse click. In some embodiments, the request to access data is selection of an affordance (e.g., 1250a-k), for instance, on a touch-sensitive display. In some embodiments, the selected affordance is a set of affordances that correspondence to a set of data types, respectively.

In response to receiving the request to display the respective data (1304), in accordance with a determination that the request to display the respective data satisfies access criteria, the computer system displays (1306) the requested respective data (e.g., displaying the requested respective data regardless of whether the respective data is data of a specific type). In some embodiments, the access criteria includes a requirement that the request (e.g., 1256, 1258, 1260, 1269) is received by the computer system within a time window. In some embodiments, the time window is defined by a time at which a user has authorized to access data including the requested data and a predetermined amount of time. In some embodiments, the time window is 1 hour in length.

In response to receiving the request to display the respective data (1304), in accordance with a determination that the request to display the respective data does not satisfy the access criteria (1308), in accordance with a determination that the request to display the respective data is a request to display data of the first type, the computer system displays (1310) (e.g., receives, accesses), via the display generation component, the requested respective data. In some embodiments, the computer system displays requested data if the requested data is a same type as previously displayed data, regardless if the access criteria is met. In some embodiments, prior to the computer system displaying data, a remote server hosting the data receives a key for accessing the data of the first type and can subsequently provide the data of the first type to the computer system such that the computer system can thereafter display the data of the first type regardless of whether access criteria is met.

In response to receiving the request to display the respective data (1304), in accordance with a determination that the request to display the respective data does not satisfy the access criteria (1308), in accordance with a determination that the request to display the respective data is not a request to display data of the first type (e.g., the request is a request to display data of a second type, different than the first type), the computer system initiates (1312) a process to display a first notification (e.g., 1230) on an external device (e.g., 605) (e.g., mobile device) for providing the computer system access to the requested respective data. In some embodiments, initiating the process includes transmitting a set of instructions to the external device (e.g., 605) and/or to a another device (e.g., a communication server) in communication with the external device. In some embodiments, selection of the notification (e.g., 1230) at the external device initiates a process for providing the computer system access to the respective data (e.g., as described with reference to FIGS. 12D-F). In some embodiments, providing the computer system access to the data of the respective data includes providing a second external device (e.g., server hosting the data) access to the respective data. In some embodiments, the second external device is provided with the necessary decryption mechanism (e.g., decryption key) to access encrypted data such that the server provides unencrypted data to the computer system. In some embodiments, a decryption mechanism is provided for each data type accessed by the computer system. Displaying requested data of a particular type when a request to display the requested data does not meet access criteria allows a user to retrieve previously accessed data without additional authentication and/or authorization, which reduces the number of inputs needed to perform an operation.

In some embodiments, the access criteria includes a criterion that is met when the request (e.g., 1256, 1258, 1260, 1269) to display the respective data is received within a predetermined amount of time (e.g., 1 hour) after the computer system has been authorized to access the respective data. In some embodiments, the external device (e.g., 605) is used to provide the computer system with access (e.g., authorize the computer system to access) the requested data. In some embodiments, the external device provides access to the computer system in response to a set of one or more inputs (e.g., 1232, 1238, 1242). Authorizing the computer system to access data for a predetermined amount of time allows for a user to access multiple types of data without a need to authorize for each access, which reduces the number of inputs needed to perform an operation.

In some embodiments, prior to displaying the data of the first type, the computer system receives a request to display the data of the first type (e.g., 1256, 1258, 1260, 1269). In some embodiments, in response to receiving the request to display the data of the first type, the computer system initiates a process to display a second notification (e.g., 1230) on the external device (e.g., mobile device) for providing the computer system access to the data of the first type. In some embodiments, selection of the notification at the external device initiates a process for providing the computer system access to the data of the first type (e.g., as described with reference to FIG. 12G. In some embodiments, providing the computer system access to the data of the first type includes providing a second external device (e.g., server hosting the data) access to the data of the first type (e.g., the server is provided with the necessary decryption mechanism (e.g., decryption key) to access encrypted data such that the server provides unencrypted data to the computer system. In some embodiments, a decryption mechanism is provided for each data type accessed by the computer system.

In some embodiments, the first notification (e.g., 1230), when selected, initiates a process (e.g., a process at the external device, the computer system, and/or a second external device (e.g., a server)) for providing the computer system access to the requested respective data. In some embodiments, the process includes prompting (e.g., with notification 1230 of interface 1229) a user to provide input allowing or denying the computer system access to the respective data. In some embodiments, the process includes displaying a set of one or more user interfaces (e.g., interfaces including notifications 1248, 1254) indicating the manner in which access is provided and/or types of data to which access is provided. By way of example, access may be provided to the computer system such that the respective data may be accessed using web browser and/or first-party applications. As another example, access may be provided for a subset of a set of data types or for all data types (e.g., data types corresponding to data affordances 1250*a*-*k*).

In some embodiments, after displaying the requested respective data, the computer system initiates a process to display a third notification (e.g., 1248, 1254) on the external device indicating that the computer system has been provided access to the requested respective data. In some embodiments, the notification (e.g., 1248, 1254) indicating that the computer system has been provided access to the requested respective data is displayed after the computer system has accessed the requested respective data. In some embodiments, the notification (e.g., 1248, 1254) indicates one or more types of data accessed by the computer system. Displaying a notification on an external device to indicate that the computer system has been provided access provides the user with visual feedback regarding whether the computer system has been provided access to data, which provides improved visual feedback.

In some embodiments, prior to displaying the data of the first type, the computer system initiates a process to authenticate a user of the computer system (e.g., authenticate an identity of a user of the computer system) using the external device (e.g., as described with reference to FIGS. 12A-B). In some embodiments, accessing the data of the first type and/or the requested respective data requires that a user of the computer system be authenticated using one or more known authentication schemes, such as two-factor authentication. In some embodiments, the user of the computer system is authenticated with the external device, for instance, using an authentication code provided (e.g., received, displayed, generated) by the external device. In some embodiments, the external device receives the authentication code via a data messaging application and/or an SMS protocol. In some embodiments, if the authentication code is received via the SMS protocol, the authentication code may be used to authenticate the computer system such that the computer system has access to a predetermined set of data types (e.g., mail, contacts, calendar, and/or device geolocation data). In some embodiments, the set of predetermined set of data types is a subset of data types that would otherwise be accessed by the computer system if the authentication code were not received via the SMS protocol. In some embodiments, the computer system is authenticated in response to a user authenticating with the external device using biometric (e.g., facial, fingerprint, iris) authentication. In some embodiments, further prior to displaying data of first type, the computer system initiates a process for checking web access permissions. In some embodiments, the process includes checking (using the computer system and/or external device) whether web access is enabled for an account of the user of the computer system. In some embodiments, if web access is disabled, the external device displays a notification requesting user approval for web access by the computer system.

In some embodiments, the computer system displays, via the display generation component, a data access interface (e.g., 1246, 1263). In some embodiments, the data access interface includes an affordance (e.g., 1250*a*-*k*) for each data type for which the computer system may request access. In some embodiments, the data access interface includes a first affordance (e.g., 1250*a*-*k*) corresponding to the data of the first type (e.g., mail, contacts, calendar, device geolocation data). In some embodiments, selection of the first affordance causes the computer system to display data of the first type. In some embodiments, the data access interface includes a second affordance (e.g., 1250*a*-*k*) corresponding to data of a second type (e.g., photos, notes, files), where the second type is different than the first type. In some embodiments, selection of the second affordance causes the computer system to selectively display data of the second type. In some embodiments, the computer system displays data of the second type when the computer system has been authorized to access the data of the second type. In some embodiments, the first affordance has a first display characteristic (e.g., lack of indicator 1264) indicating that the computer system has been provided access to the data of the first type. In some embodiments, if the computer system has been provided access to data of the first type, the first affordance is displayed without an indicator (e.g., lock icon) indicating that the computer system has not been provided access to the first data type. In some embodiments, the second affordance has a second display characteristic (e.g., 1264), different than the first display characteristic, indicating that the computer system has not been provided access to the data of the second type. In some embodiments, if the computer system has not been provided access to data of the second type, the second affordance is displayed with an indicator (e.g., lock icon) indicating that the computer system has not been provided access to the second data type. Displaying a data access interface with a first affordance and a second affordance corresponding to respective data types in this manner allows a user to quickly and efficiently select a data type to access, which reduces the number of inputs needed to perform an operation.

In some embodiments, providing an indication that the computer system is authorized to access data includes authenticating (e.g., biometrically authenticating), using the external device, a user of the user account.

In some embodiments, the request to display the respective data satisfies access criteria when the respective data includes (e.g., only includes) unsecured data (e.g., mail, contacts, calendar, device geolocation data) (e.g., as described with reference to FIG. 12J).

Note that details of the processes described above with respect to method 1300 (e.g., FIG. 11) are also applicable in an analogous manner to the methods described below. For example, method 1100 optionally includes one or more of the characteristics of the various methods described above with reference to method 1300. For example, disabling web access to data, as described in method 900, may cause the computer system and/or one or more external devices to selectively limit access to data based on access criteria, as described in method 1300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the manner in which users access accounts. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate users during account recovery processes. Accordingly, use of such personal information data enables users to access authorized accounts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of account recovery, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, account access may be provided based on non-personal information data or a bare minimum amount of personal information, such as a password associated with a user, other non-personal information available to the account authentication services, or publicly available information.

What is claimed is:

1. A computer system configured to communicate with a display generation component and one or more input devices, comprising:
 one or more processors; and
 memory storing one or more programs configured to be executed by the one or more processors, the one or more programs including instructions for:
  performing a recovery contact set up process including
   providing a notification to a contact device;

after performing the recovery contact set up process, receiving, via the one or more input devices, a request to initiate an account recovery process via the contact device;

in response to the request to initiate the account recovery process via the contact device and without providing a request to the contact device for a set of recovery credentials via the computer system, displaying, via the display generation component, a recovery code interface for receiving the set of recovery credentials;

while displaying of the recovery code interface, receiving the set of recovery credentials, wherein the set of recovery credentials are generated at the contact device;

in accordance with a determination that the recovery credentials are valid, performing a recovery function; and in accordance with a determination that the recovery credentials are not valid, forgoing performing the recovery function.

2. The computer system of claim 1, wherein the computer system is associated with a user, wherein performing the recovery contact set up process includes authenticating, via the one or more input devices, the user.

3. The computer system of claim 1, wherein:
performing the recovery contact set up process includes:
receiving a first user input corresponding to a contact associated with the contact device; and
in response to receiving the first user input and in accordance with a determination that the contact is a contact of a first type, adding the contact as a recovery contact; and
providing the notification to the contact device occurs in response to receiving the first user input.

4. The computer system of claim 3, wherein providing the notification to the contact device includes:
in response to the first user input and in accordance with a determination that the contact is not a contact of the first type, providing a request to the contact device to add the contact as a recovery contact, without adding the contact as a recovery contact in response to the first user input.

5. The computer system of claim 4, the one or more programs further including instructions for:
after providing the request to the contact device to add the contact as a recovery contact, receiving, from the contact, an approval of the request to add the contact as a recovery contact; and
in response to receiving the approval, adding the contact as a recovery contact.

6. The computer system of claim 1, wherein performing the recovery contact set up process includes initiating the recovery contact set up process, the one or more programs further including instructions for:
after initiating the recovery contact set up process, displaying a recovery settings interface that includes:
a first recovery contact graphical object that corresponds to a first recovery contact that is authorized to receive the set of recovery credentials for use in the recovery function; and
a first recovery contactee graphical object that indicates a second contact that a user of the computer system is authorized to assist with a second recovery function.

7. The computer system of claim 1, the one or more programs further including instructions for:

prior to displaying the recovery code interface, displaying, via the display generation component, an authentication interface that includes a set of one or more user-interactive graphical user interface objects for authenticating a user of the computer system;

receiving a first set of one or more user inputs that includes a second user input that is received while displaying the authentication interface; and in response to receiving the first set of one or more user inputs, ceasing to display the authentication interface, without authenticating a user of the computer system, wherein the first set of one or more user inputs is the request to initiate the account recovery process.

8. The computer system of claim 7, wherein:
the authentication interface includes a forgot passcode user-interactive graphical user interface object that, when selected, causes the authentication interface to cease being displayed without authenticating a user of the computer system; and
the second user input corresponds to the forgot passcode user-interactive graphical user interface object.

9. The computer system of claim 7, wherein the first set of one or more user inputs includes a third user input, the one or more programs further including instructions for:
in response to the third user input, displaying a help user interface that includes an ask for help user-interactive graphical user interface object;
wherein:
the third user input corresponds to the ask for help user-interactive graphical user interface object.

10. The computer system of claim 7, wherein the first set of one or more user inputs includes a fourth user input, the one or more programs further including instructions for:
after ceasing to display the authentication interface, without authenticating a user of the computer system, displaying a plurality of device user-interactive graphical user interface objects that corresponds to external electronic devices associated with a contact associated with the contact device;
wherein the fourth user input corresponds to a first device user-interactive graphical user interface object of the plurality of device user-interactive graphical user interface objects that corresponds to a first external electronic device associated with the contact.

11. The computer system of claim 10, the one or more programs further including instructions for:
in response to the fourth user input, displaying:
in accordance with a determination that the first external electronic device is a device of a first type, a first set of instructions for providing the set of recovery credentials on the first external electronic device; and
in accordance with a determination that the first external electronic device is a device of a second type, a second set of instructions, different from the first set of instructions, for providing the set of recovery credentials on the first external electronic device.

12. The computer system of claim 1, wherein the account recovery process is performed for a user account and wherein performing the recovery function includes initiating a password change process for the user account.

13. The computer system of claim 1, the one or more programs further including instructions for:
receiving, from a first external computer system, a request for a user of the computer system to be added as a recovery contact for the first external computer system; and in response to receiving the request for the user of the computer system to be added as a recovery contact for the first external computer system, displaying an acceptance user-interactive graphical user interface object;

receiving a user input corresponding to the acceptance user-interactive graphical user interface object; and in response to receiving the user input corresponding to the acceptance user-interactive graphical user interface object, transmitting, to the first external computer system, an indication that the request was accepted.

14. The computer system of claim 13, the one or more programs further including instructions for:

after transmitting, to the first external computer system, the indication that the request was accepted, receiving a second set of one or more user inputs; and in response to receiving the second set of one or more user inputs, providing a second set of recovery credentials that, when entered at the first external computer system, enables a second recovery function.

15. A non-transitory computer-readable storage medium storing one or more programs configured to be executed by one or more processors of a computer system that is in communication with a display generation component and one or more input devices, the one or more programs including instructions for:

performing a recovery contact set up process including providing a notification to a contact device;

after performing the recovery contact set up process, receiving, via the one or more input devices, a request to initiate an account recovery process via the contact device;

in response to the request to initiate the account recovery process via the contact device and without providing a request to the contact device for a set of recovery credentials via the computer system, displaying, via the display generation component, a recovery code interface for receiving the set of recovery credentials;

while displaying of the recovery code interface, receiving the set of recovery credentials, wherein the set of recovery credentials are generated at the contact device;

in accordance with a determination that the recovery credentials are valid, performing a recovery function; and in accordance with a determination that the recovery credentials are not valid, forgoing performing the recovery function.

16. The non-transitory computer-readable storage medium of claim 15, wherein the computer system is associated with a user, wherein performing the recovery contact set up process includes authenticating, via the one or more input devices, the user.

17. The non-transitory computer-readable storage medium of claim 15, wherein:

performing the recovery contact set up process includes:

receiving a first user input corresponding to a contact associated with the contact device; and in response to receiving the first user input and in accordance with a determination that the contact is a contact of a first type, adding the contact as a recovery contact; and providing the notification to the contact device occurs in response to receiving the first user input.

18. The non-transitory computer-readable storage medium of claim 17, wherein providing the notification to the contact device includes:

in response to the first user input and in accordance with a determination that the contact is not a contact of the first type, providing a request to the contact device to add the contact as a recovery contact, without adding the contact as a recovery contact in response to the first user input.

19. The non-transitory computer-readable storage medium of claim 18, the one or more programs further including instructions for:

after providing the request to the contact device to add the contact as a recovery contact, receiving, from the contact, an approval of the request to add the contact as a recovery contact; and in response to receiving the approval, adding the contact as a recovery contact.

20. The non-transitory computer-readable storage medium of claim 15, wherein performing the recovery contact set up process includes initiating the recovery contact set up process, the one or more programs further including instructions for:

after initiating the recovery contact set up process, displaying a recovery settings interface that includes:

a first recovery contact graphical object that corresponds to a first recovery contact that is authorized to receive the set of recovery credentials for use in the recovery function; and a first recovery contactee graphical object that indicates a second contact that a user of the computer system is authorized to assist with a second recovery function.

21. The non-transitory computer-readable storage medium of claim 15, the one or more programs further including instructions for:

prior to displaying the recovery code interface, displaying, via the display generation component, an authentication interface that includes a set of one or more user-interactive graphical user interface objects for authenticating a user of the computer system;

receiving a first set of one or more user inputs that includes a second user input that is received while displaying the authentication interface; and in response to receiving the first set of one or more user inputs, ceasing to display the authentication interface, without authenticating a user of the computer system, wherein the first set of one or more user inputs is the request to initiate the account recovery process.

22. The non-transitory computer-readable storage medium of claim 21, wherein:

the authentication interface includes a forgot passcode user-interactive graphical user interface object that, when selected, causes the authentication interface to cease being displayed without authenticating a user of the computer system; and the second user input corresponds to the forgot passcode user-interactive graphical user interface object.

23. The non-transitory computer-readable storage medium of claim 21, wherein the first set of one or more user inputs includes a third user input, the one or more programs further including instructions for:

in response to the third user input, displaying a help user interface that includes an ask for help user-interactive graphical user interface object;

wherein:

the third user input corresponds to the ask for help user-interactive graphical user interface object.

24. The non-transitory computer-readable storage medium of claim 21, wherein the first set of one or more user inputs includes a fourth user input, the one or more programs further including instructions for:

after ceasing to display the authentication interface, without authenticating a user of the computer system, displaying a plurality of device user-interactive graphical user interface objects that corresponds to external electronic devices associated with a contact associated with the contact device;

wherein the fourth user input corresponds to a first device user-interactive graphical user interface object of the plurality of device user-interactive graphical user interface objects that corresponds to a first external electronic device associated with the contact.

25. The non-transitory computer-readable storage medium of claim 24, the one or more programs further including instructions for:

in response to the fourth user input, displaying:

in accordance with a determination that the first external electronic device is a device of a first type, a first set of instructions for providing the set of recovery credentials on the first external electronic device; and in accordance with a determination that the first external electronic device is a device of a second type, a second set of instructions, different from the first set of instructions, for providing the set of recovery credentials on the first external electronic device.

26. The non-transitory computer-readable storage medium of claim 15, wherein the account recovery process is performed for a user account and wherein performing the recovery function includes initiating a password change process for the user account.

27. The non-transitory computer-readable storage medium of claim 15, the one or more programs further including instructions for:

receiving, from a first external computer system, a request for a user of the computer system to be added as a recovery contact for the first external computer system; and in response to receiving the request for the user of the computer system to be added as a recovery contact for the first external computer system, displaying an acceptance user-interactive graphical user interface object;

receiving a user input corresponding to the acceptance user-interactive graphical user interface object; and in response to receiving the user input corresponding to the acceptance user-interactive graphical user interface object, transmitting, to the first external computer system, an indication that the request was accepted.

28. The non-transitory computer-readable storage medium of claim 27, the one or more programs further including instructions for:

after transmitting, to the first external computer system, the indication that the request was accepted, receiving a second set of one or more user inputs; and in response to receiving the second set of one or more user inputs, providing a second set of recovery credentials that, when entered at the first external computer system, enables a second recovery function.

29. A method, comprising:

at a computer system in communication with a display generation component and one or more input devices:

performing a recovery contact set up process including providing a notification to a contact device;

after performing the recovery contact set up process, receiving, via the one or more input devices, a request to initiate an account recovery process via the contact device;

in response to the request to initiate the account recovery process via the contact device and without providing a request to the contact device for a set of recovery credentials via the computer system, displaying, via the display generation component, a recovery code interface for receiving the set of recovery credentials;

while displaying of the recovery code interface, receiving the set of recovery credentials, wherein the set of recovery credentials are generated at the contact device;

in accordance with a determination that the recovery credentials are valid, performing a recovery function; and in accordance with a determination that the recovery credentials are not valid, forgoing performing the recovery function.

30. The method of claim 29, wherein the computer system is associated with a user, wherein performing the recovery contact set up process includes authenticating, via the one or more input devices, the user.

31. The method of claim 29, wherein:

performing the recovery contact set up process includes:

receiving a first user input corresponding to a contact associated with the contact device; and in response to receiving the first user input and in accordance with a determination that the contact is a contact of a first type, adding the contact as a recovery contact; and providing the notification to the contact device occurs in response to receiving the first user input.

32. The method of claim 31, wherein providing the notification to the contact device includes:

in response to the first user input and in accordance with a determination that the contact is not a contact of the first type, providing a request to the contact device to add the contact as a recovery contact, without adding the contact as a recovery contact in response to the first user input.

33. The method of claim 32, the method further comprising:

after providing the request to the contact device to add the contact as a recovery contact, receiving, from the contact, an approval of the request to add the contact as a recovery contact; and in response to receiving the approval, adding the contact as a recovery contact.

34. The method of claim 29, wherein performing the recovery contact set up process includes initiating the recovery contact set up process, the method further comprising:

after initiating the recovery contact set up process, displaying a recovery settings interface that includes:

a first recovery contact graphical object that corresponds to a first recovery contact that is authorized to receive the set of recovery credentials for use in the recovery function; and a first recovery contactee graphical object that indicates a second contact that a user of the computer system is authorized to assist with a second recovery function.

35. The method of claim 29, the method further comprising:

prior to displaying the recovery code interface, displaying, via the display generation component, an authentication interface that includes a set of one or more user-interactive graphical user interface objects for authenticating a user of the computer system;

receiving a first set of one or more user inputs that includes a second user input that is received while displaying the authentication interface; and in response to receiving the first set of one or more user inputs, ceasing to display the authentication interface, without authenticating a user of the computer system, wherein the first set of one or more user inputs is the request to initiate the account recovery process.

36. The method of claim 35, wherein:

the authentication interface includes a forgot passcode user-interactive graphical user interface object that, when selected, causes the authentication interface to cease being displayed without authenticating a user of the computer system; and the second user input corresponds to the forgot passcode user-interactive graphical user interface object.

37. The method of claim 35, wherein the first set of one or more user inputs includes a third user input, the method further comprising:

in response to the third user input, displaying a help user interface that includes an ask for help user-interactive graphical user interface object;

wherein:

the third user input corresponds to the ask for help user-interactive graphical user interface object.

38. The method of claim 35, wherein the first set of one or more user inputs includes a fourth user input, the method further comprising:

after ceasing to display the authentication interface, without authenticating a user of the computer system, displaying a plurality of device user-interactive graphical user interface objects that corresponds to external electronic devices associated with a contact associated with the contact device;

wherein the fourth user input corresponds to a first device user-interactive graphical user interface object of the plurality of device user-interactive graphical user interface objects that corresponds to a first external electronic device associated with the contact.

39. The method of claim 38, the method further comprising:

in response to the fourth user input, displaying:

in accordance with a determination that the first external electronic device is a device of a first type, a first set of instructions for providing the set of recovery credentials on the first external electronic device; and in accordance with a determination that the first external electronic device is a device of a second type, a second set of instructions, different from the first set of instructions, for providing the set of recovery credentials on the first external electronic device.

40. The method of claim 29, wherein the account recovery process is performed for a user account and wherein performing the recovery function includes initiating a password change process for the user account.

41. The method of claim 29, the method further comprising:

receiving, from a first external computer system, a request for a user of the computer system to be added as a recovery contact for the first external computer system; and in response to receiving the request for the user of the computer system to be added as a recovery contact for the first external computer system, displaying an acceptance user-interactive graphical user interface object;

receiving a user input corresponding to the acceptance user-interactive graphical user interface object; and in response to receiving the user input corresponding to the acceptance user-interactive graphical user interface object, transmitting, to the first external computer system, an indication that the request was accepted.

42. The method of claim 41, the method further comprising:

after transmitting, to the first external computer system, the indication that the request was accepted, receiving a second set of one or more user inputs; and in response to receiving the second set of one or more user inputs, providing a second set of recovery credentials that, when entered at the first external computer system, enables a second recovery function.

\* \* \* \* \*